(12) United States Patent
Arnold

(10) Patent No.: US 12,265,550 B2
(45) Date of Patent: Apr. 1, 2025

(54) CACHING PRECOMPUTED BINOMIAL COEFFICIENT VALUES FOR QUERY EXECUTION

(71) Applicant: Ocient Holdings LLC, Chicago, IL (US)

(72) Inventor: Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/330,455

(22) Filed: Jun. 7, 2023

(65) Prior Publication Data
US 2024/0104097 A1 Mar. 28, 2024

Related U.S. Application Data

(60) Provisional application No. 63/376,522, filed on Sep. 21, 2022.

(51) Int. Cl.
*G06F 16/28* (2019.01)
*G06F 16/22* (2019.01)
(Continued)

(52) U.S. Cl.
CPC ........ *G06F 16/284* (2019.01); *G06F 16/2282* (2019.01); *G06F 16/24532* (2019.01);
(Continued)

(58) Field of Classification Search
CPC .............. G06F 16/284; G06F 16/2282; G06F 16/24542; G06F 16/24552; G06F 16/2455;
(Continued)

(56) References Cited

U.S. PATENT DOCUMENTS 5,548,770 A 8/1996 Bridges
6,230,200 B1 5/2001 Forecast
(Continued)

FOREIGN PATENT DOCUMENTS

CN 106842306 A * 6/2017 ............... G01V 1/28

OTHER PUBLICATIONS

A new high performance fabric for HPC, Michael Feldman, May 2016, Intersect360 Research.
(Continued)

*Primary Examiner* — Evan Aspinwall
(74) *Attorney, Agent, or Firm* — Garlick & Markison; Katherine C. Stuckman; Bruce E. Stuckman

(57) ABSTRACT

A database system is operable to determine a query for execution against at least one relational database table and executing the query. Executing the query is based on identifying a plurality of required binomial coefficient values required for generating a set of output values for the query. The plurality of required binomial coefficient values are precomputed and stored in cache memory resources. Generating each output value of the set of output values is based on identifying a subset of the plurality of required binomial coefficient values for generating the each output value, and accessing the subset of the plurality of required binomial coefficient value in the cache memory resources. Each output value is generated as a function of the subset of the plurality of required binomial coefficient values.

20 Claims, 117 Drawing Sheets

(51) Int. Cl.
*G06F 16/2453* (2019.01)
*G06F 16/2455* (2019.01)

(52) U.S. Cl.
CPC .... *G06F 16/24542* (2019.01); *G06F 16/2455* (2019.01); *G06F 16/24552* (2019.01)

(58) Field of Classification Search
CPC .. G06F 16/24532; G06F 16/285; G06F 17/18; G06N 7/01; G06N 3/08; G06N 5/04; G16H 50/30; G16H 50/70; H03M 7/3068; H03M 7/3079; H03M 7/70; H04N 19/91; H04N 19/463
USPC ........................................................ 707/718
See application file for complete search history.

(56) References Cited

U.S. PATENT DOCUMENTS

| | | | |
|---|---|---|---|
| 6,633,772 | B2 | 10/2003 | Ford |
| 7,499,907 | B2 | 3/2009 | Brown |
| 7,908,242 | B1 | 3/2011 | Achanta |
| 2001/0051949 | A1 | 12/2001 | Carey |
| 2002/0032676 | A1 | 3/2002 | Reiner |
| 2004/0162853 | A1 | 8/2004 | Brodersen |
| 2008/0133456 | A1 | 6/2008 | Richards |
| 2009/0063893 | A1 | 3/2009 | Bagepalli |
| 2009/0183167 | A1 | 7/2009 | Kupferschmidt |
| 2010/0082577 | A1 | 4/2010 | Mirchandani |
| 2010/0241646 | A1 | 9/2010 | Friedman |
| 2010/0274983 | A1 | 10/2010 | Murphy |
| 2010/0312756 | A1 | 12/2010 | Zhang |
| 2011/0219169 | A1 | 9/2011 | Zhang |
| 2012/0109888 | A1 | 5/2012 | Zhang |
| 2012/0151118 | A1 | 6/2012 | Flynn |
| 2012/0185866 | A1 | 7/2012 | Couvee |
| 2012/0254252 | A1 | 10/2012 | Jin |
| 2012/0311246 | A1 | 12/2012 | McWilliams |
| 2013/0332484 | A1 | 12/2013 | Gajic |
| 2014/0047095 | A1 | 2/2014 | Breternitz |
| 2014/0136510 | A1 | 5/2014 | Parkkinen |
| 2014/0188841 | A1 | 7/2014 | Sun |
| 2015/0205607 | A1 | 7/2015 | Lindholm |
| 2015/0244804 | A1 | 8/2015 | Warfield |
| 2015/0248366 | A1 | 9/2015 | Bergsten |
| 2015/0293966 | A1 | 10/2015 | Cai |
| 2015/0310045 | A1 | 10/2015 | Konik |
| 2016/0034547 | A1 | 2/2016 | Lerios |
| 2018/0101536 | A1* | 4/2018 | Govindarajan ..... G06F 16/2228 |
| 2019/0089785 | A1* | 3/2019 | Dotzler ............... H04L 67/5683 |
| 2019/0294990 | A1* | 9/2019 | Lopez De Prado ... G06N 20/00 |
| 2019/0384830 | A1* | 12/2019 | Nazi ....................... G06F 17/18 |
| 2021/0342691 | A1* | 11/2021 | Lui ................... G06F 18/24133 |
| 2021/0359701 | A1* | 11/2021 | Lacey ................ G06F 13/1668 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.
Amazon DynamoDB: ten things you really should know, Nov. 13, 2015, Chandan Patra, http://cloudacademy. . . com/blog/amazon-dynamodb-ten-thing.
An Inside Look at Google BigQuery, by Kazunori Sato, Solutions Architect, Cloud Solutions team, Google Inc., 2012.
Big Table, a NoSQL massively parallel table, Paul Krzyzanowski, Nov. 2011, https://www.cs.rutgers.edu/pxk/417/notes/contentlbigtable.html.
Distributed Systems, Fall2012, Mohsen Taheriyan, http://www-scf.usc.edu/-csci57212011Spring/presentations/Taheriyan.pptx.
International Searching Authority; International Search Report and Written Opinion; International Application No. PCT/US2017/054773; Feb. 13, 2018; 17 pgs.
International Searching Authority; International Search Report and Written Opinion; International Application No. PCT/US2017/054784; Dec. 28, 2017; 10 pgs.
International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends In Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37

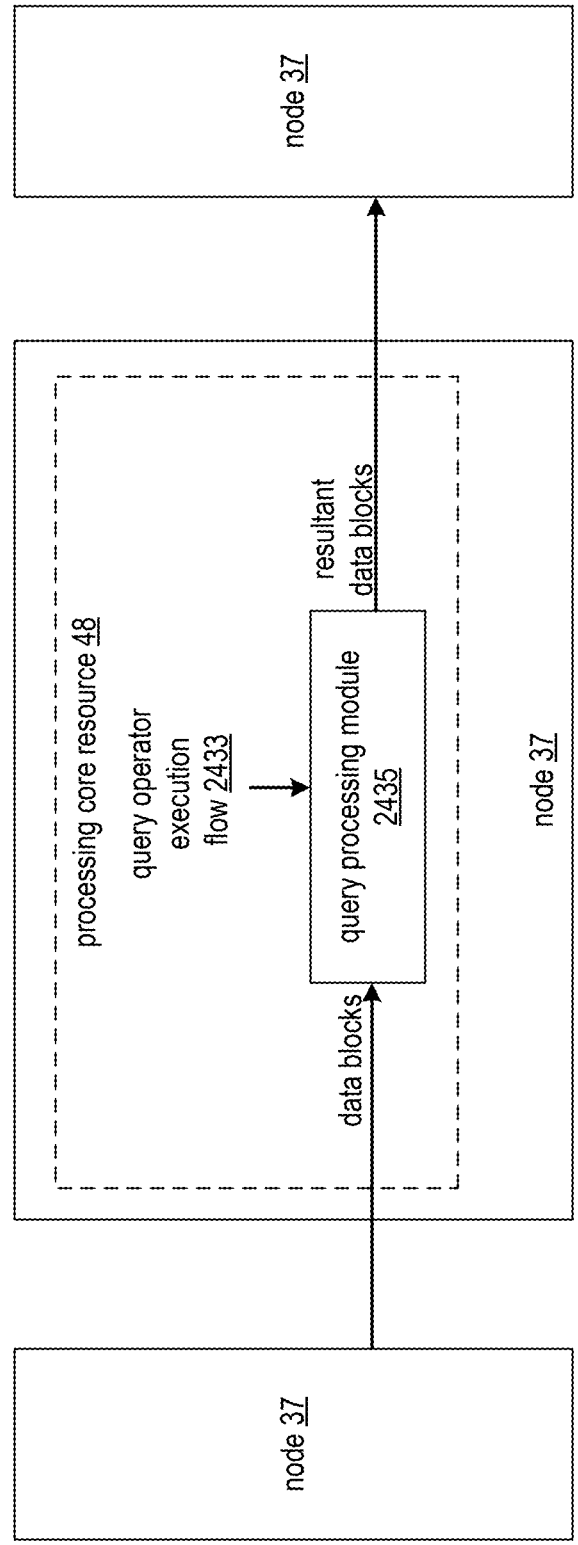

query processing system 2510

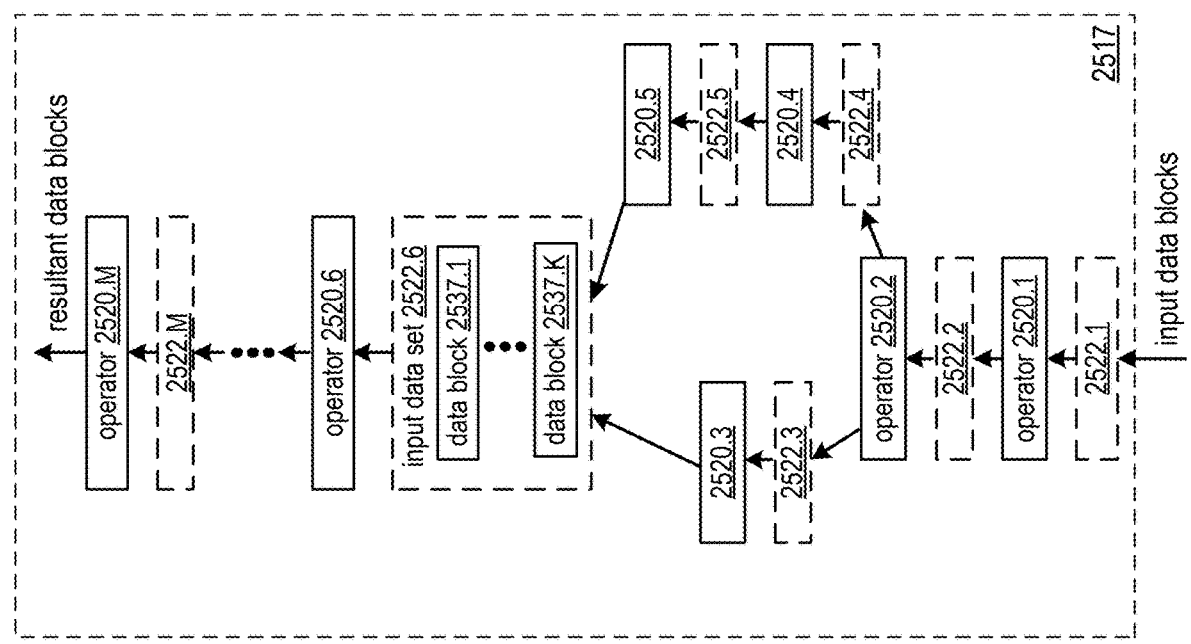

database system 10

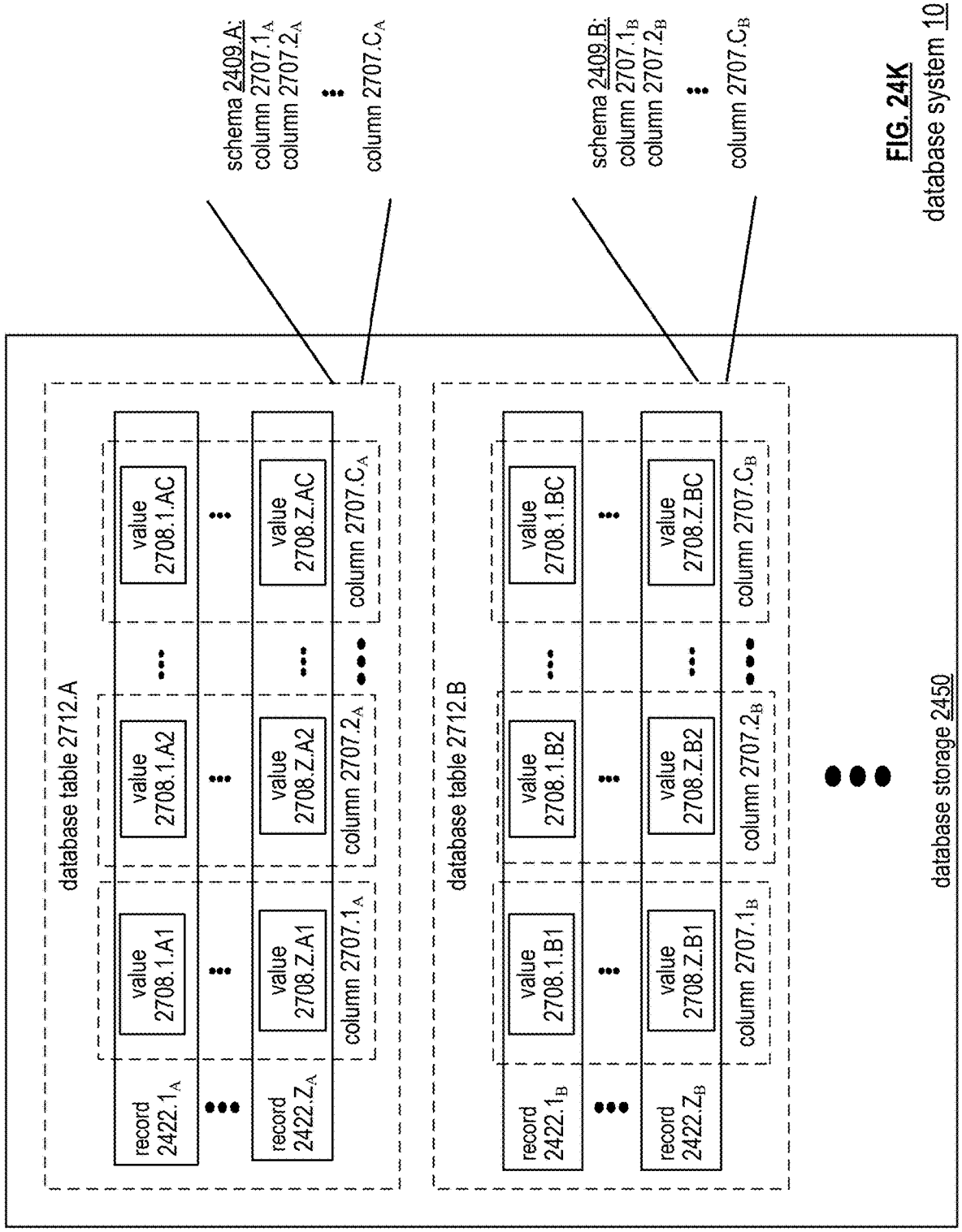

query processing system 2502

2610 recursive definition 2625

$s_1 = x_1$
$b_1 = x_1 - x_0$

And for $t > 1$ by $s_t = \alpha x_t + (1 - \alpha)(s_{t-1} + b_{t-1})$
$b_t = \beta(s_t - s_{t-1}) + (1 - \beta)b_{t-1}$ where $\alpha$ is the data smoothing factor, $0 < \alpha < 1$, and $\beta$ is the trend smoothing factor, $0 < \beta < 1$.

computing window function call 2620

COMPUTE( ← tuple construct keyword 2721
TUPLE( output variable 1 expression 2762.1
tuple index identifier 2748
0.5 * x + (1 − 0.5) * (RESULT(-1)[1] + RESULT(-1)[2]) ,
output reference 2652 output variable 2 expression 2762.2
0.3 * ((0.5 * x + (1 − 0.5) *
(RESULT(-1)[1] + RESULT(-1)[2])) −
RESULT(-1)[1]) + (1 − 0.3) * RESULT(-1)[2])) , recursive expression 2626

2772.1.1     2772.2.1
(TUPLE(x, 0.0), TUPLE(x, x − x[-1]))
2772.1.2     2772.2.2 base case definition 2637

OVER(...)

FIG. 27C query execution module 2504 output type validation module 2930 resampling TVF call 3120

```
set nextOutputValue = startValue
Initialize priorValues[] for all necessary columns to null
calculate the OVER DIMENSION value for the first row and save it in currentDimensionValue.
while (currentDimensionValue >= nextOutputValue)
    output row {nextOutputValue, value of generated columns from first input row}
    nextOutputValue += stepSize
end while
set priorDimensionValue = currentDimensionValue
update all the values in priorValues[] with the respective values from the first row by, for all other input rows:
    calculate currentDimensionValue for the row
    while (nextOutputValue < currentDimensionValue)
        output row {nextOutputValue, generated value}, where the generated values are the values in priorValues[] if the
        column is not using interpolation
        if the column is using interpolation, then compute the output for that column as:
            set currentValue = the value of the column in the current row
            output value = (currentValue * (nextOutputValue - priorDimensionValue) + priorValues[col] *
                (currentDimensionValue - nextOutputValue)) / ((currentDimensionValue - priorDimensionValue) * 1.0)
        end if
        nextOutputValue += stepSize
    end while
    update values in priorValues[] based on this row, e.g set it unless that col uses prior not null, in which case only set if the value in
    the current input row is not null
    if (nextOutputValue == currentDimensionValue)
        output row {nextOutputValue, values of generated columns from priorValues[]}
        nextOutputValue += stepSize
        priorOutputValue += stepSize
    end if
end for
```

FIG. 31C extrapolation TVF call 3220 extrapolation TVF call 3220

CREATE( [UDF creation function keyword 3321.A] [function type argument 3341] SQL UDF [function name argument 3342] ( [function argument set argument 3343] ) AS( [function body argument 3344] )

new function name argument keyword 3352 new function body argument keyword 3354

FIG. 33B
UDF creation function call 3320

[argument name 3345.1] [argument type 3346.1] , • • • , [argument name 3345.D] [argument type 3346.D]

new function argument set argument 3343

FIG. 33C
UDF creation function call 3320 new function body argument 3344

[argument reference(s) 3355.1 [argument reference symbol 3356] [argument name 3345.1]] • • • [argument reference(s) 3355.D [argument reference symbol 3356] [argument name 3345.D]]

[query language function call(s) 2619] [mathematical operator(s) 2629] [new function call(s) 3330]

FIG. 33D
UDF creation function call 3320

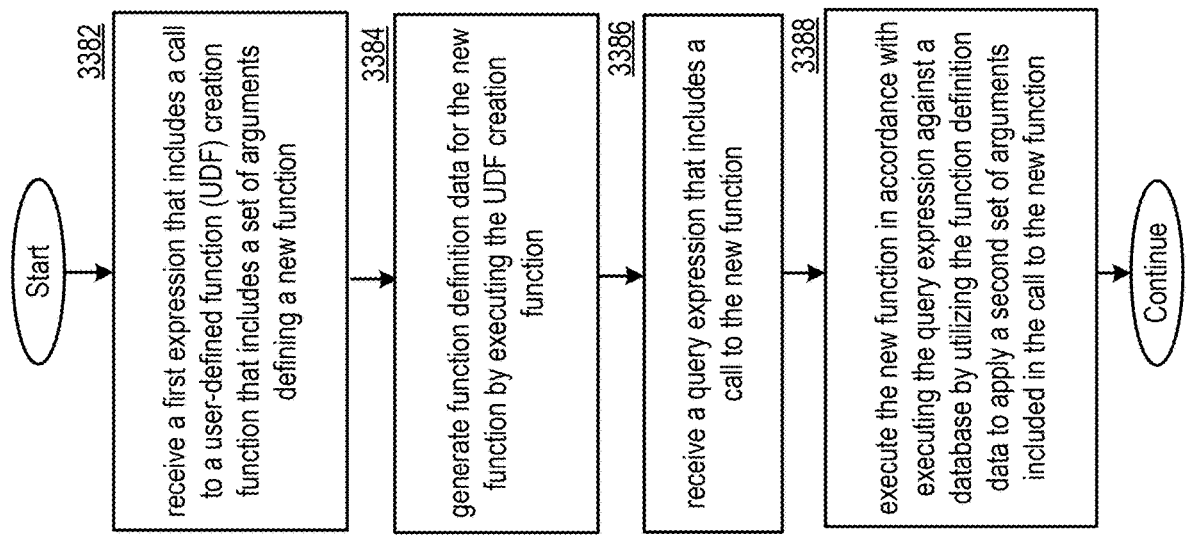

database system 10

2610

2610 database system 10

2610 database system 10

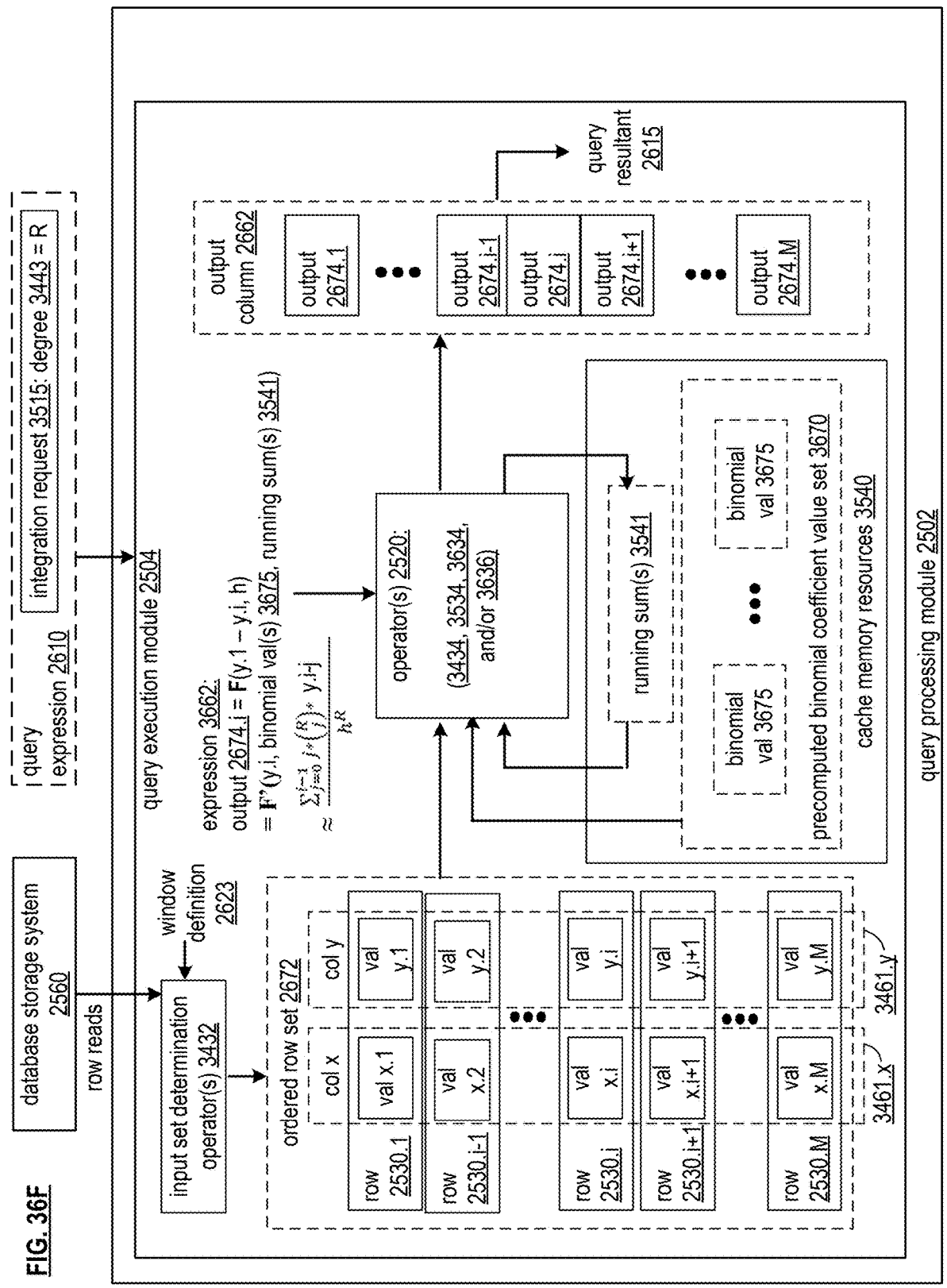

database system 10

CACHING PRECOMPUTED BINOMIAL COEFFICIENT VALUES FOR QUERY EXECUTION

CROSS-REFERENCE TO RELATED APPLICATIONS

The present U.S. Utility Patent application claims priority pursuant to 35 U.S.C. § 119(e) to U.S. Provisional Application No. 63/376,522, entitled "IMPLEMENTING DIFFERENTIATION AND INTEGRATION IN RELATIONAL DATABASE SYSTEMS", filed Sep. 21, 2022, which is hereby incorporated herein by reference in its entirety and made part of the present U.S. Utility Patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 24B-24D are schematic block diagrams of embodiments of a node that implements a query processing module in accordance with various embodiments;

FIG. 24H is a schematic block diagram of a query operator execution flow in accordance with various embodiments;

FIG. 24K illustrates an example embodiment of a plurality of database tables stored in database storage in accordance with various embodiments;

FIG. 27C is an example embodiment of the structure of a computing window function call that implements an exponential smoothing function by utilizing a tuple construct in accordance with various embodiments;

Figure 30A:
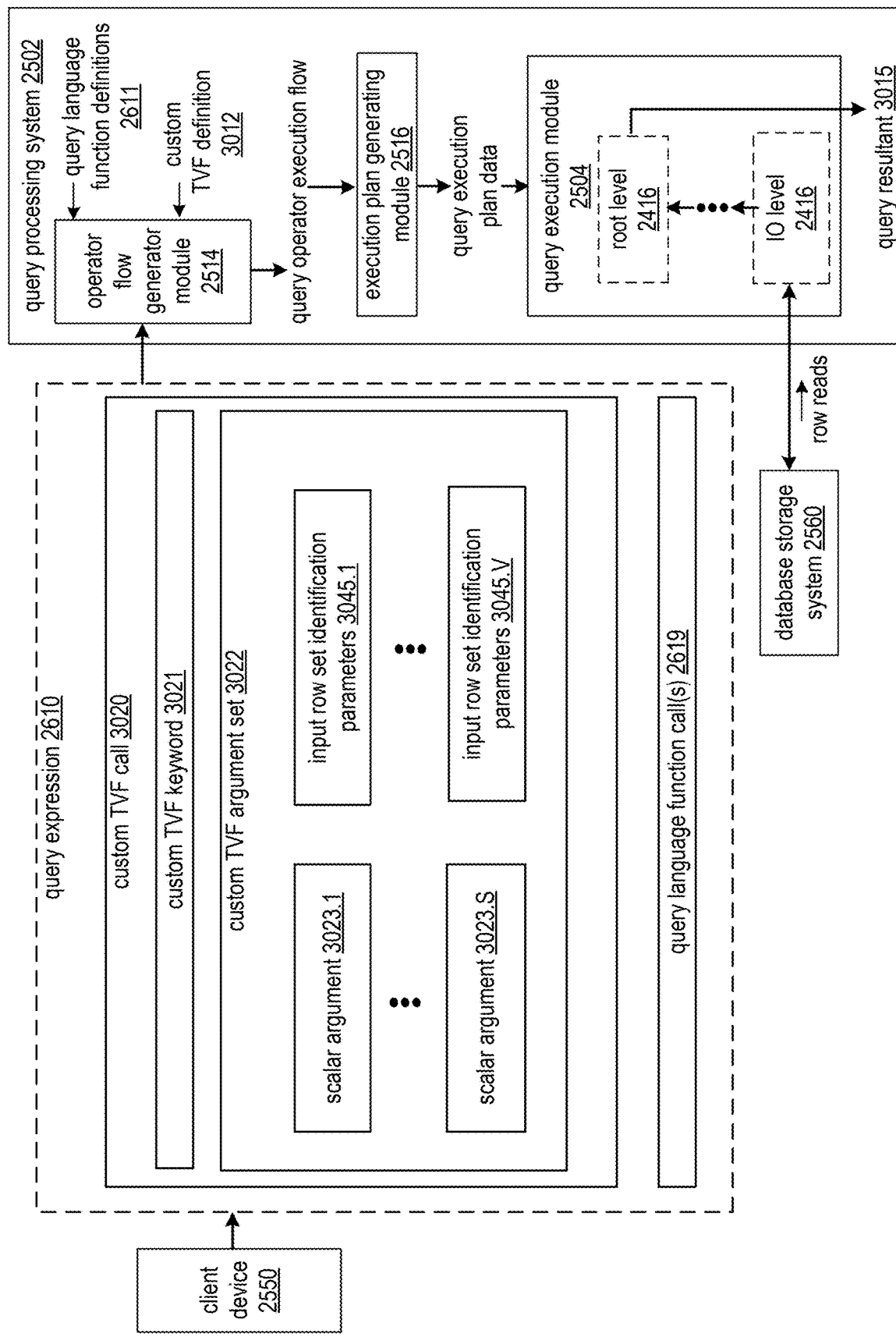
Figure 30B:
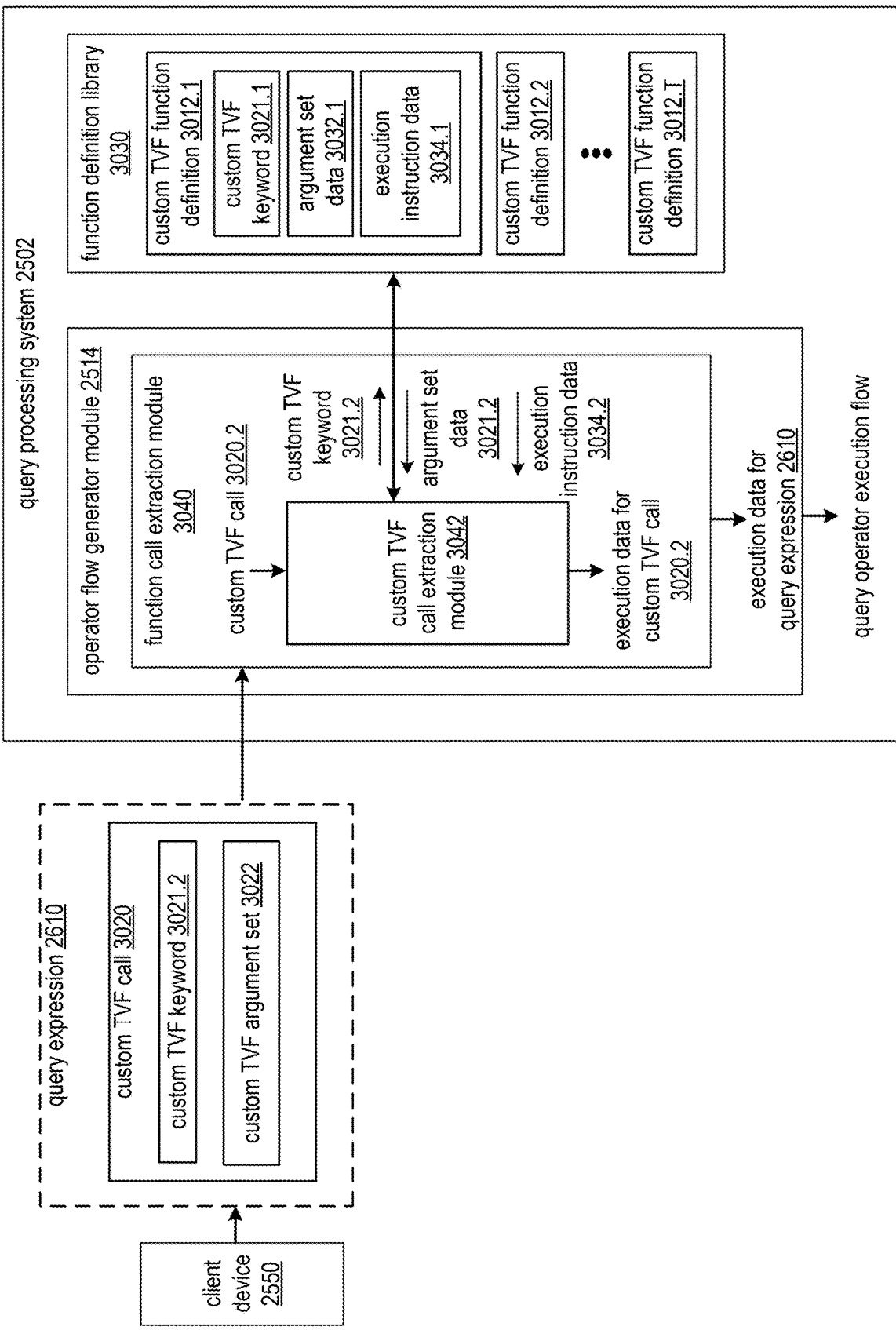
Figure 30C:
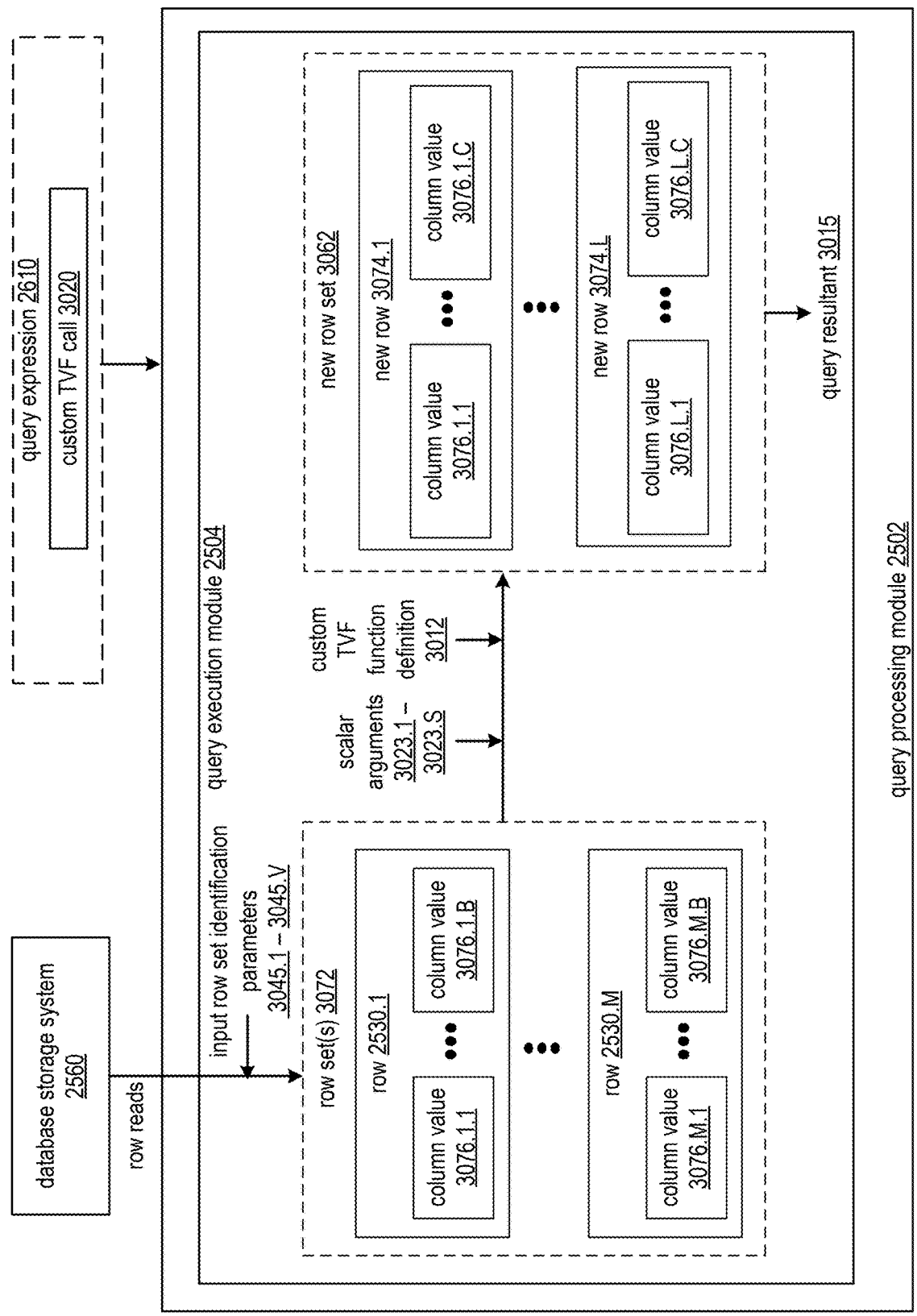
Figure 30D:
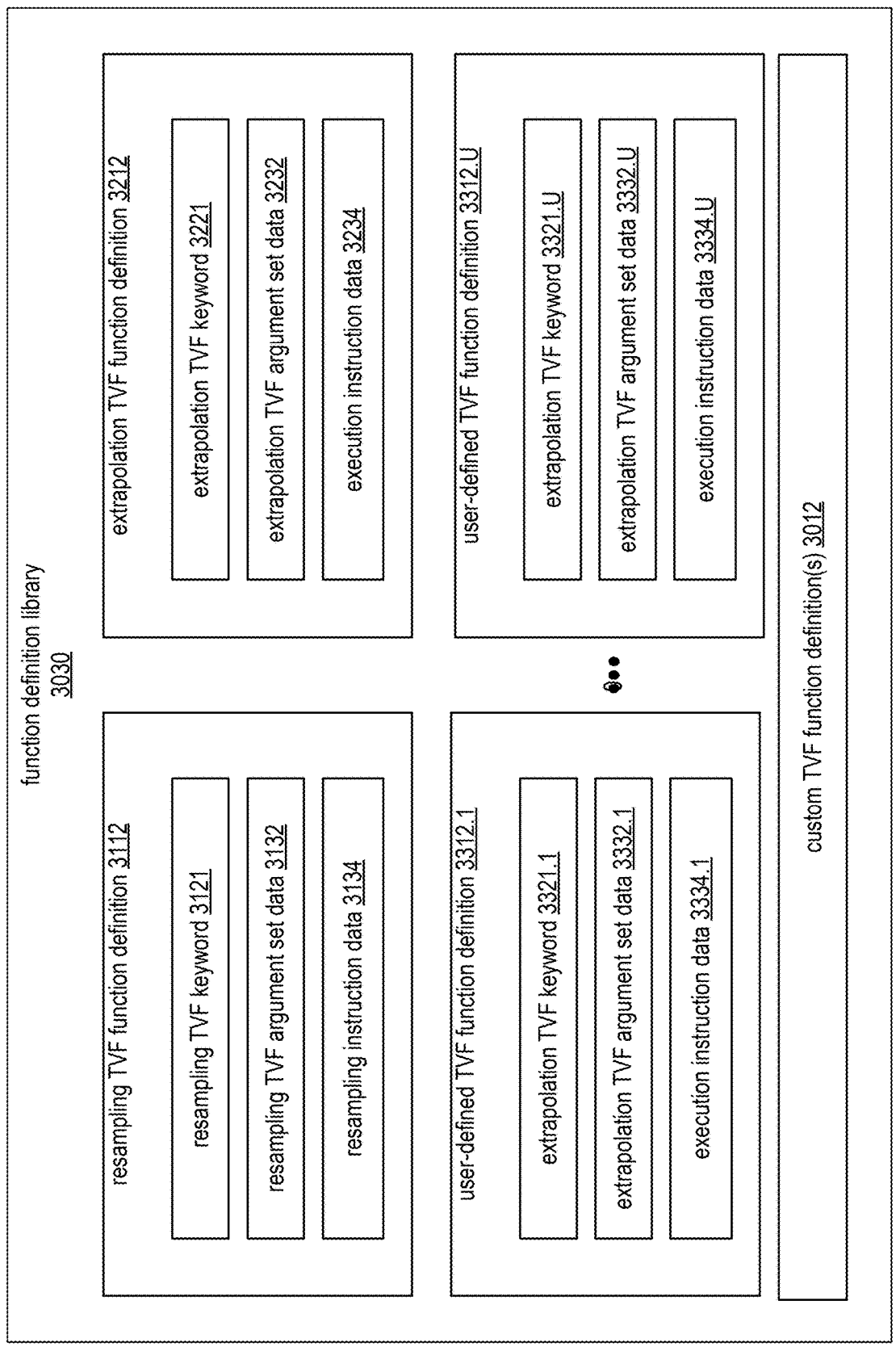
Figure 30E:
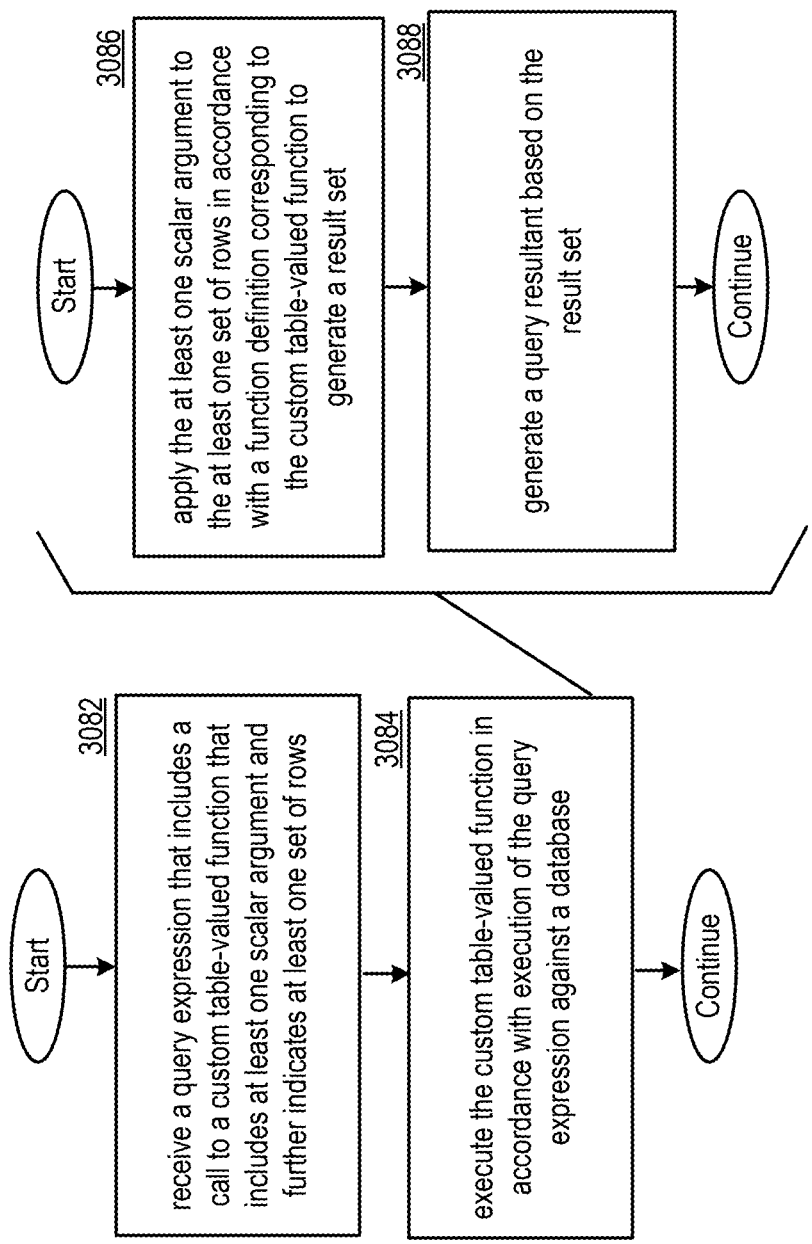
Figure 31A:
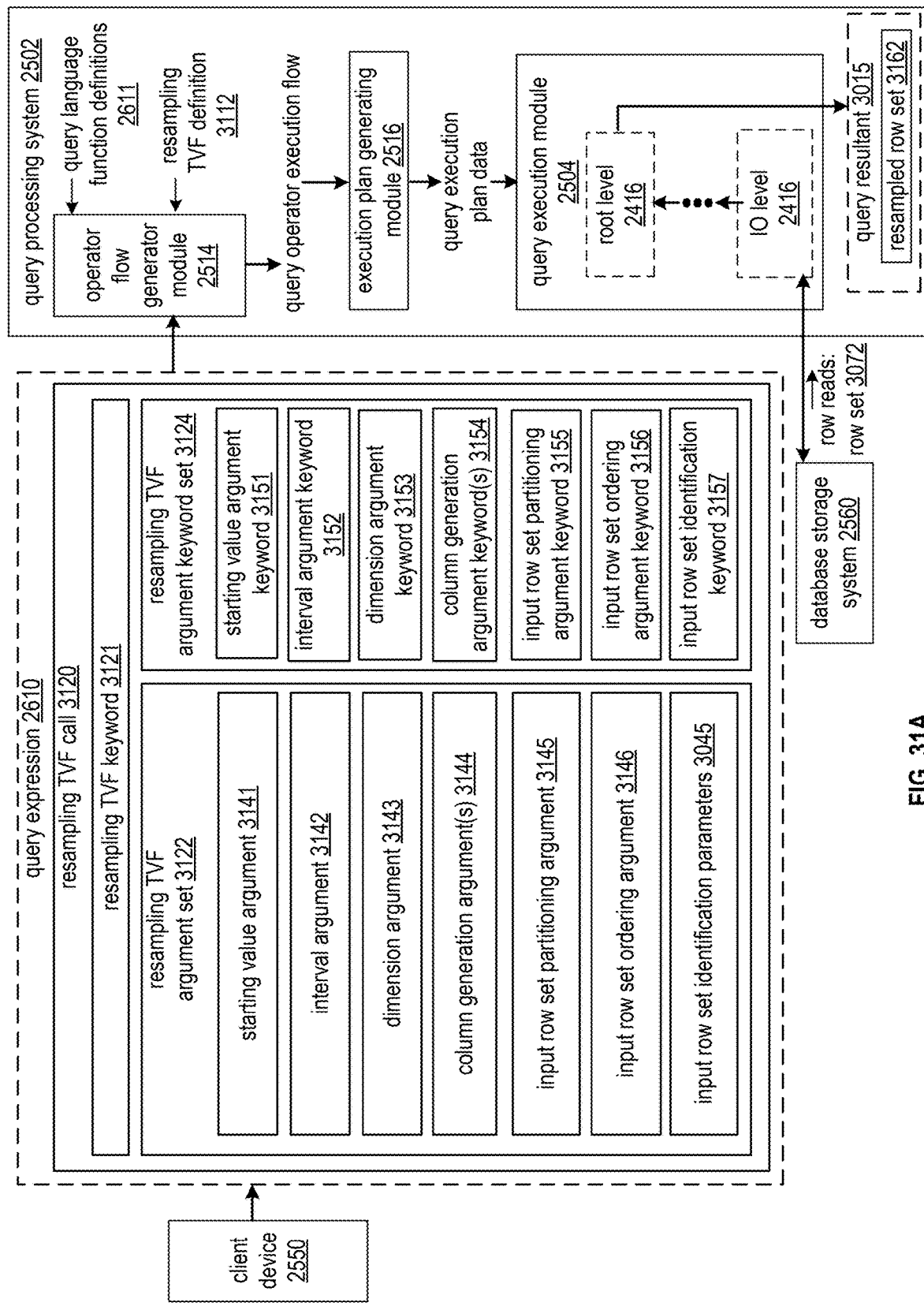
Figure 31B:
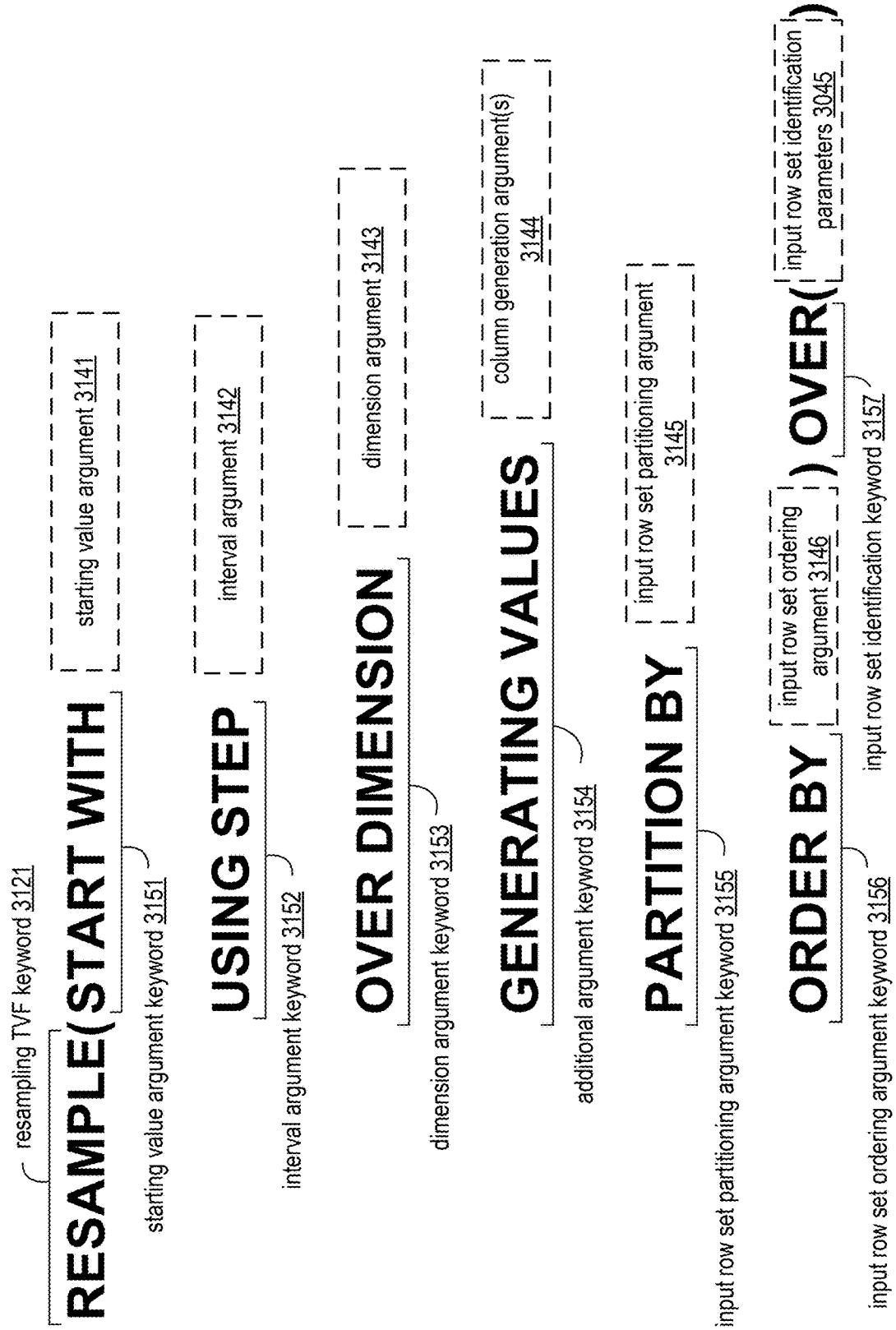
Figure 31D:
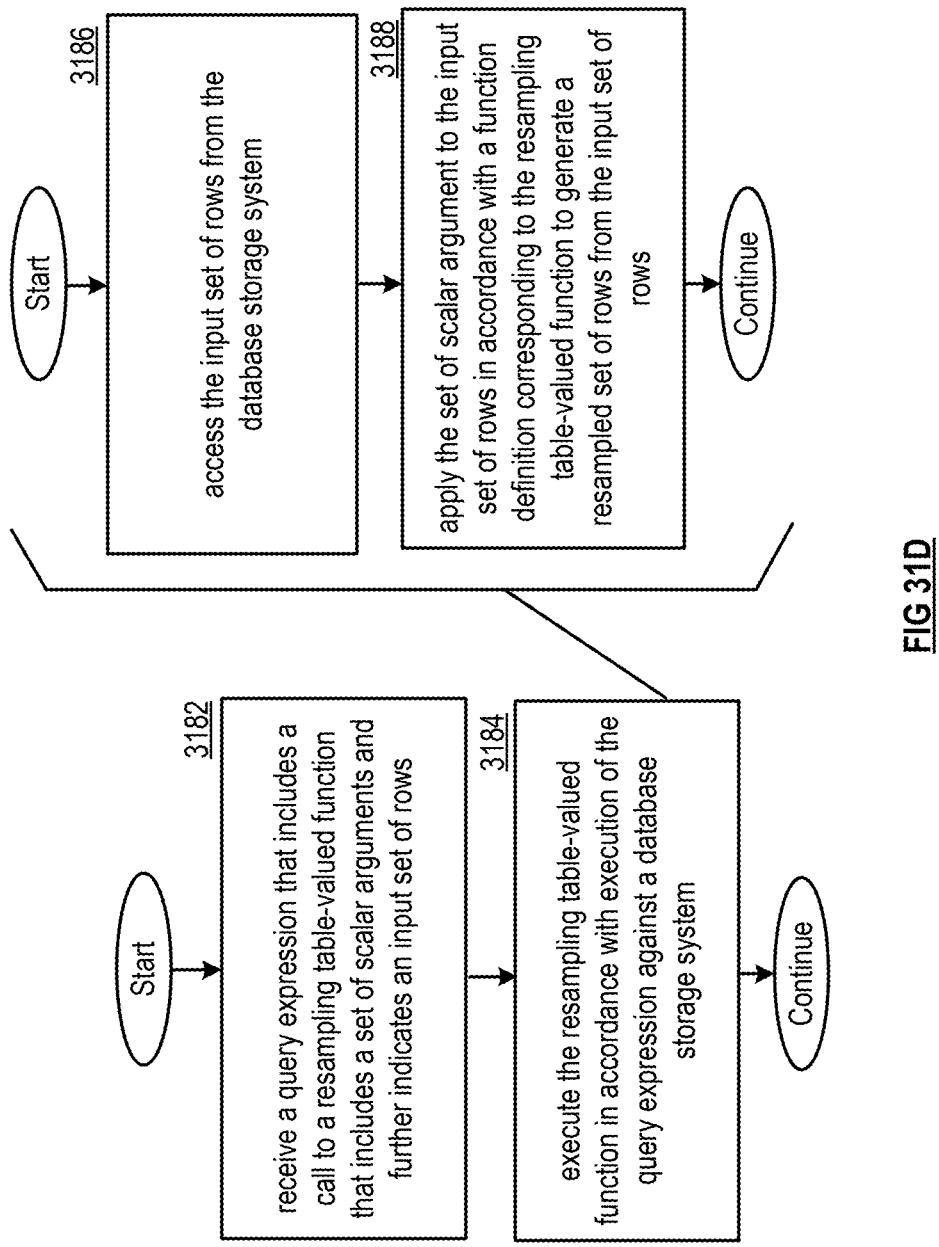
Figure 32A:
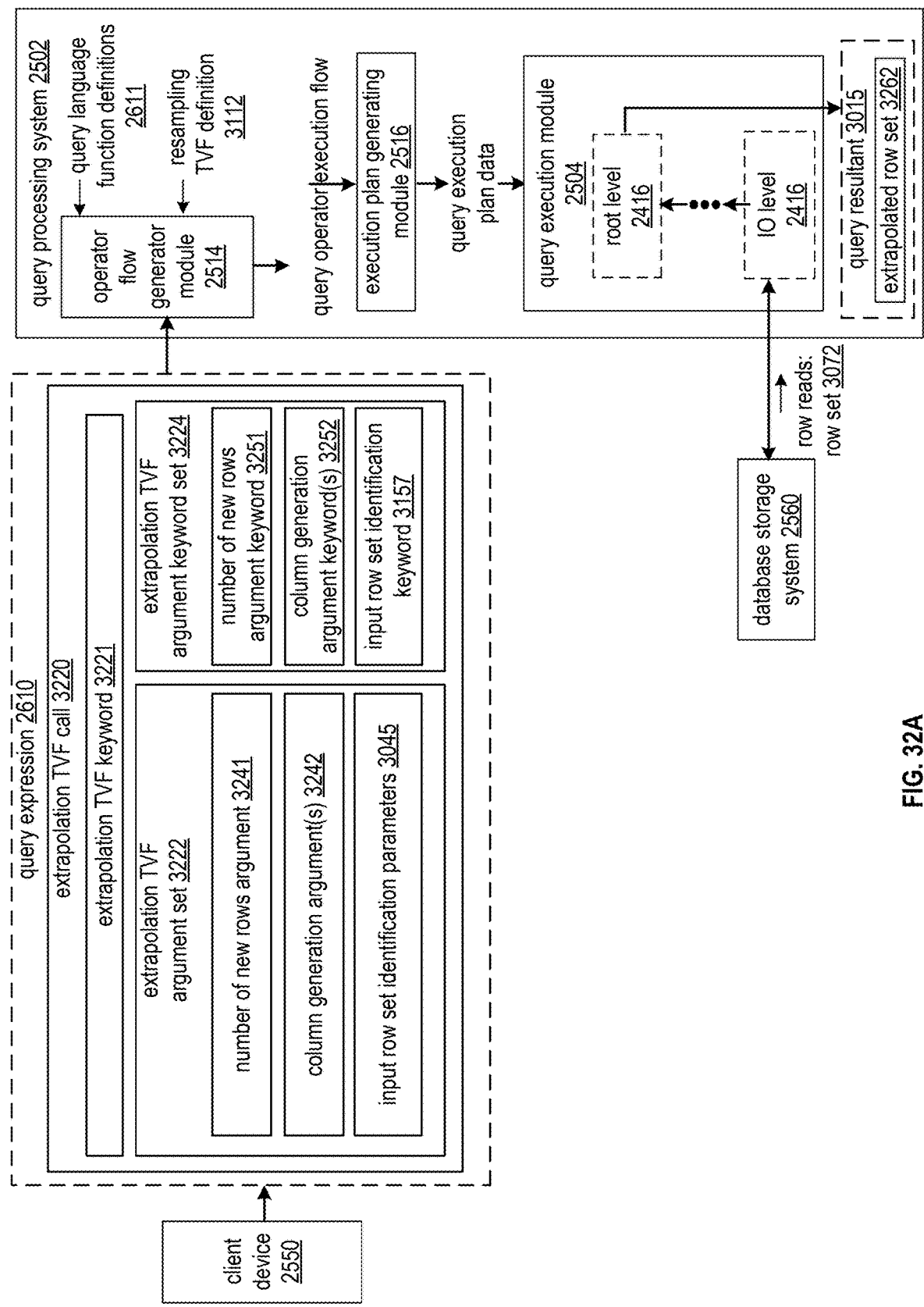
Figure 32B:
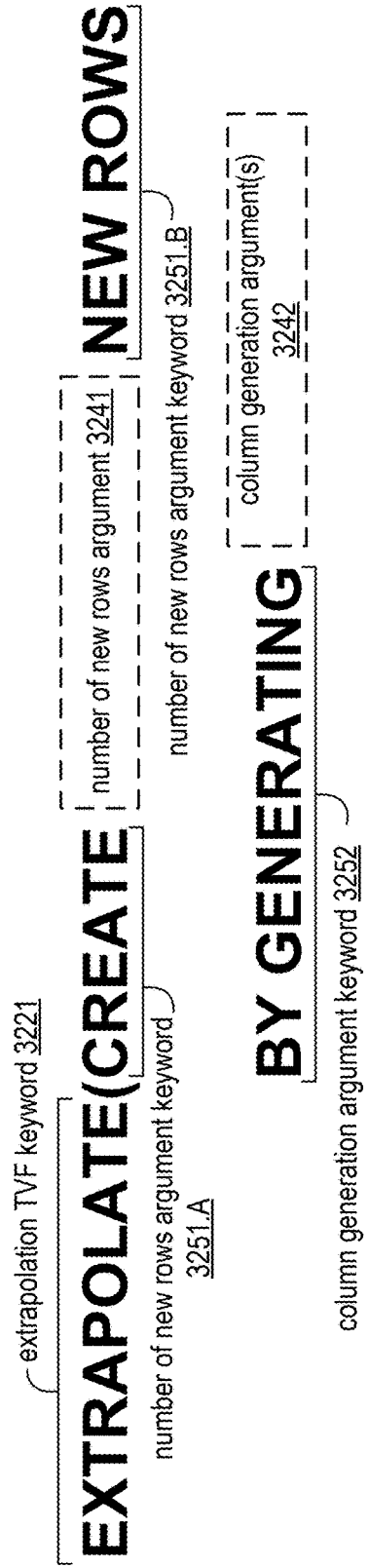
Figure 32C:
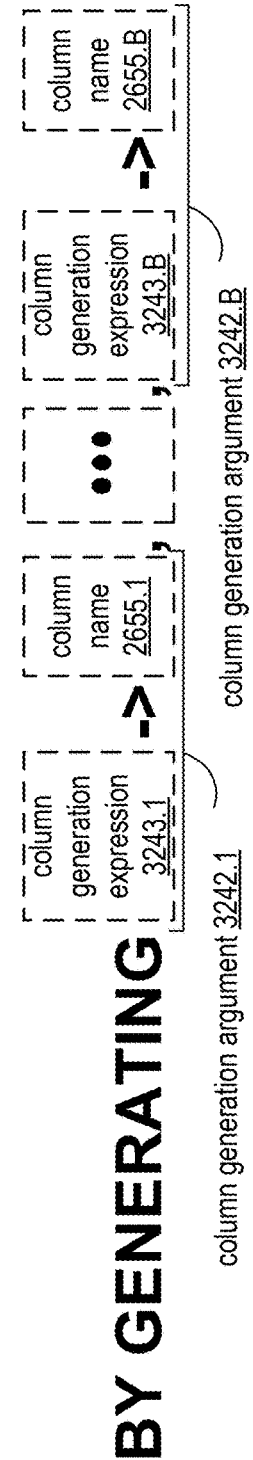
Figure 32D:
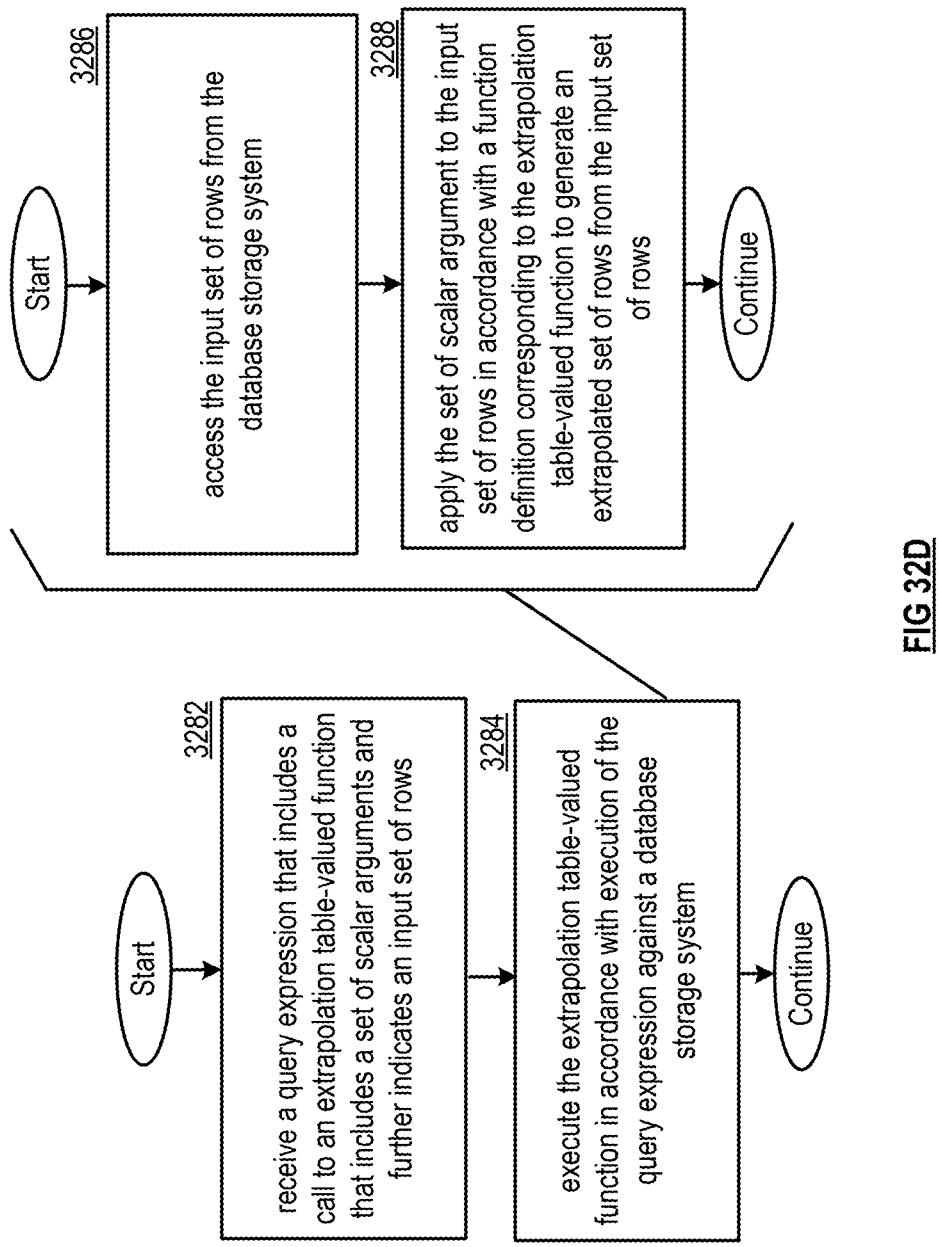
Figure 33A:
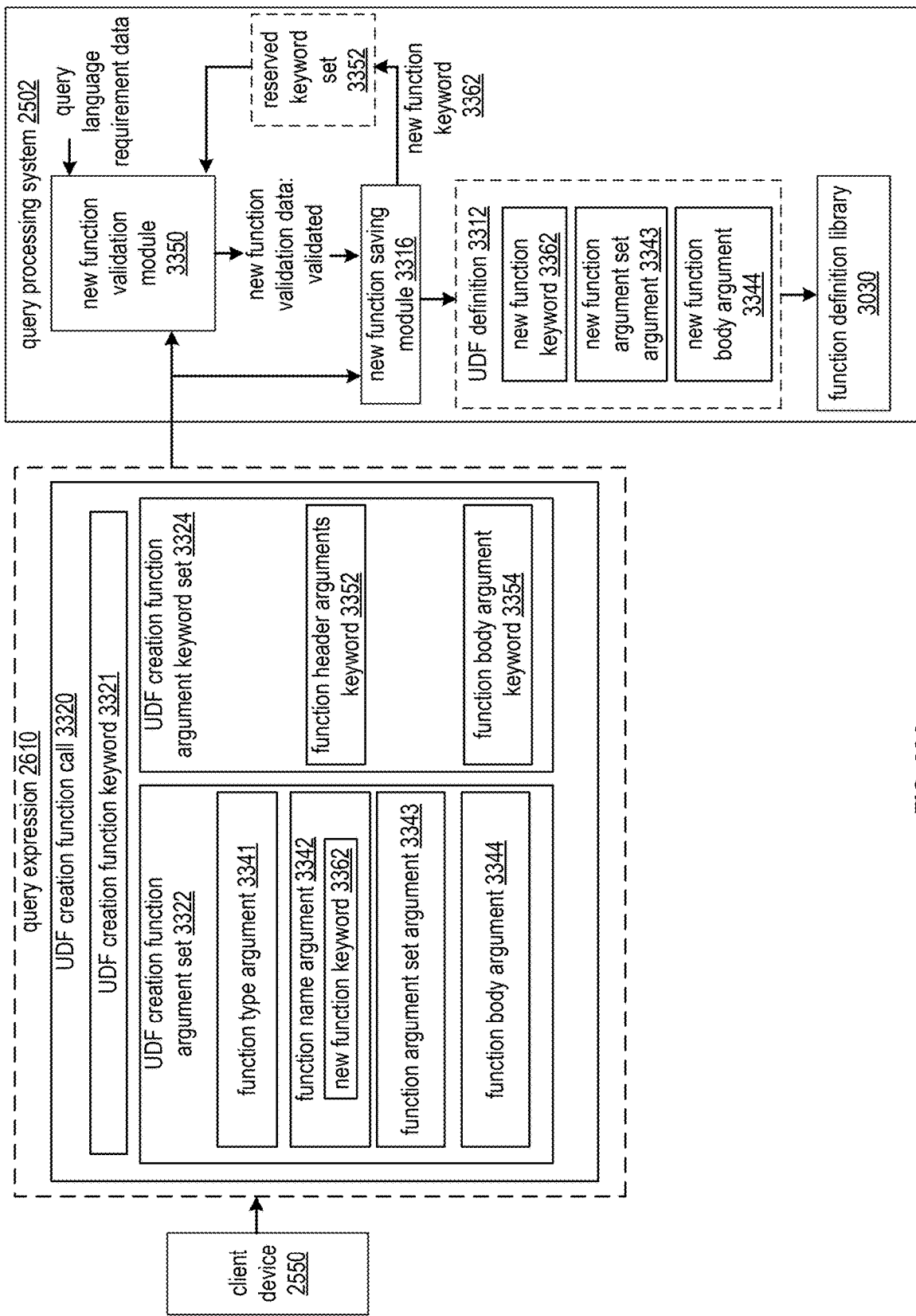
Figure 33E:
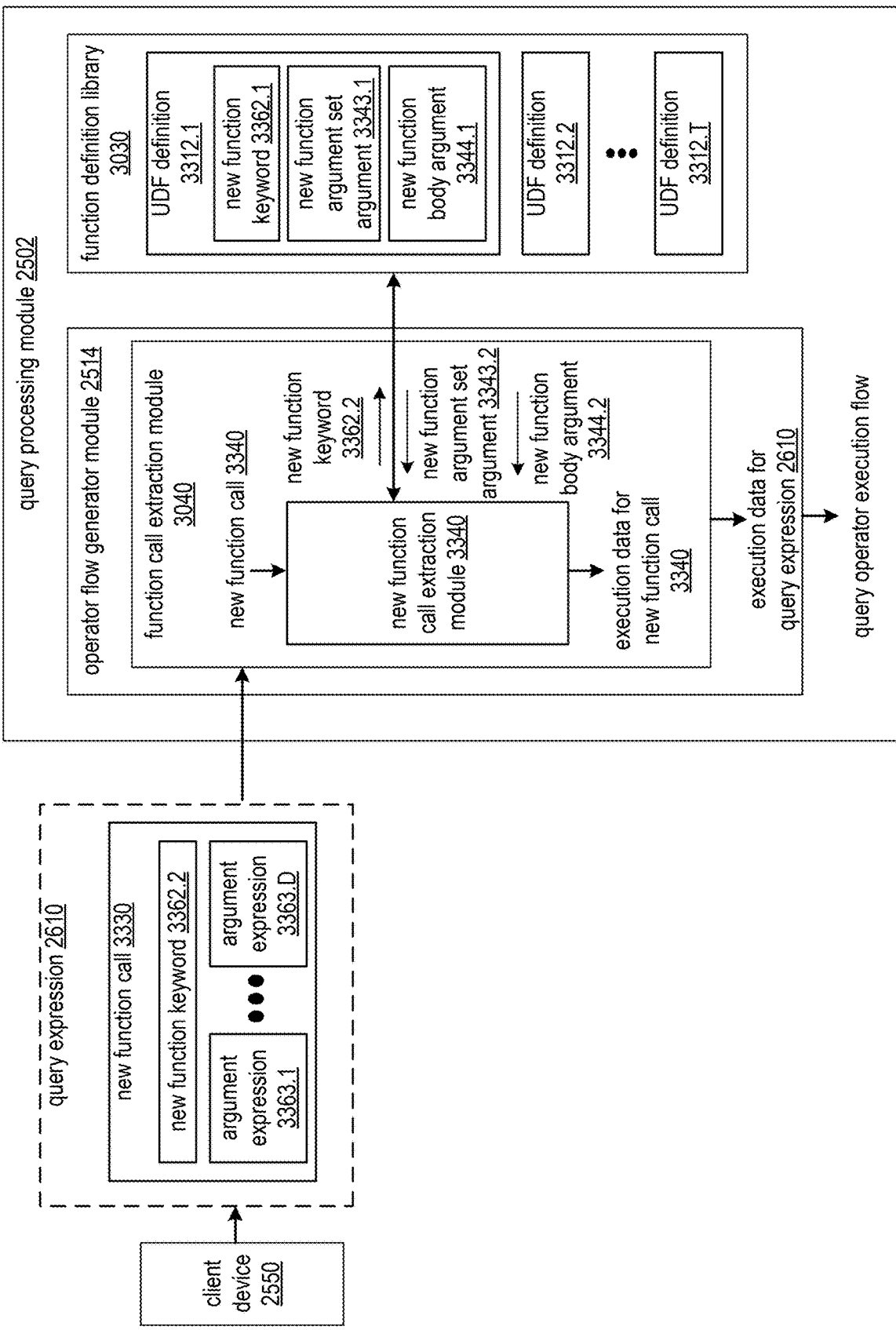
Figure 34A:
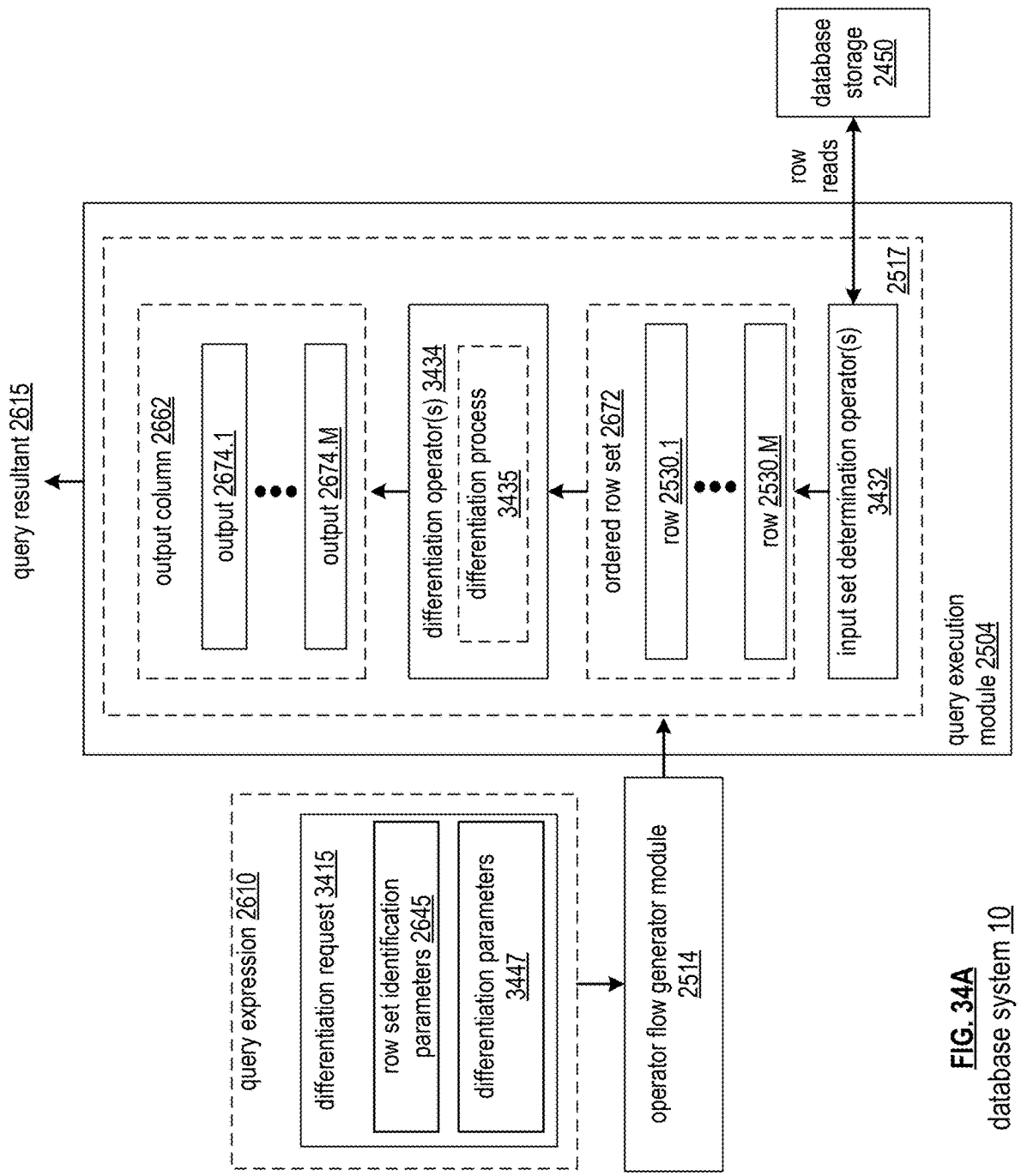
Figure 34B:
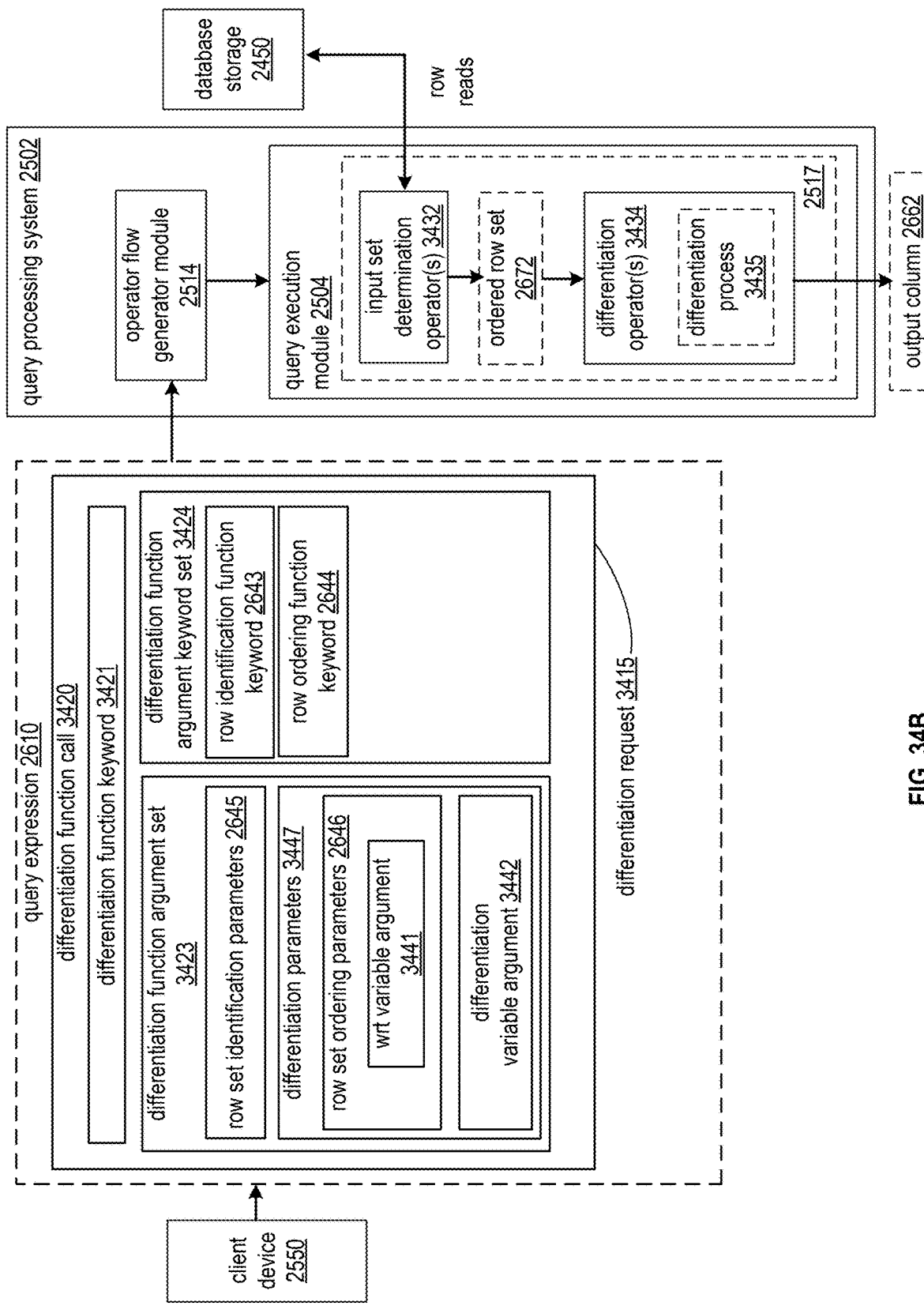
Figure 34C:
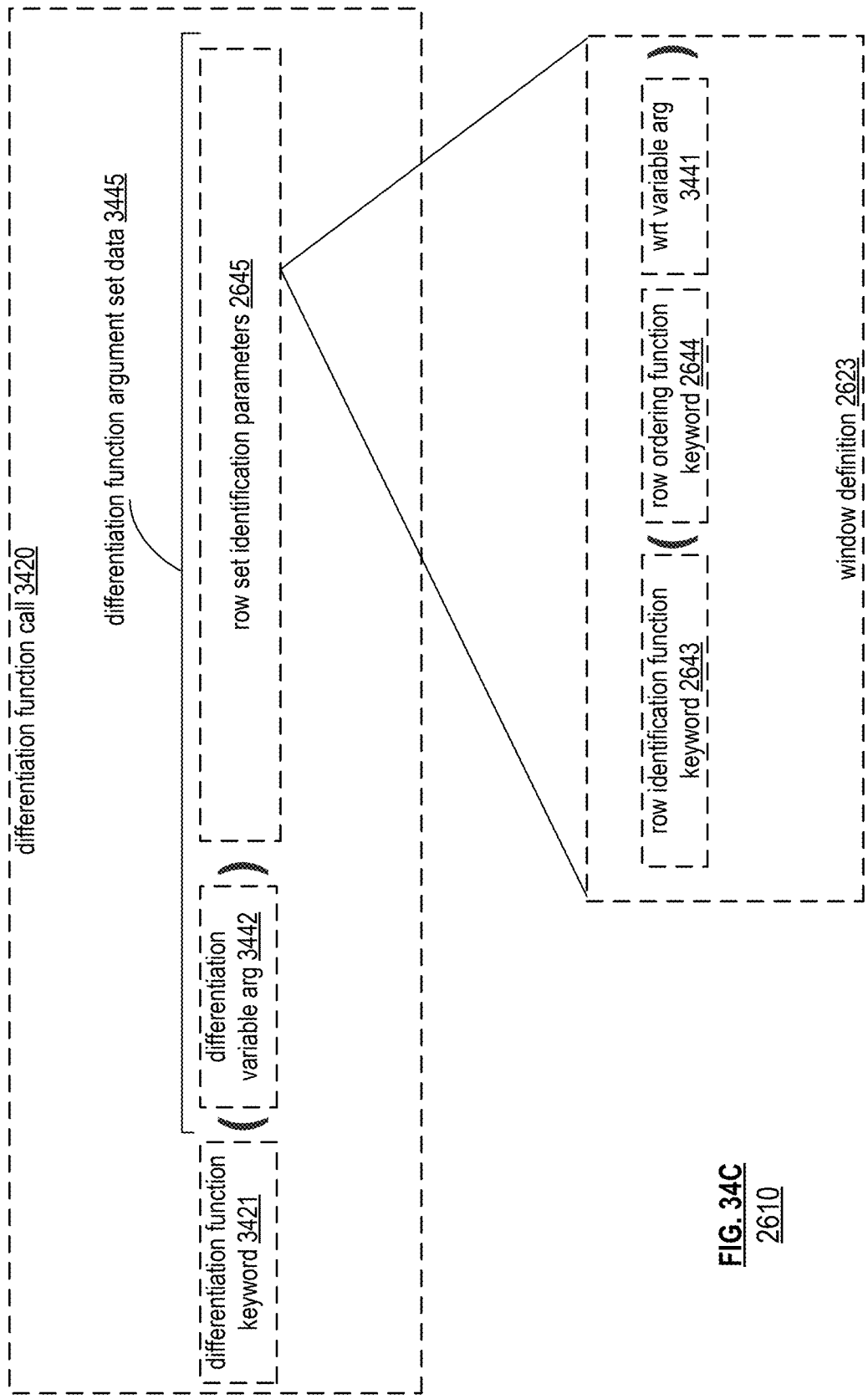
Figure 34D:
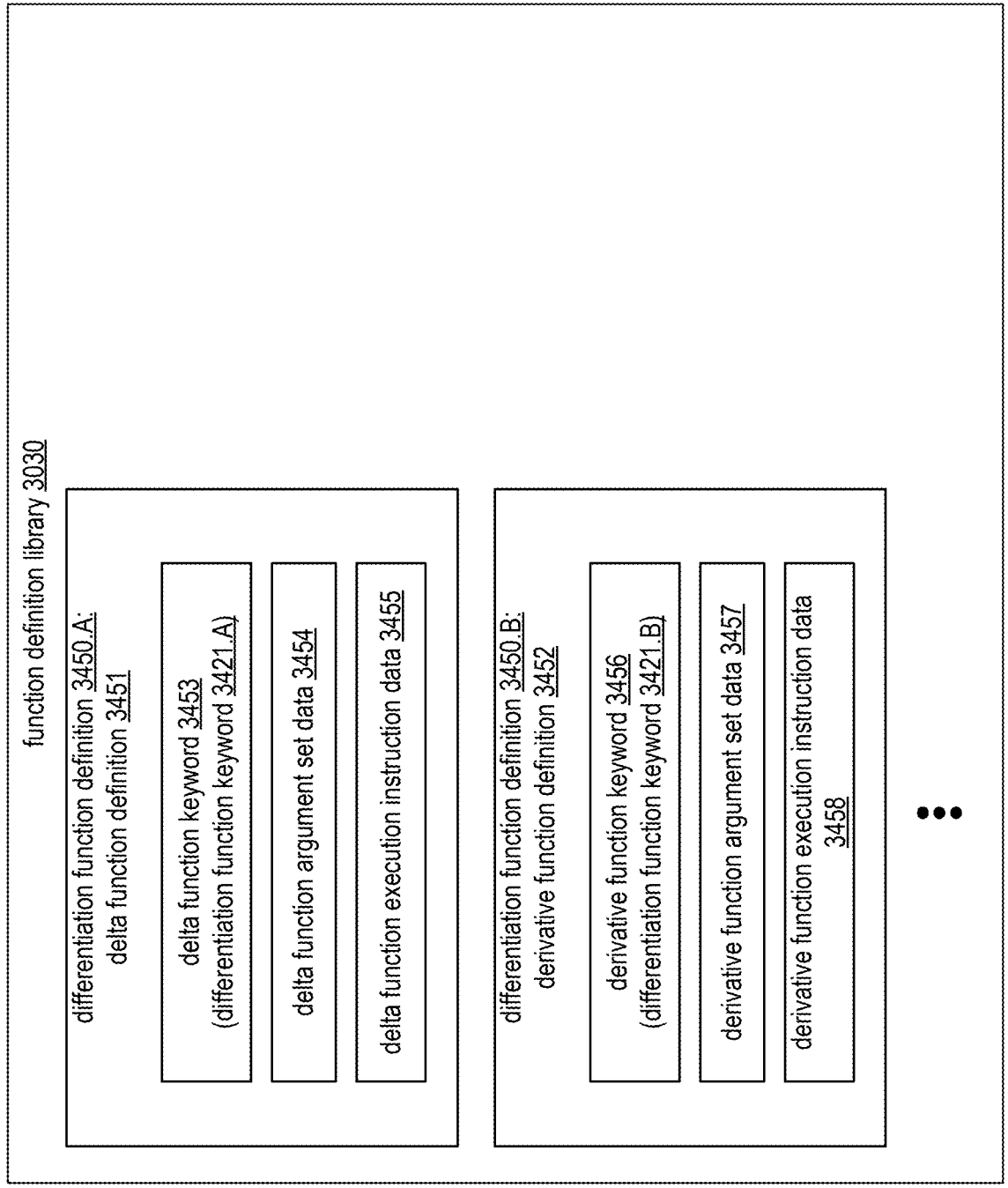
Figure 34E:
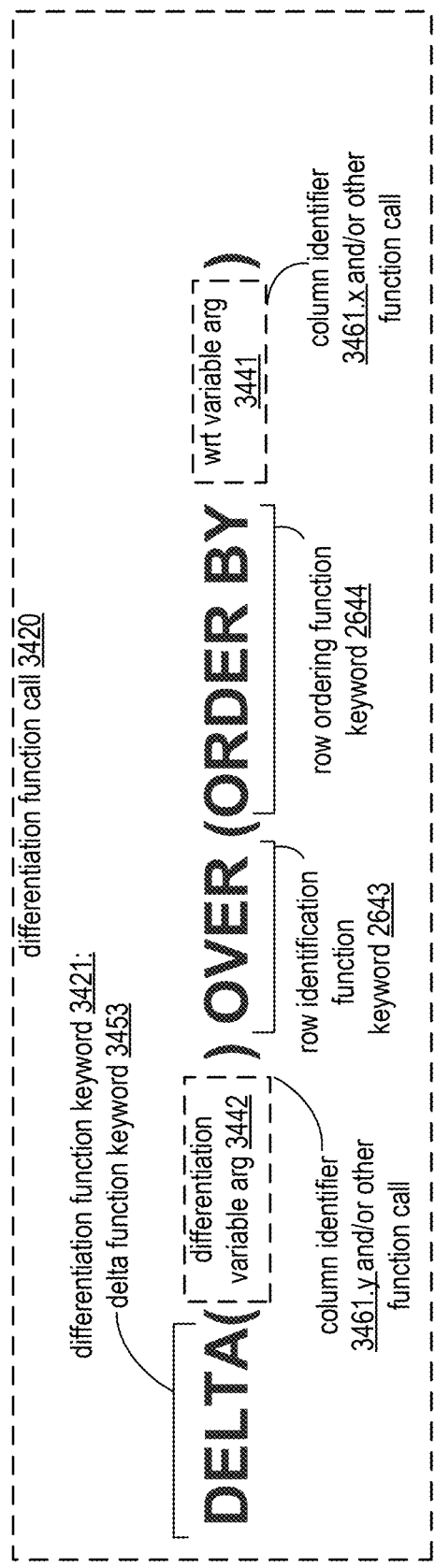
Figure 34F:
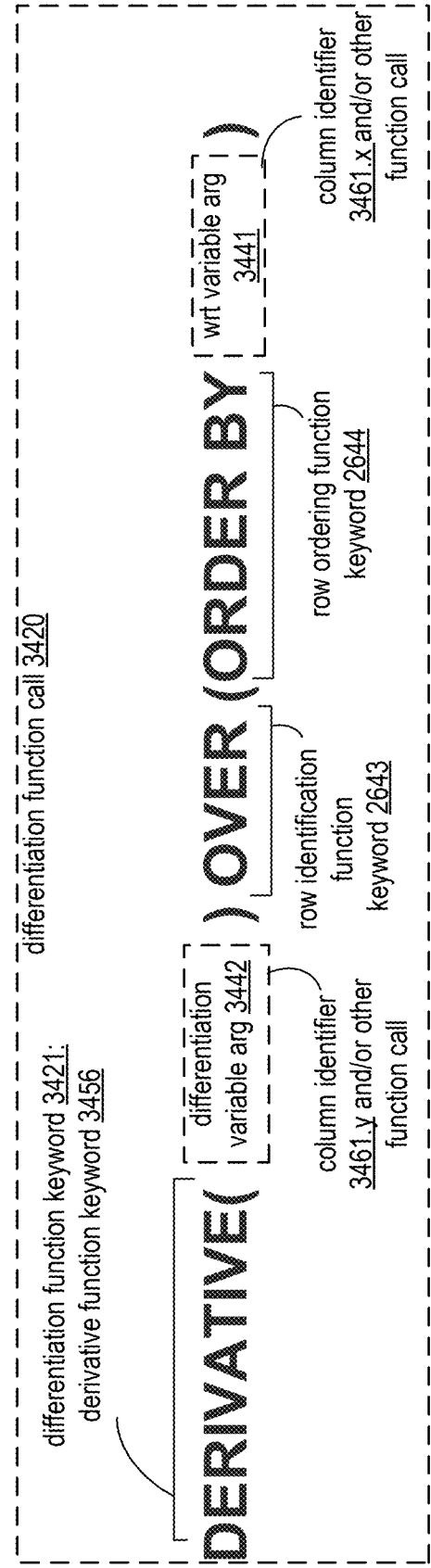
Figure 34G:
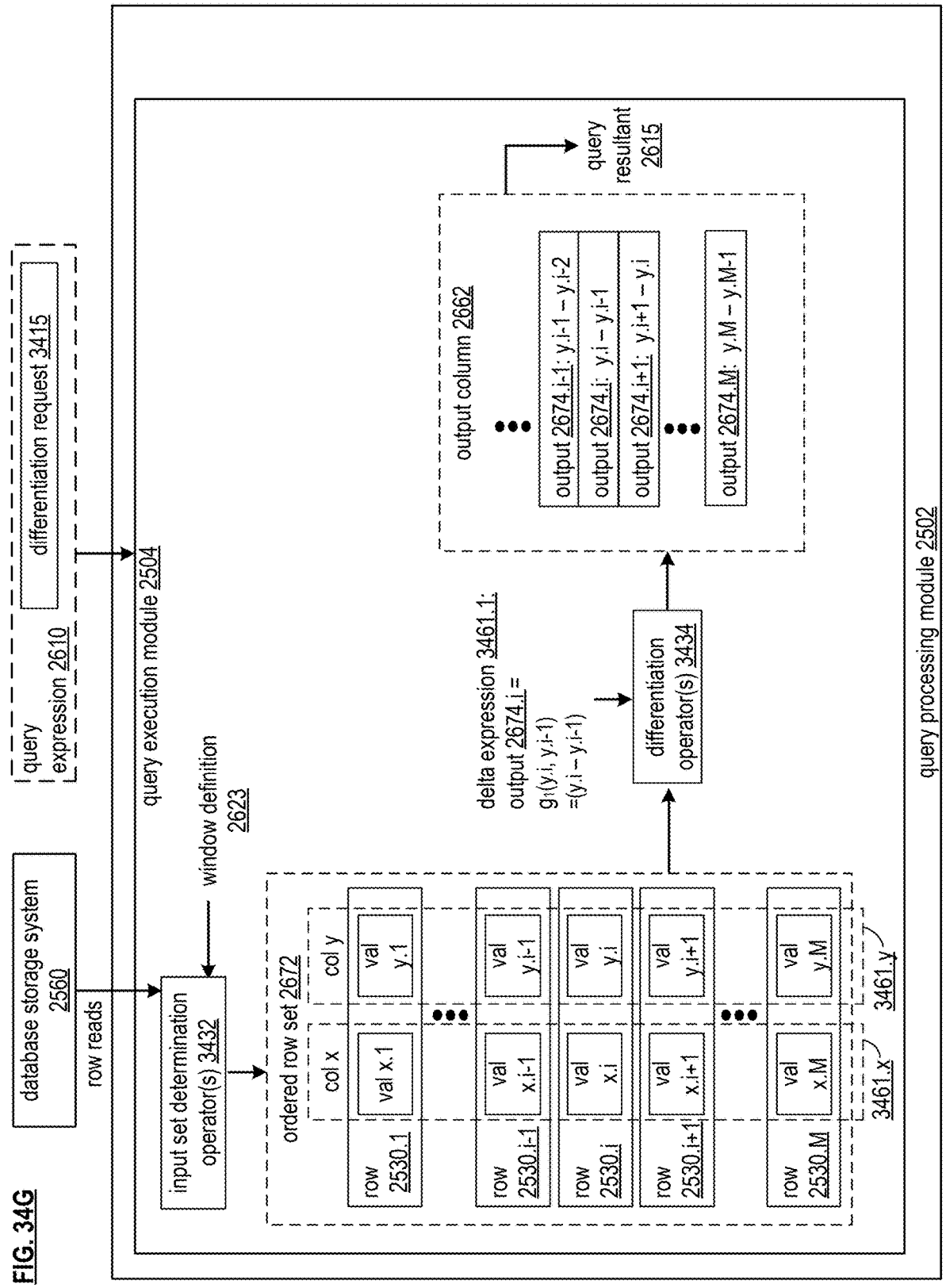
Figure 34H:
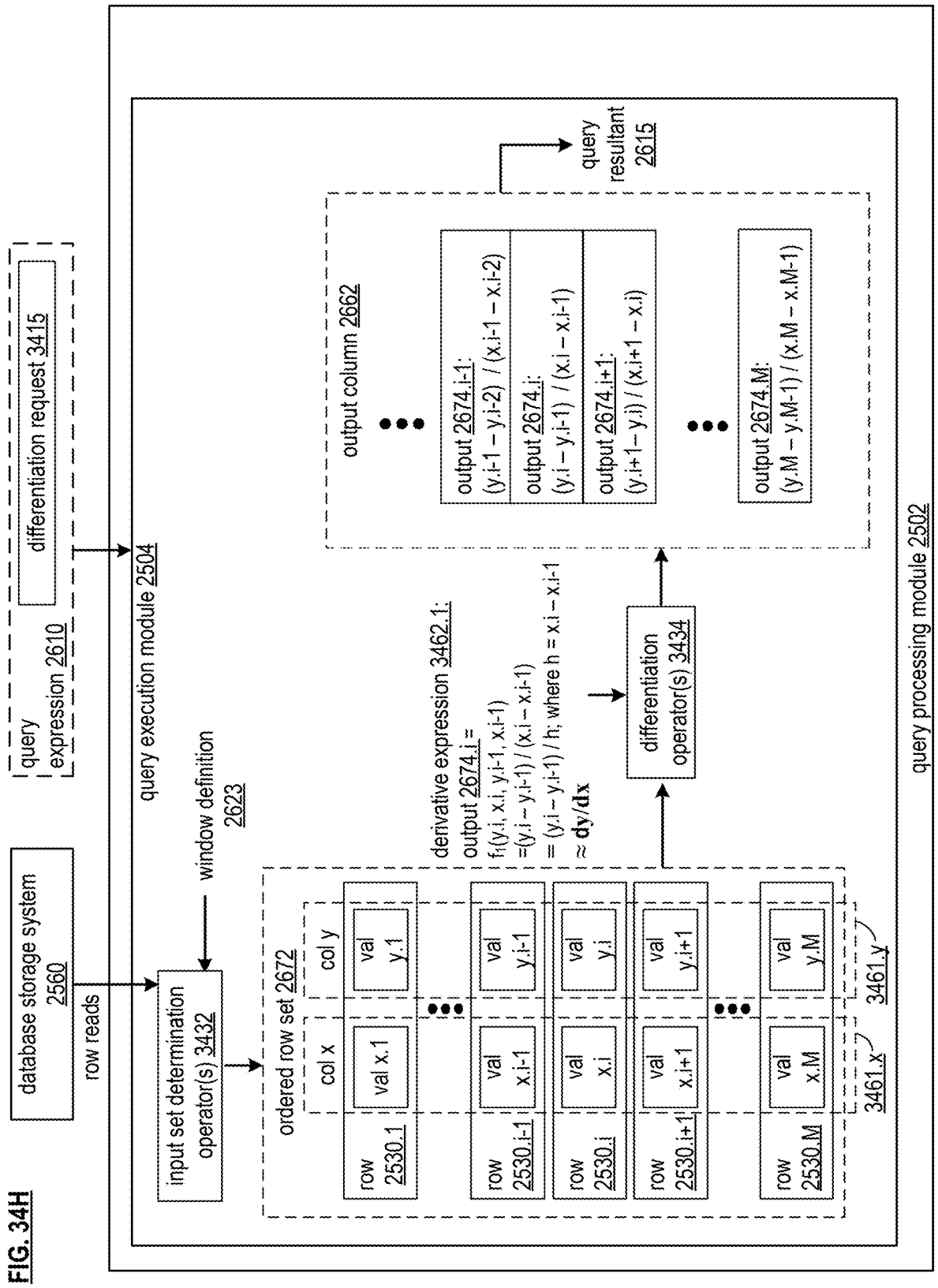
Figure 34I:
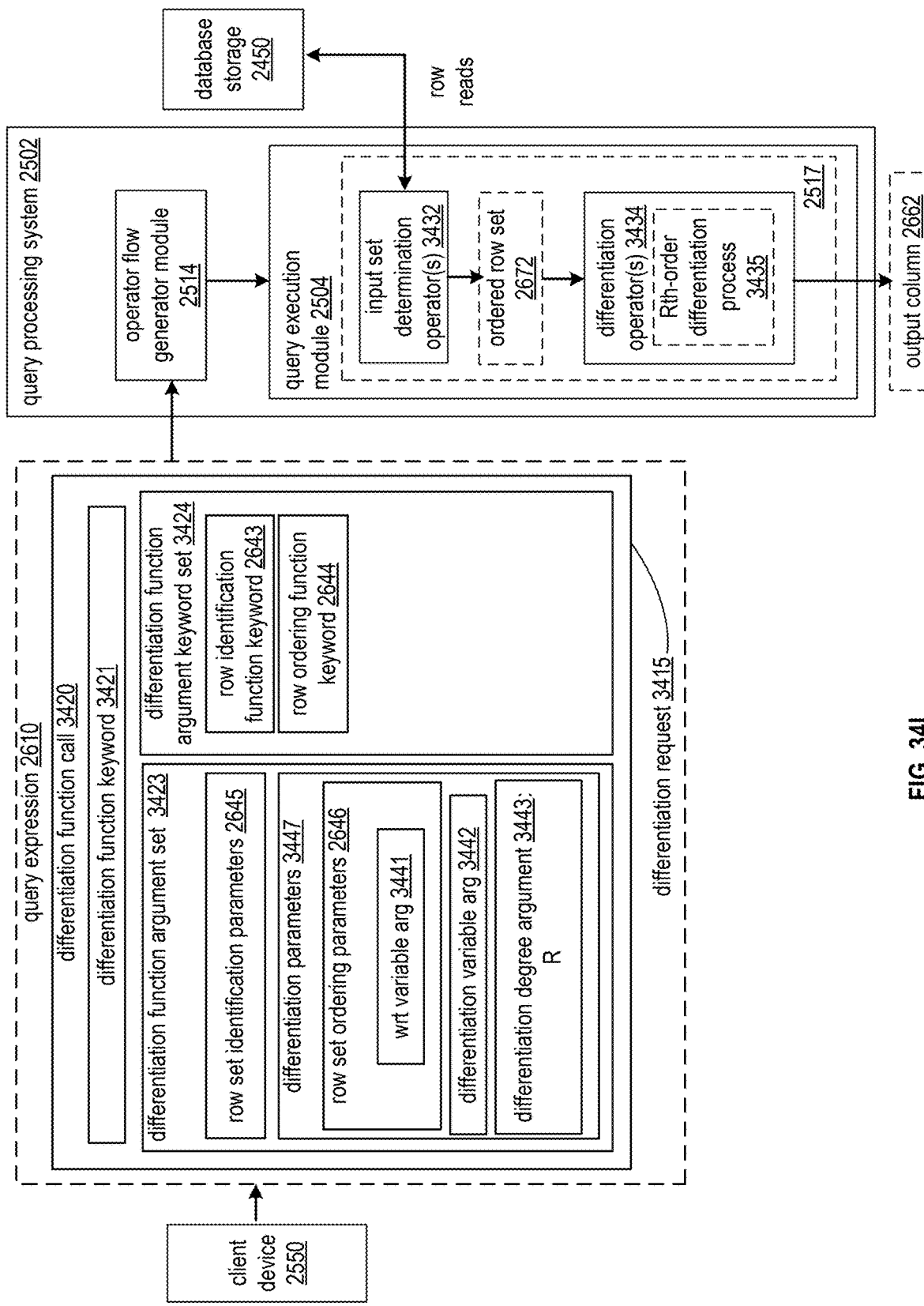
Figure 34J:
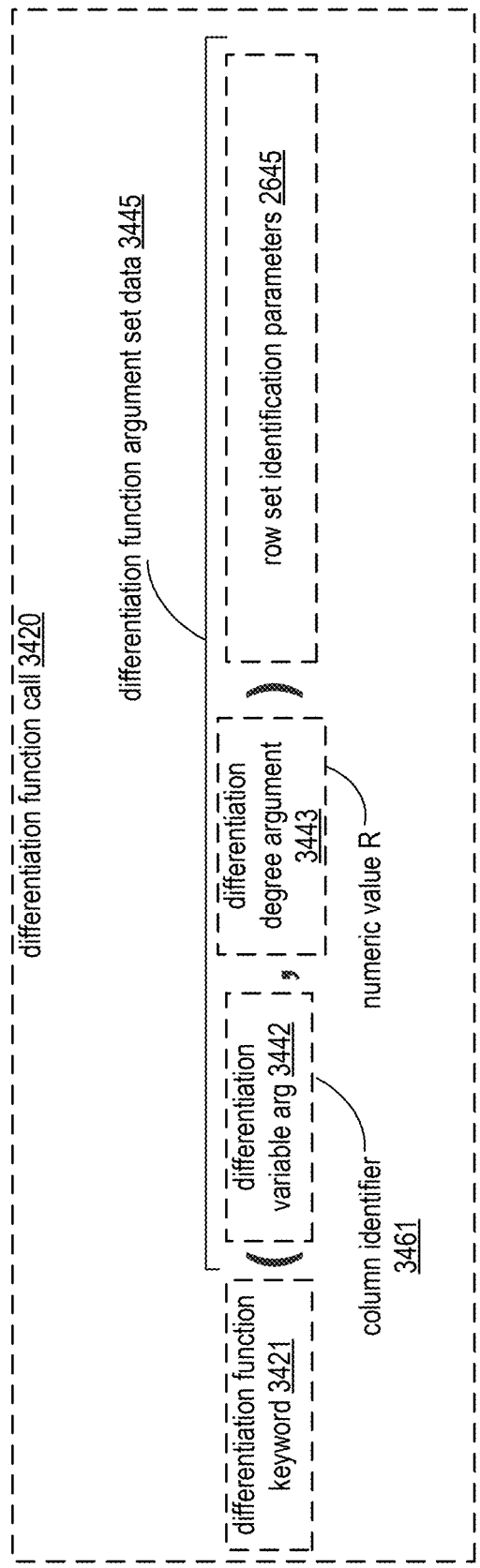
Figure 34K:
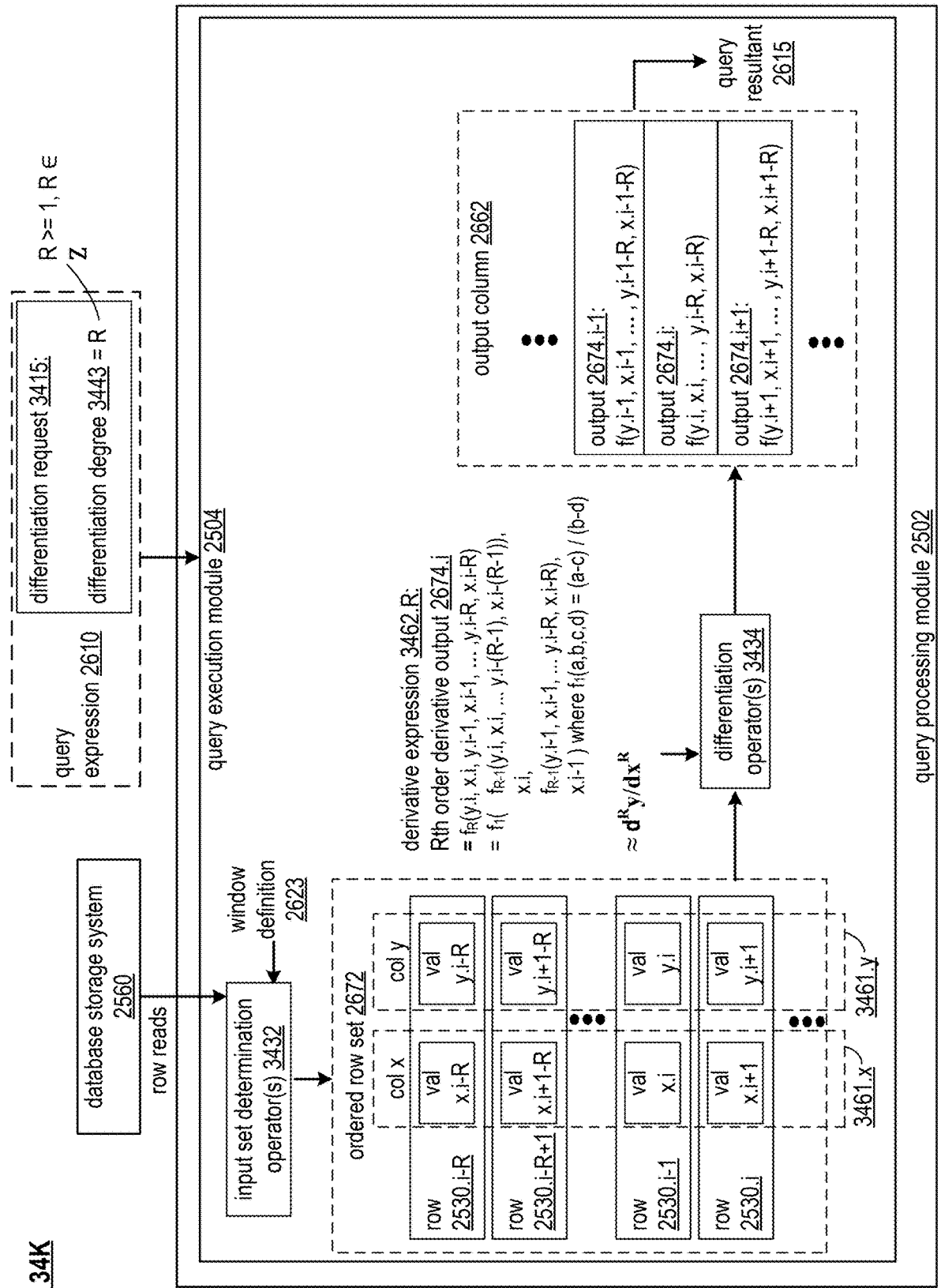
Figure 34L:
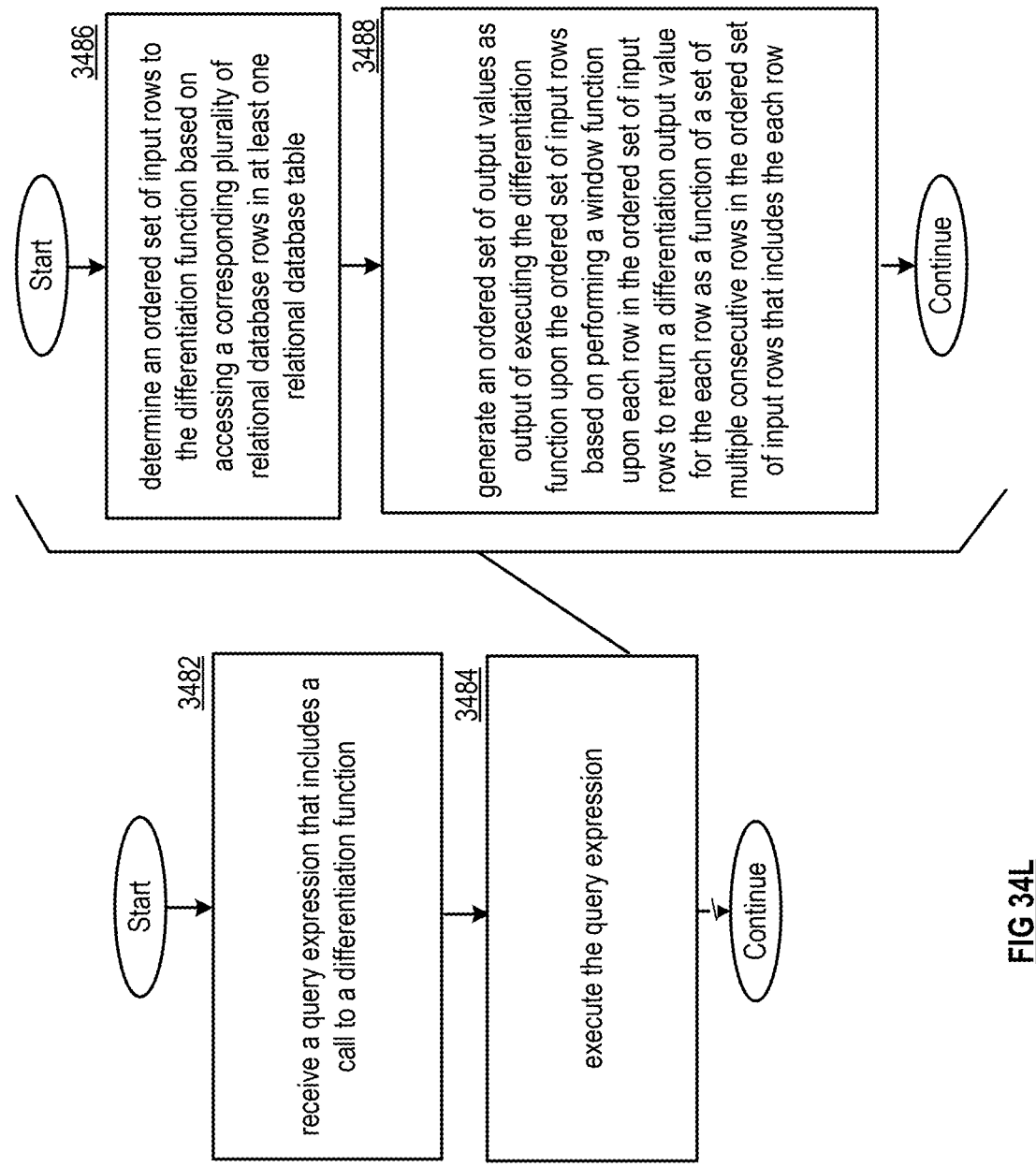
Figure 35A:
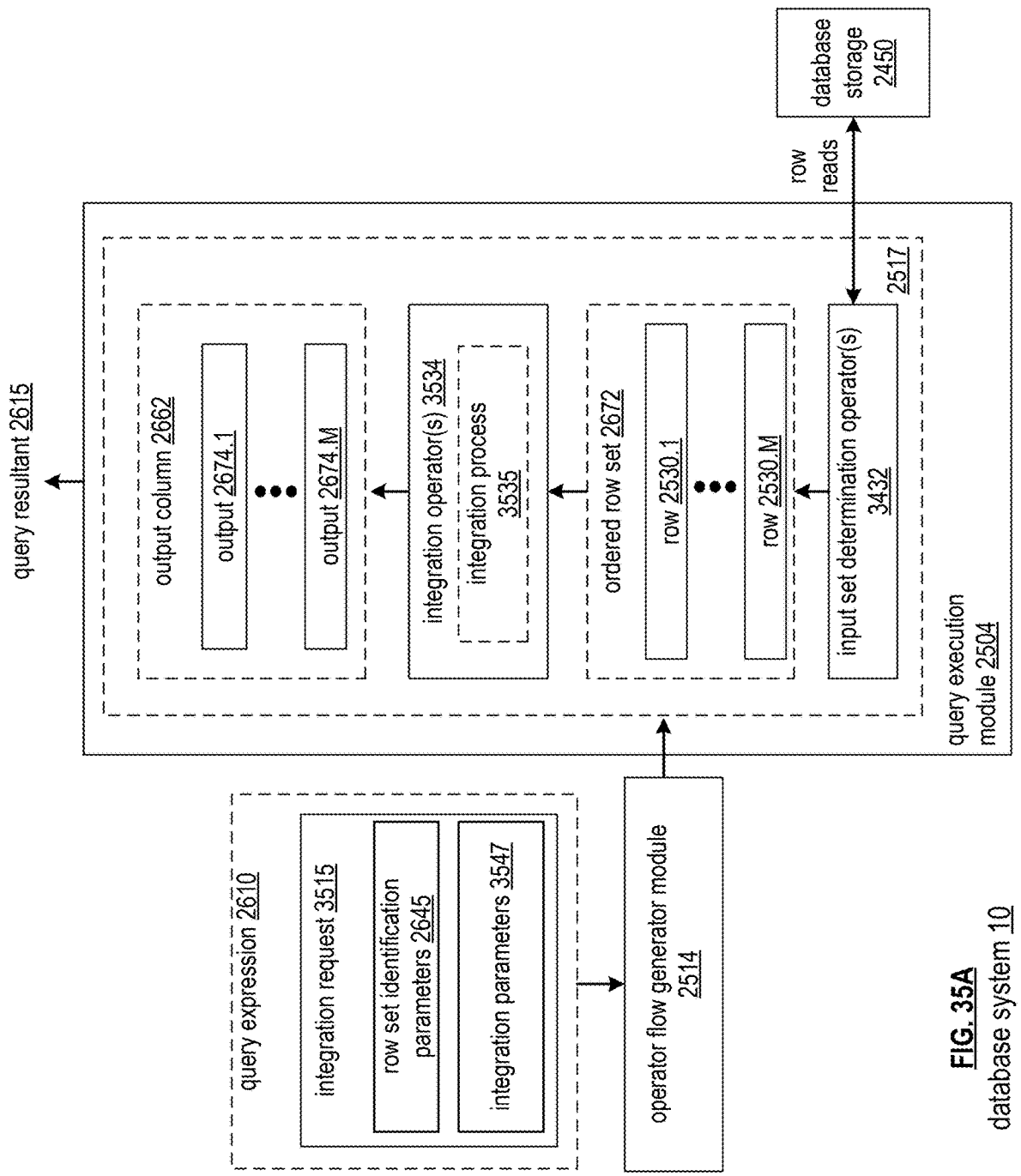
Figure 35B:
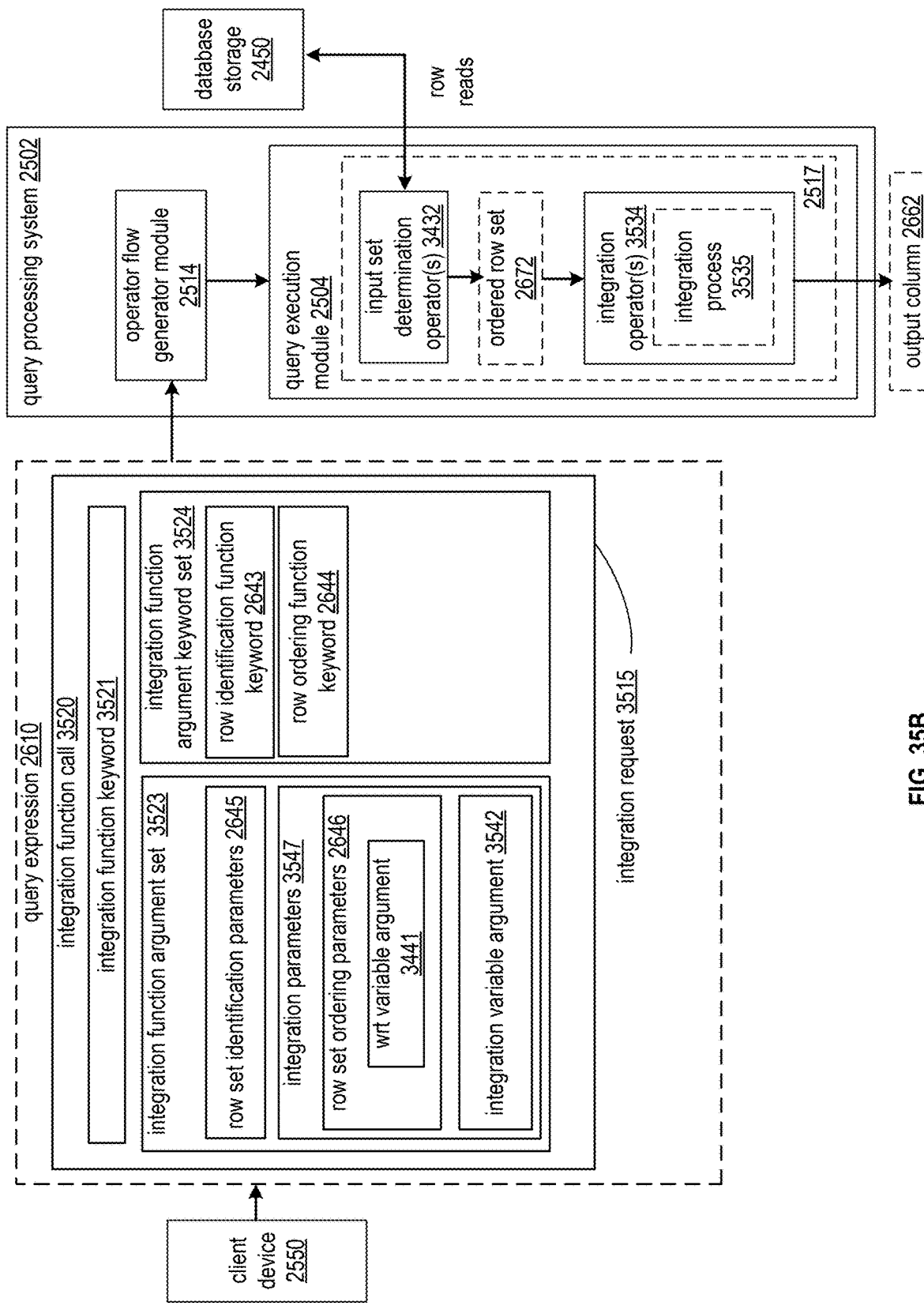
Figure 35C:
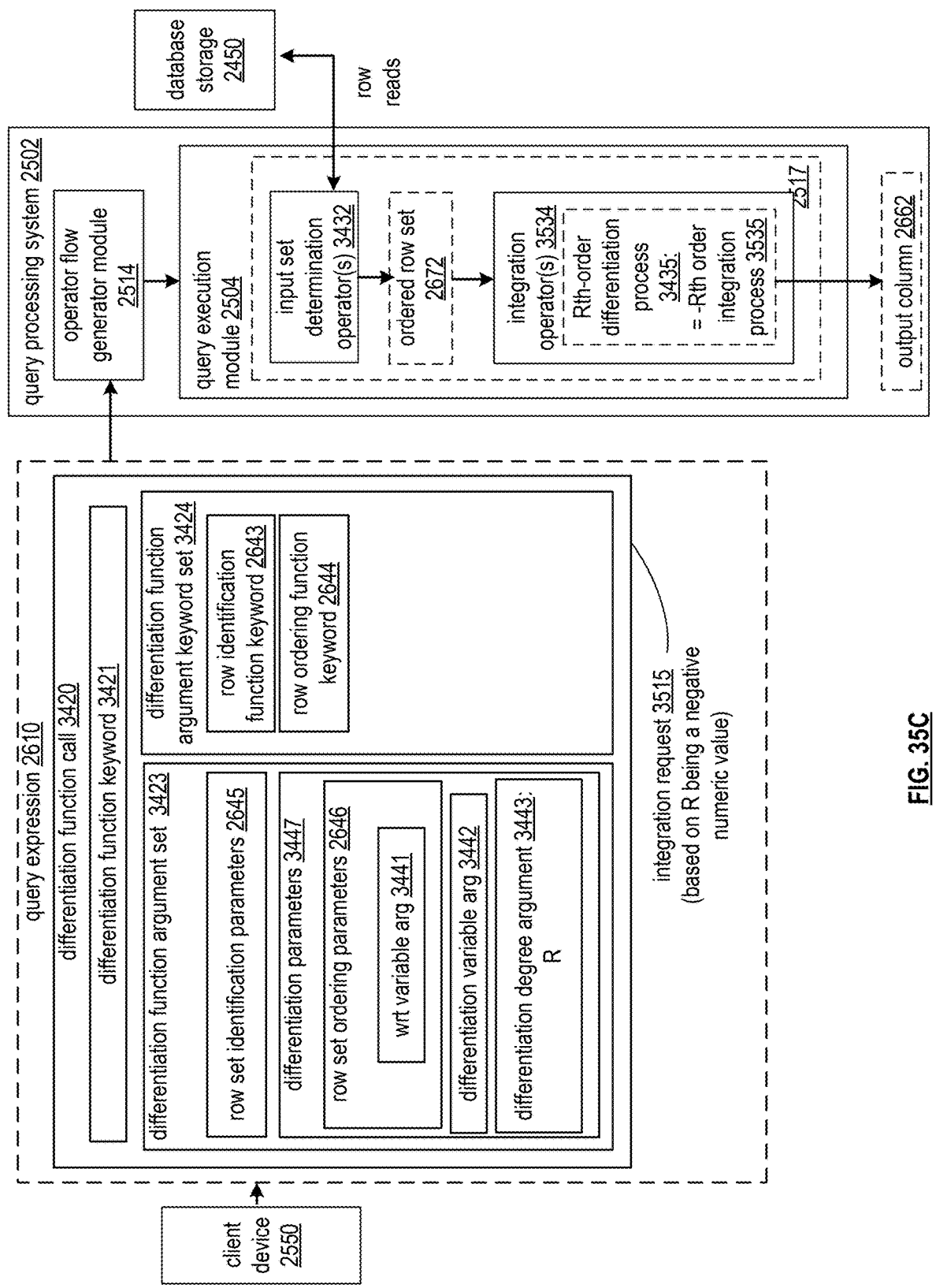
Figure 35D:
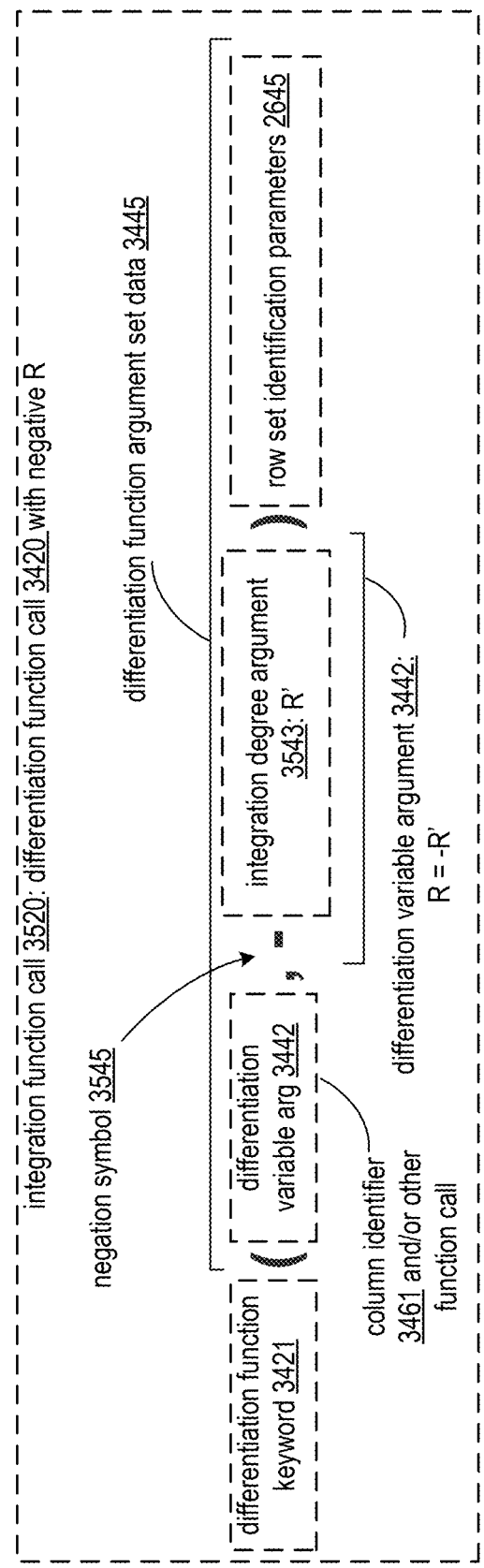
Figure 35E:
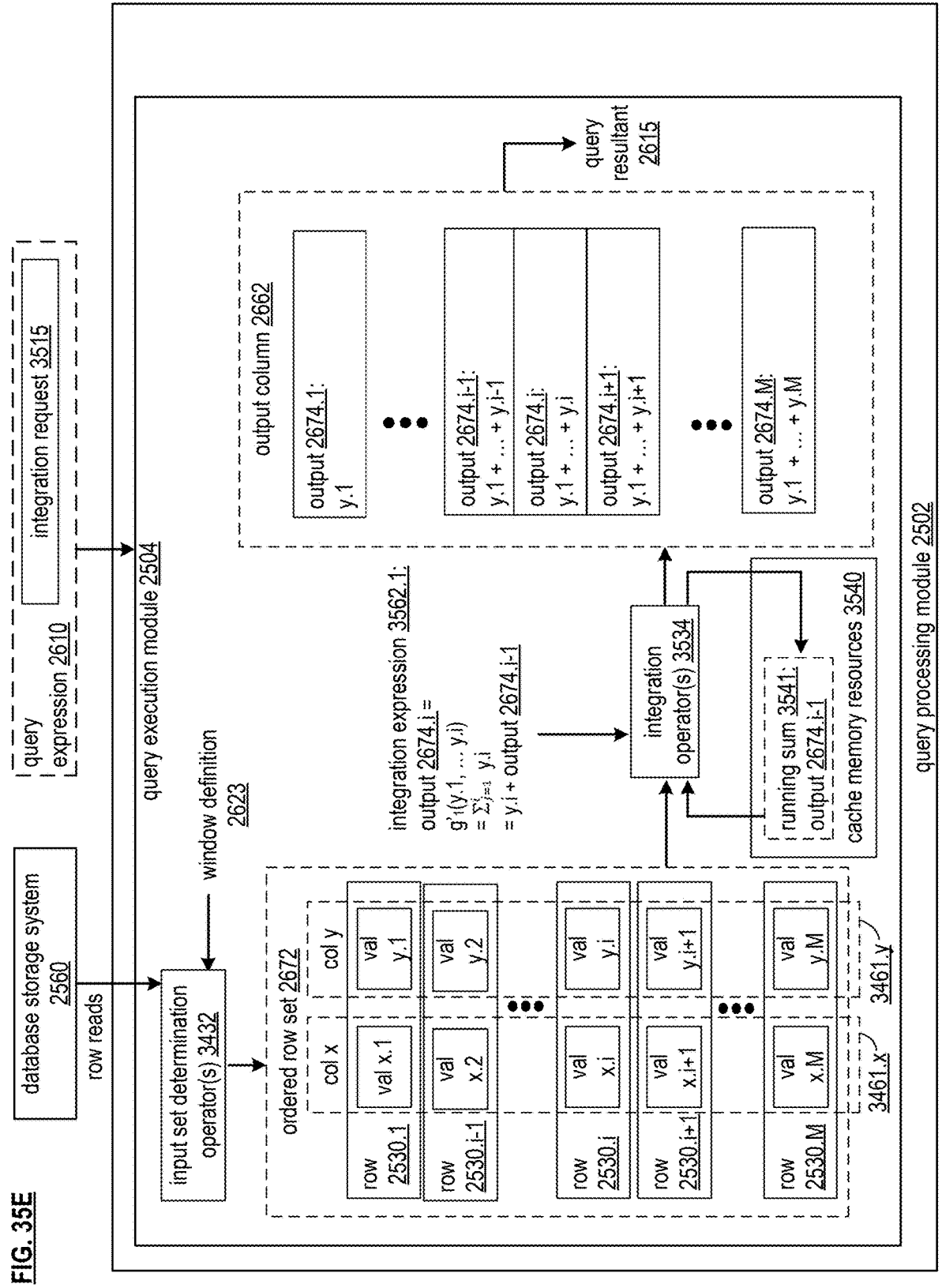
Figure 35F:
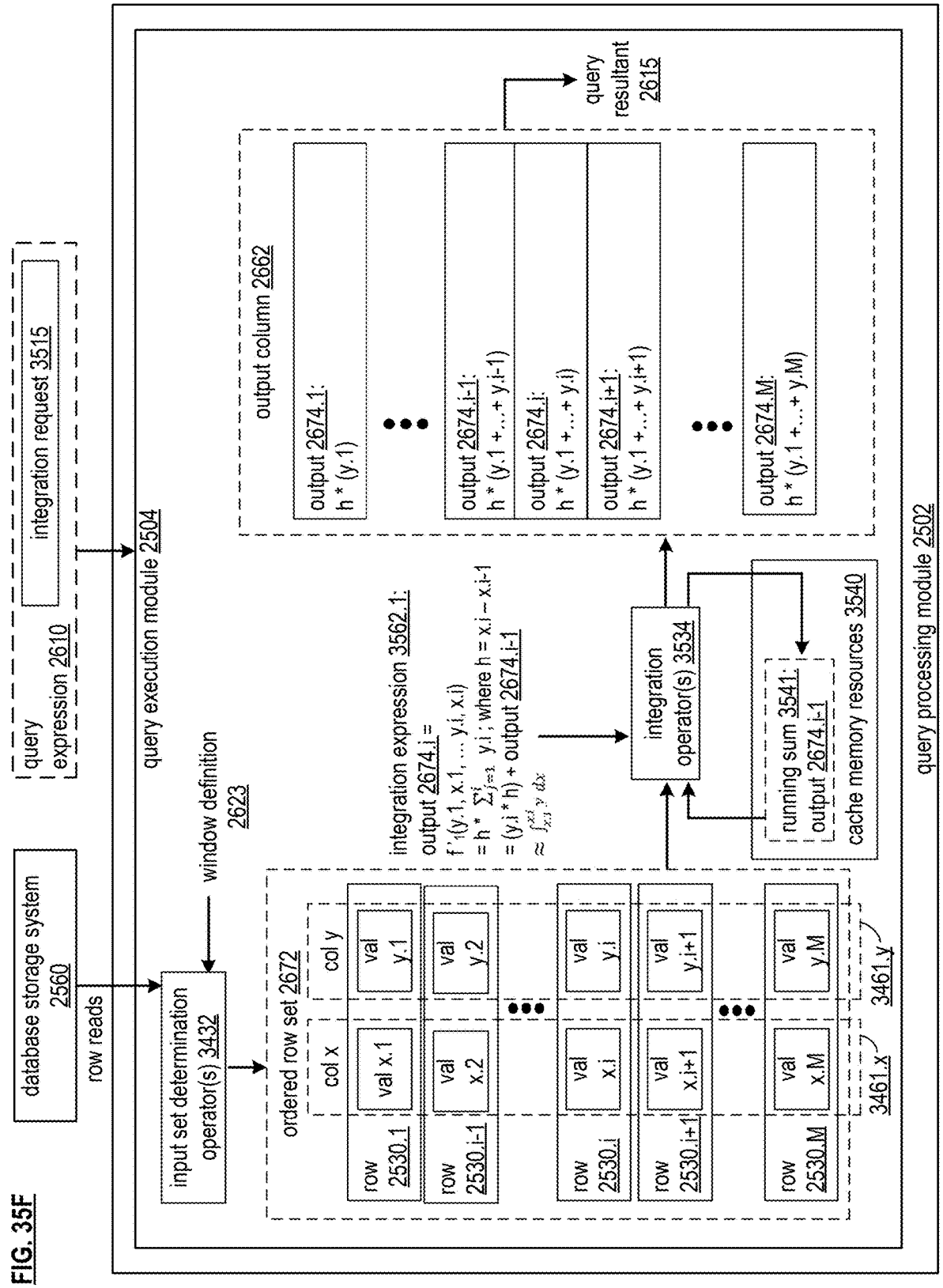
Figure 35G:
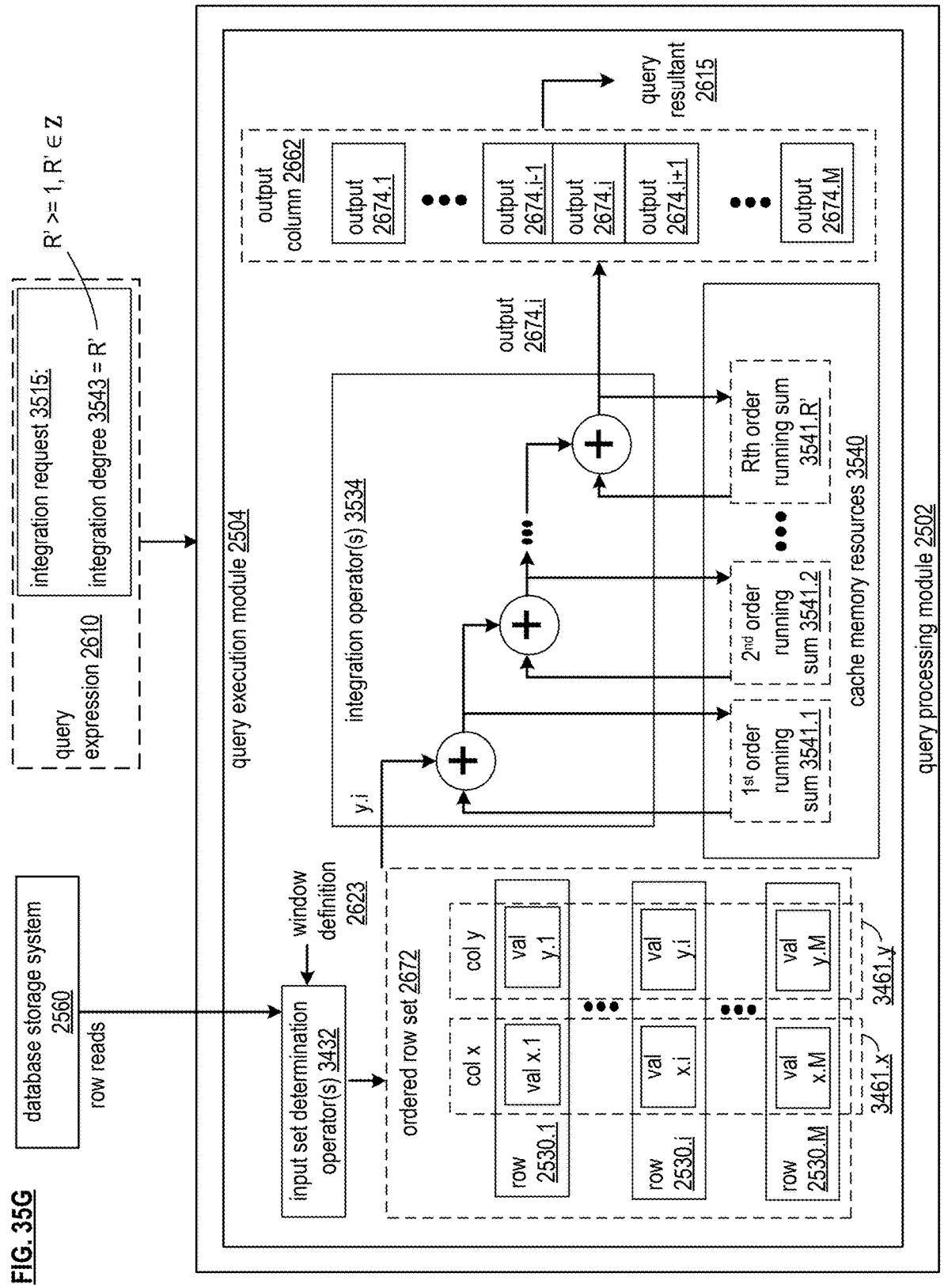
Figure 35H:
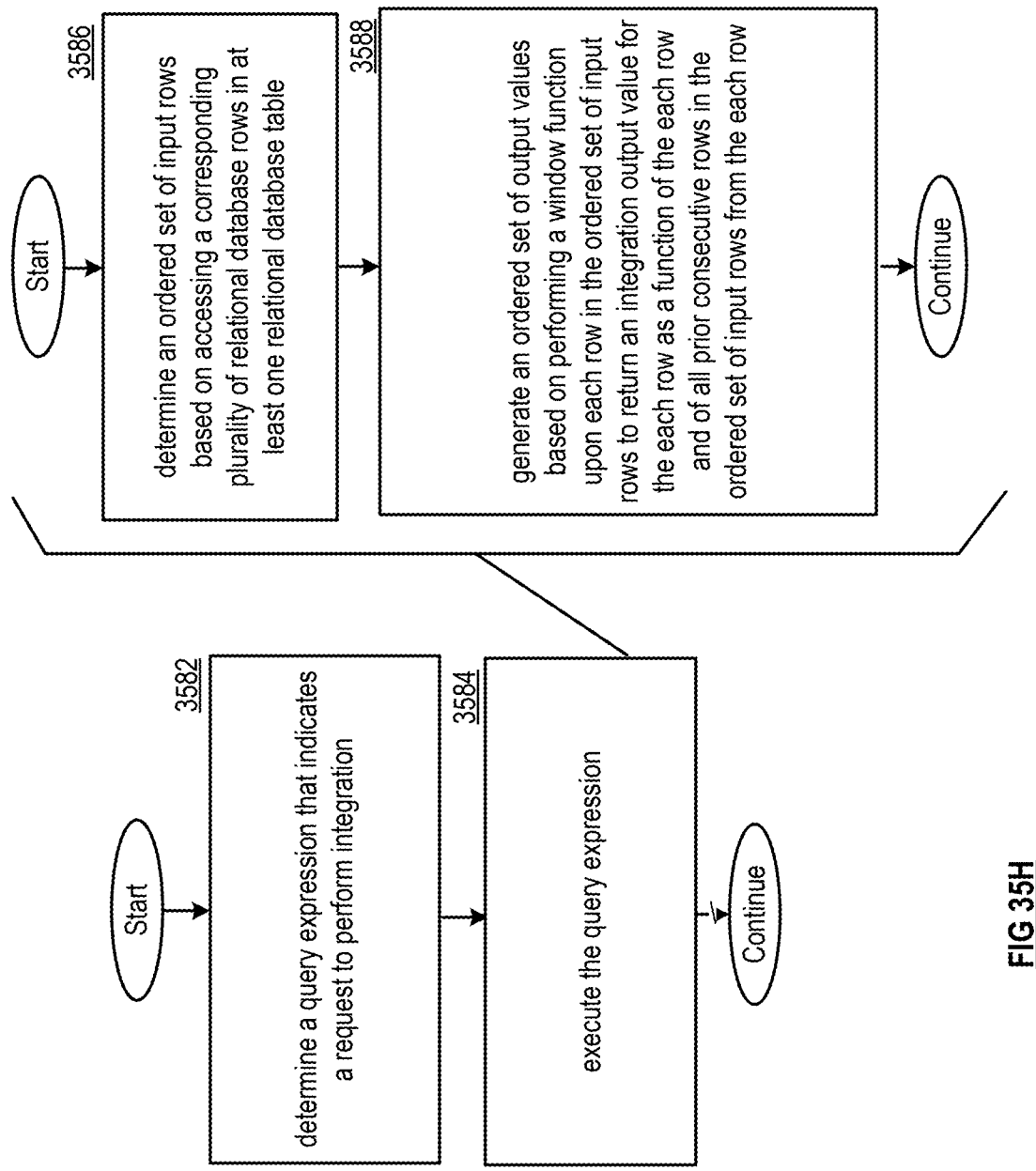
Figure 36A:
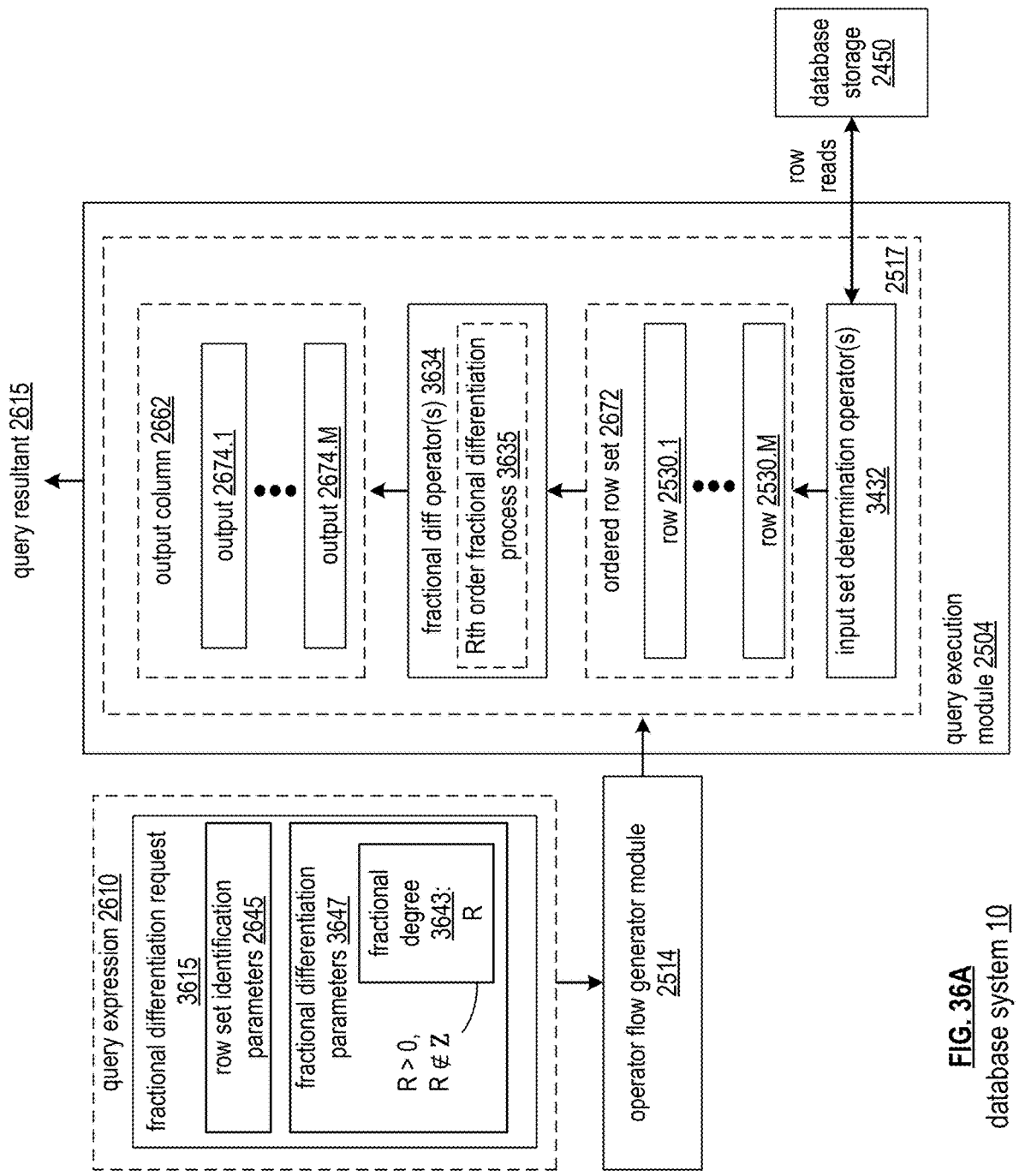
Figure 36B:
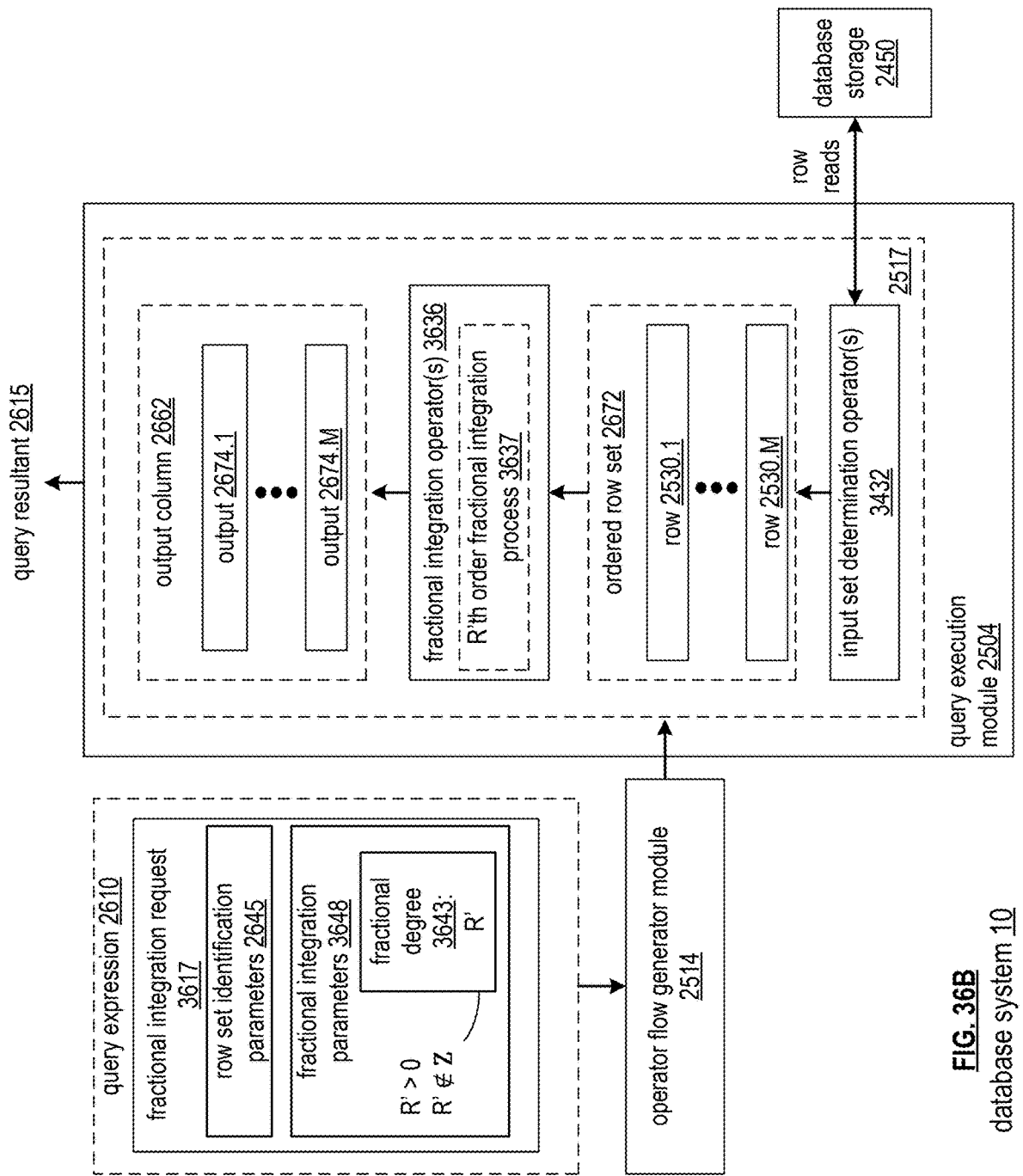
Figure 36C:
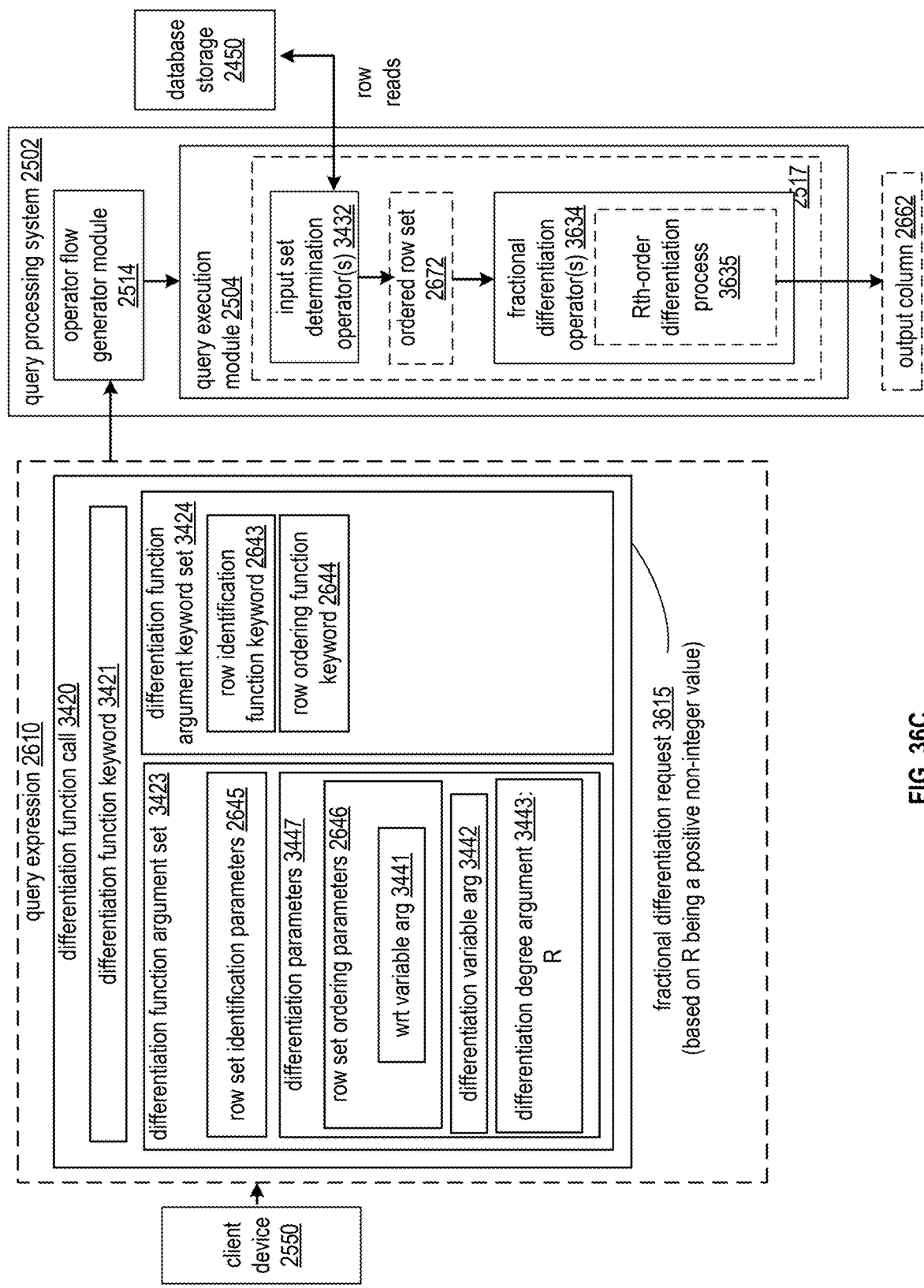
Figure 36D:
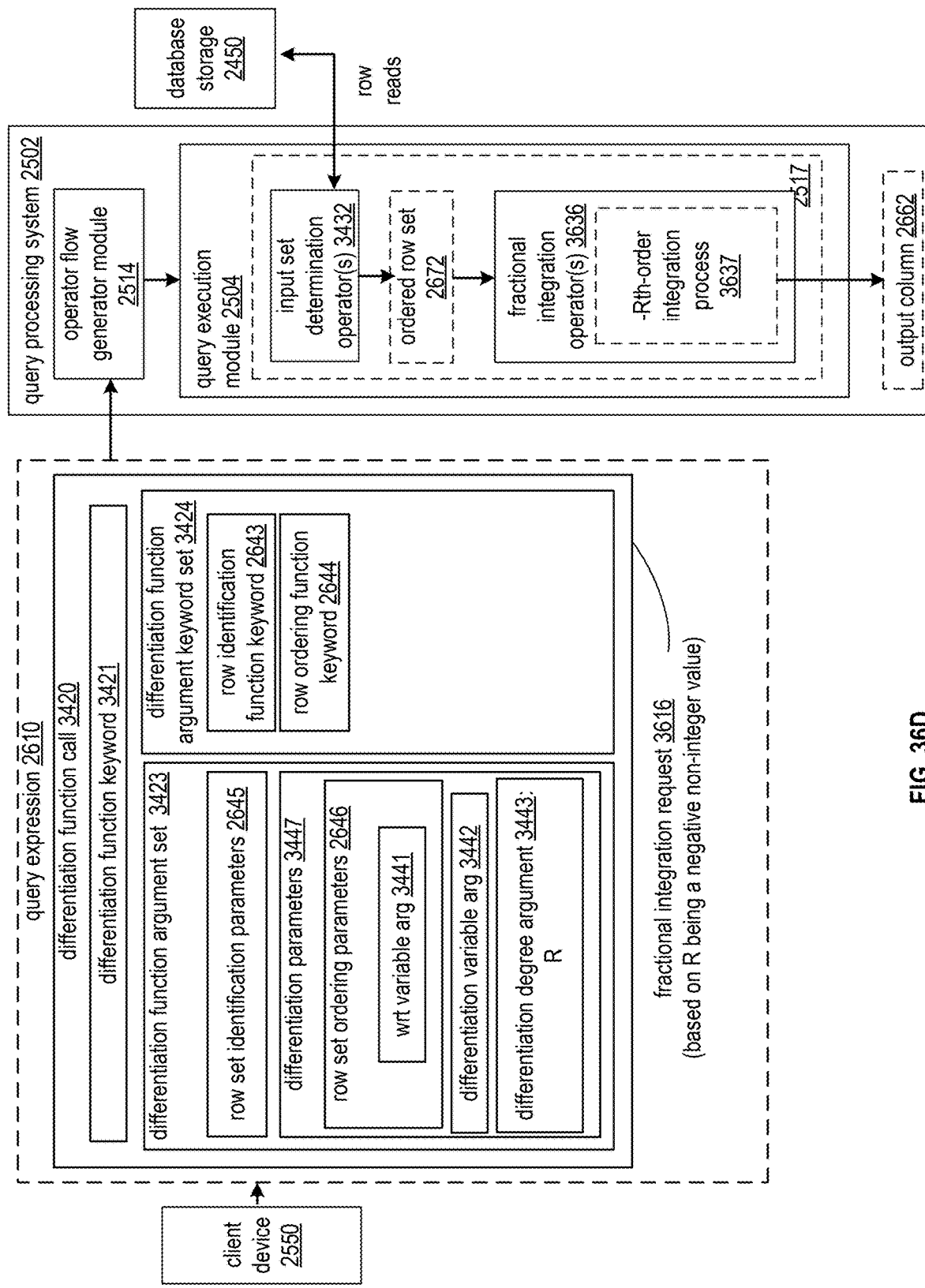
Figure 36E:
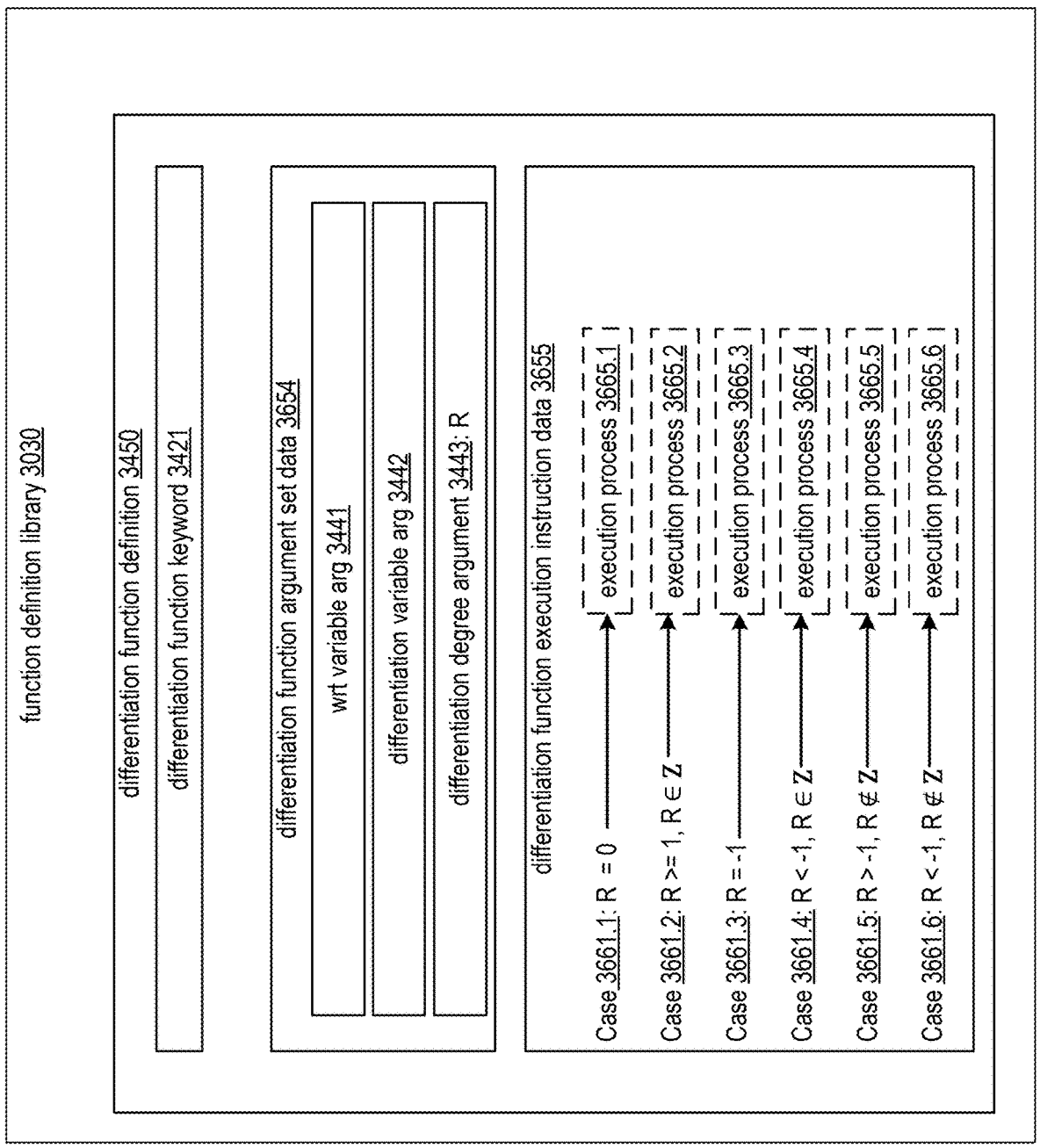
Figure 36G:
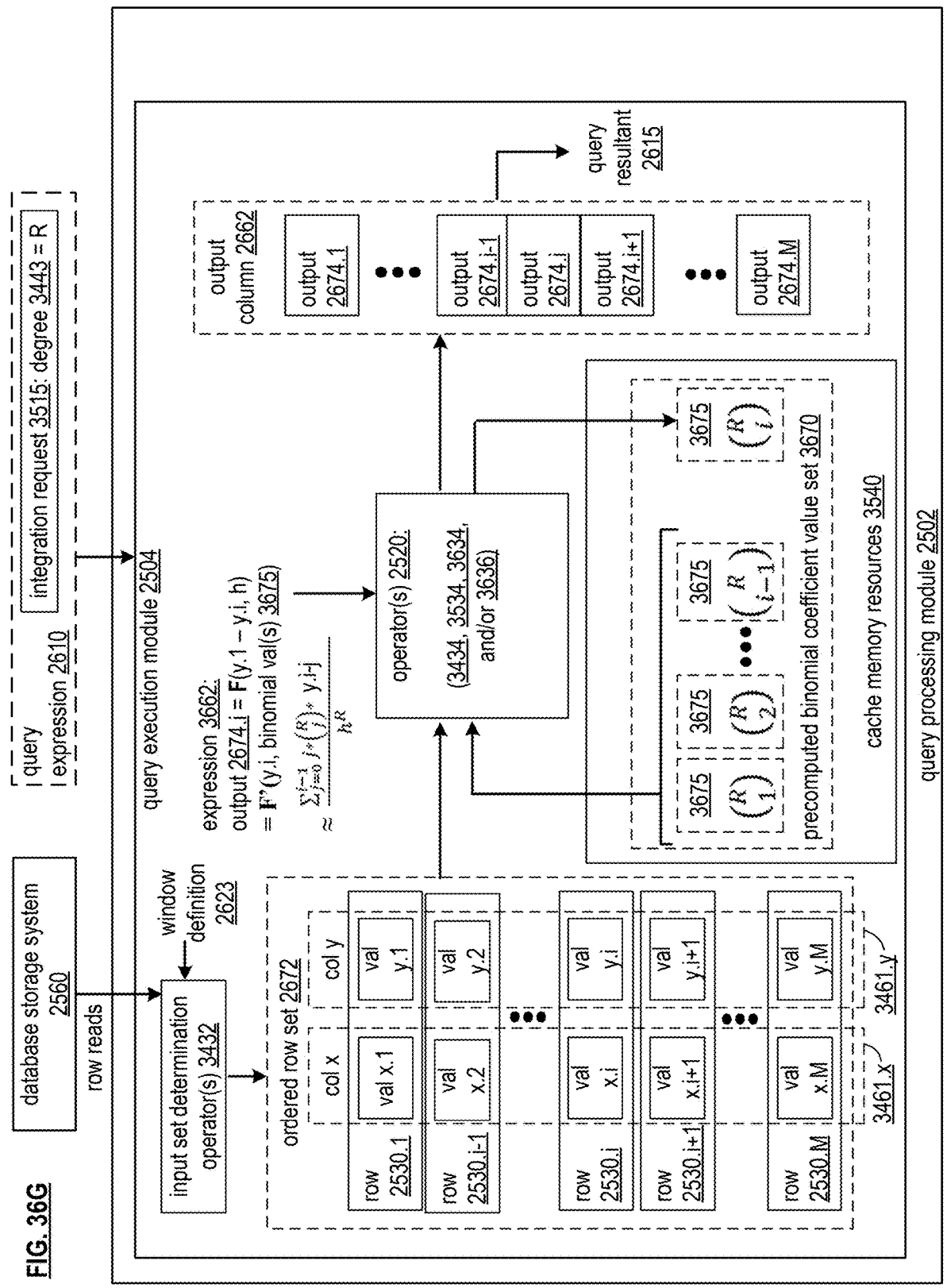
Figure 36H:
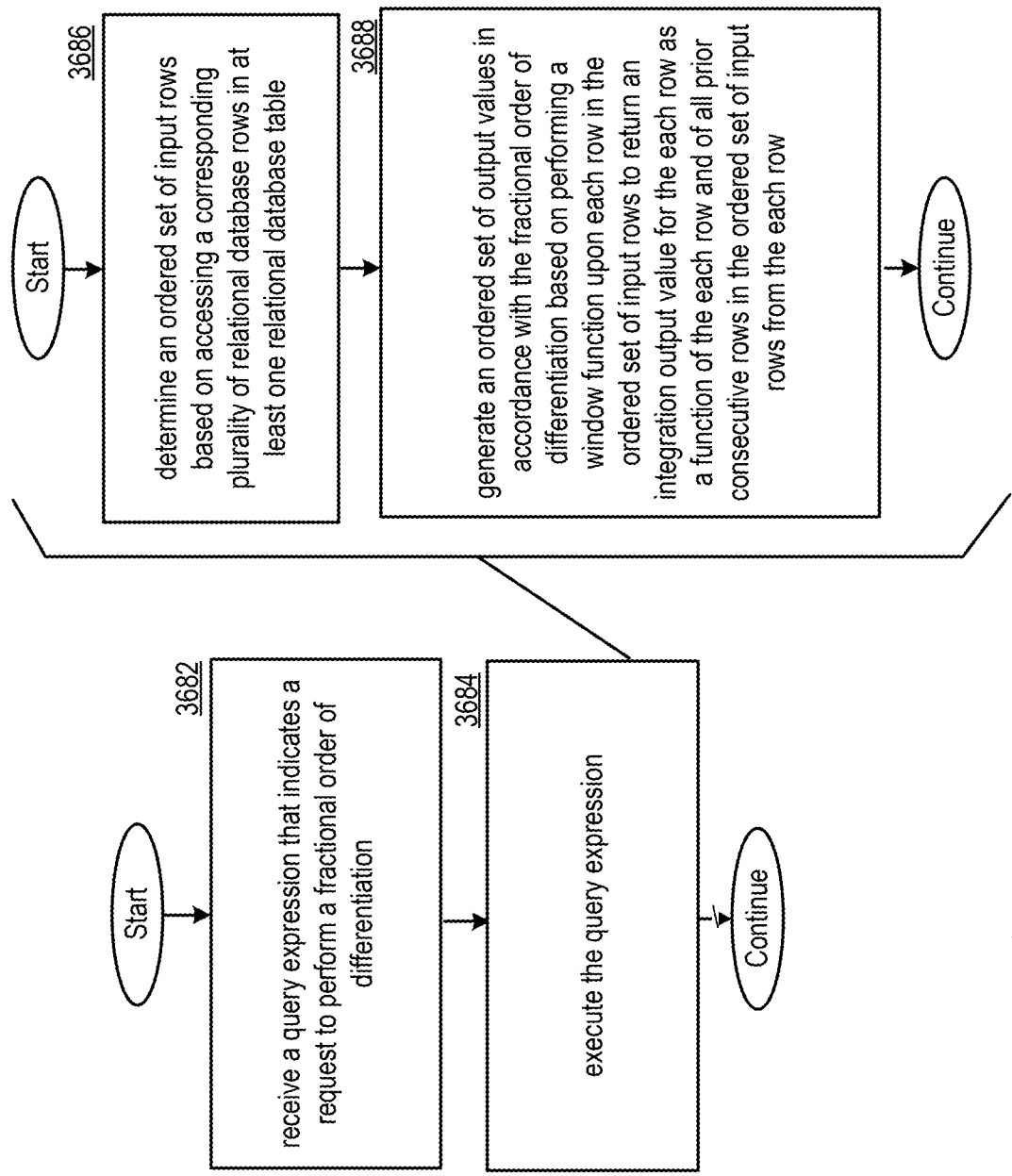
Figure 37A:
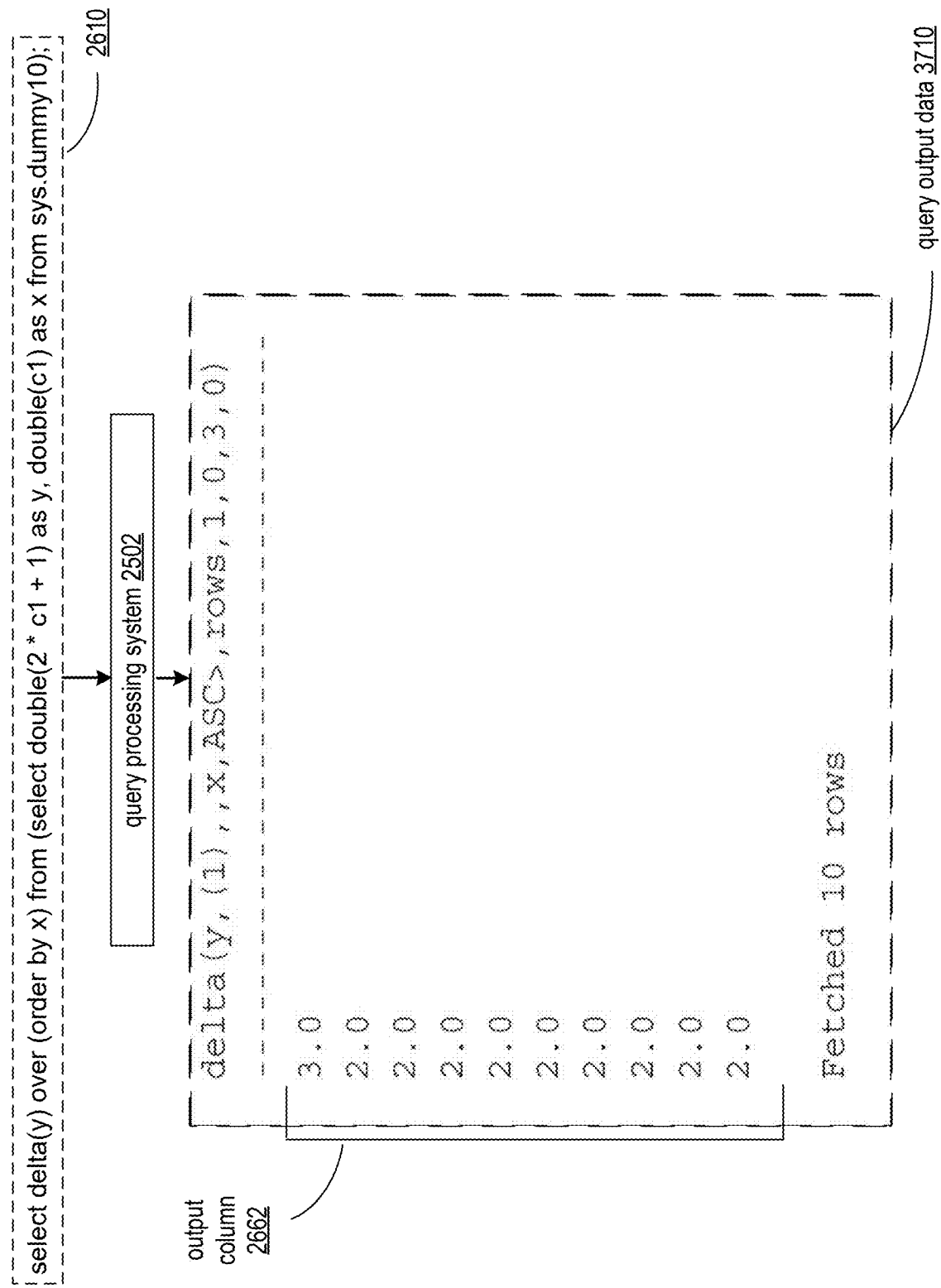
Figure 37B:
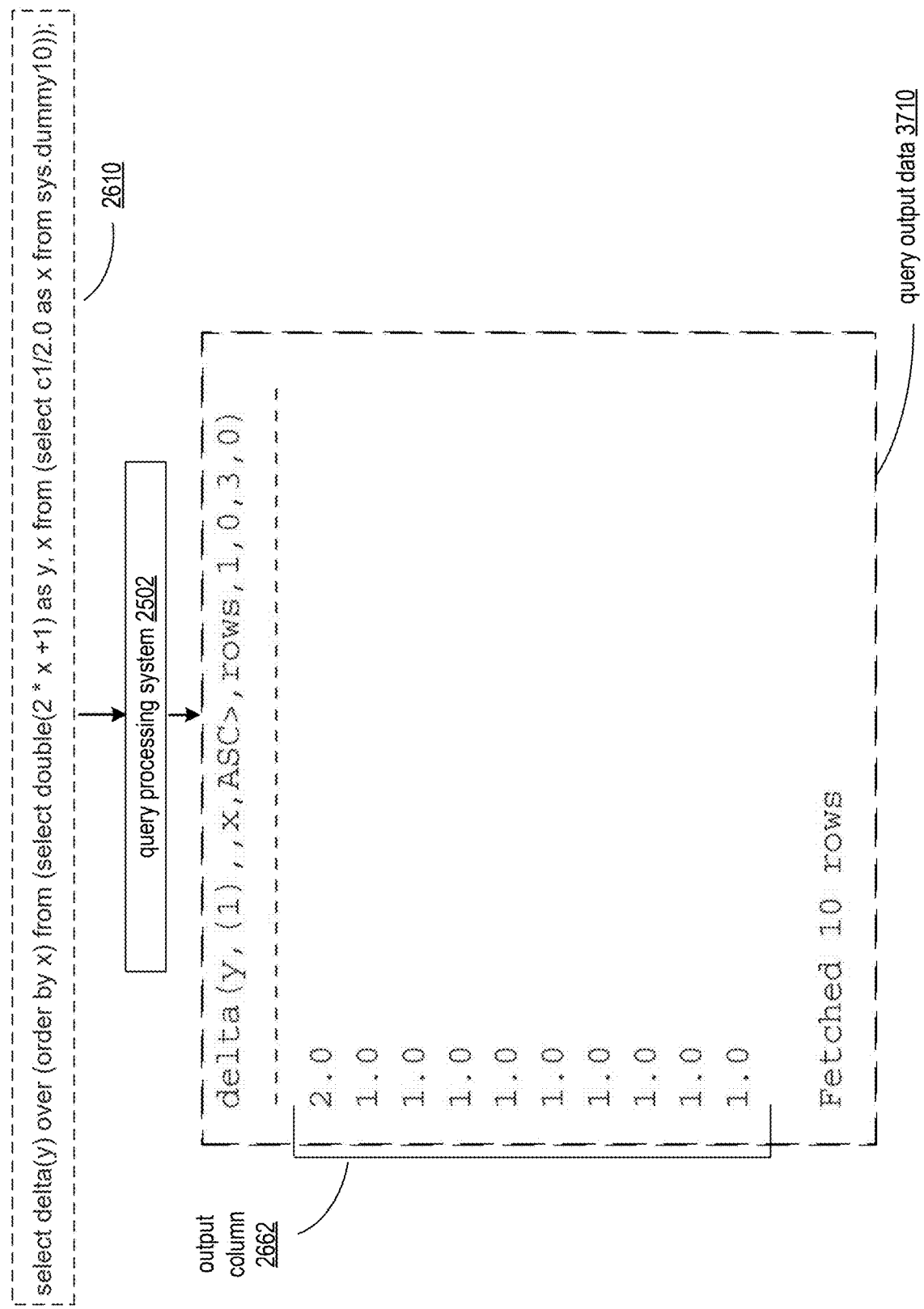
Figure 37C:
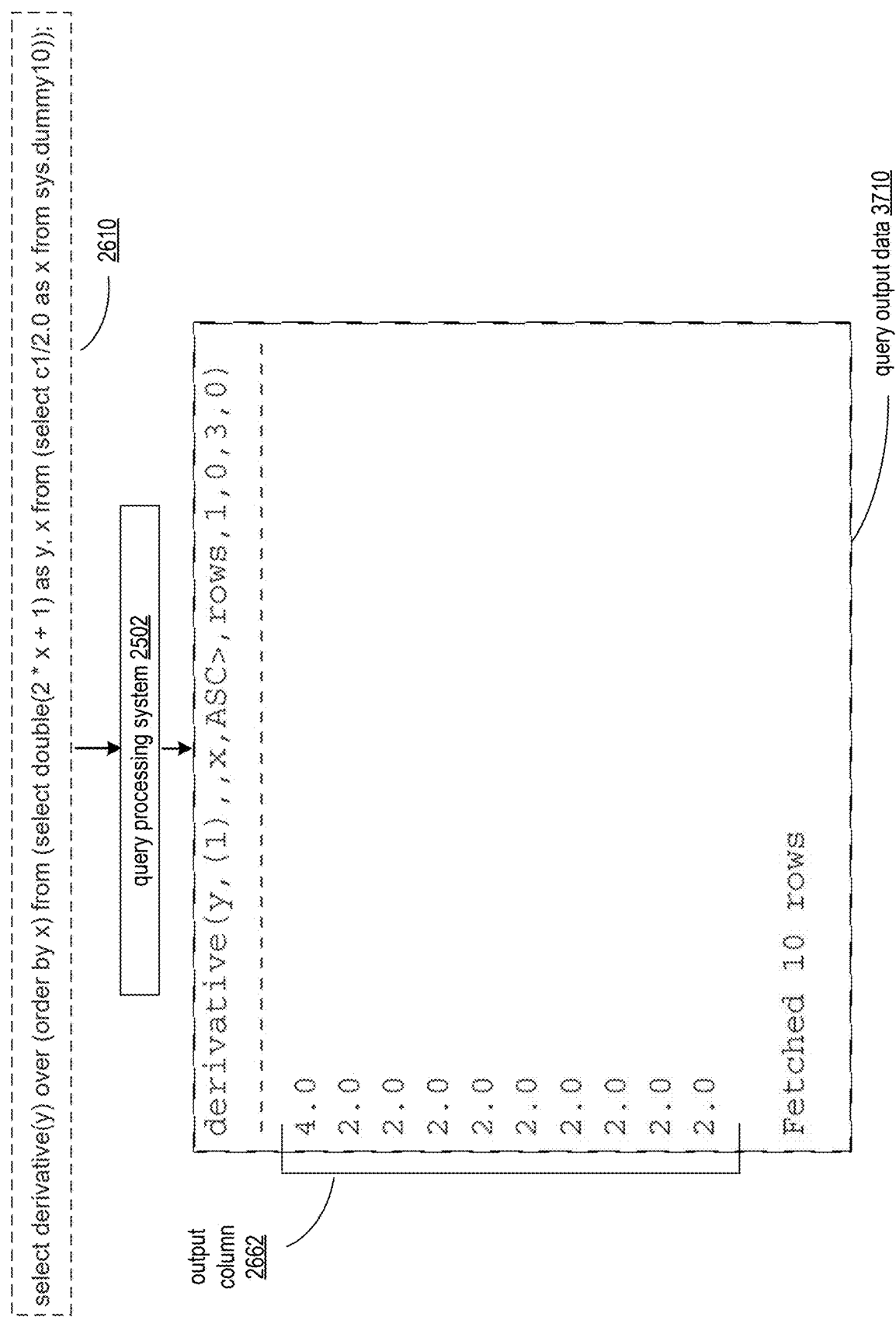
Figure 37D:
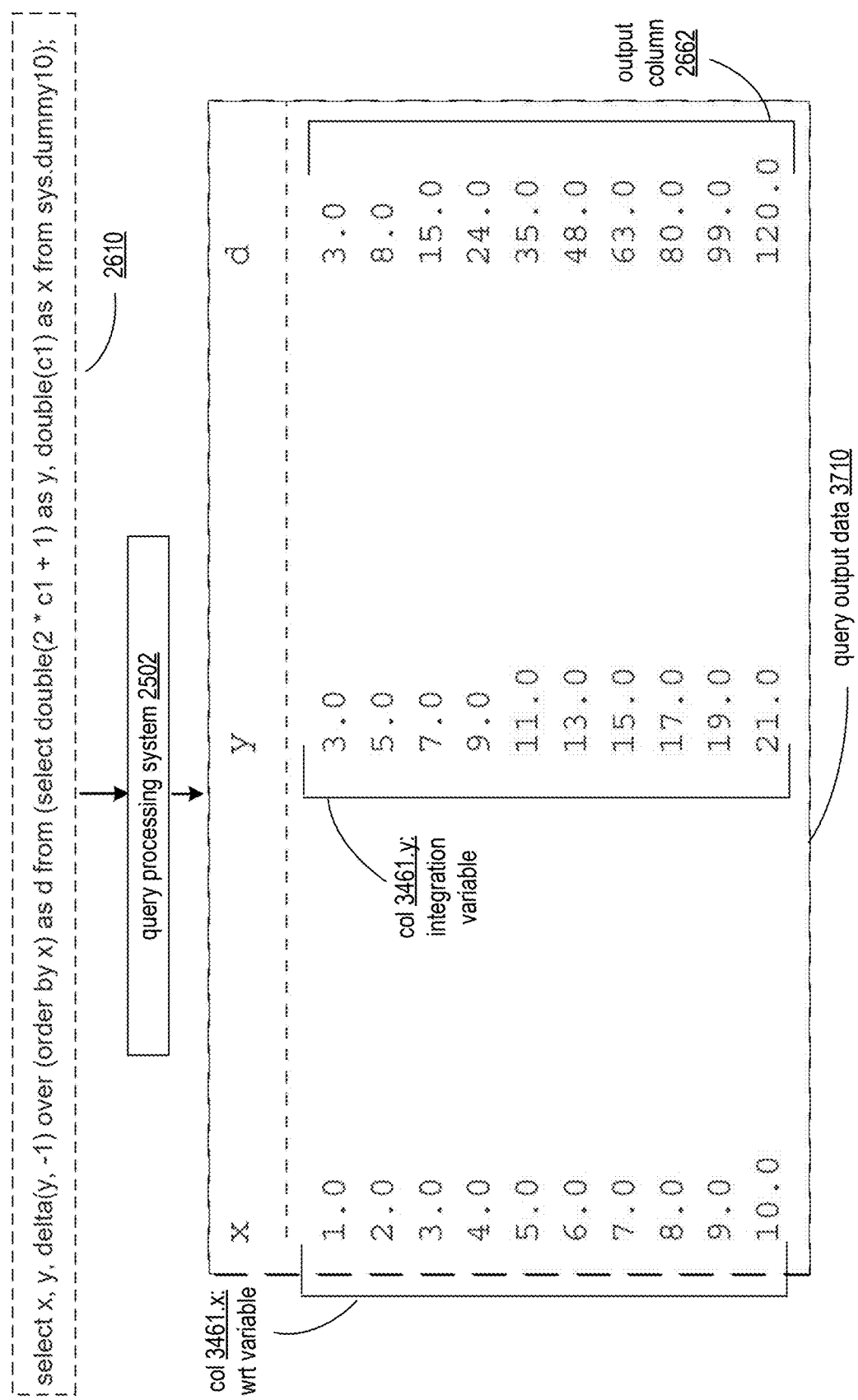
Figure 37E:
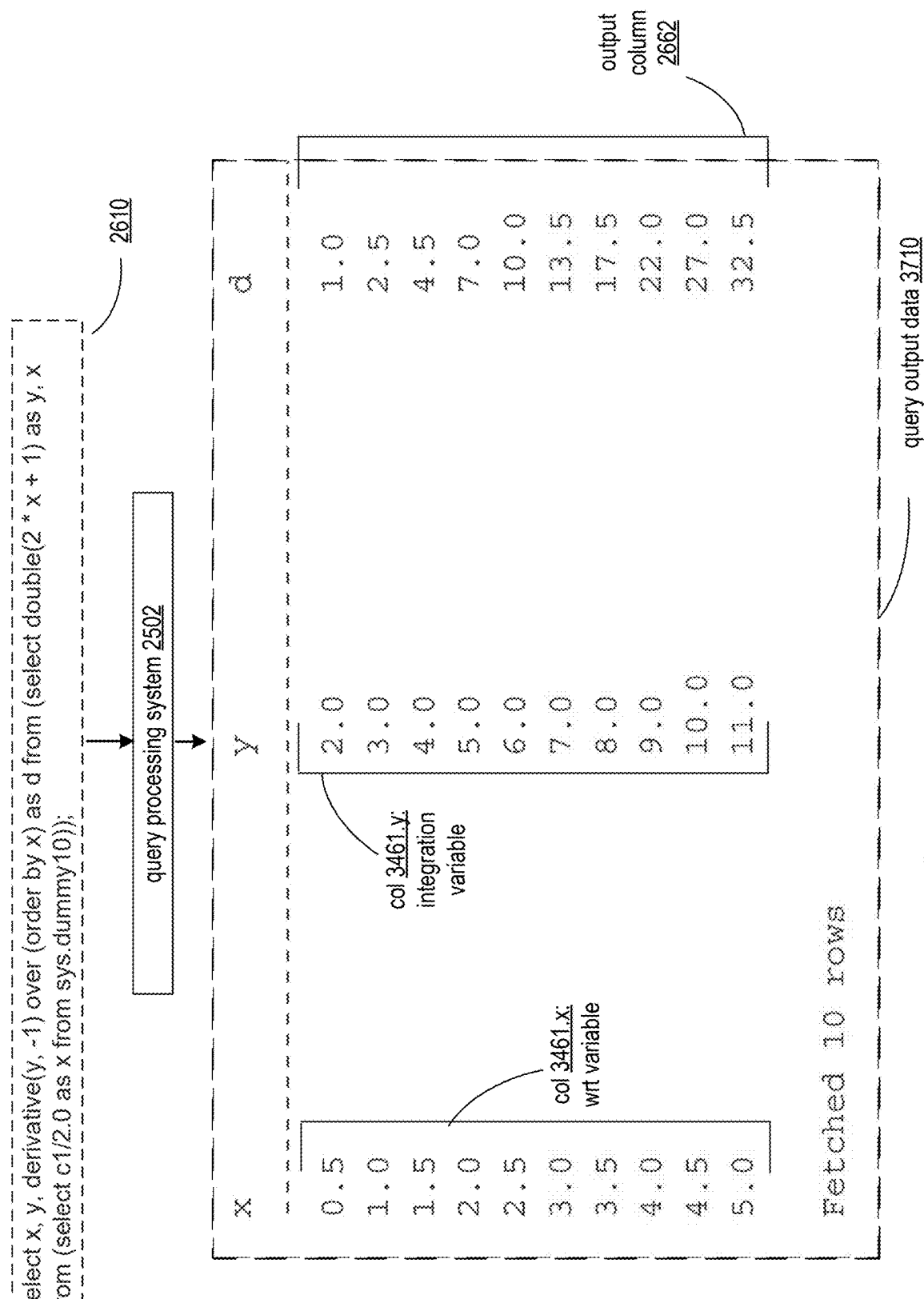
Figure 37F:
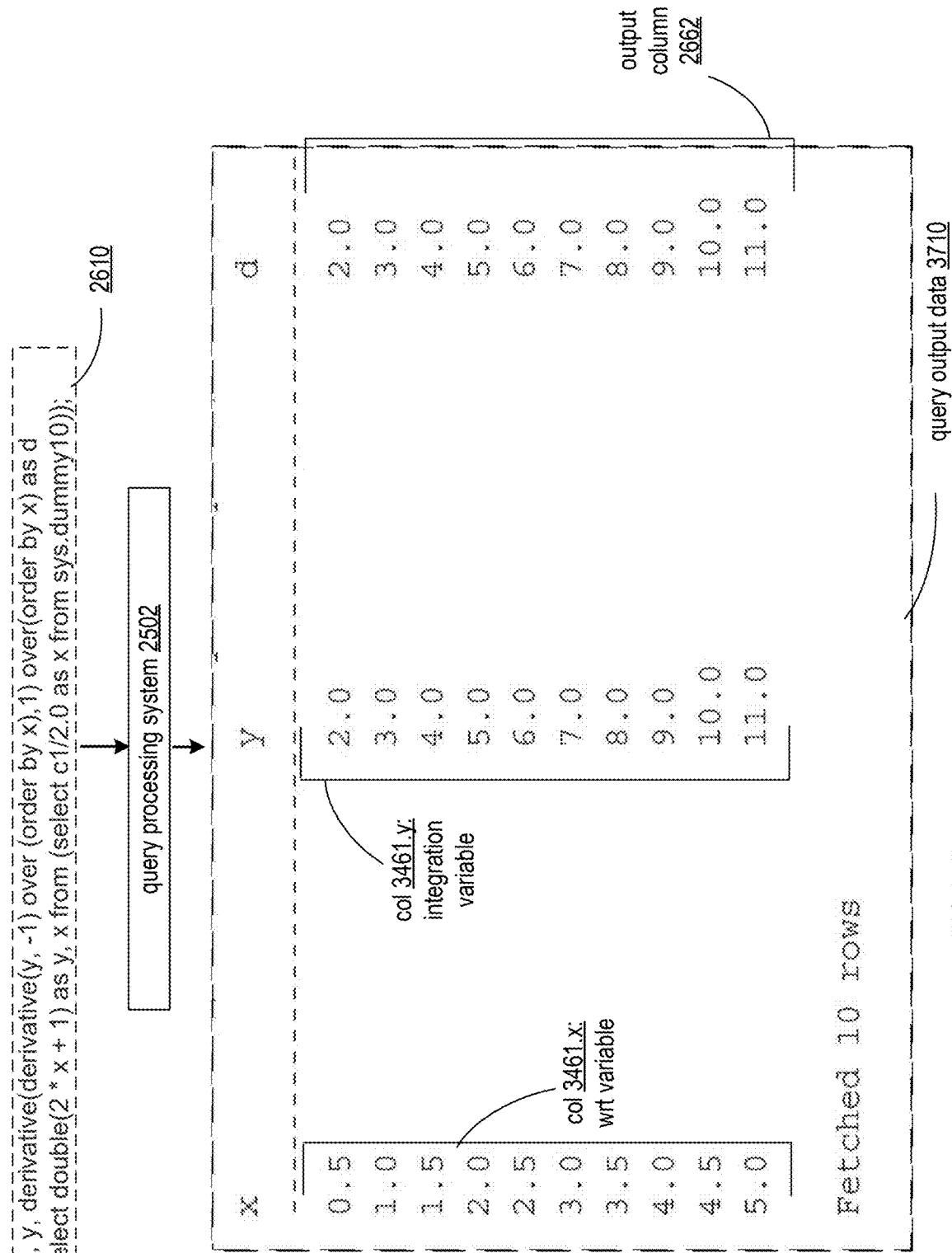
Figure 37G:
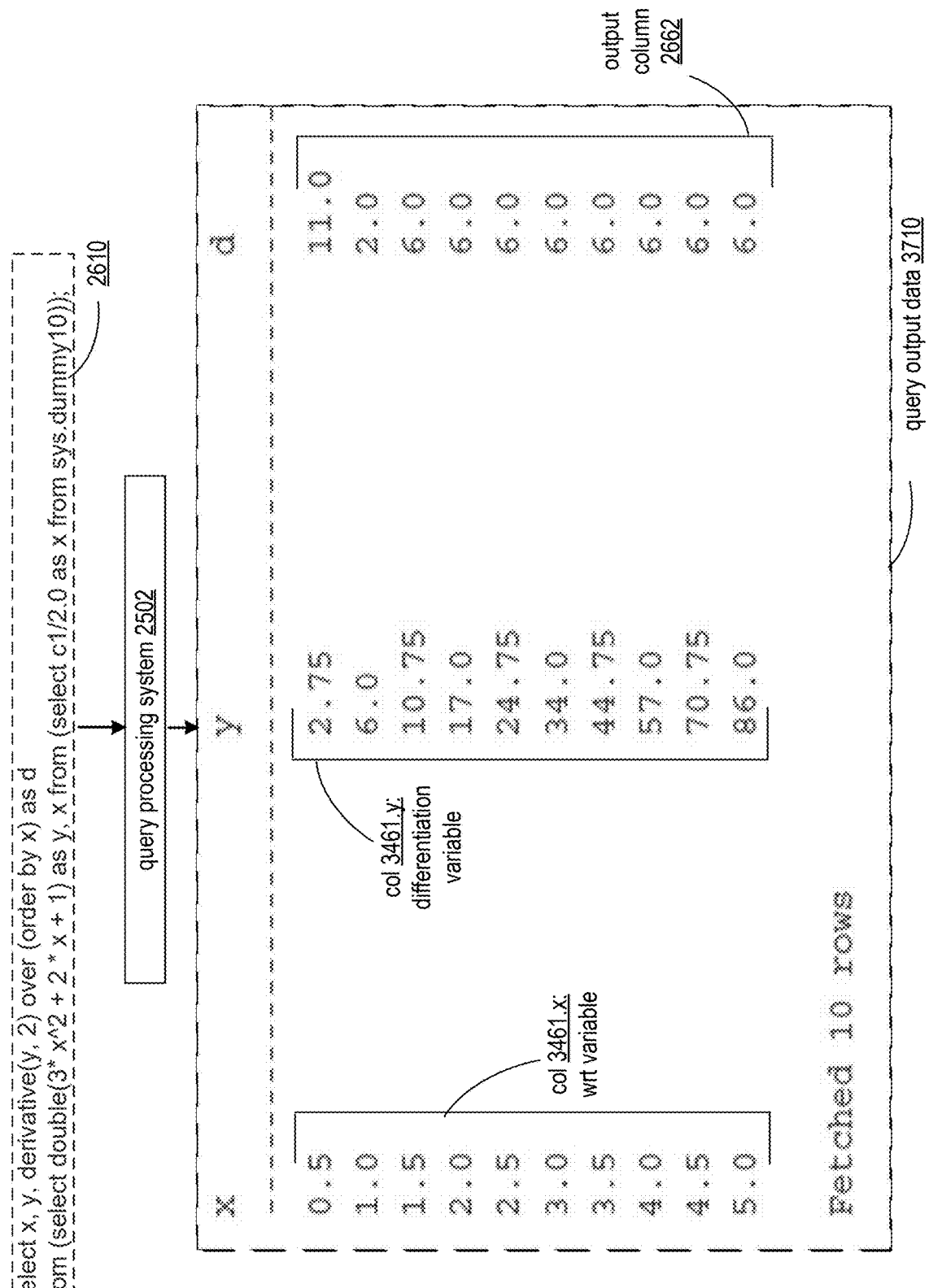
Figure 37H:
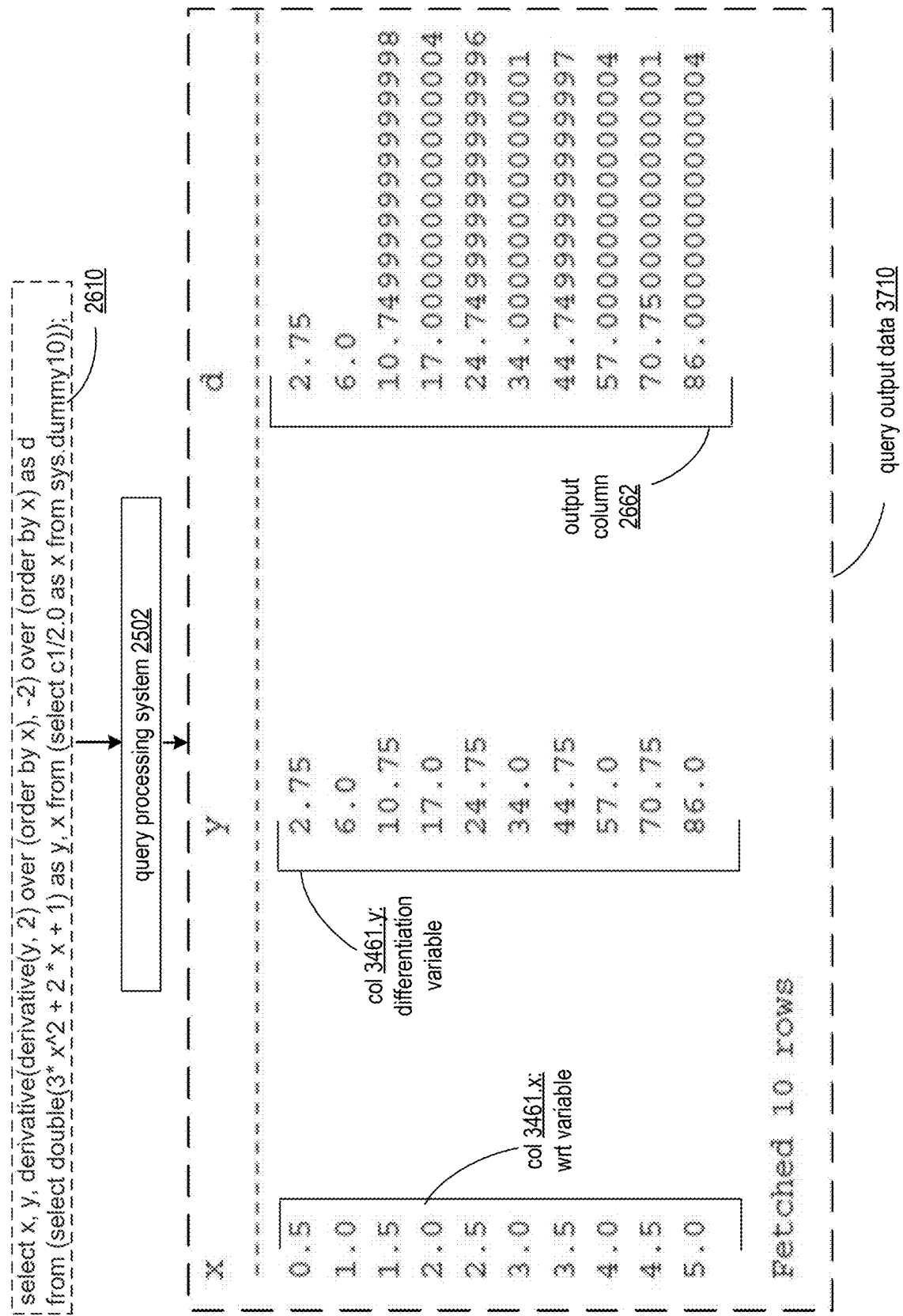
Figure 37I:
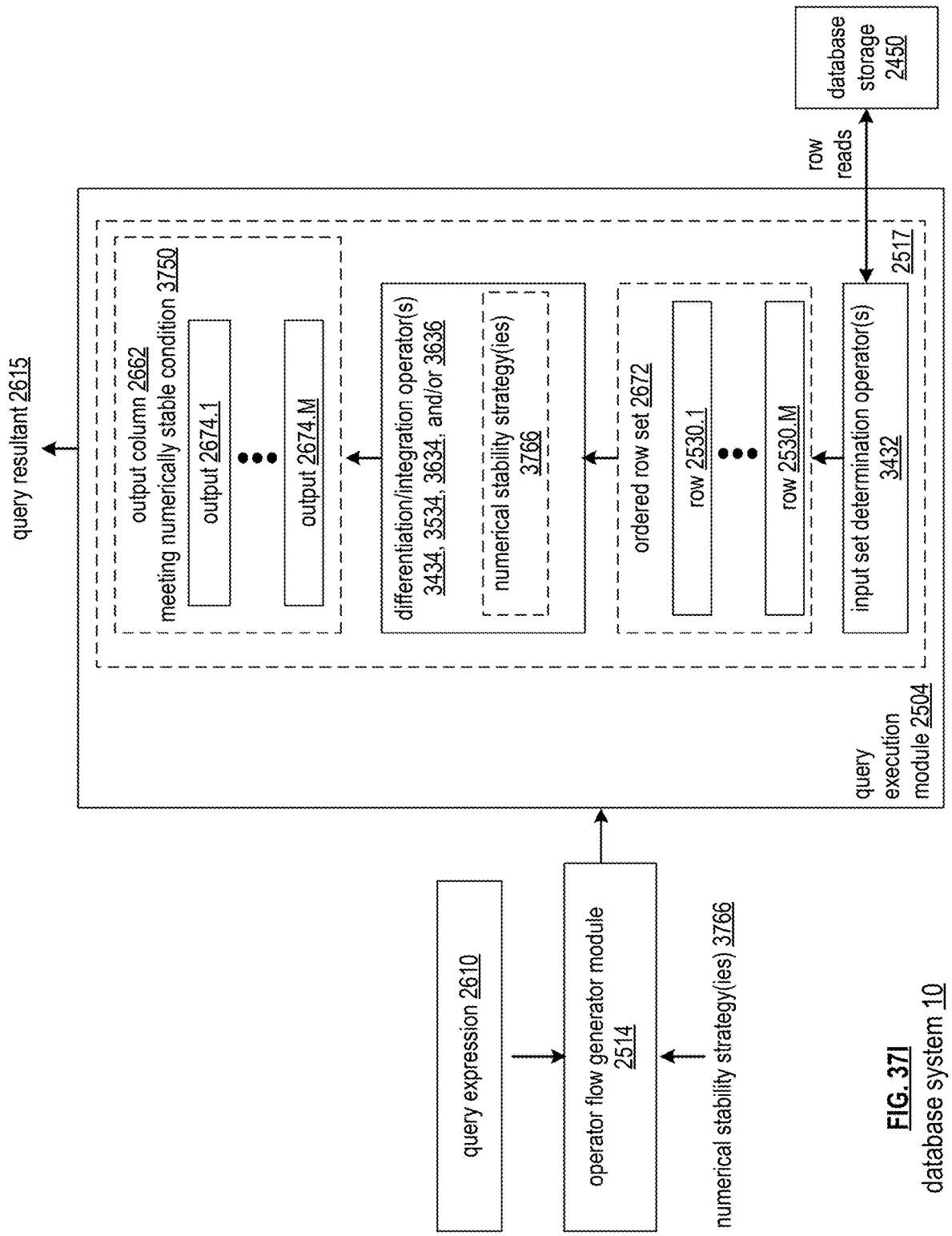
Figure 37J:
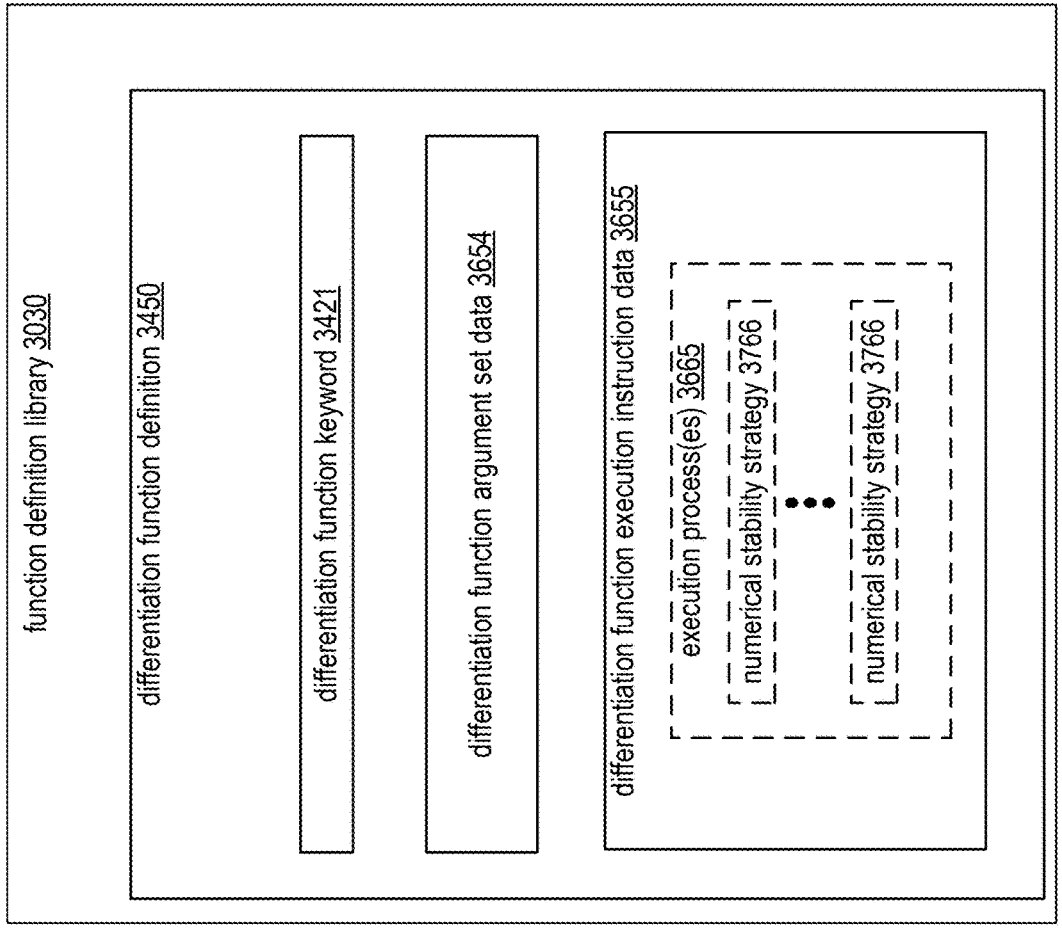
Figure 38A:
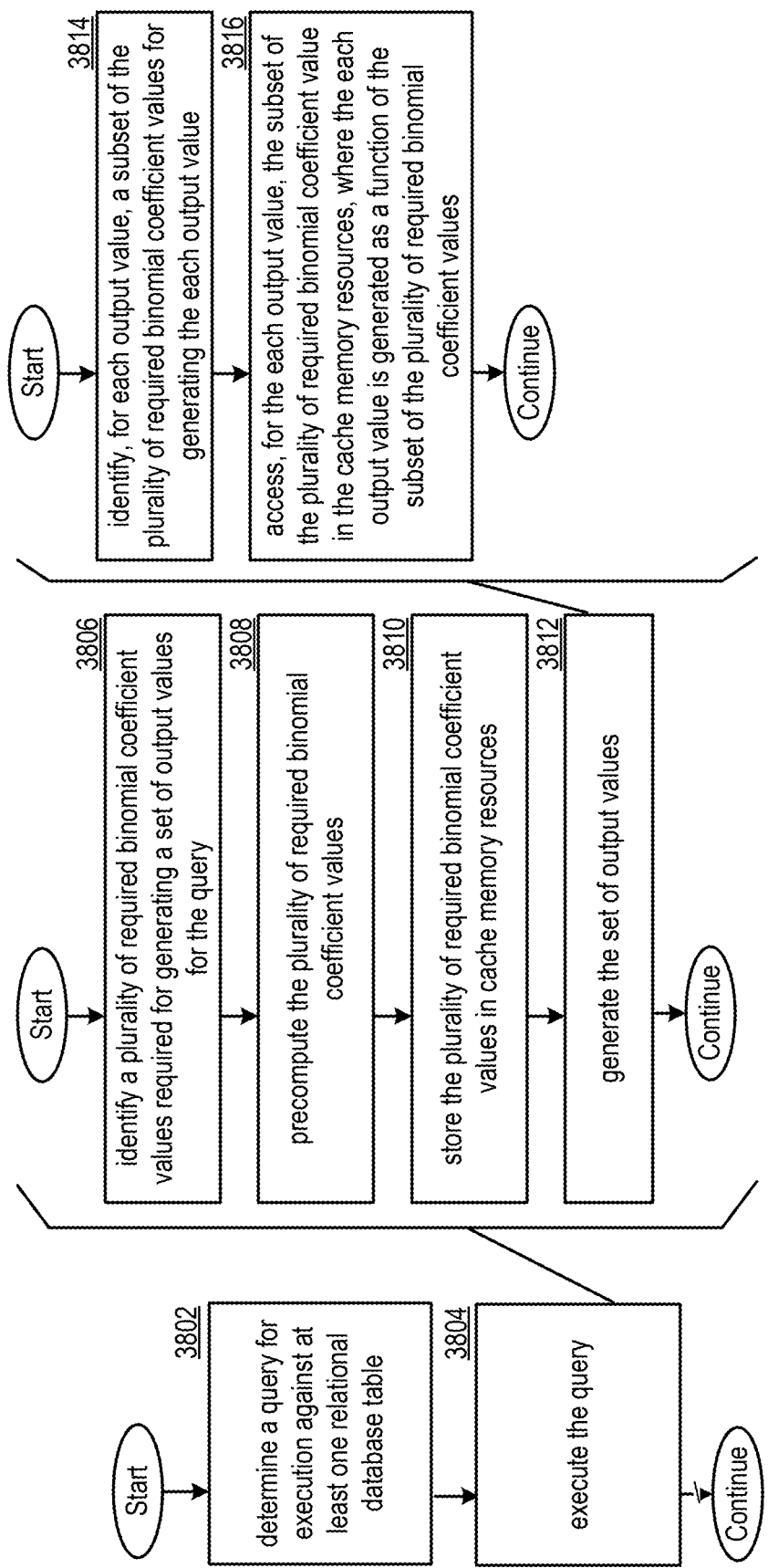
Figure 38B:
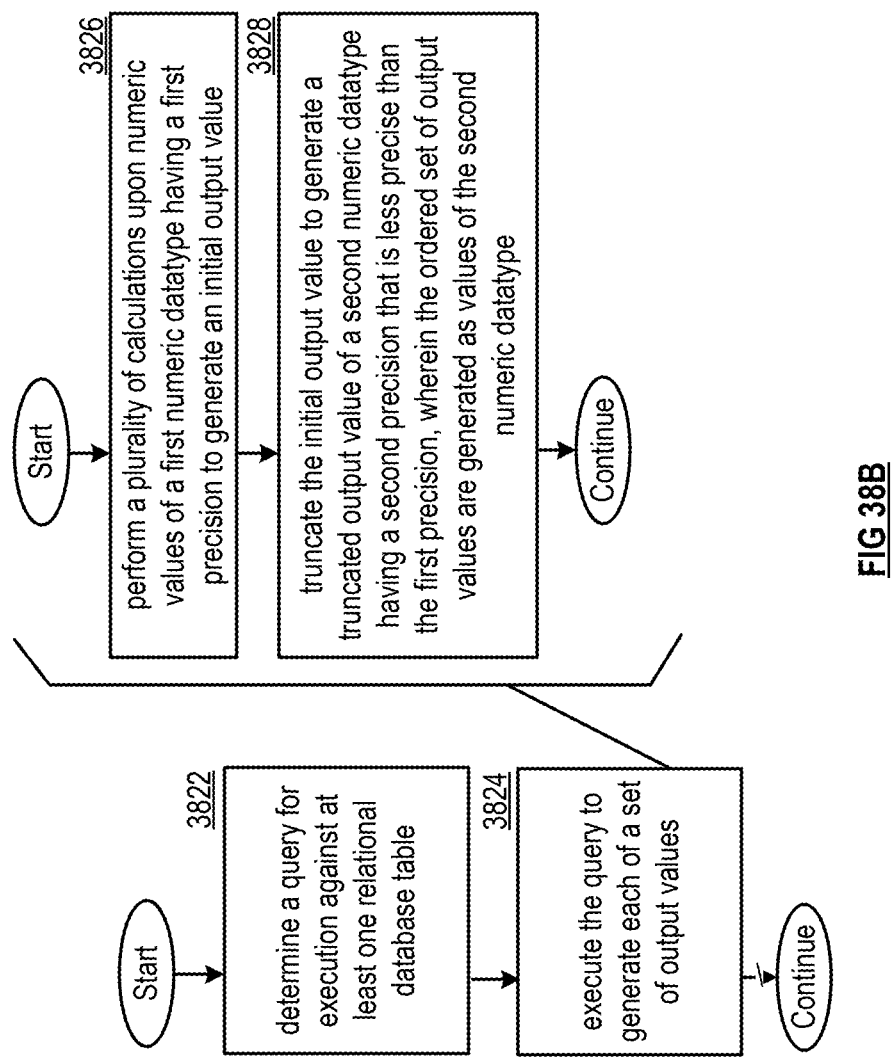
Figure 38C:
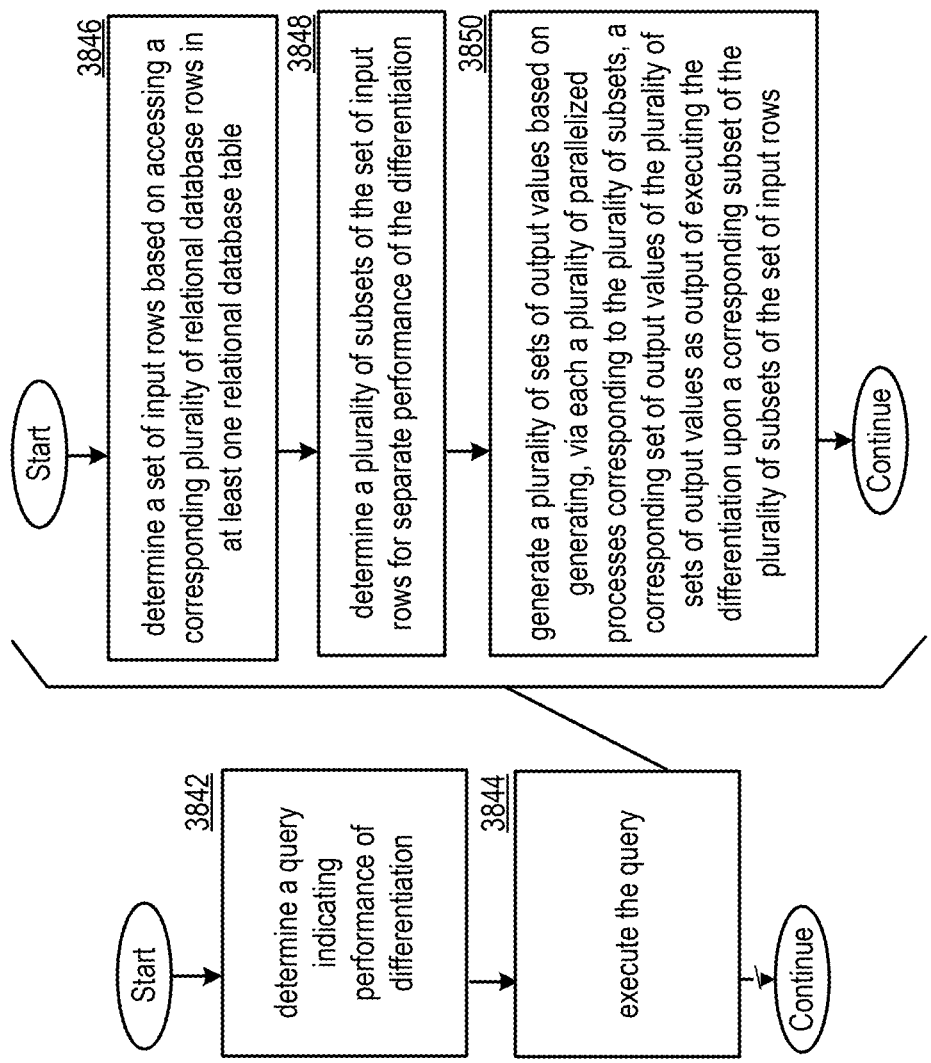
Figure 38D:
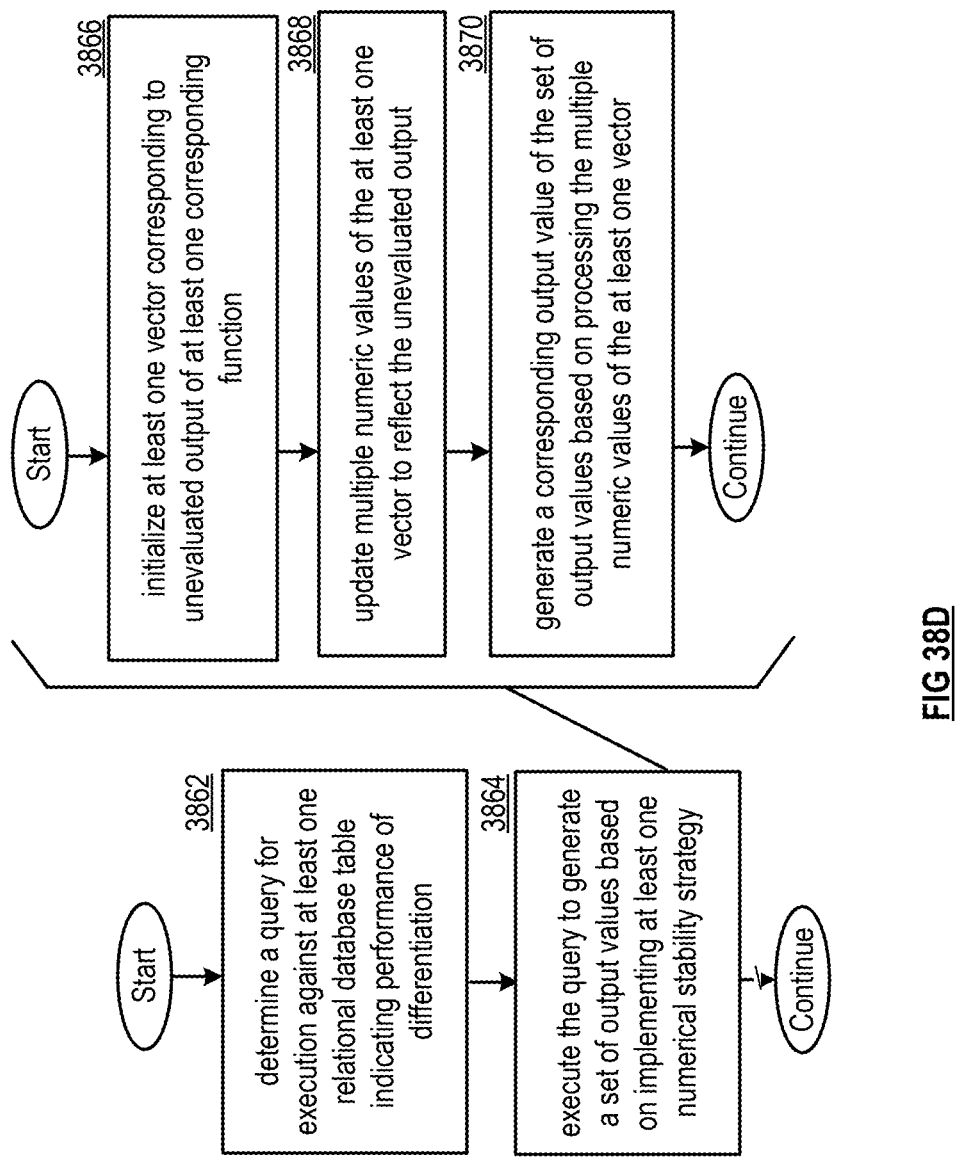

FIG. 30A a schematic block diagram of an embodiment of a query processing system that that processes a query expression that includes a custom table-valued function call in accordance with various embodiments;

FIG. 30B is a schematic block diagram of an embodiment of a query processing system that that implements a function call extraction module in accordance with various embodiments;

FIG. 30C is a schematic block diagram of an embodiment of a query execution module that generates a new row set based on a query expression that includes a custom table-valued function call in accordance with various embodiments;

FIG. 30D illustrates an embodiment of a function definition library in accordance with various embodiments;

FIG. 30E is a flow diagram illustrating a method of processing a query expression that includes a custom table-valued function call in accordance with various embodiments;

FIG. 31A a schematic block diagram of an embodiment of a query processing system that that processes a query expression that includes a resampling table-valued function call in accordance with various embodiments;

FIG. 31B is an example embodiment of the structure of a resampling table-valued function call in accordance with various embodiments;

FIG. 31C illustrates pseudo-code depicting an example embodiment of a process to be performed in accordance with execution of a resampling table-valued function call in accordance with various embodiments;

FIG. 31D is a flow diagram illustrating a method of processing a query expression that includes a resampling table-valued function call in accordance with various embodiments;

FIG. 32A is a schematic block diagram of an embodiment of a query processing system that that processes a query expression that includes an extrapolation table-valued function call in accordance with various embodiments;

FIGS. 32B-32C are example embodiments of the structure of an extrapolation table-valued function call in accordance with various embodiments;

FIG. 32D is a flow diagram illustrating a method of processing a query expression that includes an extrapolation table-valued function call in accordance with various embodiments;

FIG. 33A is a schematic block diagram of an embodiment of a query processing system that that processes a query expression that includes a user-defined function creation function call in accordance with various embodiments;

FIGS. 33B-33D are example embodiments of the structure of a user-defined function creation function call in accordance with various embodiments;

FIG. 33E is a schematic block diagram of an embodiment of a query processing system that that processes a query expression that includes a new function call based on a user-defined function definition in accordance with various embodiments; and FIG. 33F is a flow diagram illustrating a method of processing a user-defined function creation function call defining a new function, and further processing a query expression that calls the new function, in accordance with various embodiments;

FIG. 34A is a schematic block diagram of a database system that executes a query expression indicating a differentiation request in accordance with various embodiments;

FIG. 34B is a schematic block diagram of a database system that executes a query expression indicating a differentiation function call in accordance with various embodiments;

FIG. 34C illustrates an example embodiment of a differentiation function call in accordance with various embodiments;

FIG. 34D illustrates an example embodiment of a function library that includes a delta function definition and a derivative function definition in accordance with various embodiments;

FIG. 34E illustrates an example embodiment of a differentiation function call denoting execution of a delta function in accordance with various embodiments;

FIG. 34F illustrates an example embodiment of a differentiation function call denoting execution of a derivative function in accordance with various embodiments;

FIG. 34G is a schematic block diagram illustrating execution of differentiation operators that implement a delta expression in accordance with various embodiments;

FIG. 34H is a schematic block diagram illustrating execution of differentiation operators that implement a derivative expression in accordance with various embodiments;

FIG. 34I is a schematic block diagram of a database system that executes a query expression indicating a differentiation function call that indicates a differentiation degree argument in accordance with various embodiments;

FIG. 34J illustrates an example embodiment of a differentiation function call that includes a differentiation degree argument in accordance with various embodiments;

FIG. 34K is a schematic block diagram illustrating execution of differentiation operators based on a differentiation degree argument in accordance with various embodiments;

FIG. 34L is a logic diagram illustrating an example method for execution in accordance with various embodiments;

FIG. 35A is a schematic block diagram of a database system that executes a query expression indicating an integration request in accordance with various embodiments;

FIG. 35B is a schematic block diagram of a database system that executes a query expression indicating an integration function call in accordance with various embodiments;

FIG. 35C is a schematic block diagram of a database system that executes a query expression indicating a differentiation function call to perform a corresponding integration request in accordance with various embodiments;

FIG. 35D illustrates an example embodiment of a differentiation function call that includes a negative differentiation degree argument in accordance with various embodiments;

FIG. 35E is a schematic block diagram illustrating execution of integration operators that implement a first type of integration expression in accordance with various embodiments;

FIG. 35F is a schematic block diagram illustrating execution of integration operators that implement a second type of integration expression in accordance with various embodiments;

FIG. 35G is a schematic block diagram illustrating execution of integration operators that implement a positive order of integration based on maintaining one or more miming sums in accordance with various embodiments;

FIG. 35H is a logic diagram illustrating an example method for execution in accordance with various embodiments;

FIG. 36A is a schematic block diagram of a database system that executes a query expression indicating a fractional differentiation request in accordance with various embodiments;

FIG. 36B is a schematic block diagram of a database system that executes a query expression indicating a fractional integration request in accordance with various embodiments;

FIG. 36C is a schematic block diagram of a database system that executes a query expression indicating a differentiation function call to perform a corresponding fractional differentiation request in accordance with various embodiments;

FIG. 36D is a schematic block diagram of a database system that executes a query expression indicating a differentiation function call to perform a corresponding fractional integration request in accordance with various embodiments;

FIG. 36E illustrates an example embodiment of a function library that includes a differentiation function definition with differentiation function execution instruction data that indicates a plurality of cases and a corresponding plurality of execution processes accordance with various embodiments of the present invention;

FIG. 36F is a schematic block diagram illustrating execution of integration operators that implement differentiation or integration based on a corresponding expression in accordance with various embodiments;

FIG. 36G is a schematic block diagram illustrating execution of integration operators that implement differentiation or integration based on a precomputed binomial value coefficient set in accordance with various embodiments;

FIG. 36H is a logic diagram illustrating an example method for execution in accordance with various embodiments;

FIGS. 37A-37H illustrate example embodiments of query output data that includes output columns generated via a query processing system processing a corresponding query expression in accordance with various embodiments;

FIG. 37I is a schematic block diagram of a database system that executes a query expression based on applying at least one numerical stability strategy in accordance with various embodiments;

FIG. 37J illustrates an example embodiment of a function library that includes a differentiation function definition with differentiation function execution instruction data that indicates at least one execution process that implements at least one numerical stability strategy in accordance with various embodiments of the present invention;

FIG. 38A is a logic diagram illustrating an example method for execution in accordance with various embodiments;

FIG. 38B is a logic diagram illustrating an example method for execution in accordance with various embodiments;

FIG. 38C is a logic diagram illustrating an example method for execution in accordance with various embodiments; and FIG. 38D is a logic diagram illustrating an example method for execution in accordance with various embodiments.

DETAILED DESCRIPTION OF THE INVENTION

Figure 1:
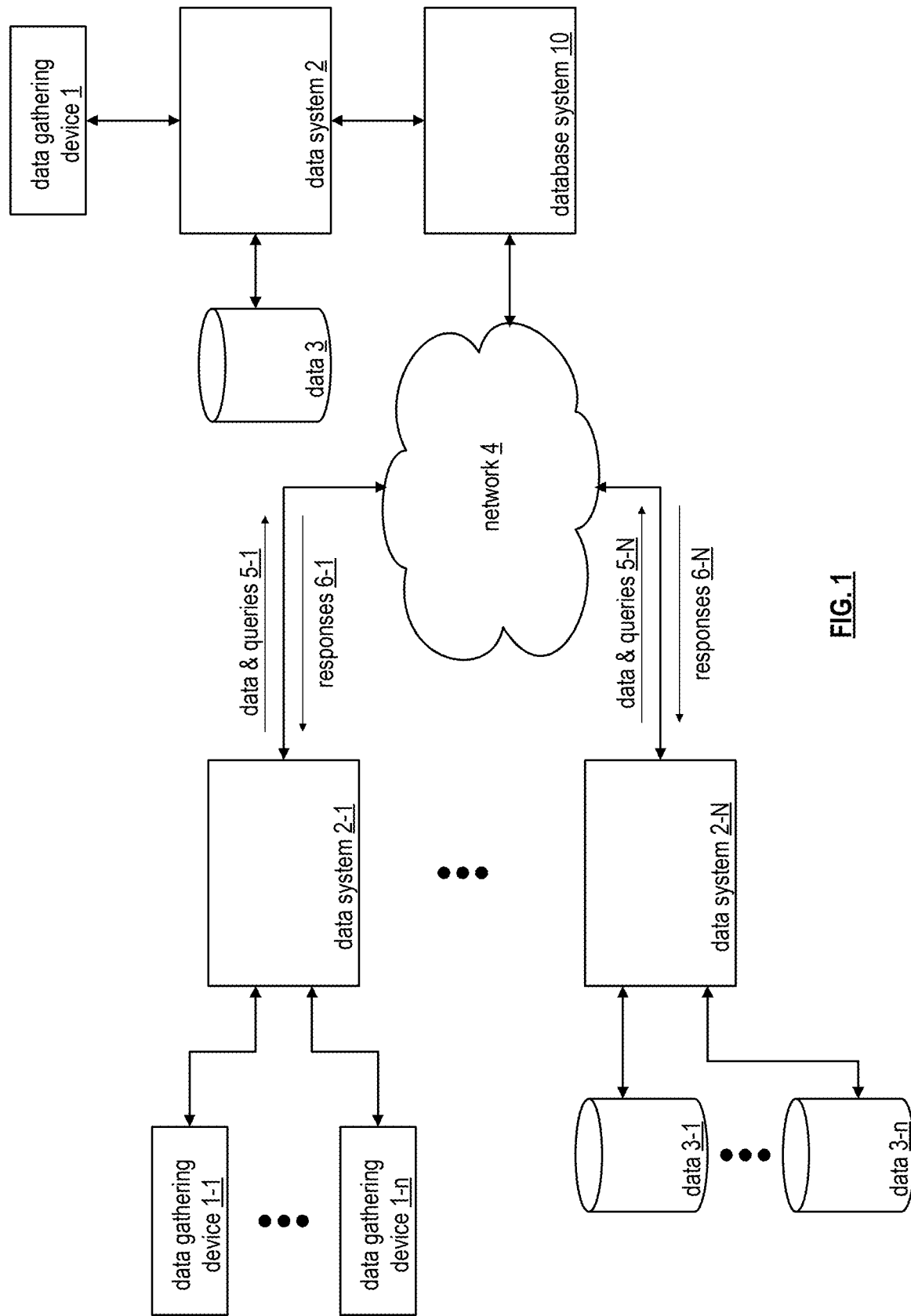
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
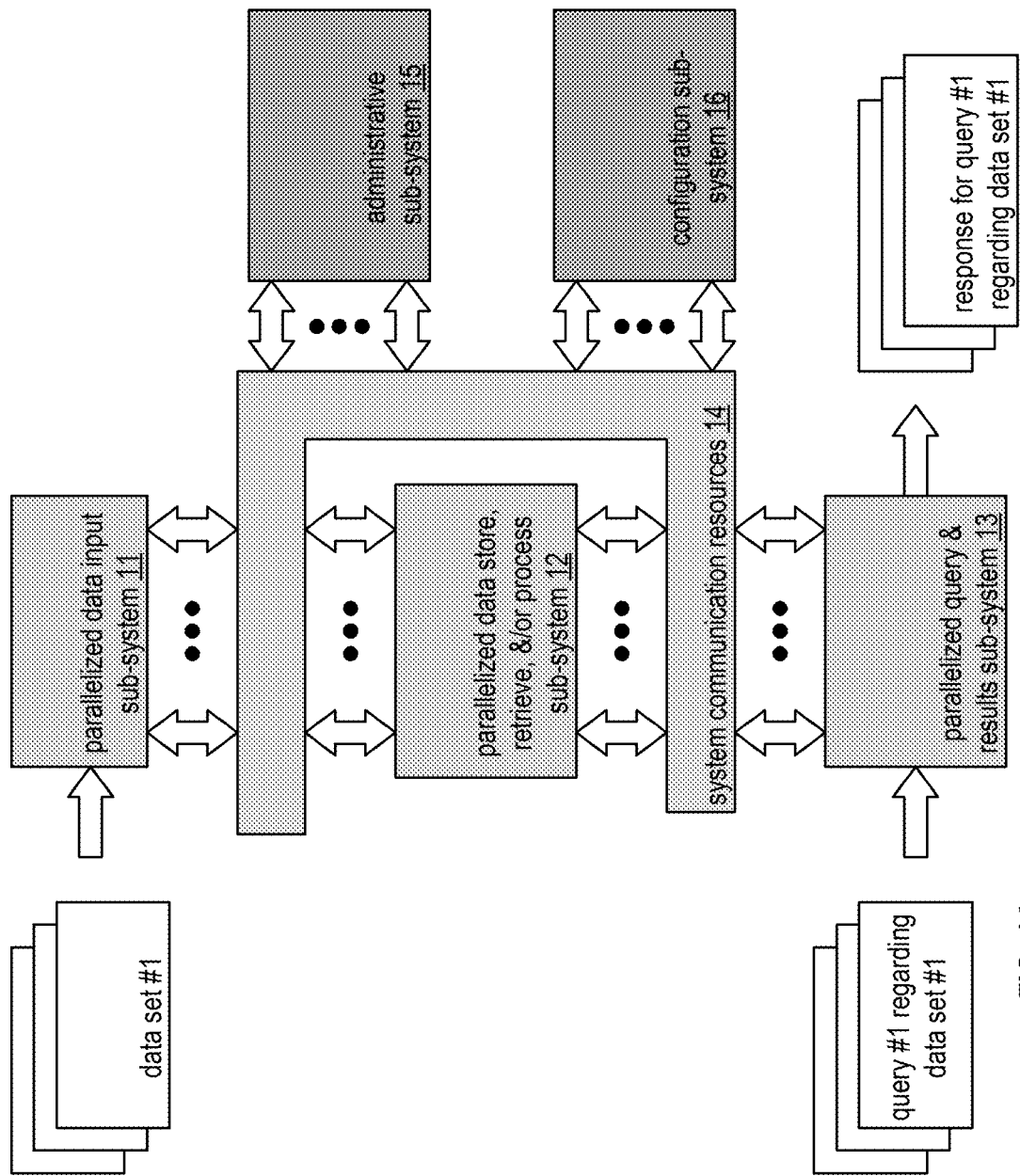
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 can also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches of dividing a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Structured Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
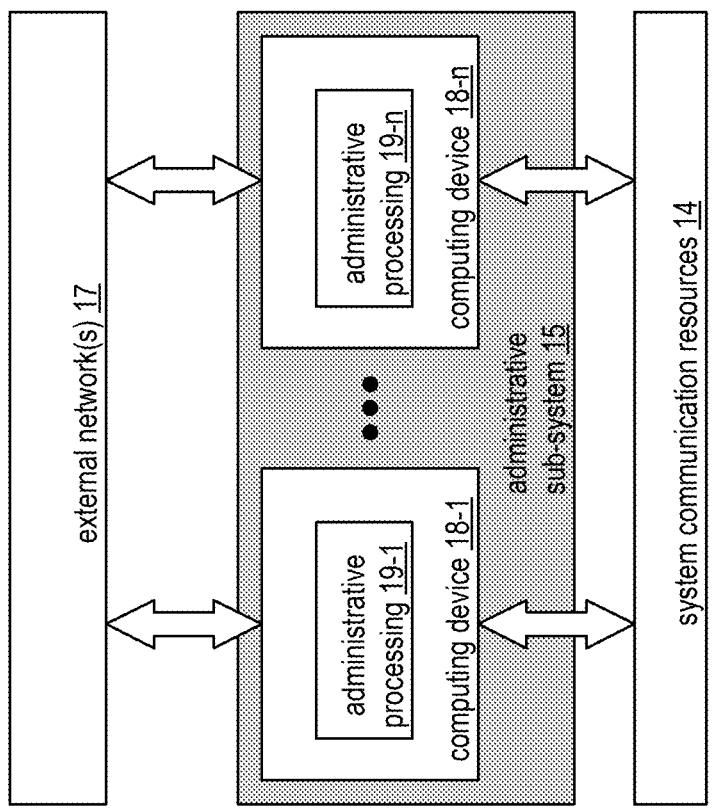
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
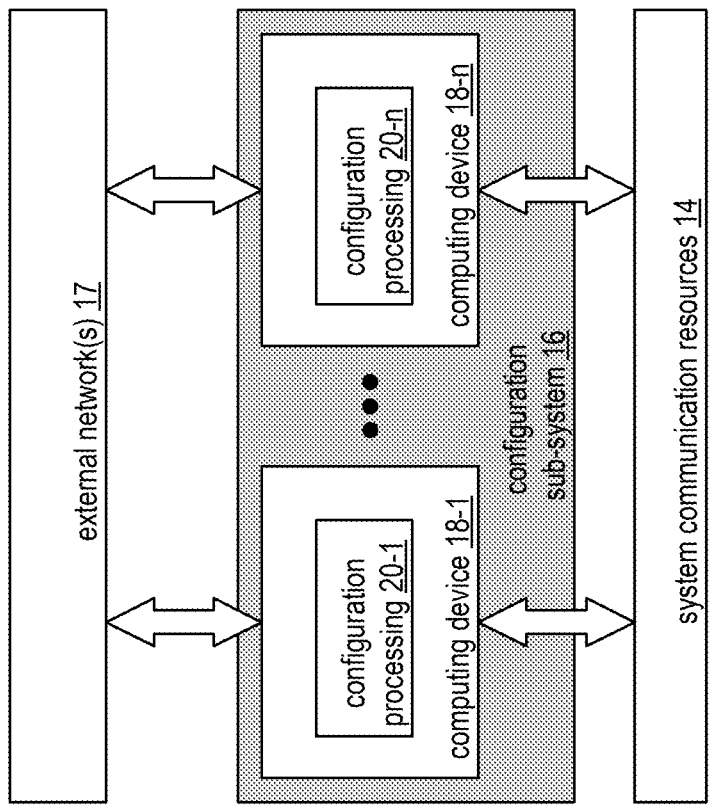
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
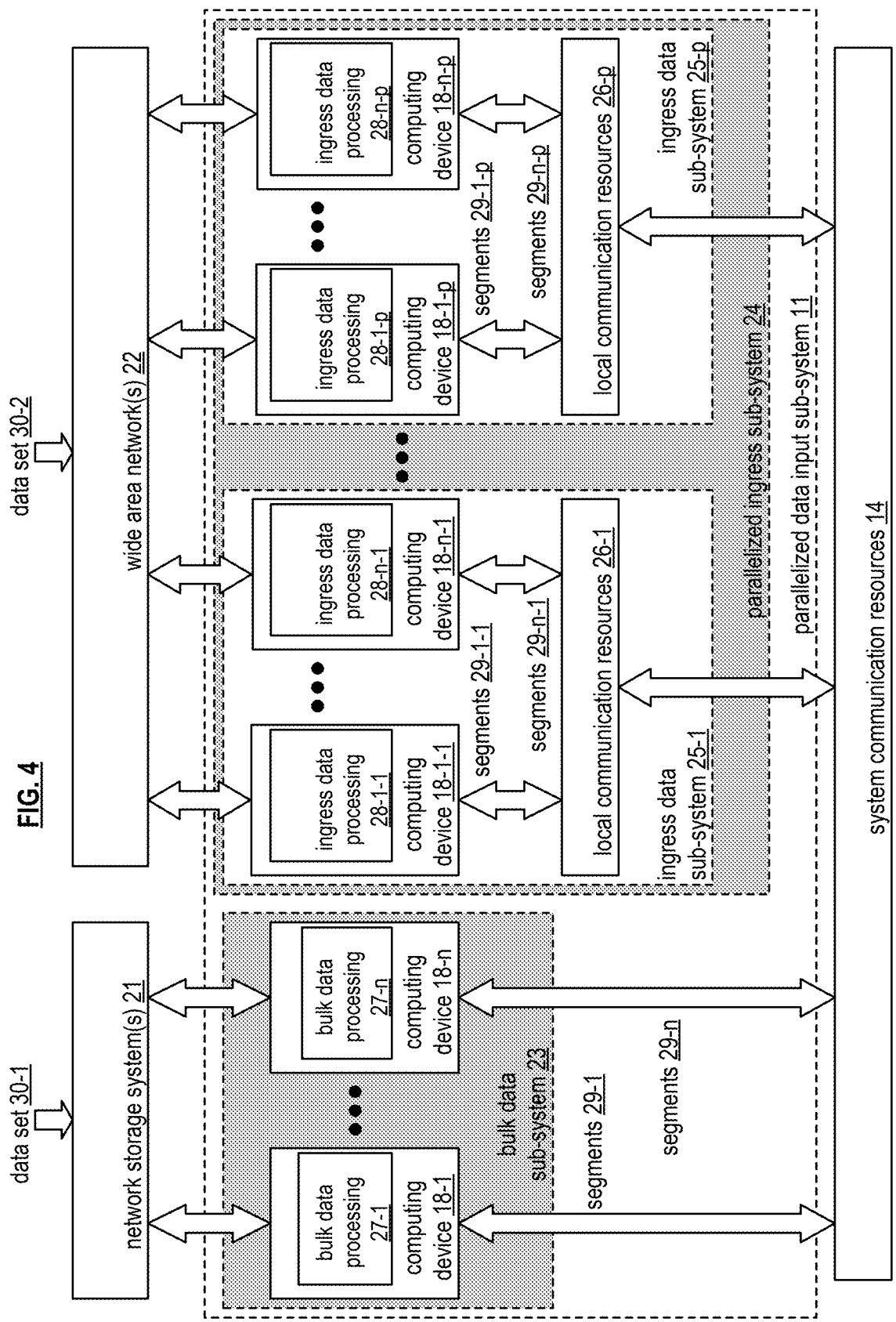
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
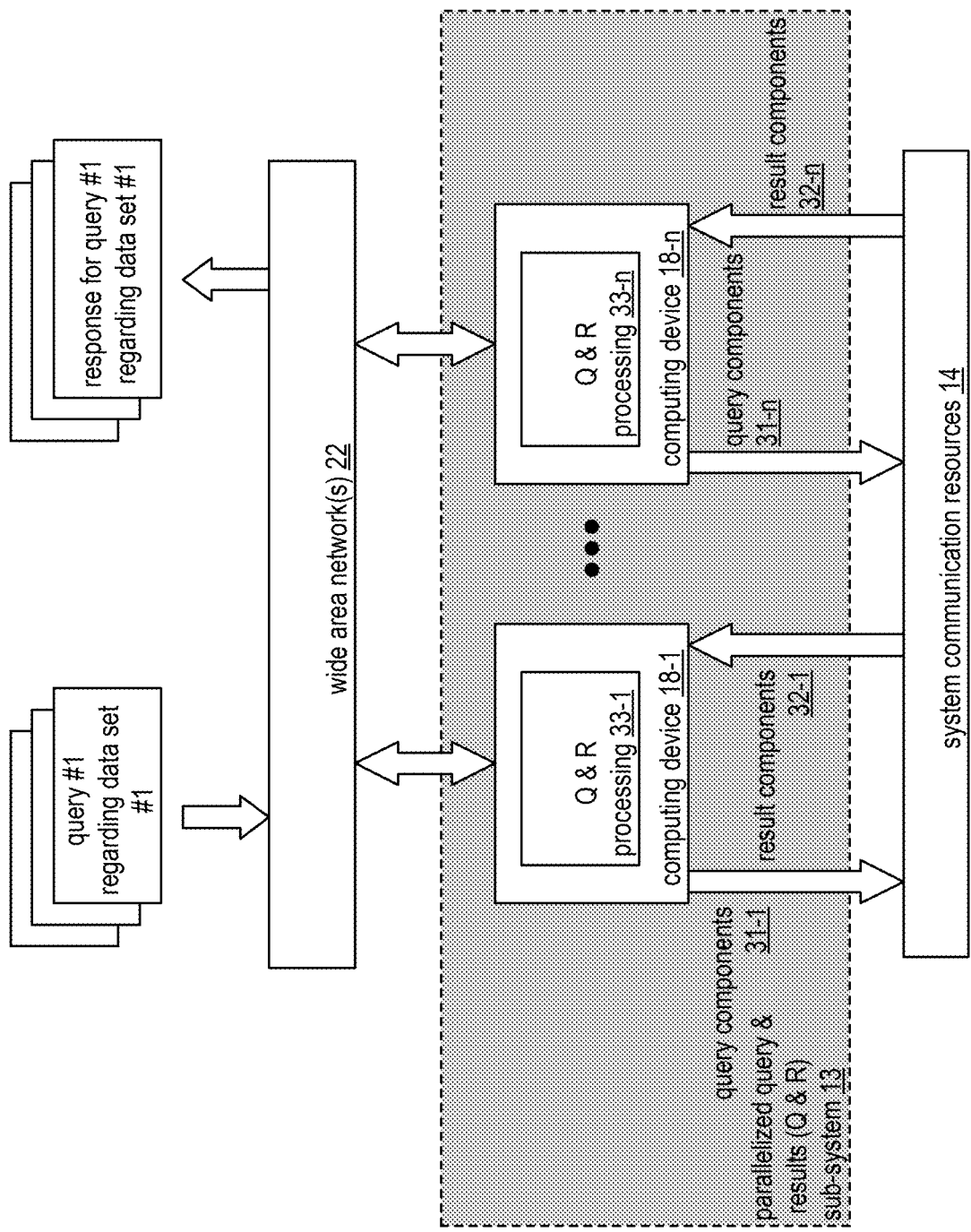
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
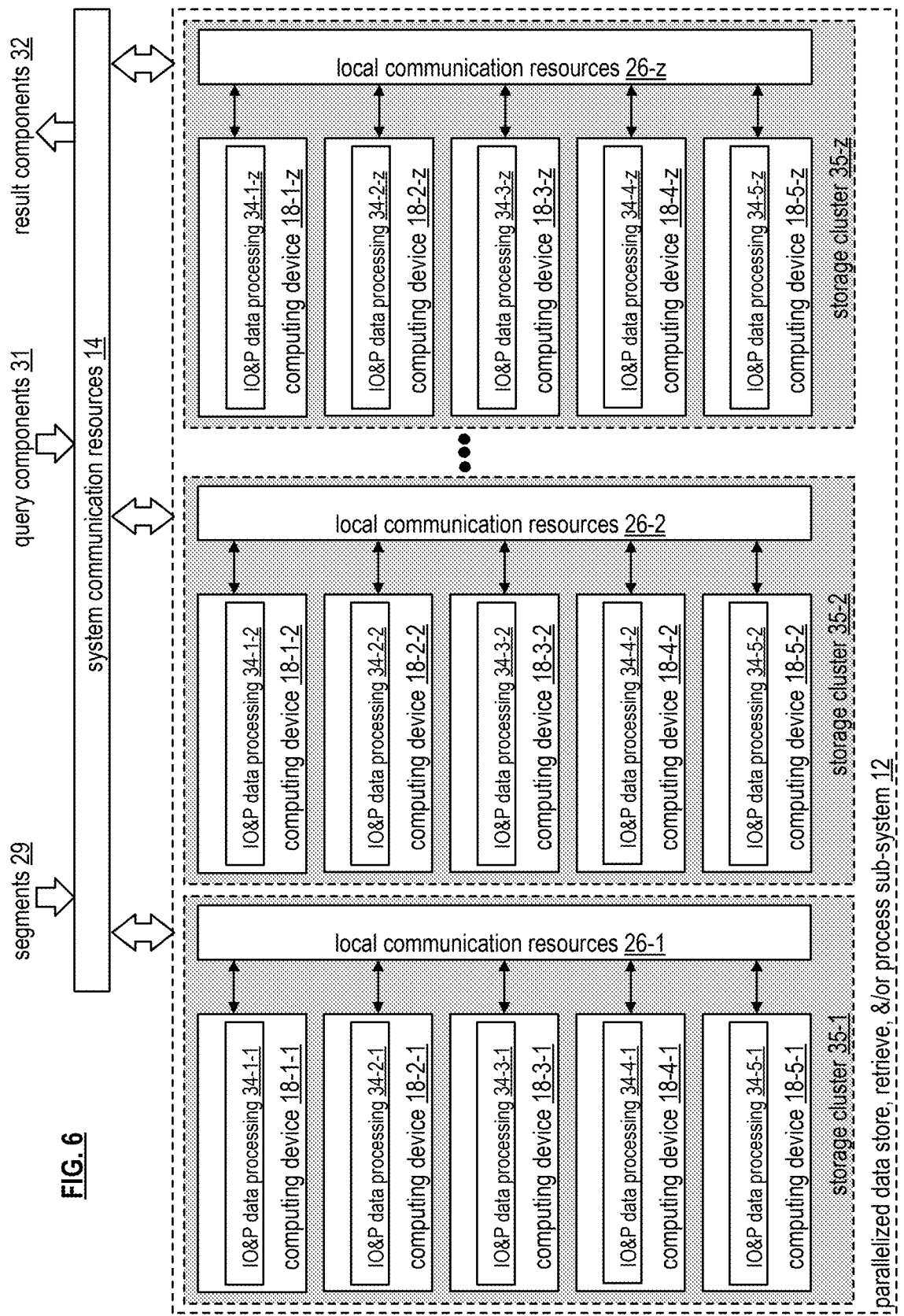
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partition is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-*n* are storing and/or processing other segment groups. For example, a table is partitioned into three segment groups. Three storage clusters store and/or process the three segment groups independently. As another example, four tables are independently stored and/or processed by one or more storage clusters. As yet another example, storage cluster 35-1 is storing and/or processing a second segment group while it is storing/or and processing a first segment group.

Figure 7:
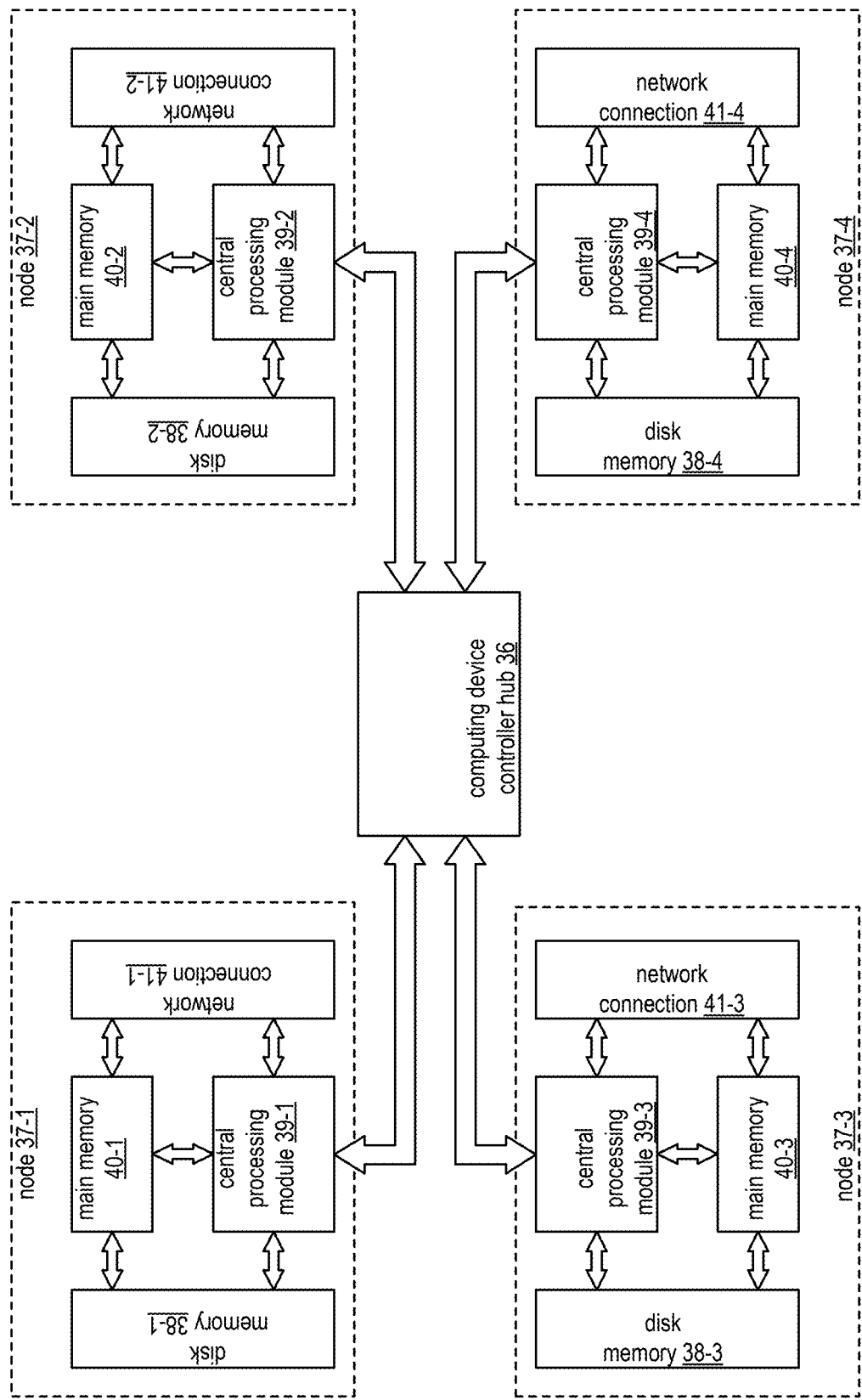
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
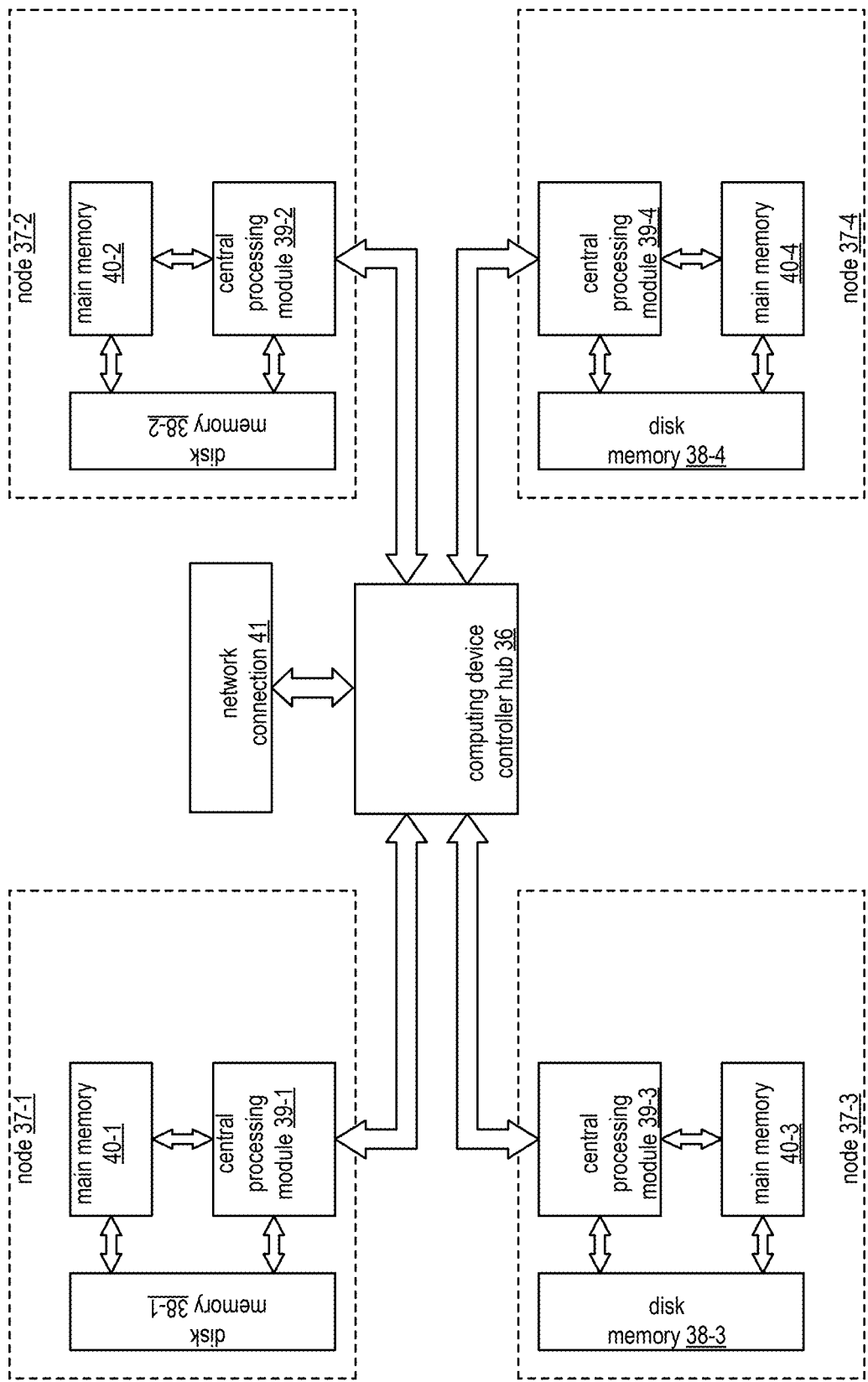
FIG. 8 is a schematic block diagram of another embodiment of a computing device in accordance with the present invention.

FIG. 8 is a schematic block diagram of another embodiment of a computing device similar to the computing device of FIG. 7 with an exception that it includes a single network connection 41, which is coupled to the computing device controller hub 36. As such, each node coordinates with the computing device controller hub to transmit or receive data via the network connection.

Figure 9:
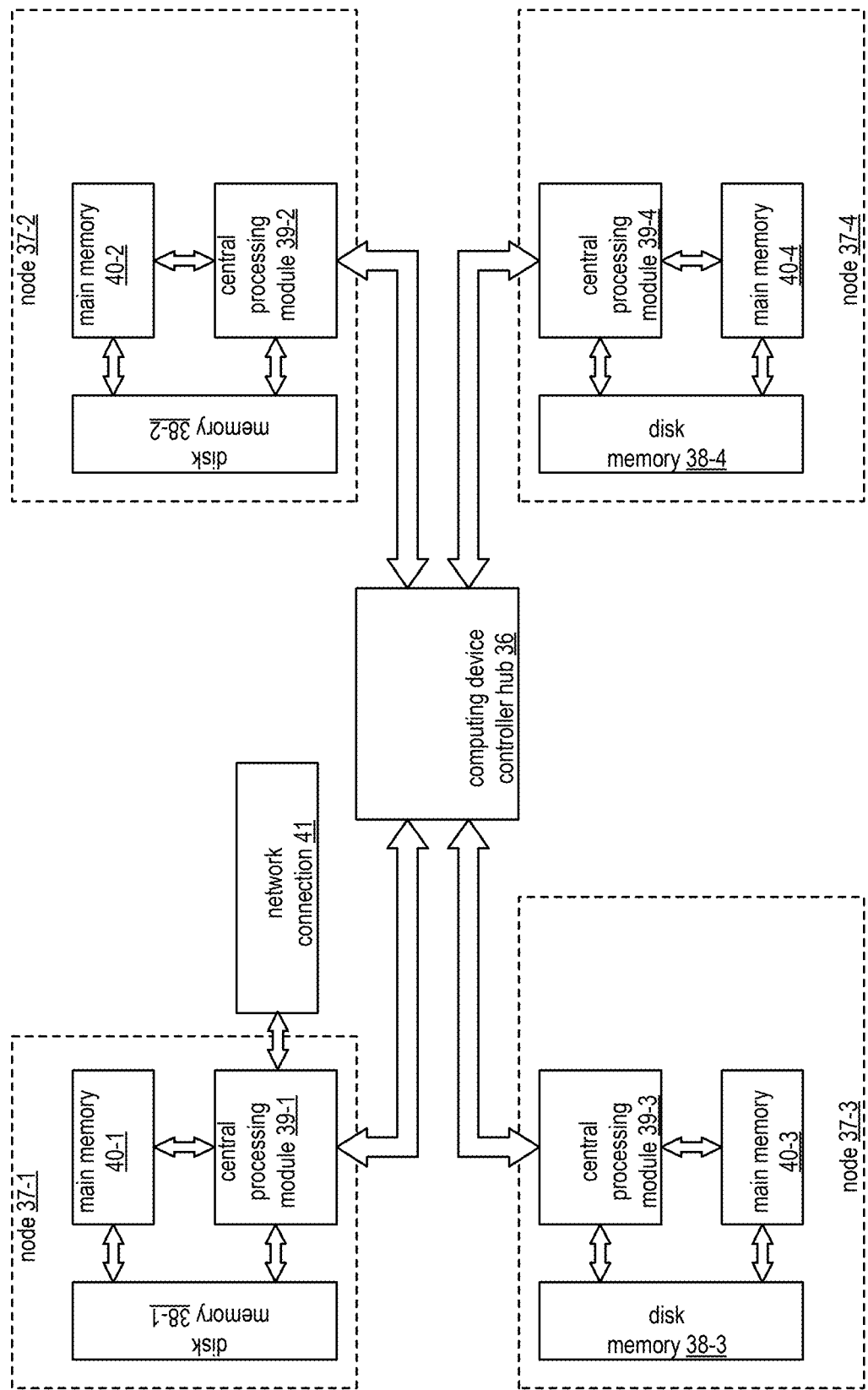
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
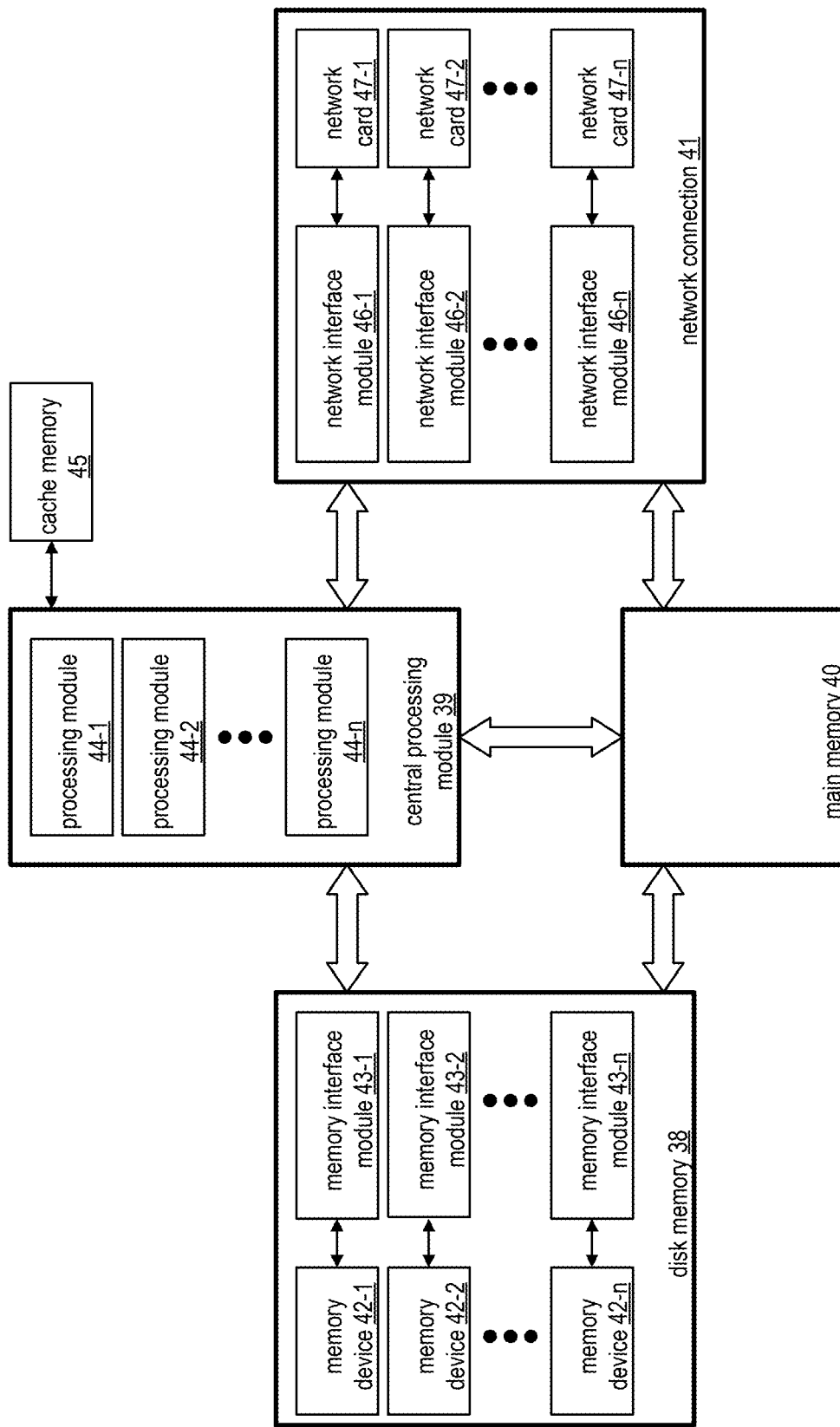
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-*n* and an associated one or more cache memory 45. A processing module is as defined at the end of the detailed description.

The disk memory 38 includes a plurality of memory interface modules 43-1 through 43-*n* and a plurality of memory devices 42-1 through 42-*n* (e.g., non-volatile memory). The memory devices 42-1 through 42-*n* include, but are not limited to, solid state memory, disk drive memory, cloud storage memory, and other non-volatile memory. For each type of memory device, a different memory interface module 43-1 through 43-*n* is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n* A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
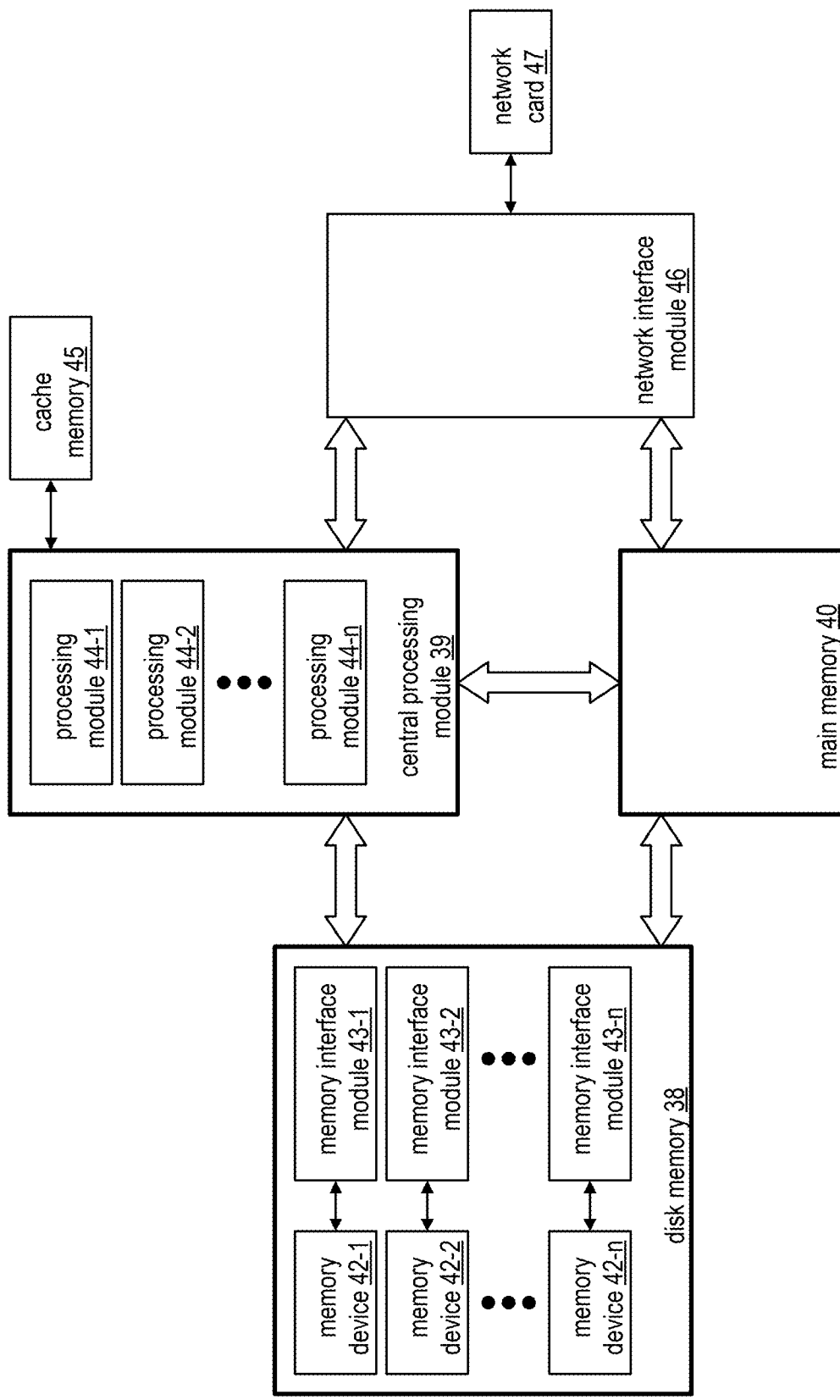
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
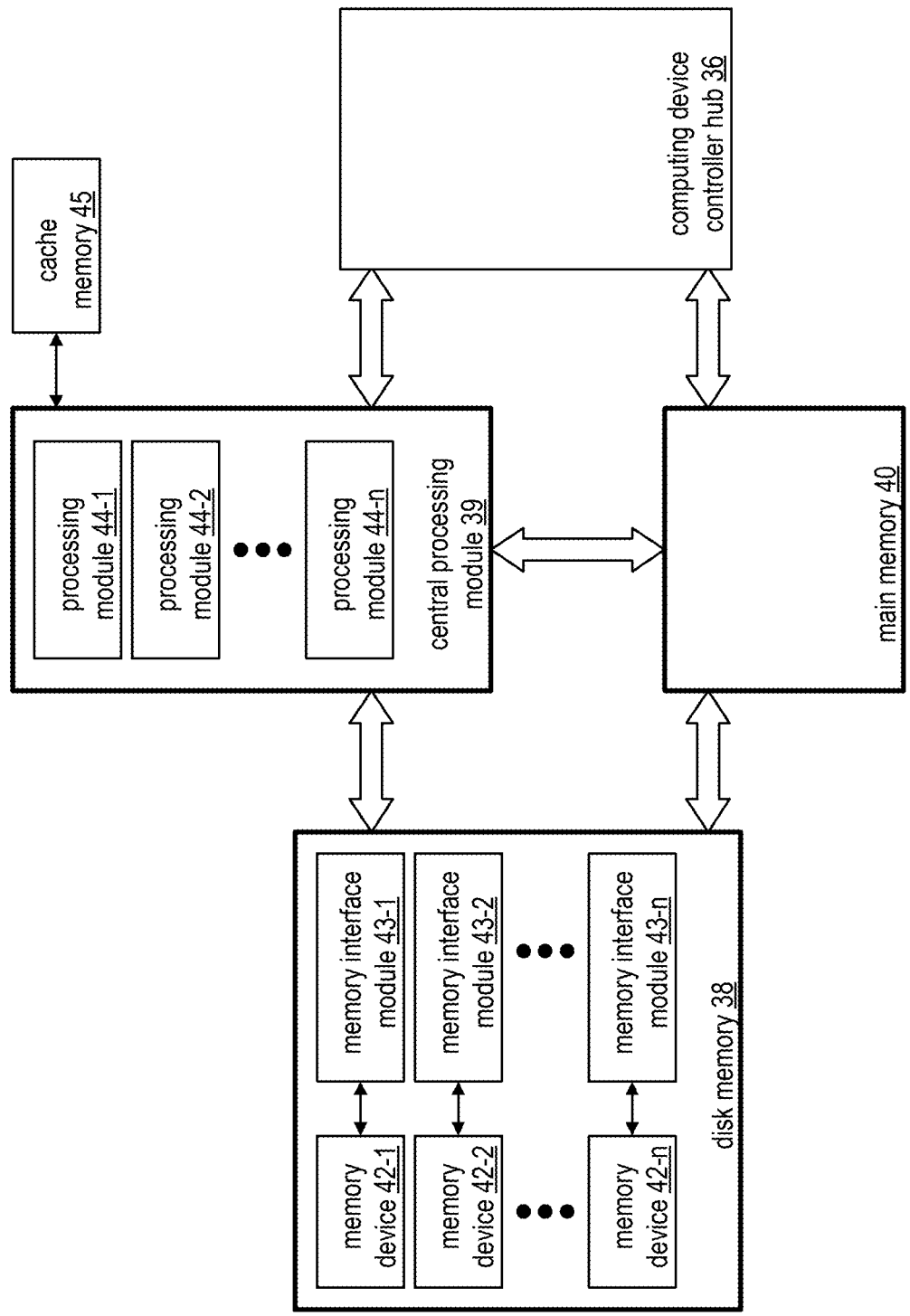
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
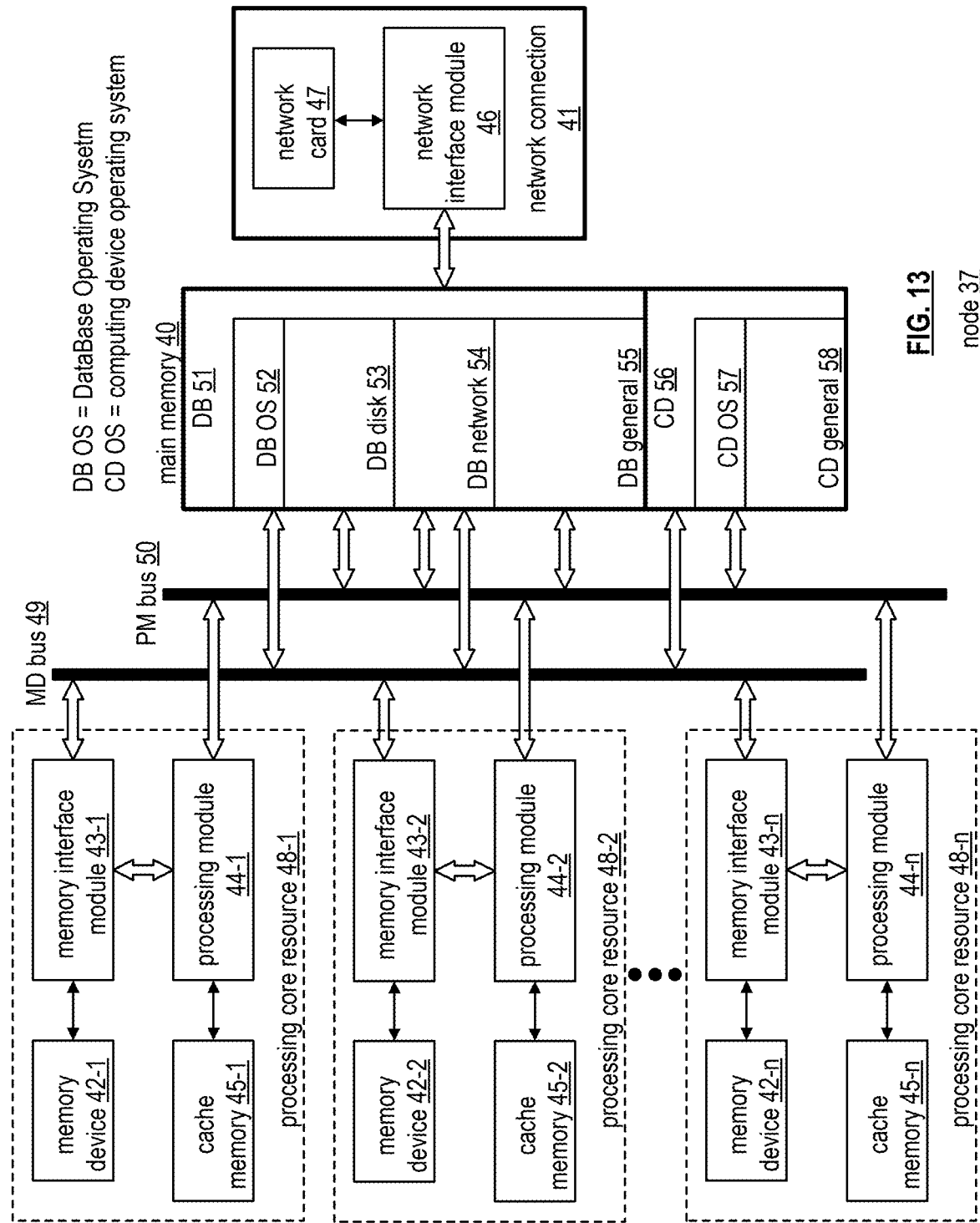
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58.

Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
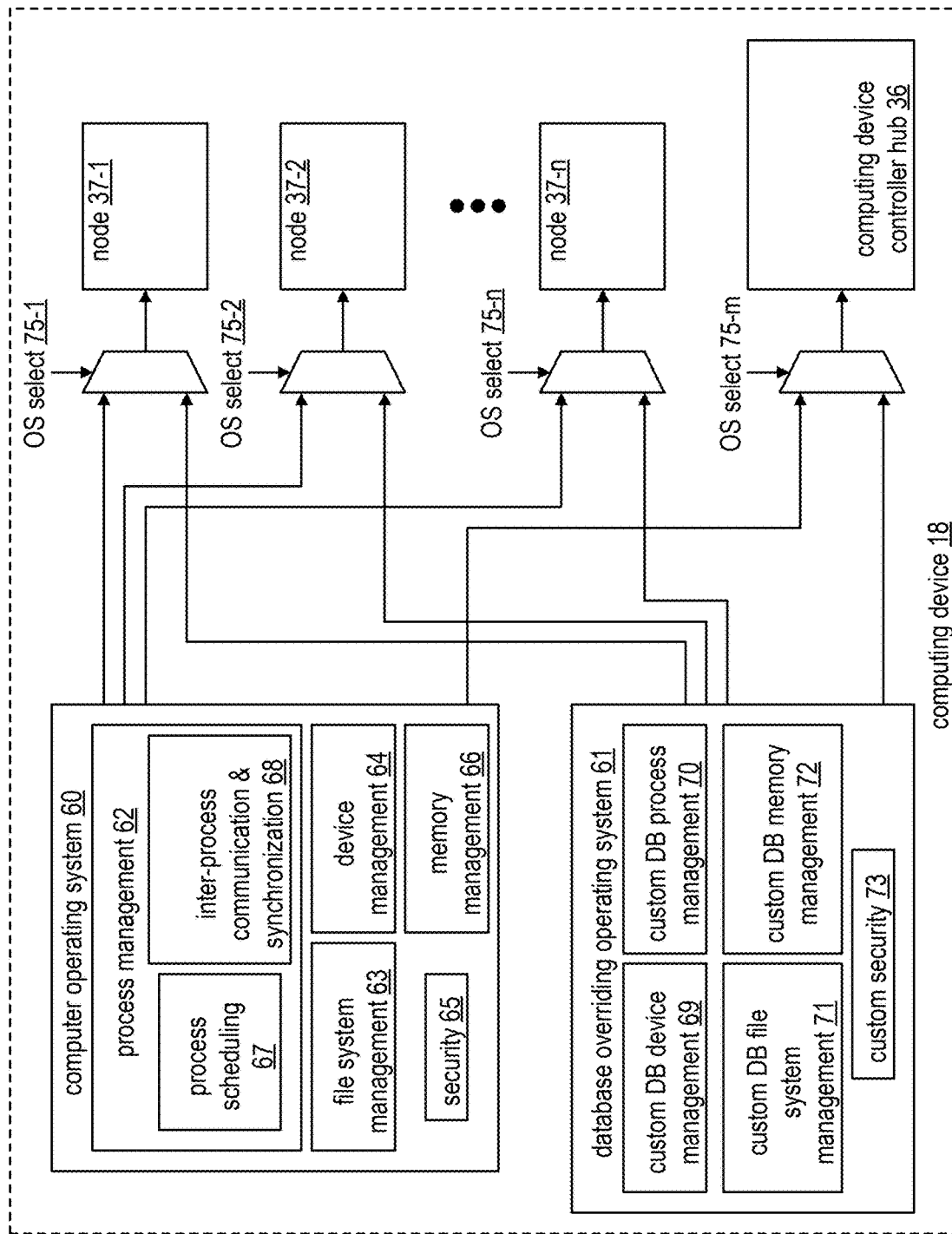
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
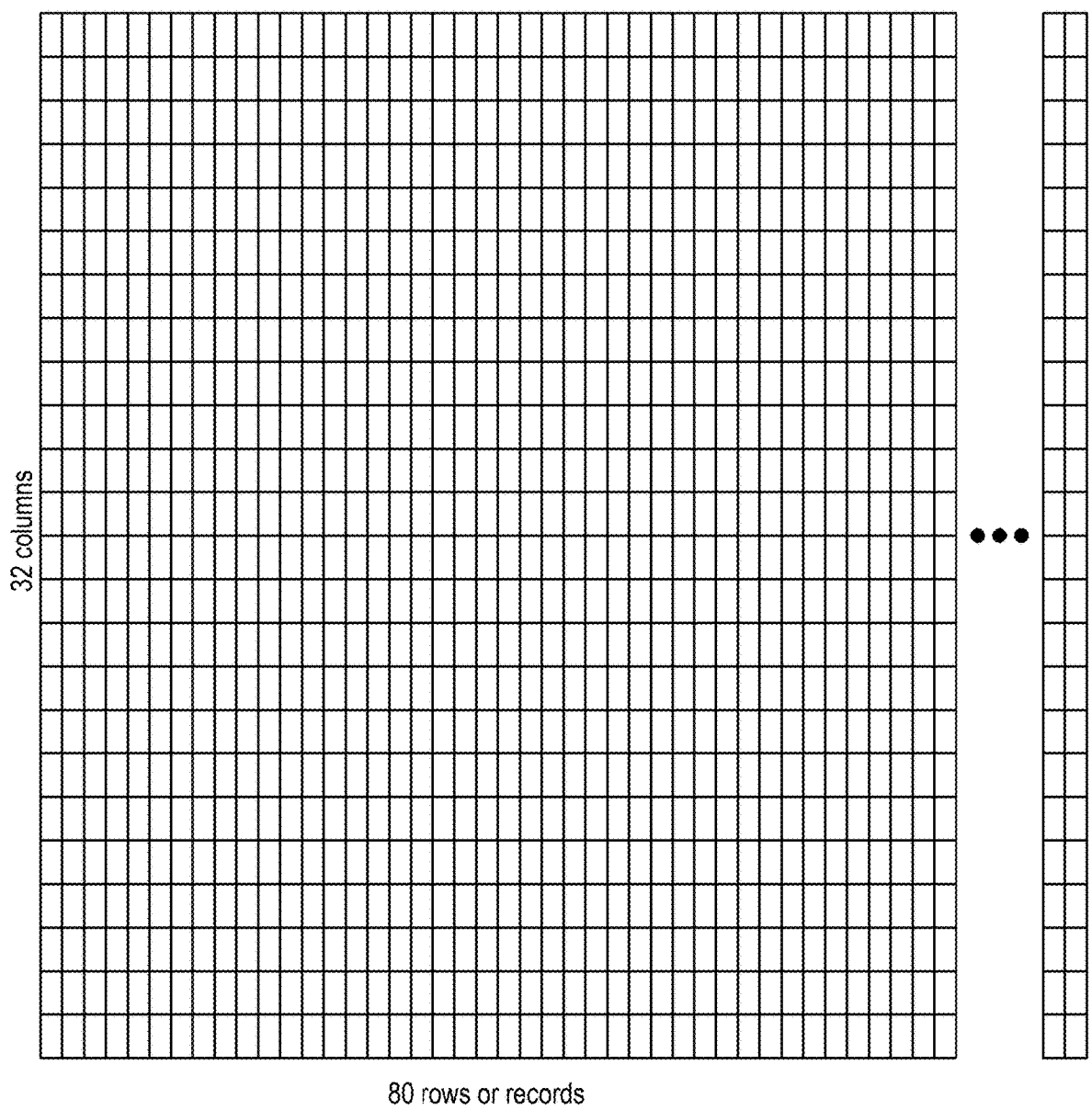
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
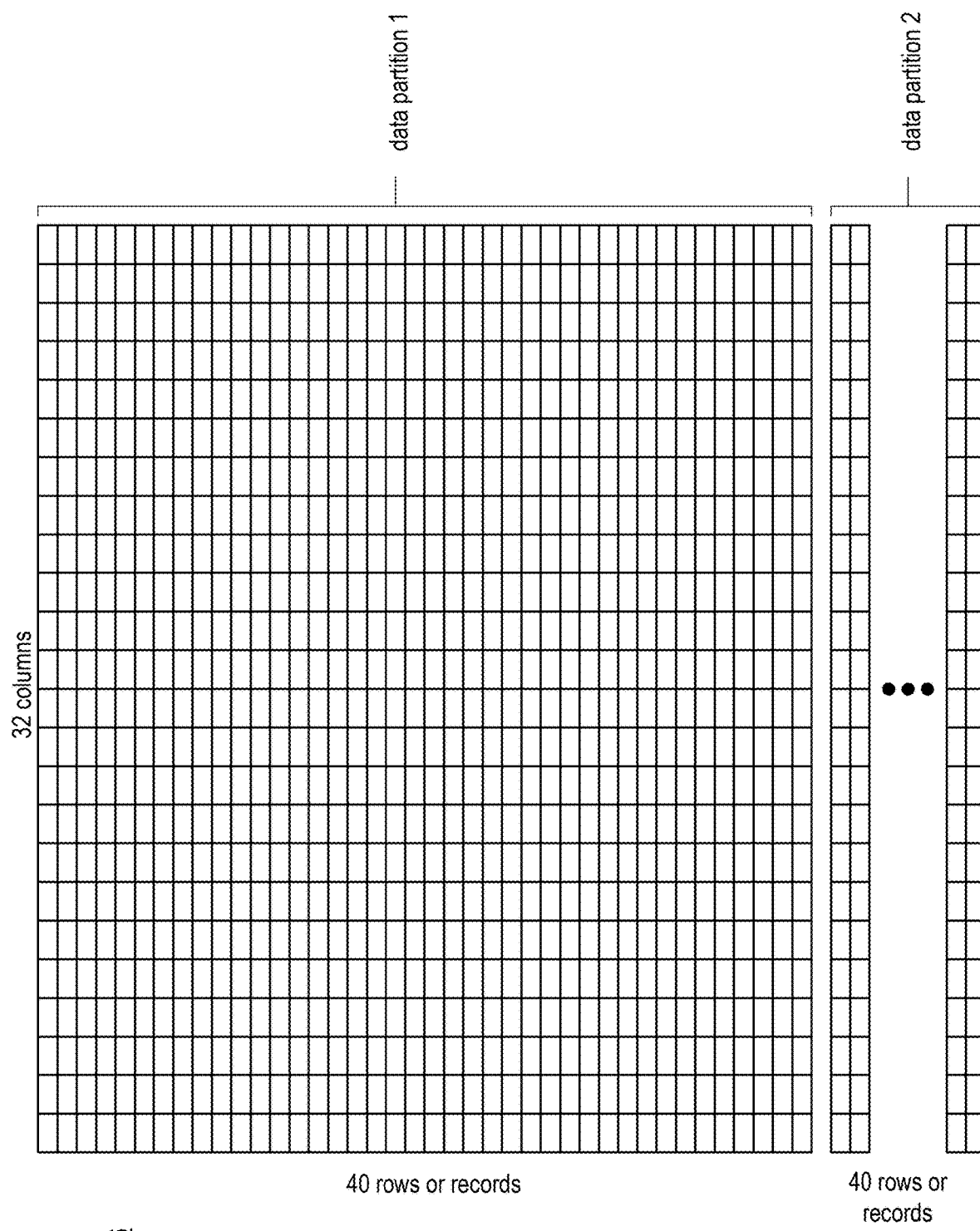

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
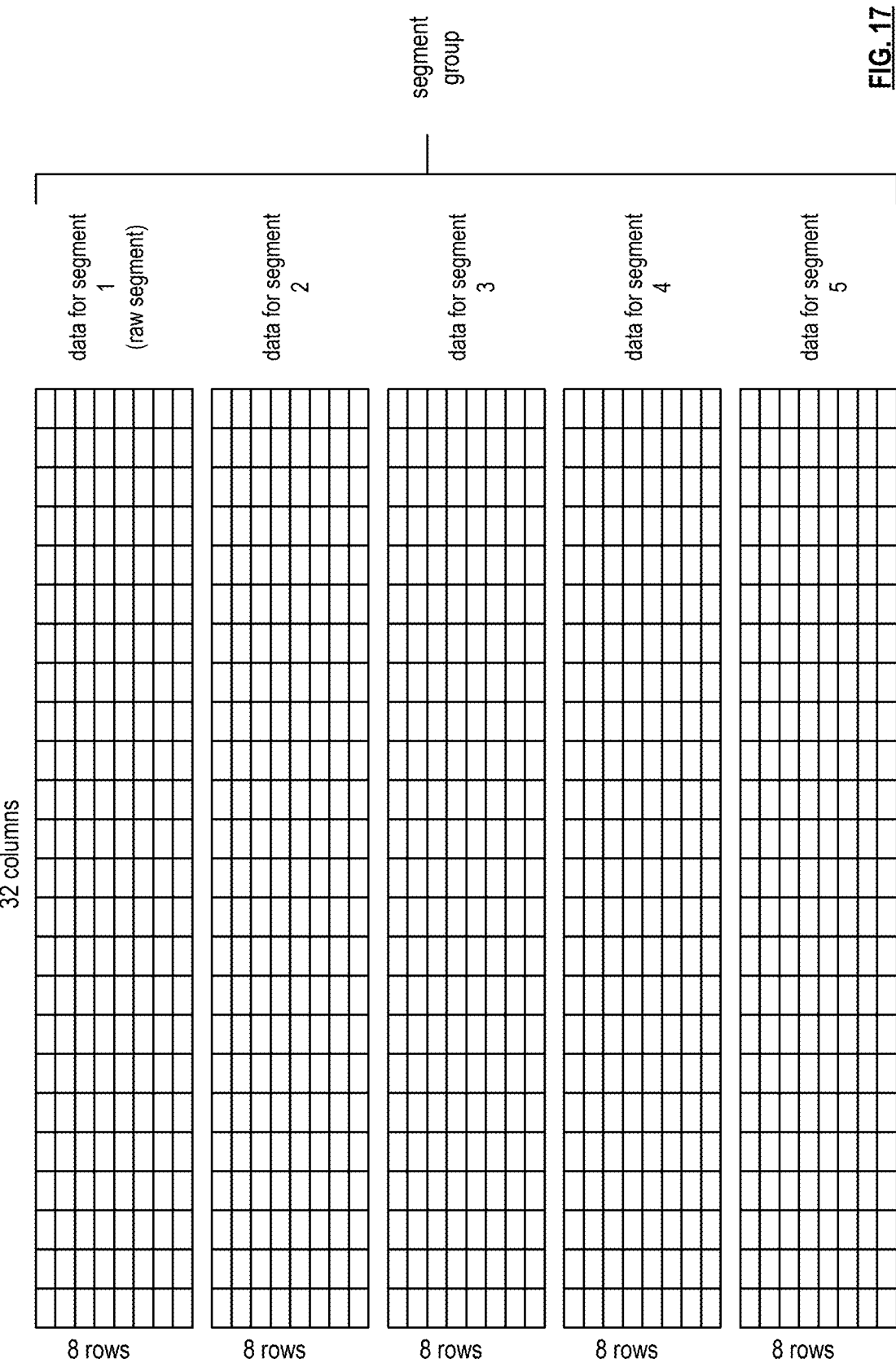

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
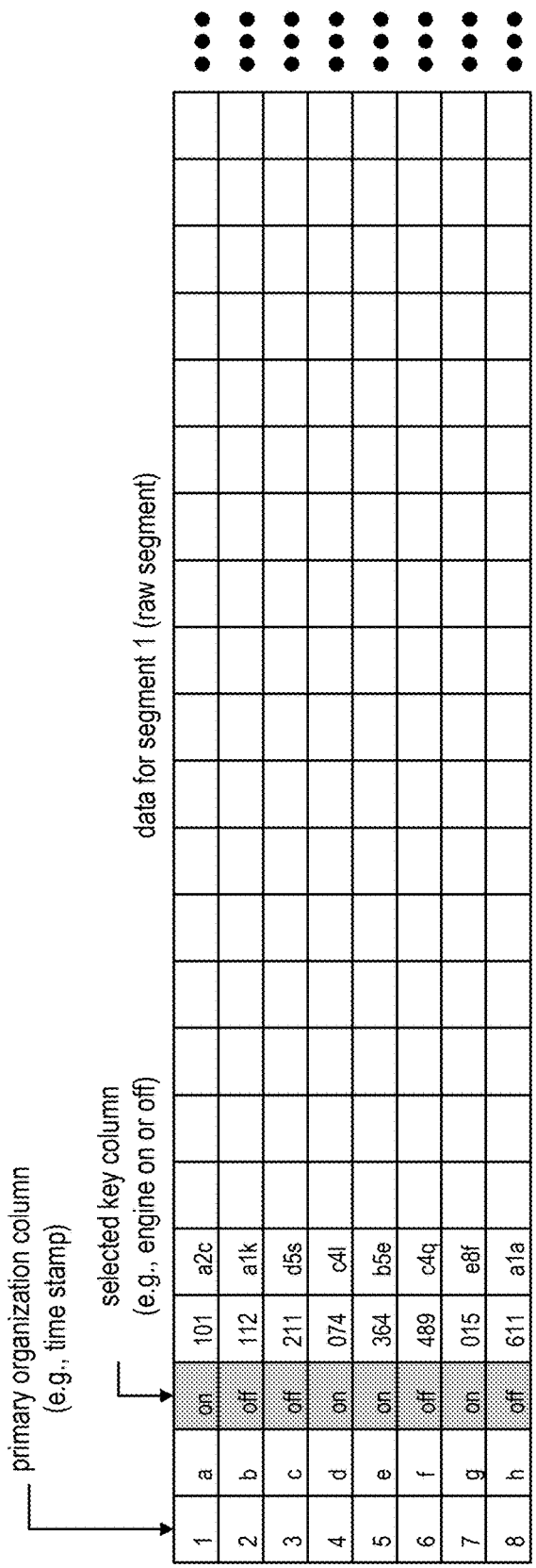

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns store various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to being sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
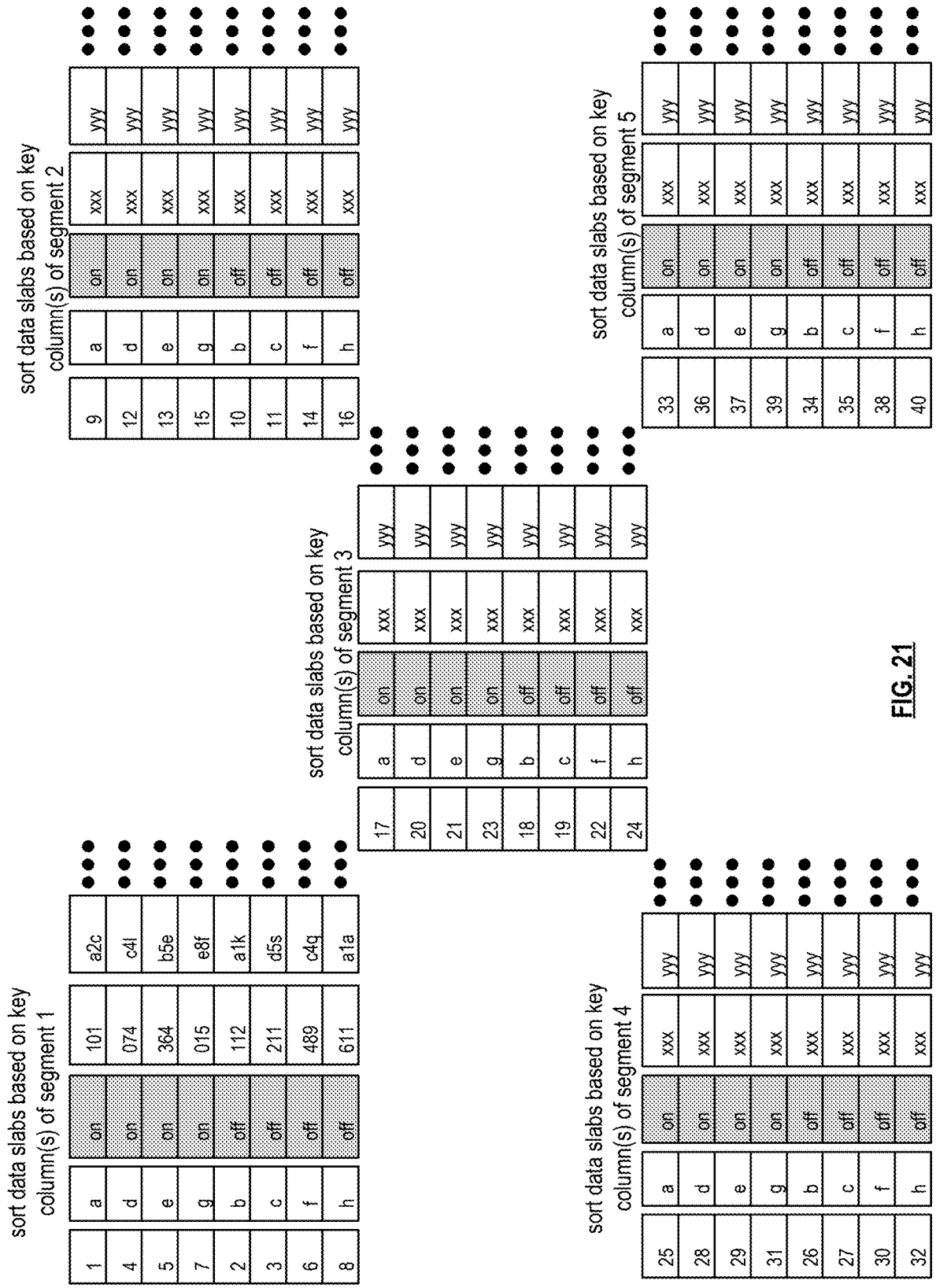

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
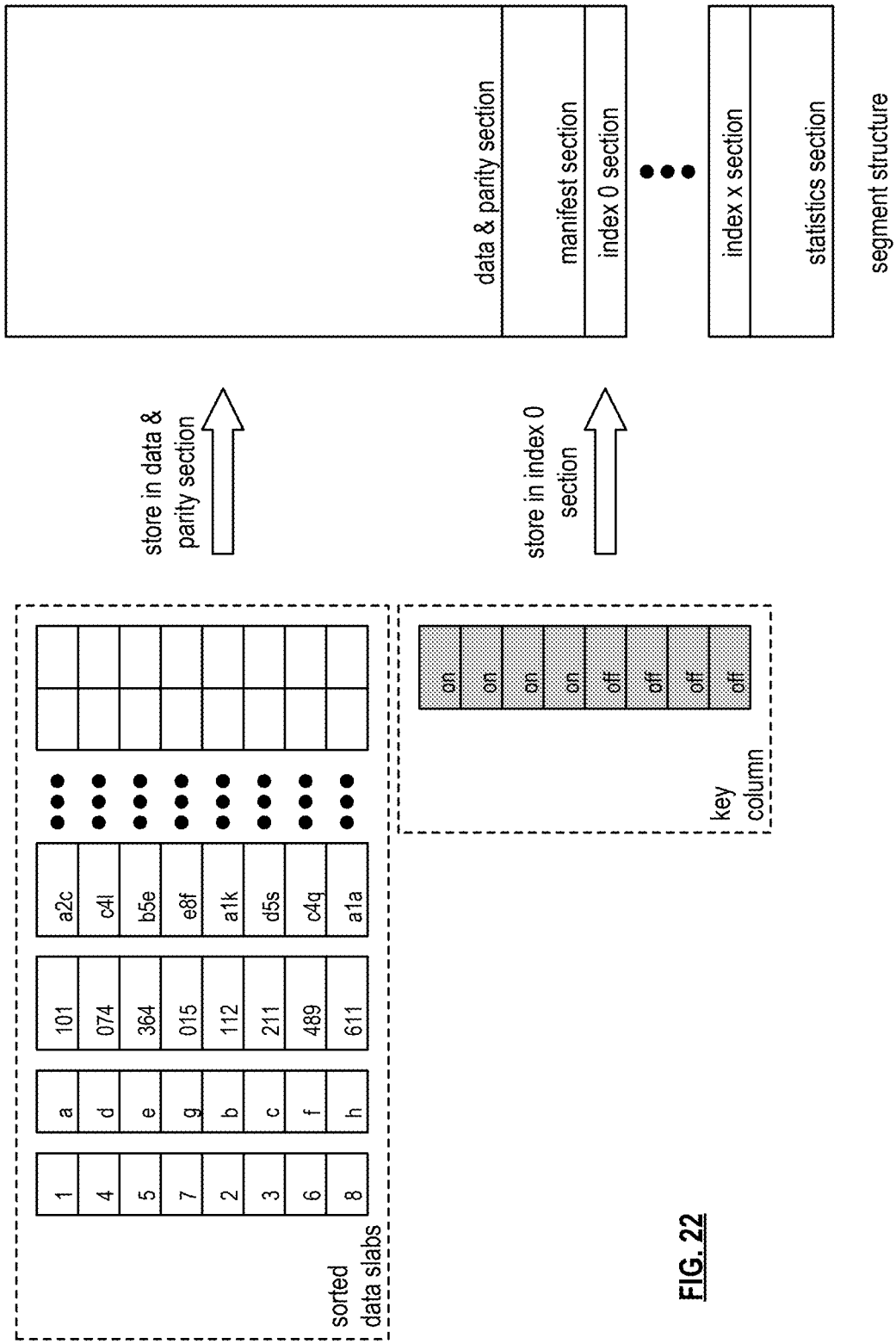

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
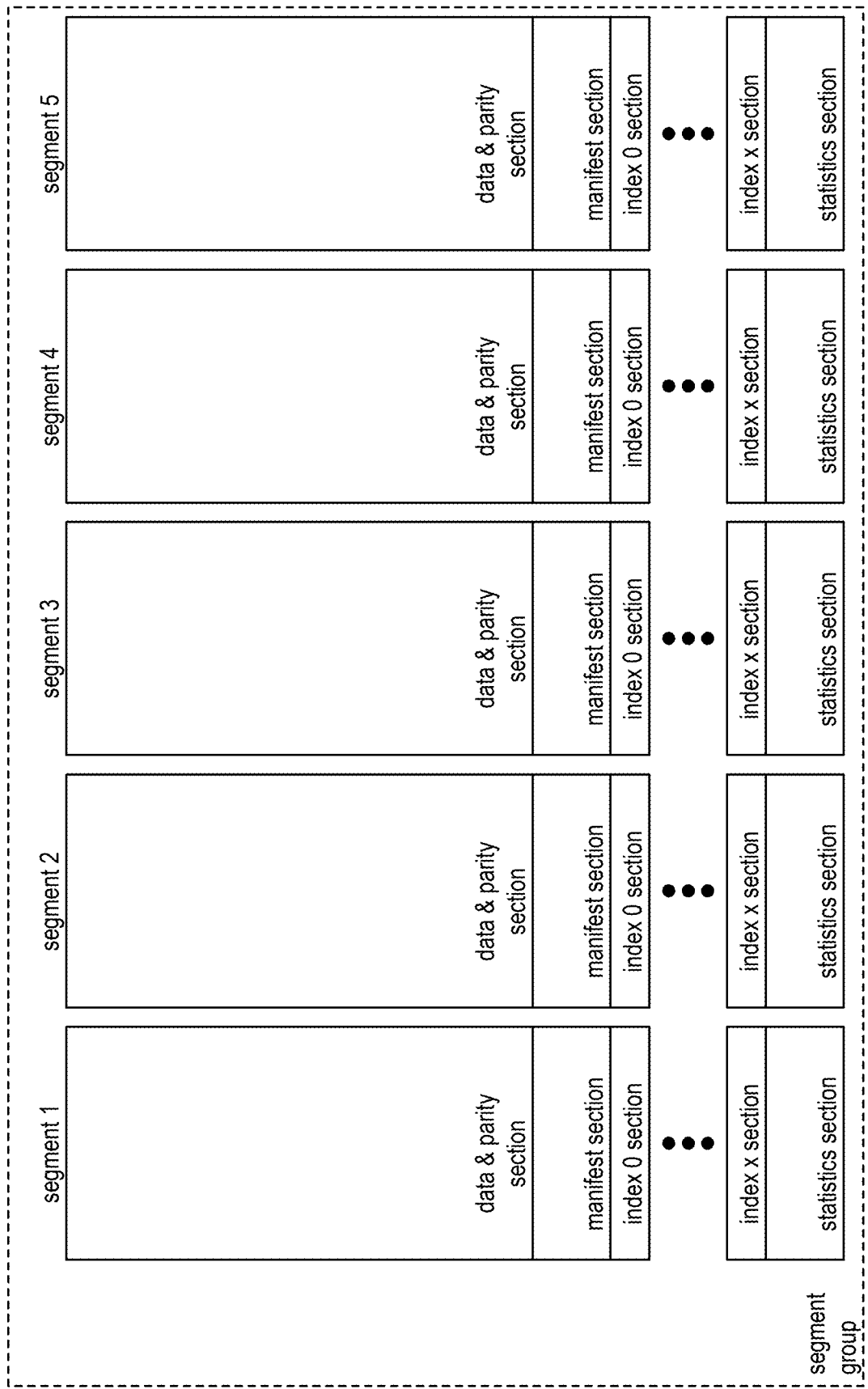

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
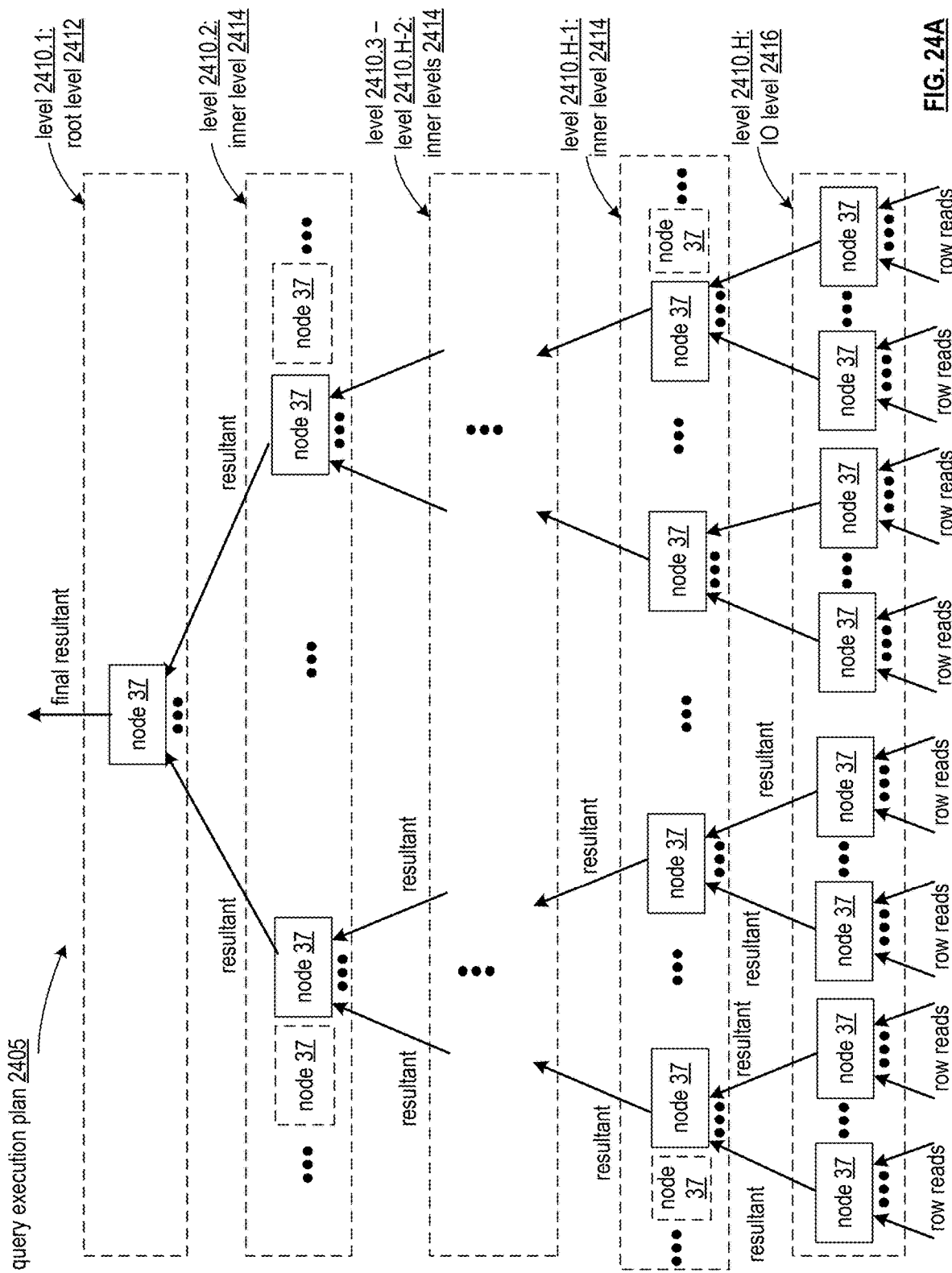
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H−1 includes at least one node from the IO level 2416 in the possible set of nodes. In such cases, while each selected node in level 2410.H−1 is depicted to process resultants sent from other nodes 37 in FIG. 24A, each selected node in level 2410.H−1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
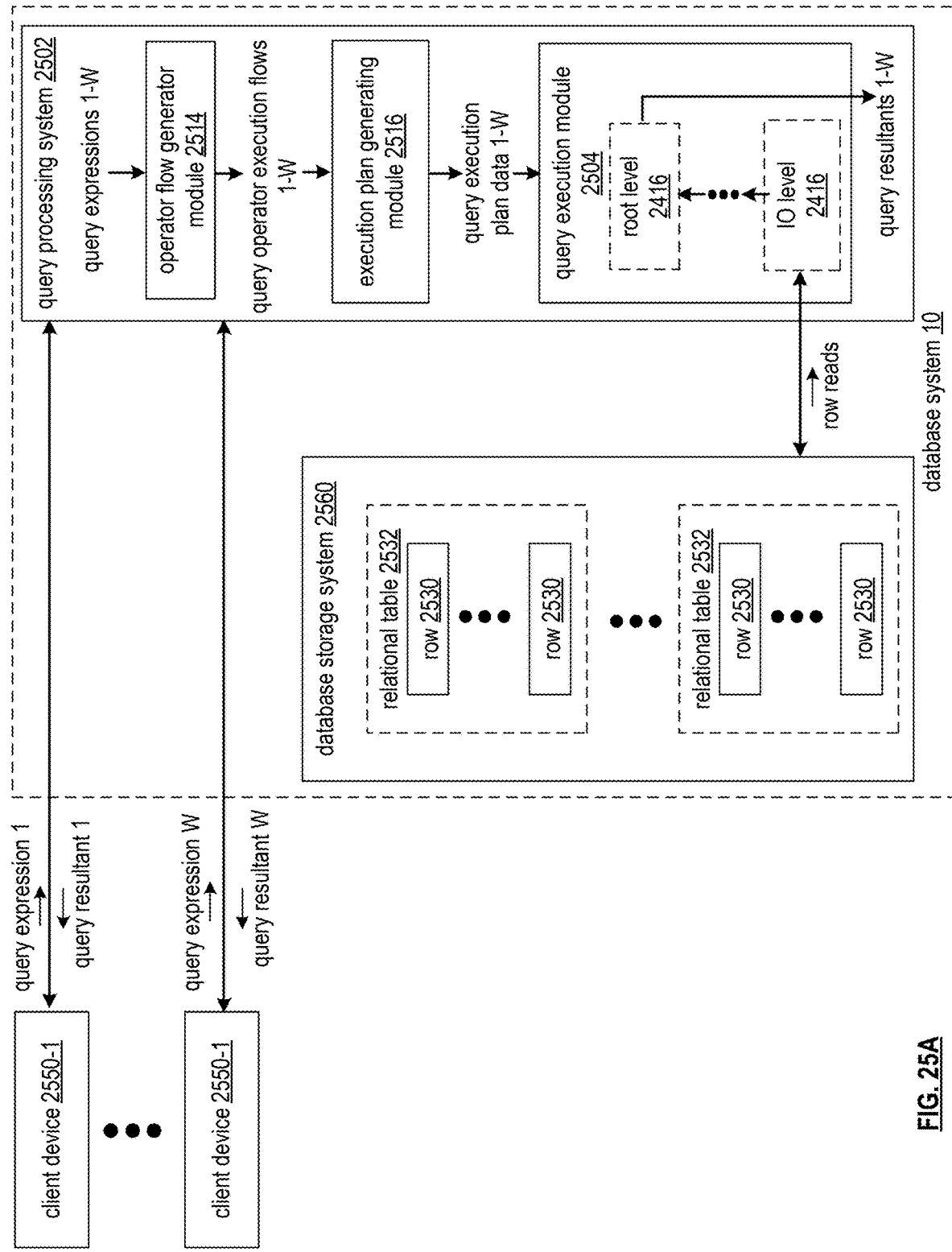
FIG. 25A is a schematic block diagram of a database system 10 that includes a query processing system in accordance with various embodiments.
Figure 25B:
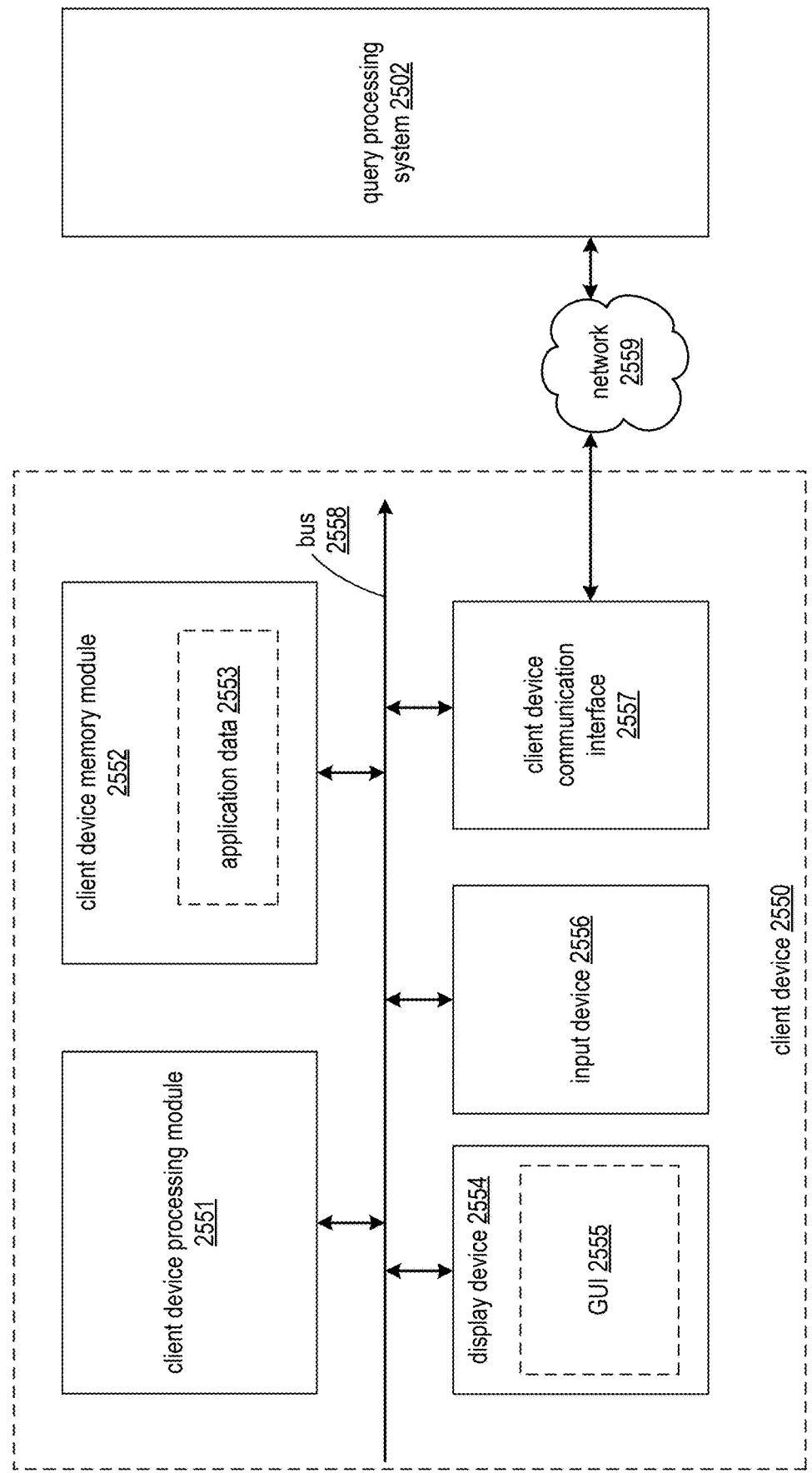
FIG. 25B is a schematic block diagram of a client device that communicates with database system 10 in accordance with various embodiments.
Figure 25C:
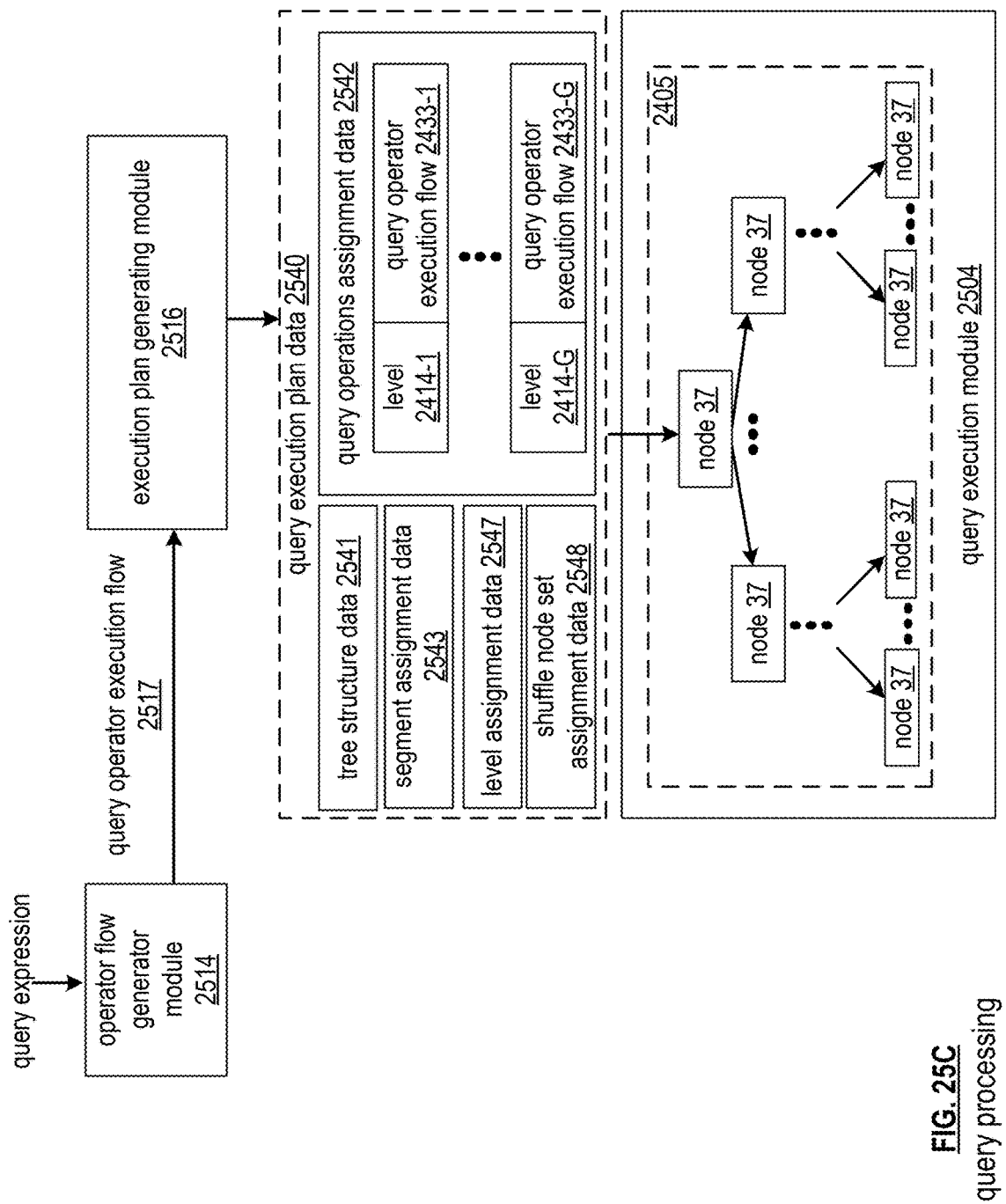
FIG. 25C is a schematic block diagram of a query processing system in accordance with various embodiments.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
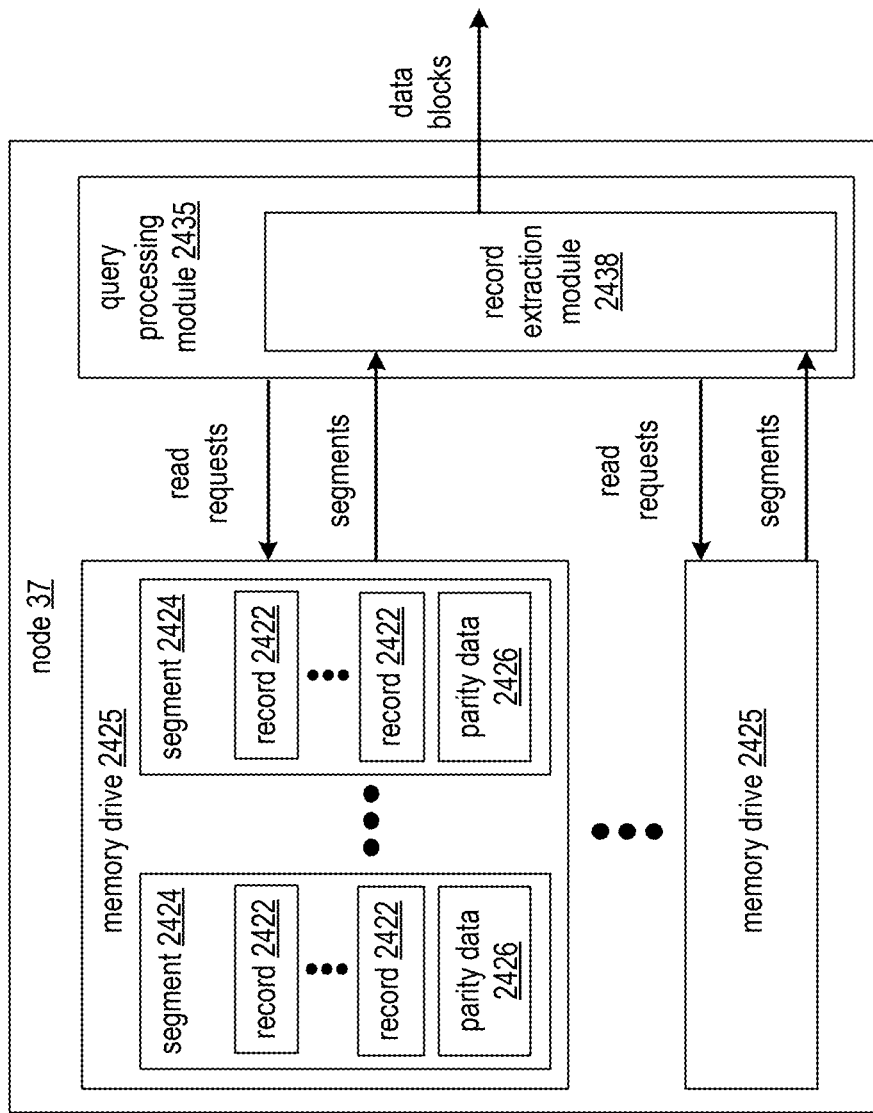
Figure 24D:
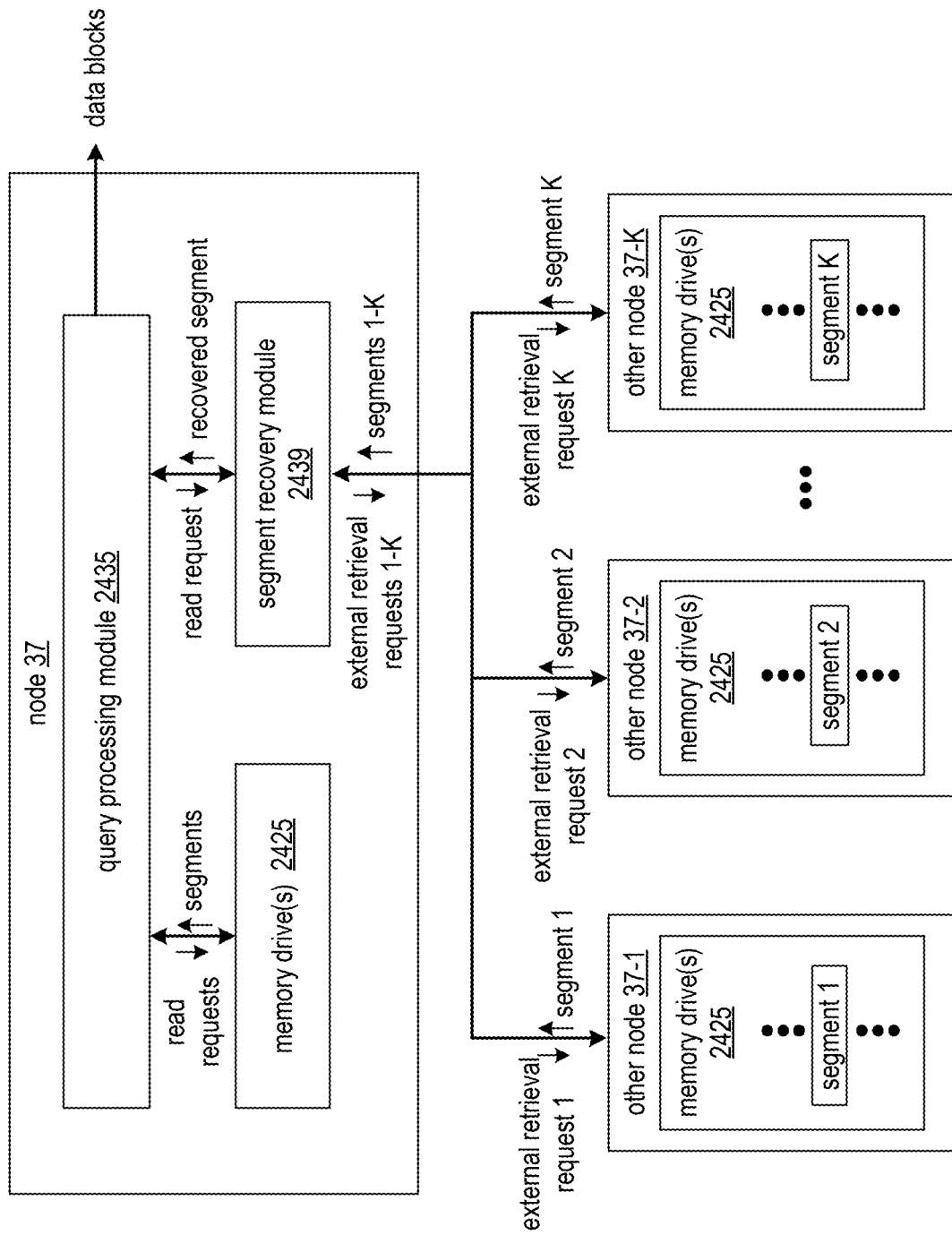

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when a complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
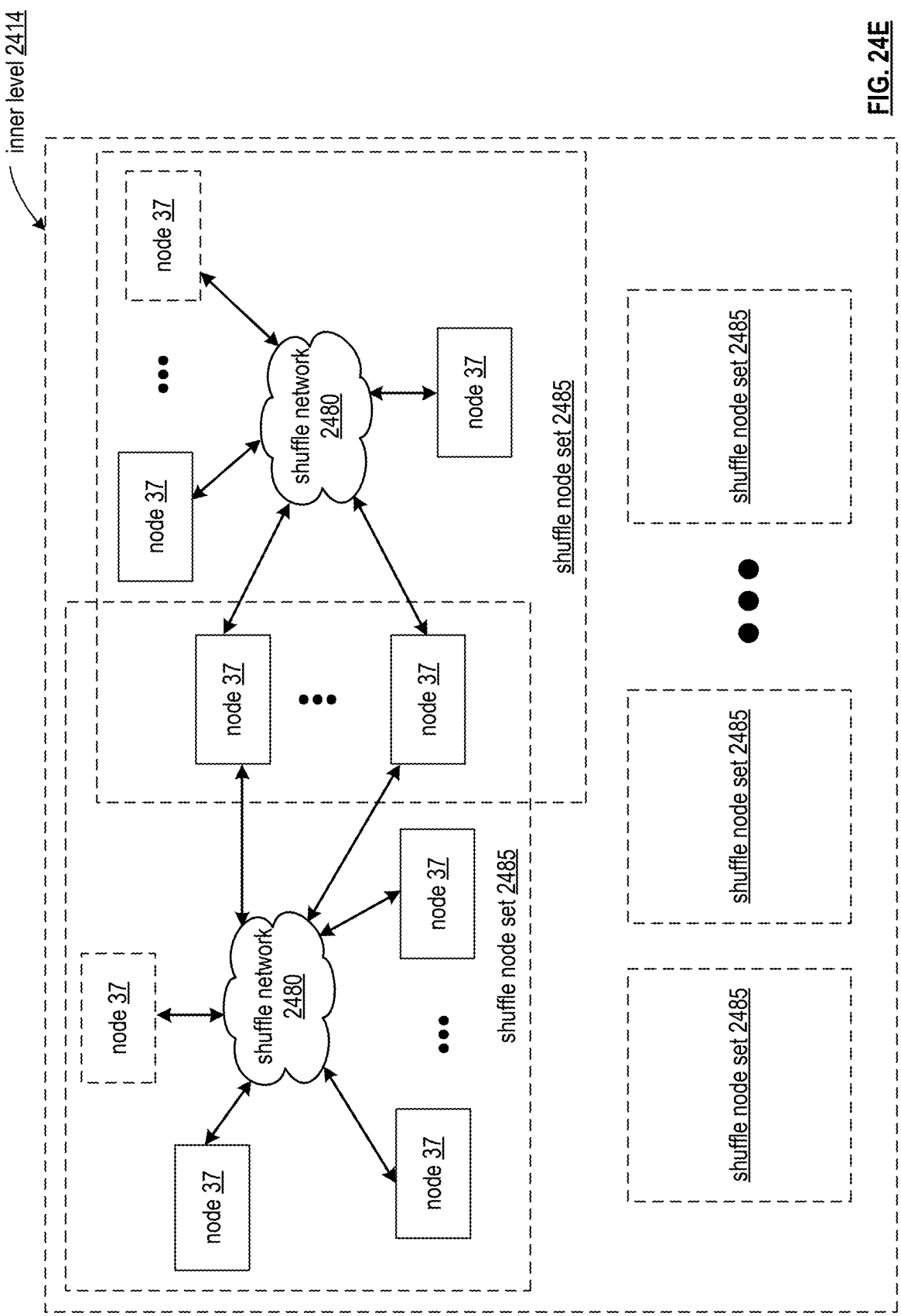
FIG. 24E is an embodiment is schematic block diagrams illustrating a plurality of nodes that communicate via shuffle networks in accordance with various embodiments.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were accessed in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set cannot communicate directly. In some cases, some pairs of nodes in a same shuffle node set can only communicate by routing their data via at least one relay node 37. For example, two nodes in a same shuffle node set do not have a direct communication link and/or cannot communicate via broadcasting their data blocks. However, if these two nodes in a same shuffle node set can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

Figure 24F:
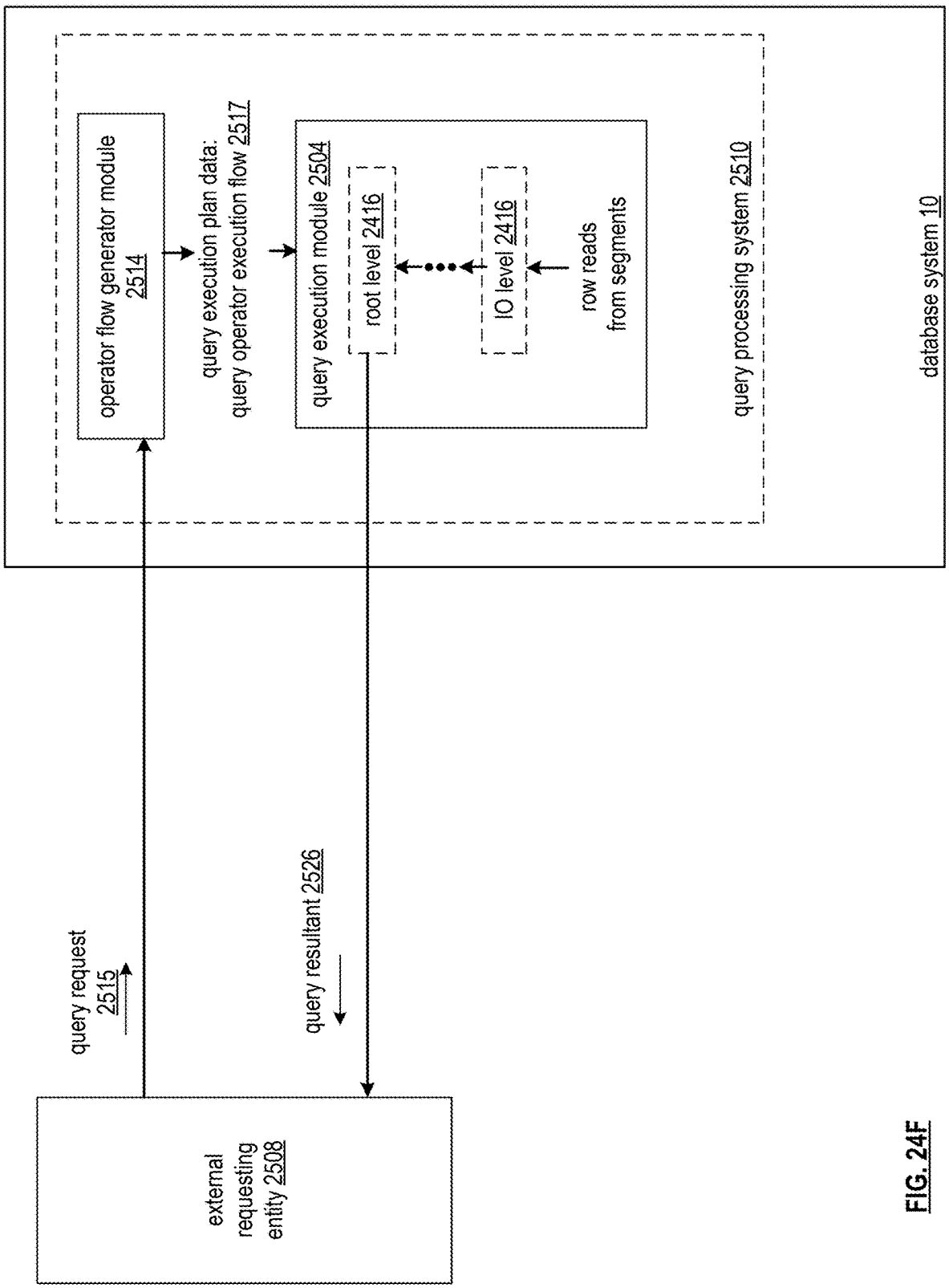
FIG. 24F is a schematic block diagram of a database system communicating with an external requesting entity in accordance with various embodiments.

FIG. 24F illustrates an embodiment of a database system that receives some or all query requests from one or more external requesting entities 2508. The external requesting entities 2508 can be implemented as a client device such as a personal computer and/or device, a server system, or other external system that generates and/or transmits query requests 2515. A query resultant 2526 can optionally be transmitted back to the same or different external requesting entity 2508. Some or all query requests processed by database system 10 as described herein can be received from external requesting entities 2508 and/or some or all query resultants generated via query executions described herein can be transmitted to external requesting entities 2508.

For example, a user types or otherwise indicates a query for execution via interaction with a computing device associated with and/or communicating with an external requesting entity. The computing device generates and transmits a corresponding query request 2515 for execution via the database system 10, where the corresponding query resultant 2526 is transmitted back to the computing device, for example, for storage by the computing device and/or for display to the corresponding user via a display device.

Figure 24G:
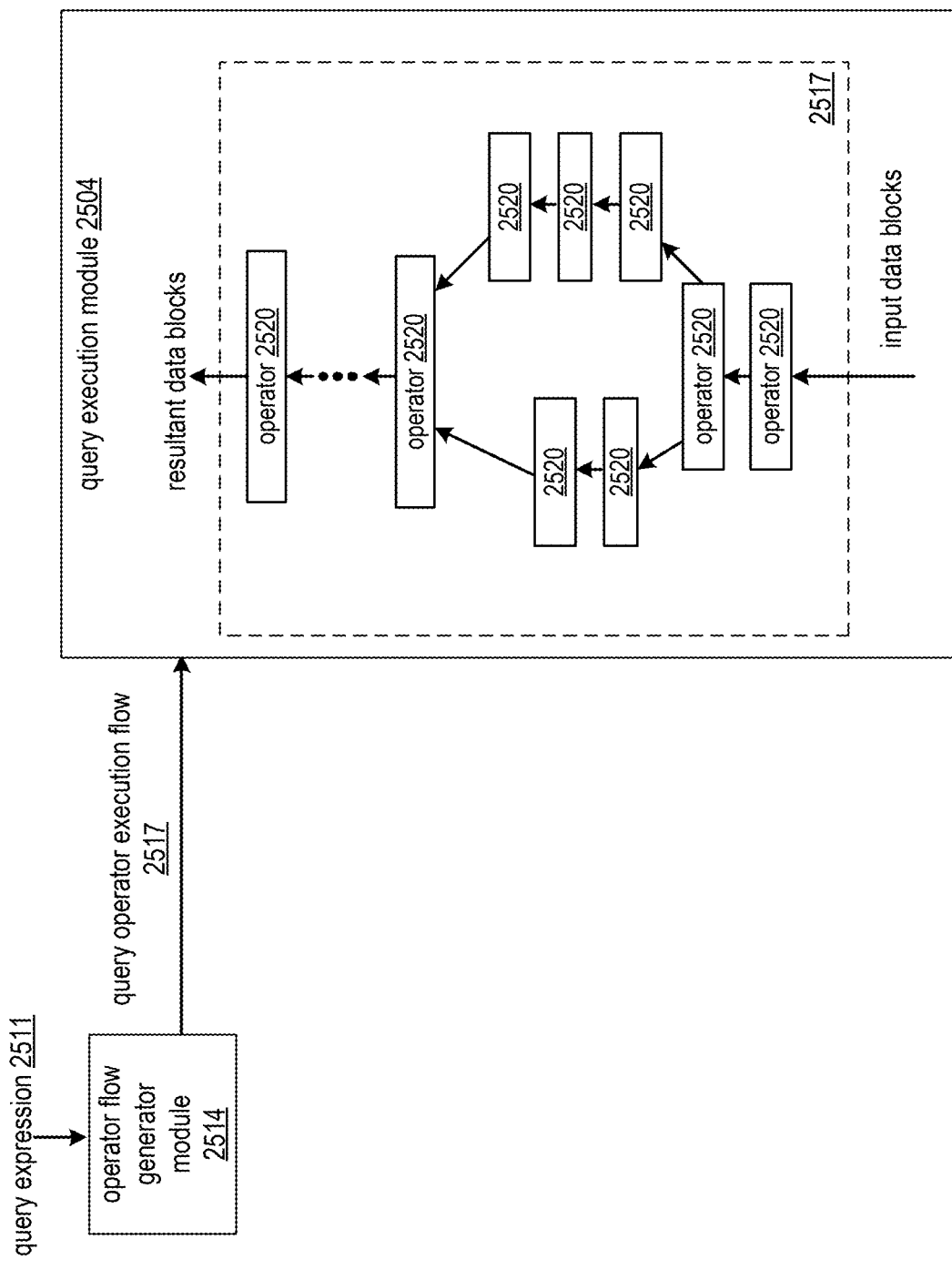
FIG. 24G is a schematic block diagram of a query processing system in accordance with various embodiments.

FIG. 24G illustrates an embodiment of a query processing system 2510 that generates a query operator execution flow 2517 from a query expression 2511 for execution via a query execution module 2504. The query processing system 2510 can be implemented utilizing, for example, the parallelized query and/or response sub-system 13 and/or the parallelized data store, retrieve, and/or process subsystem 12. The query processing system 2510 can be implemented by utilizing at least one computing device 18, for example, by utilizing at least one central processing module 39 of at least one node 37 utilized to implement the query processing system 2510. The query processing system 2510 can be implemented utilizing any processing module and/or memory of the database system 10, for example, communicating with the database system 10 via system communication resources 14.

As illustrated in FIG. 24G, an operator flow generator module 2514 of the query processing system 2510 can be utilized to generate a query operator execution flow 2517 for the query indicated in a query expression 2511. This can be generated based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

A query execution module 2504 of the query processing system 2510 can execute the query expression via execution of the query operator execution flow 2517 to generate a query resultant. For example, the query execution module 2504 can be implemented via a plurality of nodes 37 that execute the query operator execution flow 2517. In particular, the plurality of nodes 37 of a query execution plan 2405 of FIG. 24A can collectively execute the query operator execution flow 2517. In such cases, nodes 37 of the query execution module 2504 can each execute their assigned portion of the query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

FIG. 24H presents an example embodiment of a query execution module 2504 that executes query operator execution flow 2517. Some or all features and/or functionality of the query execution module 2504 of FIG. 24H can implement the query execution module 2504 of FIG. 24G and/or any other embodiment of the query execution module 2504 discussed herein. Some or all features and/or functionality of the query execution module 2504 of FIG. 24H can optionally be utilized to implement the query processing module 2435 of node 37 in FIG. 24B and/or to implement some or all nodes 37 at inner levels 2414 of a query execution plan 2405 of FIG. 24A.

The query execution module 2504 can execute the determined query operator execution flow 2517 by performing a plurality of operator executions of operators 2520 of the query operator execution flow 2517 in a corresponding plurality of sequential operator execution steps. Each operator execution step of the plurality of sequential operator execution steps can correspond to execution of a particular operator 2520 of a plurality of operators 2520-1-2520-M of a query operator execution flow 2433.

In some embodiments, a single node 37 executes the query operator execution flow 2517 as illustrated in FIG. 24H as their operator execution flow 2433 of FIG. 24B, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2517 to input data blocks received from other nodes and/or retrieved from memory as read and/or recovered records. In such cases, the entire query operator execution flow 2517 determined for the query as a whole can be segregated into multiple query operator execution sub-flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

A single operator execution by the query execution module 2504, such as via a particular node 37 executing its own query operator execution flows 2433, by executing one of the plurality of operators of the query operator execution flow 2433. As used herein, an operator execution corresponds to executing one operator 2520 of the query operator execution flow 2433 on one or more pending data blocks 2537 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2537 in the operator input data set 2522 were outputted by the one or more other operators 2520 that are immediately below the particular operator via one or more corresponding operator executions of one or more previous operator execution steps in the plurality of sequential operator execution steps. Pending data blocks 2537 of an operator input data set 2522 can be ordered, for example as an ordered queue, based on an ordering in which the pending data blocks 2537 are received by the operator input data set 2522. Alternatively, an operator input data set 2522 is implemented as an unordered set of pending data blocks 2537.

If the particular operator 2520 is executed for a given one of the plurality of sequential operator execution steps, some or all of the pending data blocks 2537 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2537 to generate one or more output data blocks, this data block is removed from the operator's operator input data set 2522. In some cases, an operator selected for execution is automatically executed upon all pending data blocks 2537 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 24G, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2537 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2537. At this given time, one more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2517 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in a same shuffle node set as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in a same shuffle node set as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in a shuffle node set all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in a same shuffle node set as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in a same shuffle node set based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.*i* in their own query operator execution flow 2433 upon their own corresponding input data set 2522 for this particular operator. The particular node adds this received output of execution of operator 2520.*i* by the one or more other nodes to the be input data set 2522 of its own next operator 2520.*i*+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.*i*+1 corresponds to and/or is utilized to implement JOIN operator and/or a custom-join operator of the query operator execution flow 2517, and where the operator 2520.*i*+1 thus utilizes input received from many different nodes in the shuffle node set in accordance with their performing of all of the operators serially before operator 2520.*i*+1 to generate the input to operator 2520.*i*+1.

As used herein, a child operator of a given operator corresponds to an operator immediately before the given operator serially in a corresponding query operator execution flow and/or an operator from which the given operator receives input data blocks for processing in generating its own output data blocks. A given operator can have a single child operator or multiple child operators. A given operator optionally has no child operators based on being an IO operator and/or otherwise being a bottommost and/or first operator in the corresponding serialized ordering of the query operator execution flow. A child operator can implement any operator 2520 described herein.

A given operator and one or more of the given operator's child operators can be executed by a same node 37 of a given node 37. Alternatively or in addition, one or more child operators can be executed by one or more different nodes 37 from a given node 37 executing the given operator, such as a child node of the given node in a corresponding query execution plan that is participating in a level below the given node in the query execution plan.

As used herein, a parent operator of a given operator corresponds to an operator immediately after the given operator serially in a corresponding query operator execution flow, and/or an operator from which the given operator receives input data blocks for processing in generating its own output data blocks. A given operator can have a single parent operator or multiple parent operators. A given operator optionally has no parent operators based on being a topmost and/or final operator in the corresponding serialized ordering of the query operator execution flow. If a first operator is a child operator of a second operator, the second operator is thus a parent operator of the first operator. A parent operator can implement any operator 2520 described herein.

A given operator and one or more of the given operator's parent operators can be executed by a same node 37 of a given node 37. Alternatively or in addition, one or more parent operators can be executed by one or more different nodes 37 from a given node 37 executing the given operator, such as a parent node of the given node in a corresponding query execution plan that is participating in a level above the given node in the query execution plan.

As used herein, a lateral network operator of a given operator corresponds to an operator parallel with the given operator in a corresponding query operator execution flow. The set of lateral operators can optionally communicate data blocks with each other, for example, in addition to sending data to parent operators and/or receiving data from child operators. For example, a set of lateral operators are implemented as one or more broadcast operators of a broadcast operation, and/or one or more shuffle operators of a shuffle operation. For example, a set of lateral operators are implemented via corresponding plurality of parallel processes 2550, for example, of a join process or other operation, to facilitate transfer of data such as right input rows received for processing between these operators. As another example, data is optionally transferred between lateral network operators via a corresponding shuffle and/or broadcast operation, for example, to communicate right input rows of a right input row set of a join operation to ensure all operators have a full set of right input rows.

A given operator and one or more lateral network operators lateral with the given operator can be executed by a same node 37 of a given node 37. Alternatively or in addition, one or lateral network operators can be executed by one or more different nodes 37 from a given node 37 executing the given operator lateral with the one or more lateral network operators. For example, different lateral network operators are executed via different nodes 37 in a same shuffle node set 37.

Figure 24I:
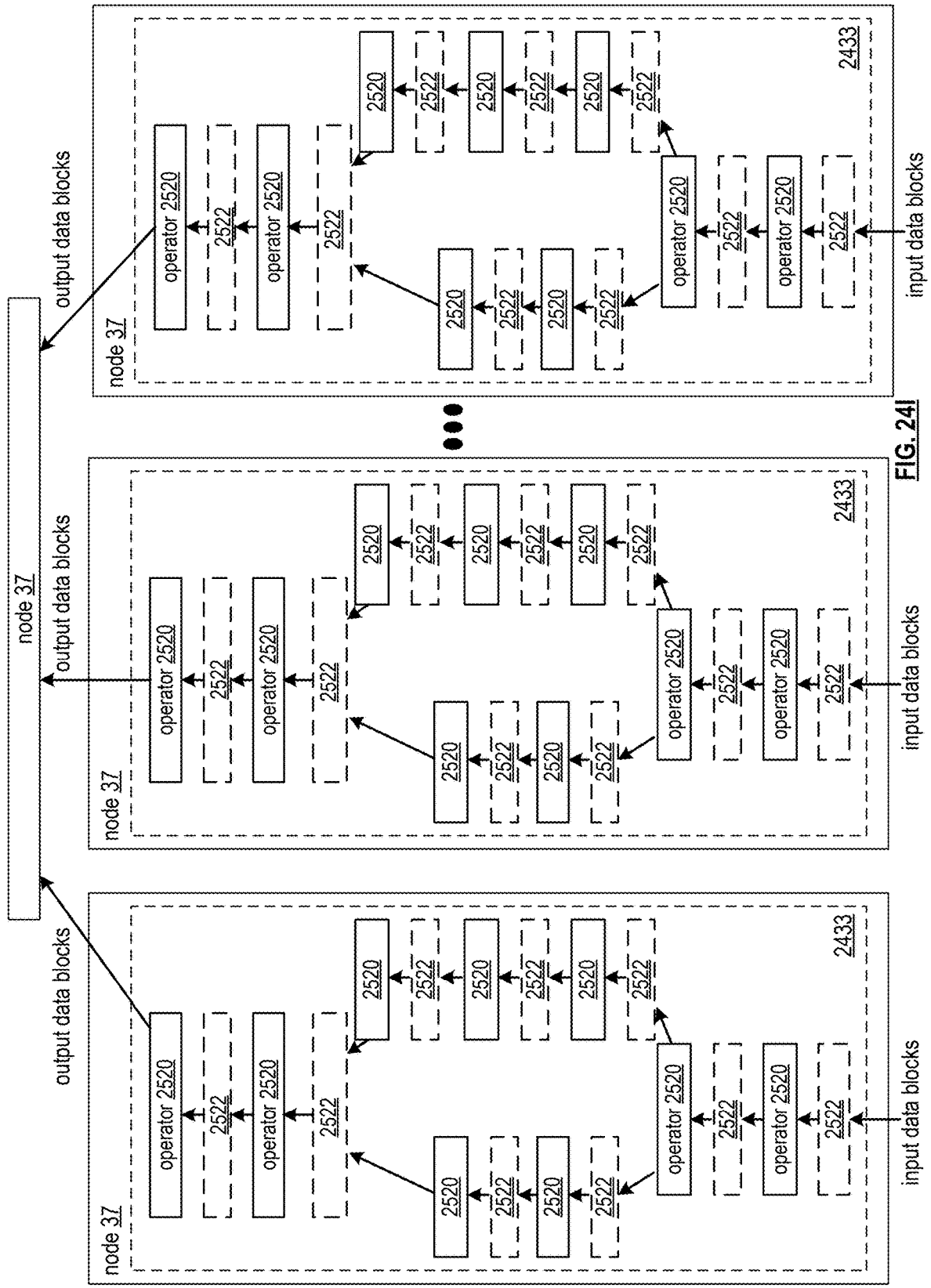
FIG. 24I is a schematic block diagram of a plurality of nodes that utilize query operator execution flows in accordance with various embodiments.

FIG. 24I illustrates an example embodiment of multiple nodes 37 that execute a query operator execution flow 2433. For example, these nodes 37 are at a same level 2410 of a query execution plan 2405, and receive and perform an identical query operator execution flow 2433 in conjunction with decentralized execution of a corresponding query. Each node 37 can determine this query operator execution flow 2433 based on receiving the query execution plan data for the corresponding query that indicates the query operator execution flow 2433 to be performed by these nodes 37 in accordance with their participation at a corresponding inner level 2414 of the corresponding query execution plan 2405 as discussed in conjunction with FIG. 24G. This query operator execution flow 2433 utilized by the multiple nodes can be the full query operator execution flow 2517 generated by the operator flow generator module 2514 of FIG. 24G. This query operator execution flow 2433 can alternatively include a sequential proper subset of operators from the query operator execution flow 2517 generated by the operator flow generator module 2514 of FIG. 24G, where one or more other sequential proper subsets of the query operator execution flow 2517 are performed by nodes at different levels of the query execution plan.

Each node 37 can utilize a corresponding query processing module 2435 to perform a plurality of operator executions for operators of the query operator execution flow 2433 as discussed in conjunction with FIG. 24H. This can include performing an operator execution upon input data sets 2522 of a corresponding operator 2520, where the output of the operator execution is added to an input data set 2522 of a sequentially next operator 2520 in the operator execution flow, as discussed in conjunction with FIG. 24H, where the operators 2520 of the query operator execution flow 2433 are implemented as operators 2520 of FIG. 24H. Some or operators 2520 can correspond to blocking operators that must have all required input data blocks generated via one or more previous operators before execution. Each query processing module can receive, store in local memory, and/or otherwise access and/or determine necessary operator instruction data for operators 2520 indicating how to execute the corresponding operators 2520.

Figure 24J:
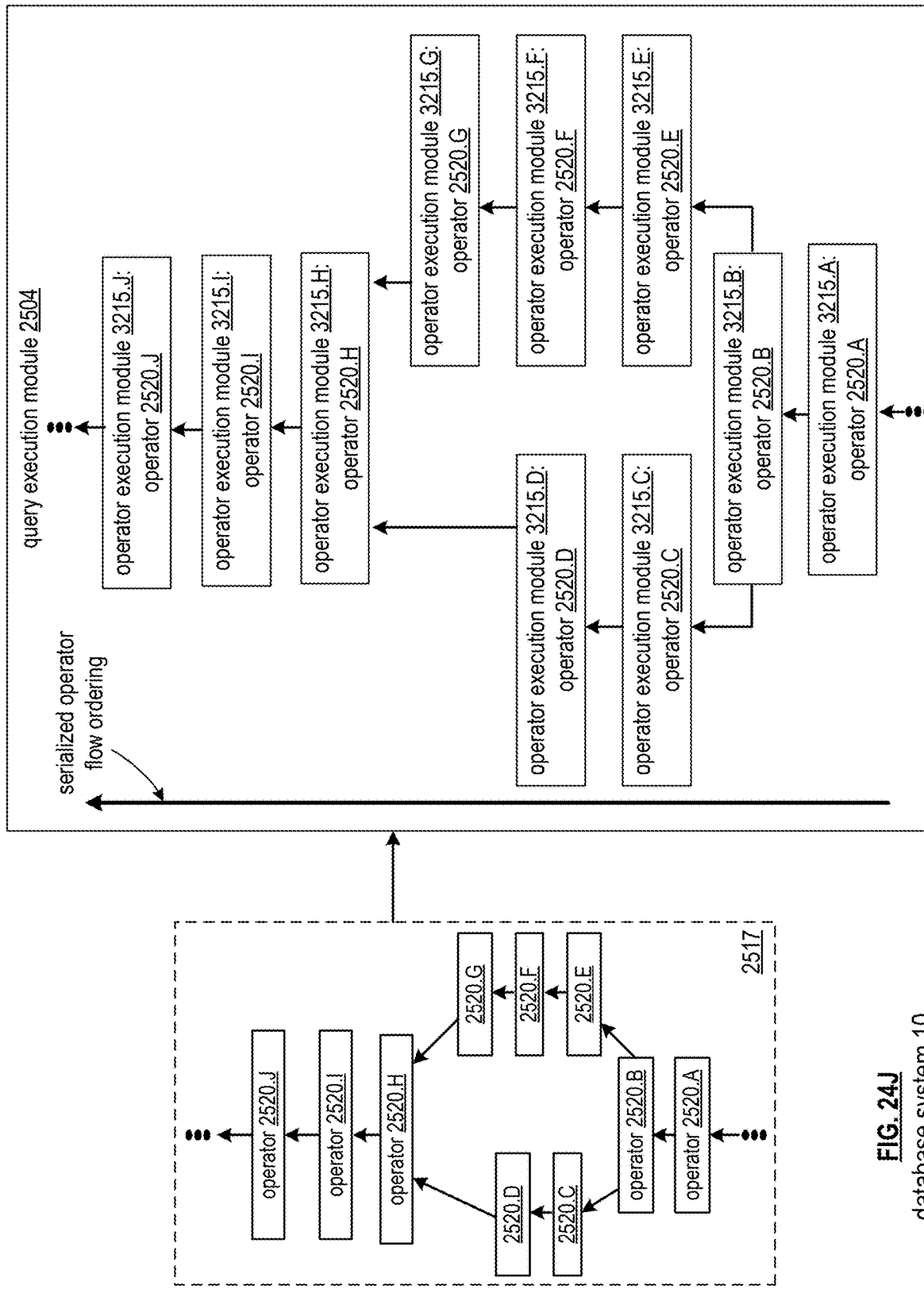
FIG. 24J is a schematic block diagram of a query execution module that executes a query operator execution flow via a plurality of corresponding operator execution modules in accordance with various embodiments.

FIG. 24J illustrates an embodiment of a query execution module 2504 that executes each of a plurality of operators of a given operator execution flow 2517 via a corresponding one of a plurality of operator execution modules 3215. The operator execution modules 3215 of FIG. 24J can be implemented to execute any operators 2520 being executed by a query execution module 2504 for a given query as described herein.

In some embodiments, a given node 37 can optionally execute one or more operators, for example, when participating in a corresponding query execution plan 2405 for a given query, by implementing some or all features and/or functionality of the operator execution module 3215, for example, by implementing its operator processing module 2435 to execute one or more operator execution modules 3215 for one or more operators 2520 being processed by the given node 37. For example, a plurality of nodes of a query execution plan 2405 for a given query execute their operators based on implementing corresponding query processing modules 2435 accordingly.

FIG. 24K illustrates an embodiment of database storage 2450 operable to store a plurality of database tables 2712, such as relational database tables or other database tables as described previously herein. Database storage 2450 can be implemented via the parallelized data store, retrieve, and/or process sub-system 12, via memory drives 2425 of one or more nodes 37 implementing the database storage 2450, and/or via other memory and/or storage resources of database system 10. The database tables 2712 can be stored as segments as discussed in conjunction with FIGS. 15-23 and/or FIGS. 24B-24D. A database table 2712 can be implemented as one or more datasets and/or a portion of a given dataset, such as the dataset of FIG. 15.

A given database table 2712 can be stored based on being received for storage, for example, via the parallelized ingress sub-system 24 and/or via other data ingress. Alternatively or in addition, a given database table 2712 can be generated and/or modified by the database system 10 itself based on being generated as output of a query executed by query execution module 2504, such as a Create Table As Select (CTAS) query or Insert query.

In various embodiments, generating this table of results for storage via a CTAS operation via database system 10 can be implemented via any features and/or functionality of performing CTAS operations and/or otherwise creating and storing new rows via query executions by query execution module 2504, disclosed by U.S. Utility application Ser. No. 18/313,548, entitled "LOADING QUERY RESULT SETS FOR STORAGE IN DATABASE SYSTEMS", filed May 8, 2023, which is hereby incorporated herein by reference in its entirety and made part of the present U.S. Utility patent application for all purposes.

A given database table 2712 can be in accordance with a schema 2409 defining columns of the database table, where records 2422 correspond to rows having values 2708 for some or all of these columns. Different database tables can have different numbers of columns and/or different datatypes for values stored in different columns. For example, the set of columns $2707.I_A$-$2707.C_A$ of schema 2709.A for database table 2712.A can have a different number of columns than and/or can have different datatypes for some or all columns of the set of columns $2707.I_B$-$2707.C_B$ of schema 2709.B for database table 2712.B. The schema 2409 for a given n database table 2712 can denote same or different datatypes for some or all of its set of columns. For example, some columns are variable-length and other columns are fixed-length. As another example, some columns are integers, other columns are binary values, other columns are Strings, and/or other columns are char types.

Row reads performed during query execution, such as row reads performed at the IO level of a query execution plan 2405, can be performed by reading values 2708 for one or more specified columns 2707 of the given query for some or all rows of one or more specified database tables, as denoted by the query expression defining the query to be performed. Filtering, join operations, and/or values included in the query resultant can be further dictated by operations to be performed upon the read values 2708 of these one or more specified columns 2707.

FIG. 25A illustrates an embodiment of a database system 10 that implements a query processing system 2502. The query processing system 2502 is operable to receive query expressions from one or more client devices 2550, is operable to execute the queries via a query execution module 2504 to generate query resultants, and is operable to send the query resultants to the respective client devices. For example, a set of client devices 2550-1-2550-W each send one of a set of queries 1-W to the query processing system 2502 for execution, and receive a corresponding one of a set of query resultants 1-W generated by the a query processing system 2502 in response.

The query processing system 2502 can be utilized to implement, for example, the parallelized query and/or response sub-system 13 and/or the parallelized data store, retrieve, and/or process subsystem 12. The query processing system 2502 can be implemented by utilizing at least one computing device 18, for example, by utilizing at least one central processing module 39 of at least one node 37 utilized to implement the query processing system 2502. The query processing system 2502 can be implemented utilizing any processing module and/or memory of the database system 10, for example, communicating with the database system 10 via system communication resources 14.

As illustrated in FIG. 25A, an operator flow generator module 2514 of the query processing system 2502 can be utilized to generate a query operator execution flow 2517 for the query indicated in a query request. This can be generated based on the received query expression, based on a plurality of query operators indicated in the query expression and their respective sequential, parallelized, and/or nested ordering in the query expression, and/or based on optimizing the execution of the plurality of operators of the query expression. This query operator execution flow 2517 can include and/or be utilized to determine the query operator execution flow 2433 assigned to nodes 37 at one or more particular levels of the query execution plan 2405 and/or can include the operator execution flow to be implemented across a plurality of nodes 37, for example, based on a query expression indicated in the query request and/or based on optimizing the execution of the query expression.

In some cases, the operator flow generator module 2514 implements an optimizer to select the query operator execution flow 2517 based on determining the query operator execution flow 2517 is a most efficient and/or otherwise most optimal one of a set of query operator execution flow options and/or that arranges the operators in the query operator execution flow 2517 such that the query operator execution flow 2517 compares favorably to a predetermined efficiency threshold. For example, the operator flow generator module 2514 selects and/or arranges the plurality of operators of the query operator execution flow 2517 to implement the query expression in accordance with performing optimizer functionality, for example, by performing a deterministic function upon the query expression to select and/or arrange the plurality of operators in accordance with the optimizer functionality. This can be based on known and/or estimated processing times of different types of operators. This can be based on known and/or estimated levels of record filtering that will be applied by particular filtering parameters of the query. This can be based on selecting and/or deterministically utilizing a conjunctive normal form and/or a disjunctive normal form to build the query operator execution flow 2517 from the query expression. This can be based on selecting a determining a first possible serial ordering of a plurality of operators to implement the query expression based on determining the first possible serial ordering of the plurality of operators is known to be or expected to be more efficient than at least one second possible serial ordering of the same or different plurality of operators that implements the query expression. This can be based on ordering a first operator before a second operator in the query operator execution flow 2517 based on determining executing the first operator before the second operator results in more efficient execution than executing the second operator before the first operator. For example, the first operator is known to filter the set of records upon which the second operator would be performed to improve the efficiency of performing the second operator due to being executed upon a smaller set of records than if performed before the first operator. This can be based on other optimizer functionality that otherwise selects and/or arranges the plurality of operators of the query operator execution flow 2517 based on other known, estimated, and/or otherwise determined criteria.

An execution plan generating module 2516 can utilize the query operator execution flow 2517 to generate query execution plan data for execution via a query execution module 2504. The query execution module 2504 of the query processing system 2502 can include a plurality of nodes 37 that implement the resulting query execution plan 2405 in accordance with the query execution plan data 2540 generated by the execution plan generating module 2516. The query execution plan data can indicate the set of nodes participating in a query execution plan 2405 as illustrated and discussed in conjunction with FIG. 24A. Nodes 37 of the query execution module 2504 can each execute their assigned portion query to produce data blocks as discussed previously, starting from IO level nodes propagating their data blocks upwards until the root level node processes incoming data blocks to generate the query resultant, where inner level nodes execute their respective query operator execution flow 2433 upon incoming data blocks to generate their output data blocks. The query execution module 2504 can be utilized to implement the parallelized query and results sub-system 13 and/or the parallelized data store, receive and/or process sub-system 12.

Nodes 37 at IO level 2416 of the query execution plan 2405 implemented by the query execution module 2504 can perform row reads to rows stored by the database system as discussed previously. The row reads can include accessing rows 2530 of one or more relational tables 2532 of a database storage system 2560. The rows 2530 can be implemented as records 2422, where the rows 2530 are stored in accordance with a column-based format in one or more segments 2424 as discussed previously, and where the database storage system 2560 stores a plurality of rows 2530 of one or more relational tables 2532 as a plurality of segments 2424. For example, the database storage system 2560 is implemented as memory drives 2425 of a plurality nodes 37 that store rows via participation in a storage cluster 35. For example, nodes 37 at IO level 2416 that perform row reads can optionally read rows 2530 from their own segments 2424 stored upon their own memory drives 2425. The database storage system 2560 can be implemented as a single storage cluster 35 or a plurality of storage clusters 35.

For example, the database storage system 2560 is implemented by utilizing the parallelized data store, retrieve, and/or process sub-system 12 of FIG. 6. The database storage system 2560 can otherwise be implemented via at least one memory that stores a plurality of rows 2530 of one or more relational tables 2532.

FIG. 25B illustrates an embodiment of a client device 2550. The client device 2550 of FIG. 25B can be utilized to implement some or all client devices 2550-1-2550-W of FIG. 25A. The client device 2550 can include a bus 2558 that facilitates and/or enables communication of data between a client device processing module 2551, a client device memory module 2552, a client device display device 2554, an input device 2556, and/or a client device communication interface 2557.

The client device 2550 can include a client device processing module 2551, which can be implemented via at least one processor. The client device 2550 can include a client device memory module 2552, which can be implemented via at least one memory. The client device memory module 2552 can store application data 2553 that includes operational instructions that, when executed by the client device memory module 2552, causes the client device processing module 2551 to perform some or all functionality of the client device 2550 discussed herein. The application data 2553 can be stored, downloaded and/or installed by the client device 2550. For example, the application data 2553 is associated with the query processing system 2502, and is downloaded via communication with a server associated with the query processing system 2502 and/or is sent to the client device from the query processing system 2502. The client device memory module 2552 can alternatively store other operational instruction that, when executed by the client device memory module 2552, causes the client device processing module 2551 to perform some or all functionality of the client device 2550 discussed herein.

The client device 2550 can include and/or communicate with a display device 2554 operable to display a graphical user interface (GUI) 2555. The GUI can display prompts and/or other information, for example, based on the execution of application data 2553. The client device 2550 can include an input device 2556, such as a mouse, keyboard, touchscreen of the display device 2554, and/or another device enabling a user of client device 2550 to enter user input. For example, the input device 2556 can enable a user of client device 2550 to enter commands and/or responses to prompts displayed by GUI 2555.

The client device 2550 can include a client device communication interface 2557 that enables communication with the query processing system 2502, for example, via a wired and/or wireless network 2559 and/or via another communication connection with the query processing system 2502. For example, the network 2559 can be implemented by utilizing the external network(s) 17, the network 4, and/or the system communication resources 14.

As an example of operation of the client device 2550, execution of the application data 2553 by client device processing module 2551 can cause GUI 2555 can display one or more prompts for the user enter query expressions for execution by the query processing system 2502. A user of client device 2550 can enter query expressions via input device 2556 in response to the prompt. The execution of the application data 2553 by client device processing module 2551 can cause a query expression entered in response to the prompt displayed by GUI 2555 to be sent by the client device communication interface 2557 to the query processing system 2502 via network 2559. The query processing system 2502 can receive and execute the query expression to generate a query resultant, for example, as discussed in conjunction with FIG. 25A. The query processing system 2502 can send the query resultant to the client device 2550. The execution of the application data 2553 by client device processing module 2551 can cause the client device communication interface 2557 to receive the query resultant via network 2559 and/or to display the query resultant to the user via GUI 2555.

FIG. 25C illustrates an example embodiment of the query processing system 2502 of FIG. 25A. In particular, the query execution plan data executed by the execution plan generating module 2516 of FIG. 25A can be implemented as query execution plan data 2540 illustrated in FIG. 25C.

The query execution plan data 2540 that is generated can be communicated to nodes 37 in the corresponding query execution plan 2405, for example, in the downward fashion in conjunction with determining the corresponding tree structure and/or in conjunction with the node assignment to the corresponding tree structure for execution of the query as discussed previously. Nodes 37 can thus determine their assigned participation, placement, and/or role in the query execution plan accordingly, for example, based on receiving and/or otherwise determining the corresponding query execution plan data 2540, and/or based on processing the tree structure data 2541, query operations assignment data 2542, segment assignment data 2543, level assignment data 2547, and/or shuffle node set assignment data of the received query execution plan data 2540.

The query execution plan data 2540 can indicate tree structure data 2541, for example, indicating child nodes and/or parent nodes of each node 37, indicating which nodes each node 37 is responsible for communicating data block and/or other metadata with in conjunction with the query execution plan 2405, and/or indicating the set of nodes included in the query execution plan 2405 and/or their assigned placement in the query execution plan 2405 with respect to the tree structure. The query execution plan data 2540 can alternatively or additionally indicate segment assignment data 2543 indicating a set of segments and/or records required for the query and/or indicating which nodes at the IO level 2416 of the query execution plan 2405 are responsible for accessing which distinct subset of segments and/or records of the required set of segments and/or records. The query execution plan data 2540 can alternatively or additionally indicate level assignment data 2547 indicating which one or more levels each node 37 is assigned to in the query execution plan 2405. The query execution plan data 2540 can alternatively or additionally indicate shuffle node set assignment data 2548 indicating assignment of nodes 37 to participate in one or more shuffle node sets 2485 as discussed in conjunction with FIG. 24E.

The query execution plan can alternatively or additionally indicate query operations assignment data 2542, for example, based on the query operator execution flow 2517. This can indicate how the query operator execution flow 2517 is to be subdivided into different levels of the query execution plan 2405, and/or can indicate assignment of particular query operator execution flows 2433 to some or all nodes 37 in the query execution plan 2405 based on the overall query operator execution flow 2517. As a particular example, a plurality of query operator execution flows 2433-1-2433-G are indicated to be executed by some or all nodes 37 participating in corresponding inner levels 2414-1-2414-G of the query execution plan. For example, the plurality of query operator execution flows 2433-1-2433-G correspond to distinct serial portions of the query operator execution flow 2517 and/or otherwise renders execution of the full query operator execution flow 2517 when these query operator execution flows 2433 are executed by nodes 37 at the corresponding levels 2414-1-2414-G. If the query execution plan 2405 has exactly one inner level 2414, the query operator execution flow 2433 assigned to nodes 37 at the exactly one inner level 2414 can correspond to the entire query operator execution flow 2517 generated for the query.

Figure 25D:
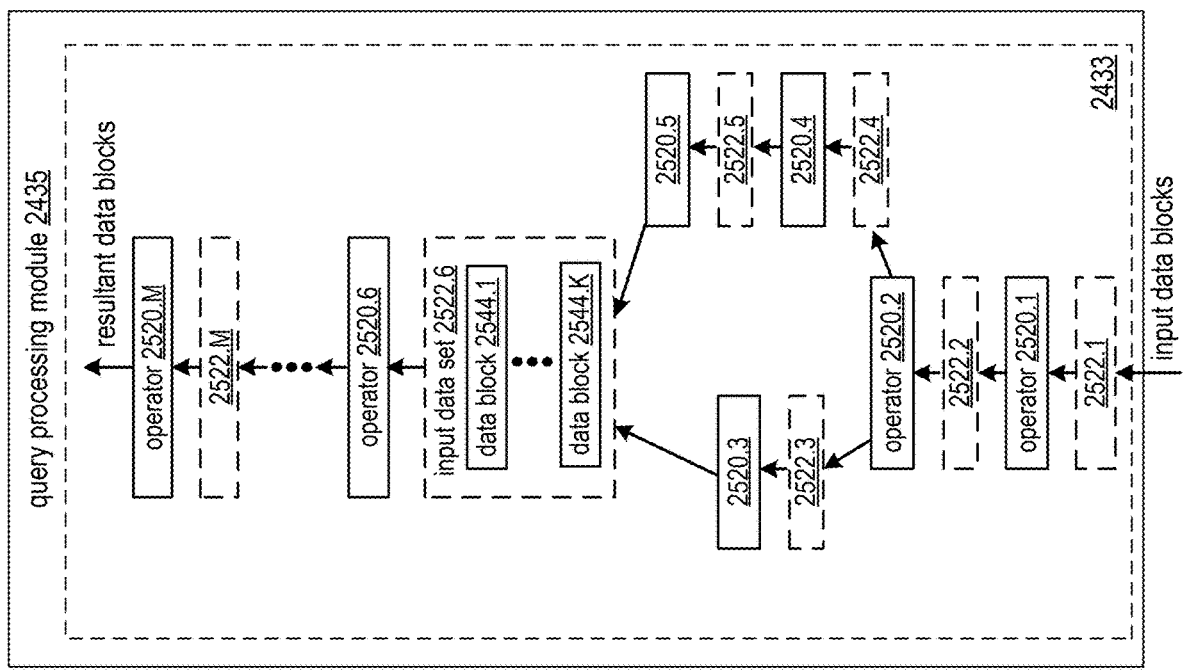
FIG. 25D is a schematic block diagram of a query processing module that executes an operator execution flow in accordance with various embodiments.

FIG. 25D presents an example embodiment of a query processing module 2435 of a node 37 that executes a query's query operator execution flow 2433. The query processing module 2435 of FIG. 25D can be utilized to implement the query processing module 2435 of node 37 in FIG. 24B and/or to implement some or all nodes 37 at inner levels 2414 of a query execution plan 2405 of FIG. 24A and/or implemented by the query execution module 2504 of FIG. 25C.

Each node 37 can determine the query operator execution flow 2433 for its execution of a given query based on receiving and/or determining the query execution plan data 2540 of the given query. For example, each node 37 determines its given level 2410 of the query execution plan 2405 in which it is assigned to participate based on the level assignment data 2547 of the query execution plan data 2540. Each node 37 further determines the query operator execution flow 2433 corresponding to its given level in the query execution plan data 2540. Each node 37 can otherwise determines the query operator execution flow 2433 to be implemented based on the query execution plan data 2540, for example, where the query operator execution flow 2433 is some or all of the full query operator execution flow 2517 of the given query.

The query processing module 2435 of node 37 can execute the determined query operator execution flow 2433 by performing a plurality of operator executions of operators 2520 of its query operator execution flow 2433 in a corresponding plurality of sequential operator execution steps. Each operator execution step of the plurality of sequential operator execution steps corresponds to execution of a particular operator 2520 of a plurality of operators 2520-1-2520-M of a query operator execution flow 2433. In some embodiments, the query processing module 2435 is implemented by a single node 37, where some or all nodes 37 such as some or all inner level nodes 37 utilize the query processing module 2435 as discussed in conjunction with FIG. 24B to generate output data blocks to be sent to other nodes 37 and/or to generate the final resultant by applying the query operator execution flow 2433 to input data blocks received from other nodes and/or retrieved from memory as read and/or recovered records. In such cases, the entire query operator execution flow 2517 determined for the query as a whole can be segregated into multiple query operator execution flows 2433 that are each assigned to the nodes of each of a corresponding set of inner levels 2414 of the query execution plan 2405, where all nodes at the same level execute the same query operator execution flows 2433 upon different received input data blocks. In some cases, the query operator execution flows 2433 applied by each node 37 includes the entire query operator execution flow 2517, for example, when the query execution plan includes exactly one inner level 2414. In other embodiments, the query processing module 2435 is otherwise implemented by at least one processing module the query execution module 2504 to execute a corresponding query, for example, to perform the entire query operator execution flow 2517 of the query as a whole.

The query processing module 2435 to perform a single operator execution by executing one of the plurality of operators of the query operator execution flow 2433. As used herein, an operator execution corresponds to executing one operator 2520 of the query operator execution flow 2433 on one or more pending data blocks 2544 in an operator input data set 2522 of the operator 2520. The operator input data set 2522 of a particular operator 2520 includes data blocks that were outputted by execution of one or more other operators 2520 that are immediately below the particular operator in a serial ordering of the plurality of operators of the query operator execution flow 2433. In particular, the pending data blocks 2544 in the operator input data set 2522 were outputted by the one or more other operators 2520 that are immediately below the particular operator via one or more corresponding operator executions of one or more previous operator execution steps in the plurality of sequential operator execution steps. Pending data blocks 2544 of an operator input data set 2522 can be ordered, for example as an ordered queue, based on an ordering in which the pending data blocks 2544 are received by the operator input data set 2522. Alternatively, an operator input data set 2522 is implemented as an unordered set of pending data blocks 2544.

If the particular operator 2520 is executed for a given one of the plurality of sequential operator execution steps, some or all of the pending data blocks 2544 in this particular operator 2520's operator input data set 2522 are processed by the particular operator 2520 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2520 has performed an execution upon a given data block 2544 to generate one or more output data blocks, this data block is removed from the operator's operator input data set 2522. In some cases, an operator selected for execution is automatically executed upon all pending data blocks 2544 in its operator input data set 2522 for the corresponding operator execution step. In this case, an operator input data set 2522 of a particular operator 2520 is therefore empty immediately after the particular operator 2520 is executed. The data blocks outputted by the executed data block are appended to an operator input data set 2522 of an immediately next operator 2520 in the serial ordering of the plurality of operators of the query operator execution flow 2433, where this immediately next operator 2520 will be executed upon its data blocks once selected for execution in a subsequent one of the plurality of sequential operator execution steps.

Operator 2520.1 can correspond to a bottom-most operator 2520 in the serial ordering of the plurality of operators 2520.1-2520.M. As depicted in FIG. 25C, operator 2520.1 has an operator input data set 2522.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator input data set 2522.1 may only include a proper subset of the full set of input data blocks required for execution of the query at a particular time due to not all of the input data blocks having been read and/or received, and/or due to some data blocks having already been processed via execution of operator 2520.1. In other cases, these input data blocks are read and/or retrieved by performing a read operator or other retrieval operation indicated by operator 2520.

Note that in the plurality of sequential operator execution steps utilized to execute a particular query, some or all operators will be executed multiple times, in multiple corresponding ones of the plurality of sequential operator execution steps. In particular, each of the multiple times a particular operator 2520 is executed, this operator is executed on set of pending data blocks 2544 that are currently in their operator input data set 2522, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2520 has an operator input data set 2522 that includes at least one data block 2544. At this given time, one or more other ones of the plurality of operators 2520 can have input data sets 2522 that are empty. For example, a given operator's operator input data set 2522 can be empty as a result of one or more immediately prior operators 2520 in the serial ordering not having been executed yet, and/or as a result of the one or more immediately prior operators 2520 not having been executed since a most recent execution of the given operator.

Some types of operators 2520, such as JOIN operators or aggregating operators such as SUM, AVERAGE, MAXIMUM, or MINIMUM operators, require knowledge of the full set of rows that will be received as output from previous operators to correctly generate their output. As used herein, such operators 2520 that must be performed on a particular number of data blocks, such as all data blocks that will be outputted by one or more immediately prior operators in the serial ordering of operators in the query operator execution flow 2433 to execute the query, are denoted as "blocking operators." Blocking operators are only executed in one of the plurality of sequential execution steps if their corresponding operator queue includes all of the required data blocks to be executed. For example, some or all blocking operators can be executed only if all prior operators in the serial ordering of the plurality of operators in the query operator execution flow 2433 have had all of their necessary executions completed for execution of the query, where none of these prior operators will be further executed in accordance with executing the query.

Some operator output generated via execution of an operator 2520, alternatively or in addition to being added to the input data set 2522 of a next sequential operator in the sequential ordering of the plurality of operators of the query operator execution flow 2433, can be sent to one or more other nodes 37 in the same shuffle node set 2485 as input data blocks to be added to the input data set 2522 of one or more of their respective operators 2520. In particular, the output generated via a node's execution of an operator 2520 that is serially before the last operator 2520.M of the node's query operator execution flow 2433 can be sent to one or more other nodes 37 in the same shuffle node set 2485 as input data blocks to be added to the input data set 2522 of a respective operators 2520 that is serially after the last operator 2520.1 of the query operator execution flow 2433 of the one or more other nodes 37.

As a particular example, the node 37 and the one or more other nodes 37 in the shuffle node set 2485 all execute queries in accordance with the same, common query operator execution flow 2433, for example, based on being assigned to a same inner level 2414 of the query execution plan 2405. The output generated via a node's execution of a particular operator 2520.$i$ this common query operator execution flow 2433 can be sent to the one or more other nodes 37 in the same shuffle node set 2485 as input data blocks to be added to the input data set 2522 the next operator 2520.$i$+1, with respect to the serialized ordering of the query of this common query operator execution flow 2433 of the one or more other nodes 37. For example, the output generated via a node's execution of a particular operator 2520.$i$ is added input data set 2522 the next operator 2520.$i$+1 of the same node's query operator execution flow 2433 based on being serially next in the sequential ordering and/or is alternatively or additionally added to the input data set 2522 of the next operator 2520.$i$+1 of the common query operator execution flow 2433 of the one or more other nodes in the shuffle node set 2485 based on being serially next in the sequential ordering.

In some cases, in addition to a particular node sending this output generated via a node's execution of a particular operator 2520.$i$ to one or more other nodes to be input data set 2522 the next operator 2520.$i$+1 in the common query operator execution flow 2433 of the one or more other nodes 37, the particular node also receives output generated via some or all of these one or more other nodes' execution of this particular operator 2520.$i$ in their own query operator execution flow 2433 upon their own corresponding input data set 2522 for this particular operator. The particular node adds this received output of execution of operator 2520.$i$ by the one or more other nodes to the be input data set 2522 of its own next operator 2520.$i$+1.

This mechanism of sharing data can be utilized to implement operators that require knowledge of all records of a particular table and/or of a particular set of records that may go beyond the input records retrieved by children or other descendants of the corresponding node. For example, JOIN operators can be implemented in this fashion, where the operator 2520.$i$+1 corresponds to and/or is utilized to implement JOIN operator and/or a custom-join operator of the query operator execution flow 2517, and where the operator 2520.$i$+1 thus utilizes input received from many different nodes in the shuffle node set in accordance with their performing of all of the operators serially before operator 2520.$i$+1 to generate the input to operator 2520.$i$+1.

Figure 25E:
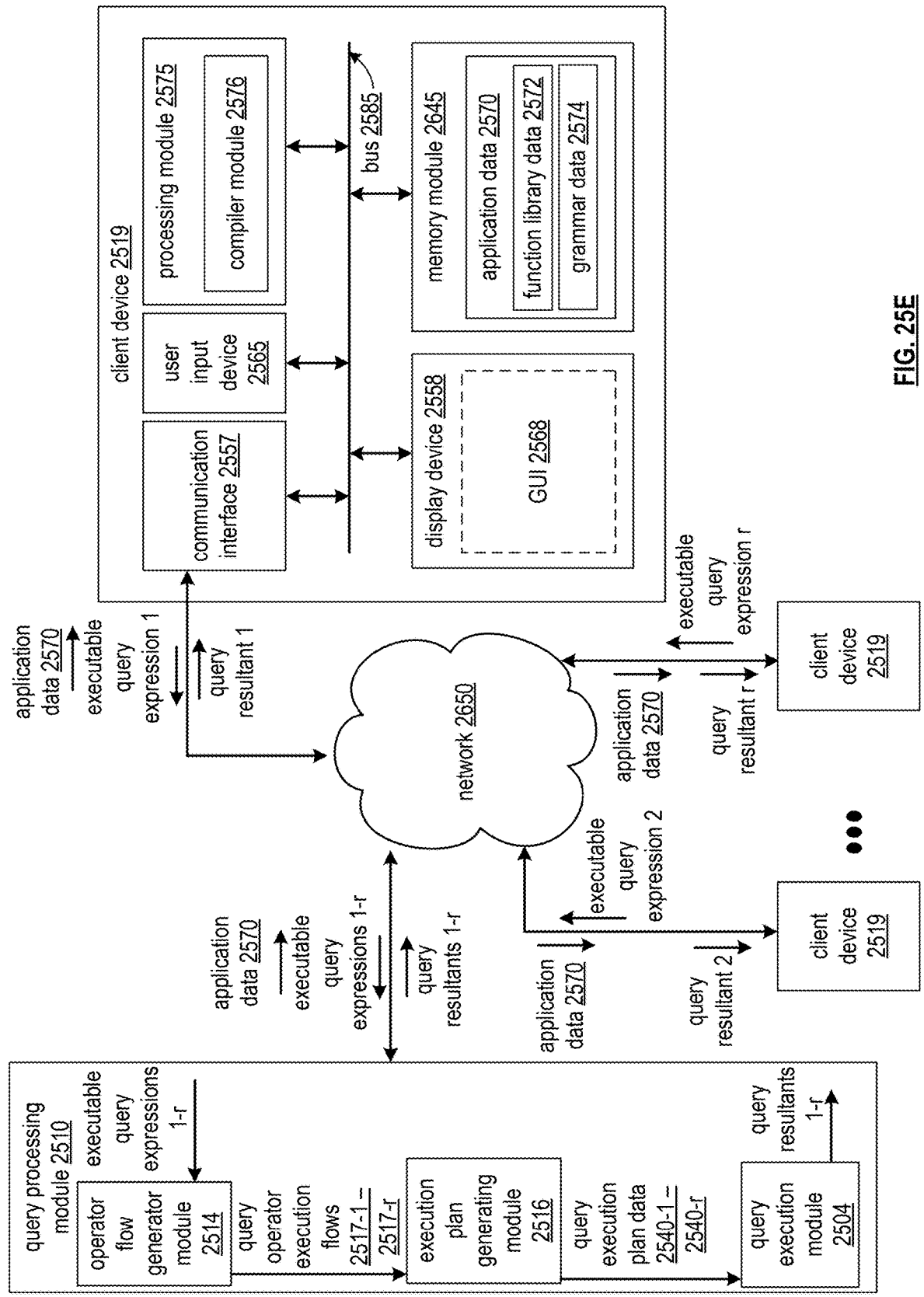
FIG. 25E is a schematic block diagram of a query processing system that communicates with a plurality of client devices in accordance with various embodiments.

FIG. 25E illustrates an embodiment of a query processing system 2510 that communicates with a plurality of client devices. The query processing system 2510 of FIG. 25E can be utilized to implement the query processing system 2510 of FIG. 25A and/or any other embodiment of the query processing system 2510 discussed herein.

In various embodiments, a user can generate their own executable query expression that is utilized to generate the query operator execution flow 2517 of FIG. 25E. The executable query expression can be built from a library of operators that include both standard relational operators and additional, custom, non-relational operators that are utilized implement linear algebra constructs to execute derivates, fractional derivatives, integrals, Fourier transforms, regression machine learning models, clustering machine learning models, etc. A language and corresponding grammar rules can be defined to allow users to write executable query expressions that include the linear algebra constructs.

Rather than rigidly confining the bounds to which the non-relational operators 2524 can be utilized in query execution, the embodiment of FIG. 25E enables users to implement non-relational operators 2524 and/or to create new non-relational operators 2524 from existing non-relational operators 2524 and/or relational algebra operators 2523. This further improves database systems by expanding the capabilities to which mathematical functions and machine learning models can be defined and implemented in query executions. In particular, users can determine and further define particular query functionality based on characteristics of their data and/or of their desired analytics, rather than being confined to a fixed set of functionality that can be performed.

As discussed in conjunction with FIG. 25A-25D, these custom, executable query expressions can be optimized and/or otherwise decentralized in execution via a plurality of nodes. Non-relational operators, such as non-relational operators 2524 and/or custom non-relational functions utilized to implement linear algebra constructs and/or other custom non-relational, are selected and arranged in the query operator execution flow 2517 for execution by a plurality of nodes 37 of a query execution plan 2405. This enables the custom functionality to be optimized and/or otherwise be efficiently processed in a decentralized fashion rather than requiring centralization of data prior to executing the non-relational constructs presented in a corresponding executable query expression.

For example, the query request of FIG. 25C can be expressed as a single, executable query expression that includes and/or indicates the one or more relational query expressions 2553, the one or more non-relational function calls 2554, and/or the one or more machine learning constructs 2555 in accordance with the function library and/or grammar rules of a corresponding language. Executable query expressions of the corresponding language can be broken down into a combination of relational algebra operators 2523 and/or non-relational operators 2524 that can be arranged into a corresponding query operator execution flow 2517 that can be segmented and/or otherwise sent to a plurality of nodes 37 of a query execution plan 2405 to be executed as a query operator execution flow 2433 via the node as illustrated in FIG. 25B. For example, any compliable or otherwise acceptable executable query expression that complies with the function library and/or grammar rules can be processed by the operator flow generator module 2514 to generate a corresponding query operator execution flow 2517 that can be executed in accordance with a query execution plan 2405 in a decentralized fashion.

These executable query expressions can be generated and/or determined automatically by the query processing system 2510 and/or can be received from client devices 2519 as illustrated in FIG. 25E. As illustrated, a plurality of client devices 2519 can bidirectionally communicate with the query processing system 2510 via a network 2650. For example, the network 2650 can be implemented utilizing the wide area network(s) 22 of FIG. 5, the external network(s) 17 of FIG. 2, the system communication resources 14 of FIG. 5, and/or by utilizing any wired and/or wireless network. The query processing system 2510 can receive a plurality of executable query expressions 1-$r$ from a set of client devices 1-$r$, can generate query operator execution flows 2517 for each query expression to facilitate execution of the executable query expressions 1-$r$ via the query execution module 2502 to generate corresponding query resultants 1-$r$. The query processing system 2510 can send the generated query resultants 1-$r$ to the same or different corresponding client device for display. In some embodiments, the client devices 2519 of FIG. 25E implement one or more corresponding external requesting entities 2508 of FIG. 24F.

Client devices 2519 can include and/or otherwise communicate with a processing module 2575, a memory module 2545, a communication interface 2557, a display device 2558, and/or a user input device 2565, connected via a bus 2585. The client device 2519 can be implemented by utilizing a computing device 18 and/or via any computing device that includes a processor and/or memory. Some or all client devices 2519 can correspond to end users of the database system that request queries for execution and/or receive query resultants in response. Some or all client devices 2519 can alternatively or additionally correspond to administrators of the system, for example, utilizing administrative processing 19.

Client devices 2519 can store application data 2570 to enable client devices 2519 to generate executable query expressions. The application data 2570 can be generated by and/or can be otherwise received from the query processing system 2510 and/or another processing module of database system 10. The application data 2570 can include application instructions that, when executed by the processing module 2575, cause the processing module 2575 to generate and/or compile executable query expressions based on user input. For example, execution of the application instruction data 2620 by the processing module 2575 can cause the client device to display a graphical user interface (GUI) 2568 via display device 2558 that presents prompts to enter executable query expressions via the user input device 2565 and/or to display query resultants generated by and received from the query processing system 2510.

The application data 2570 can include and/or otherwise indicate function library data 2572 and/or grammar data 2574, for example, of a corresponding language that can be utilized by a corresponding end user to generate executable query expressions. The function library data 2572 and/or grammar data 2574 can be utilized by the processing module 2575 to implement a compiler module 2576 utilized to process and/or compile text or other user input to GUI 2568 to determine whether the executable query expression complies with function library data 2572 and/or grammar data 2574 and/or to package the executable query expression for execution by the query processing system 2510. The function library data 2572 and/or grammar data 2574 can be displayed via GUI 2568 to instruct the end user as to rules and/or function output and parameters to enable the end user to appropriately construct executable query expressions. For example, the application data 2570 can be utilized to implement an application programming interface (API) to enable construction, compiling, and execution of executable query expressions by the end user via interaction with client device 2519.

The function library data 2572 can include a plurality of functions that can be called and/or included in an executable query expression. These functions can include and/or map to one or more operators of the relational algebra library 2563 and/or the linear algebra library 2564. For example, the relational algebra library 2563 and/or the linear algebra library 2564 stored by the query processing system 2510 can be sent and/or included in application data 2570. As another example, the relational algebra library 2563 and/or the linear algebra library 2564 can store function mapping data that maps the functions indicated in the function library data 2572 to one or more operators of the relational algebra library 2563 and/or the linear algebra library 2564 that can implement the corresponding function when included in a query operator execution flow 2517, for example, in predefined ordering and/or arrangement in the query operator execution flow 2517.

The function library data 2572 can indicate rules and/or roles of one or more configurable parameters of one or more corresponding functions, where the executable query expression can include one or more user-selected parameters of one or more functions indicated in the function library data 2572. The function library data 2572 can indicate one or more user-defined functions written and/or otherwise generated via user input to the GUI 2568 by the same user or different user via a different client device. These user-defined functions can be written in the same language as the executable query expressions in accordance with the function library data 2572 and/or grammar data 2574, and/or can be compiled via compiler module 2576. These user-defined functions can call and/or utilize a combination of other function indicated in function library data 2572 and/or in relational algebra library 2563 and/or the linear algebra library 2564.

Executable query expressions generated via user input to the GUI 2568 and/or compiled by compiler module 2576 can be transmitted to the query processing system 2510 by communication interface 2557 via network 2650. Corresponding query resultants can be generated by the query processing system 2510 by utilizing operator flow generator module 2514 to generate a query operator execution flow 2517 based on the executable query expression; by utilizing execution plan generating module 2516 to generate query execution plan data 2540 based on the query operator execution flow 2517; and/or by utilizing a plurality of nodes 37 of query execution module 2502 to generate a query resultant via implementing the query execution plan 2405 indicated in the query execution plan data 2540, for example, as discussed in conjunction with FIGS. 25A-25D. The query resultant can be sent back to the client device 2519 by the query processing system 2510 via network 2650 for receipt by the client device 2519 and/or for display via GUI 2568.

FIGS. 26A-26J present embodiments of a query processing system 2502 that executes query expressions that include computing window functions. The computing window functions can correspond to adapted window functions of relational query syntax, such as adapted window functions of structured query language (SQL) queries. The computing window functions can be implemented to enable recursive functionality upon relational databases.

Many computational functions are unreasonable to implement in database queries via traditional SQL functions. This includes the class of exponential smoothing functions, such as simple exponential smoothing, double exponential smoothing, triple exponential smoothing, and/or other exponential smoothing functions, which can be useful in analyzing the time-series data stored in the time-series database system. A non-traditional window function can be adapted from a traditional window function of SQL and/or of other relational query languages to include additional parameters enabling a user to reference previous rows and to further reference output of the function about previous rows to implement a recursive process. The row-by-row operation of a traditional window function can be leveraged and extended to implement this non-traditional window that includes references to other rows and utilizes fields of other rows. This can be utilized to implement exponential smoothing functions upon data stored by the database, such as time-series data stored in one or more relational tables 2532. This can alternatively or additionally be utilized to implement other applications such as kernel functions, finite response filters, and/or other digital signal processing applications. This can alternatively or additionally be utilized to implement any other customizable, time-series based recursive function definitions applied to database systems.

The integration of these computing window function can enable a user writing query expression for execution to specify any expression they wish to define computation of a corresponding output, for example, in a row by row fashion upon a set of rows designated in a corresponding window definition. In particular, the computing window function can provide a means by which to compute recursively defined expressions. The computing window function calls 2620 can use same and/or similar syntax as query expressions under existing query languages, such as same or similar syntax as SQL.

The computing window function can further include a first extension to window functions of existing query language such as SQL. The computing window function can introduce prior row index identifiers to enable reference to column values of prior rows. The user-defined expression indicated in the window function can include these prior row index identifiers to reference corresponding column values of other rows, where the user-defined expression is a function of column values of other rows. As a particular example, the value of an immediately previous row in an ordered list of row particular column named "col1" can be referenced as col1[−1]. Example embodiments of prior row index identifiers are discussed in further detail in conjunction with FIGS. 26B-26F.

In particular, computing window function calls 2620 can optionally be implemented to enable reference to existing column values of other rows, relative to the given row. This can be ideal in cases where the recursive definition 2625 requires column values of other rows in addition to the output of the recursive call on other rows. This can also be ideal in cases where the computing window function calls 2620 is implemented for a broader class of functionalities that don't necessarily require recursion, but do require some dependency on column values previous rows.

The computing window function can alternatively or additionally include a second extension to window functions of existing query language such as SQL, a modified form of SQL, another query language that is similar to SQL, another query language that has same or similar function structure and/or syntax as SQL, and/or any other existing query language utilized to execute queries against relational databases and/or non-relational databases. The computing window function can introduce a prior output keyword to enable reference to output values generated by performing the user-defined expression indicated in the window function upon other rows. The user defined expression indicated in the window function can include this prior output keyword to reference corresponding output values of previous rows. For example, the prior row index identifier can follow the prior output keyword to denote which particular rows output is being referenced, where the user-defined expression is a function of output values of other rows. This extension enables recursive functionality. Example embodiments of the prior output keyword are discussed in further detail in conjunction with FIG. 26B-26F.

The computing window function can alternatively or additionally include a third extension to window functions of existing query language such as SQL. In addition to the user-defined expression, the computing window function can be initialized by the user via a base case definition. For example, if the user-defined expression is in accordance with a recursive definition referencing previous output of previous rows, applying the expression upon the first one or more row will ender nulls which could cause all other rows to render null output. An optional base case definition can be implemented as list-type argument of the computing window function call, where each element of the list is an initialization output expression that is utilized calculate the values for the first R rows. In some cases, if the user supplies a single expression for this argument rather than providing a list, this expression can be treated as a list of size one. Example embodiments of the base case definition are discussed in further detail in conjunction with FIG. 26B-26F.

This integration of custom computing window functions as described in conjunction with FIGS. 26A-26J improves the technology of database systems by enabling recursive functionality via simple function calls in query expressions. Furthermore, traditional relational languages such as SQL can be leveraged with small modifications to enable end users to easily write query expressions that can execute recursive functionality as required for many applications. This improves the technology of database systems by allowing additional functions integrated within traditional relational languages to integrate recursive functionality in relational expressions performed upon relational databases. This improves the technology of database systems by allowing recursive functionality to be parallelized and performed across a plurality of nodes to enable efficient query execution at scale.

Figure 26A:
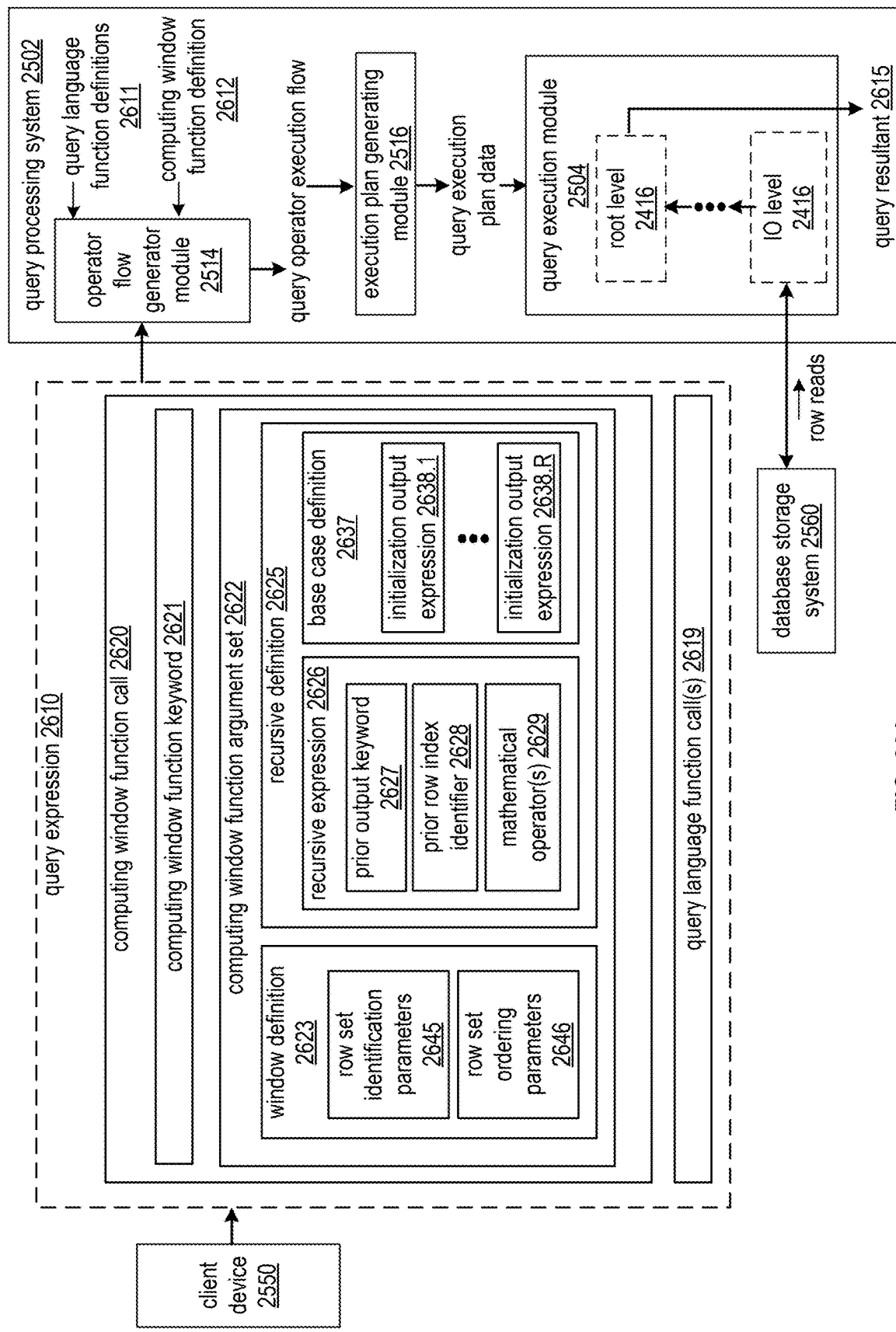
FIG. 26A is a schematic block diagram of a query processing system that processes a query expression that includes a computing window function call in accordance with various embodiments.

FIG. 26A illustrates a query processing system 2502 that processes a query expression 2610 that includes a computing window function call 2620. Some or all features and/or functionality of the query processing system 2502 of FIG. 26A can be utilized to implement the query processing system 2502 of FIG. 25A and/or to implement any other embodiment of the query processing system 2502 discussed herein.

Some query expressions 2610 received from one or more client devices 2550 over time can include function calls to a non-traditional window function described above, for example, in accordance with a computing window function definition 2612. These computing window function calls 2620 can be identifiable and/or parsed by the operator flow generator module 2514 in accordance with the computing window function definition 2612. For example, the computing window function calls 2620 can be written in accordance with a particular structure and/or syntax as required by the computing window function definition 2612.

In some cases, the computing window function calls 2620 can be included within query expressions that are written in accordance with a new and/or custom query language. The computing window function calls 2620 can have its own distinct and/or custom keyword identifying the computing window function that is different from a plurality of other reserved keywords of this new query language and/or is different from keywords utilized for different functions of the new query language. In such cases, a given query expression can include one or more other query function calls 2619 in accordance with the new query language. For example, these query function calls 2619 can be in accordance with the syntax requirements of the new query language and can be identified by corresponding ones of the plurality of reserved keywords of the new query language. The computing window function call 2620 can be integrated within the within query expressions written in accordance with syntax requirements of the new query language and/or other query expression structure requirements of the new query language.

In other cases, the computing window function calls 2620 can be included within query expressions 2610 written in accordance with an existing query language, such as SQL and/or any other query language. However, the computing window function calls 2620 can have their own distinct and/or custom keyword identifying the computing window function. This keyword can be different from a plurality of reserved keywords of the existing query language and/or can be different from keywords utilized for different functions of the existing query language. This keyword can be added to a set of reserved keywords for processing and/or validation by query processing system 2502. In such cases, a given query expression can optionally include one or more other query function calls 2619 in accordance with the existing query language. For example, these query function calls 2619 can be in accordance with the syntax requirements of the existing query language and can be identified by corresponding ones of the plurality of reserved keywords of the existing query language. The computing window function call 2620 can be integrated within the within query expressions written in accordance with syntax requirements of the existing query language and/or other query expression structure requirements of the existing query language.

In these cases where the computing window function calls 2620 are included within query expressions 2610 written in accordance with an existing query language, the computing window function definition 2612 can define the computing window function in the context of the existing query language. For example, the computing window function calls 2620 in a given query expression 2610 can be parsed and/or rewritten as an equivalent expression in the existing query language, for example, utilizing only function calls of the existing query language. As a particular example, parsing of the computing window function calls 2620 in a given query expression 2610 can include rewriting the computing window function calls 2620 as a SQL expression.

In such cases, the rewritten expression in the existing query language that renders the intended functionality of the computing window function call 2620 may be more complicated and/or can otherwise be more difficult and/or timely for a user to determine. For example, it can be less intuitive for users to implement recursive functionality utilizing only traditional SQL functions than implement recursive functionality via embodiments of the computing window function call 2620 described herein. Allowing a user to instead leverage the non-traditional window function defined by computing window function definition 2612 can enhance the user experience by easing the implementation of recursive functionality in SQL queries. This improves the technology of database systems by reducing execution of multiple iterations of query expressions due to human error in writing the appropriate query expression, which can improve efficiency of concurrent query executions in database systems. This improves the technology of database systems by increasing the ease and efficiency that query expressions can be written via user input for implementing recursive functionality. This can be particularly useful in performing analyses on the most recently generated and stored data of the database system, which can be of the most interest to end users, more quickly.

By further integrating the computing window function calls in query expressions of an existing query language such as SQL, end users can implement recursive functionality in database queries without necessitating learning of a new query language. End users may already be familiar with the syntax, grammar rules, function structure, and/or reserved keywords of an existing query language, and need only learn the syntax, grammar rules, function structure, and/or reserved keywords associated with the new computing window function call 2620. As the remainder of a given query expression 2610 that includes computing window function call 2620 can be written in accordance with an existing query language that is known and familiar to end users, the technology of database systems can be further improved by further reducing execution of multiple iterations of query expressions due to human error in writing the appropriate query expression. For example, errors can be reduced as the additional portions query expressions that are written in accordance with SQL queries are familiar to end users. Furthermore, the ease and efficiency that query expressions can be written via user input for implementing recursive functionality can be similarly increased because the additional portions query expressions that are written in accordance with SQL queries are familiar to end users.

Upon receiving the query expression 2610, an equivalent expression in the existing query language can be written and/or determined by the query processing system 2502 from the computing window function call 2620 identified in and/or extracted from a received query expression 2610 based on the computing window function definition 2612. The query processing system 2502 can the process and/or execute this equivalent expression in accordance with the existing query language, for example, in conjunction with processing and/or executing the other query language function calls 2619 of the query expression 2610. This execution of the equivalent expression can render a query resultant 2615, for example, generated discussed in conjunction with FIG. 25A. This query resultant 2615 can be sent back to the client device 2550 for display via GUI 2555. This query resultant 2615 can optionally be stored in database storage system 2560.

For example, the operator flow generator module 2514 can determine query language function definitions 2611 of the query language function call(s) 2619 of the existing query language and/or the new language and/or can determine the computing window function definition 2612 to parse, validate, and/or rewrite the query expression 2610 to generate the query operator execution flow. This can include: identifying the computing window function call 2620 based on the computing window function keyword 2621; identifying the computing window function argument set 2622 based on following and/or being structured in conjunction with the computing window function keyword 2621 in accordance with a syntax and/or structure dictated by the computing window function definition 2612 to determine window definition 2623 and/or recursive definition 2625; parsing the identified computing window function argument set 2622; rewriting the window definition 2623 and/or rewriting the recursive definition 2625 as an expression in accordance with the existing query language; and/or generating a query operator execution flow to include only a plurality of operators in accordance with the existing query language, such as a query operator execution flow that includes only SQL operators. For example, a portion of the resulting query operator execution flow includes one or more SQL operators in a serial and/or parallelized flow that is equivalent to and/or implements the given computing window function call 2620, for example, based on being equivalent to and/or implementing a SQL query expression written from the computing window function call 2620 based on the computing window function definition 2612.

While not illustrated, alternatively or in addition to query language function call(s) 2619 of the existing query language and/or the new language, the query expression 2610 can include one or more function calls to any functions of a function library, such as the function library discussed in conjunction with FIGS. 30A-30D. For example, the query expression 2610 can optionally include: one or more calls to one or more custom table-valued functions of FIGS. 30A-30D; one or more calls to the resampling table-valued function of FIGS. 31A-31C; one or more calls to the extrapolation table-valued function of FIGS. 32A-32C; and/or one or more calls to one or more user-defined functions of FIGS. 33A-33E. In some cases the computing window definition is included in the function library of FIG. 30A and/or FIG. 30E.

In some cases, the query execution plan data 2540 of FIG. 25C can be generated by execution plan generating module 2516 as discussed in conjunction with FIG. 25C to indicate one or more query operator execution flows 2433 to be executed via nodes at one or more corresponding levels of the query execution plan 2405 implemented by query execution module 2405. The one or more query operator execution flows 2433 can be executed by one or more query processing modules, for example, as discussed in conjunction with FIG. 25D. The one or more query operator execution flows 2433 can implement the equivalent expression of the existing query language that is rewritten from and/or otherwise parsed from the computing window function call 2620 included in the query expression 2610.

The query expression 2610 can include one or more words, strings, and/or symbols identifying the call to the computing window function in the new query language or the existing query language computing window function keyword 2621, for example, corresponding to a name of the computing window function keyword 2621. This keyword can be distinct from all other keywords of other functions and/or operators of the query language under which other query language function calls 2619 are written in the query expression 2610. In some cases, this computing window function keyword 2621 can be implemented as an additional reserved keyword, for example, where query expressions 2610 and/or relational tables cannot include column names or other variable names that match the computing window function keyword 2621. The query processing system 2502 can identify and parse a computing window function argument set 2622 of the computing window function call 2620 accordingly to generate the resulting query operator execution flow of the query expression, for example, via operator flow generator module 2514. In particular, the computing window function argument set 2622 can include a window definition 2623 and/or a recursive definition 2625.

The window definition 2623 can indicate an ordered set of rows that the recursive definition 2625 will be performed upon, for example, row by row. The window definition 2623 can include row set identification parameters 2645 identifying the particular set of rows to which the recursive definition 2625 is to be applied. The window definition 2623 can additionally include row set ordering parameters 2646 identifying how the set of rows indicated by row set identification parameters 2645 are to be ordered.

In some cases, the window definition 2623 can be indicated by one or more query language function calls 2619 in the existing query language. For example, one or more SQL window functions identifying the set of rows upon which the window function is to be performed row by row and/or ordering the set of rows can be included in the query expression and can be utilized as the window definition 2623 for the computing window function argument set 2622 of the computing window function call 2620. As a particular example, an OVER clause and/or an ORDER BY clause of the query expression 2610 in accordance with SQL can be implemented as some or all of the window definition 2623. As another example, a SELECT statement of the query expression 2610 in accordance with SQL can identify a relational table 2532 that includes the set of rows and can be implemented as some or all of the window definition 2623. In some cases, the computing window function definition 2612 requires that only a left half frame with no peers is defined in window definition 2623. For example, a compile error and/or validation error is returned if a window definition 2623 specifying anything other than a left half frame with no peers is specified in the query expression 2610 and/or the query expression is not executed in this case. Examples embodiments of the window definition 2623 are discussed in further detail in conjunction with FIGS. 26B and 26F.

The recursive definition 2625 can indicate the recursive function to be performed, row by row, upon the ordered set of rows identified in the window definition 2623. The recursive definition can indicate a recursive expression 2626 and/or a base case definition 2637. The execution of the recursive definition 2625 upon an ordered set of rows to render output for each row is discussed in further detail in conjunction with FIGS. 26G-26I.

The base case definition 2637 can indicate one or more initialization output expressions 2638 to be applied to a corresponding first one or more rows in the ordered set of rows. This can include any number R of initialization output expressions, for example, where the value of R is determined based on a number of previous rows required by the recursive expression 2626. In particular, if R previous rows are required by the recursive expression to be performed on a particular row, the recursive expression 2626 cannot be performed upon the first R rows and initialization output expressions 2638 must be applied to the first R rows. Each initialization output expression 2638 can be written as a constant value, a traditional query expression in the existing query language such as a SQL subquery, and/or another expression. In some cases, one or more initialization output expressions 2638 are defined as functions of one or more previous outputs of previous rows in a similar fashion as the recursive expression 2626. For example, one or more initialization output expressions 2638 can be defined as a function of previous initialization output expressions and/or existing column values of the given row and/or one or more previous rows, where the number of one or more previous rows is less than R and is further less than or equal to the total number of previous rows from the given row in the ordered row set. For example, the initialization output expressions 2638.3 for a third row in the ordered row set can be expressed as a function of two prior rows because the first row and second row are prior to the third row in the ordered row set.

The recursive expression 2626 can indicate an expression to be performed on the remaining set of rows after the first R rows. For example, the recursive expression 2626 can be performed for each row after the first R rows in the ordered row set defined by the window definition 2623 to generate output values for each of these rows. In particular, the recursive expression can be a function of one or more output values of up to R previous rows. The recursive expression can optionally further be a function of one or more existing column values of the given row. The recursive expression can optionally further be a function of one or more existing column values of up to R previous rows.

The output value of a previous row can be indicated in the recursive expression by a prior output keyword 2627. This prior output keyword can be distinct from all other keywords of other functions and/or operators of the query language under which other query language function calls 2619 are written in the query expression 2610, and can further be distinct from the computing window function keyword 2621. In some cases, this prior output keyword 2627 can be implemented as an additional reserved keyword, for example, where query expressions 2610 and/or relational tables cannot include column names or other variable names that match the prior output keyword 2627.

The particular previous row relative to the given row can be indicated by a prior row index identifier 2628. The prior row index identifier 2628 can optionally be identified as an integer value indicating a number of rows previous to the given row being accessed. In some cases, the computing window function definition 2612 can require that the prior row index identifier 2628 be a constant value rather than an expression to be evaluated. This can ensure that a same set of rows relative to the given row are accessed for generating the output value of each given row via the recursive expression 2626 and/or can minimize compiling and/or runtime errors associated with improper indices evaluated as the prior row index identifier 2628 via evaluation of an expression.

The prior row index identifier 2628 can optionally be denoted with a negation symbol, such as a '-' character to denote the corresponding integer value as a negative number, for example, to intuitively denote that the corresponding index is prior to the given row in the ordered set of rows. In some cases, the computing window function definition can necessitate that the prior row index identifier 2628 be lead with the negation symbol, for example, to enforce that only column values and/or output values of rows prior to the given row in the ordered set of rows can be accessed in the recursive expression 2626 and/or to otherwise enforce the syntax that includes the negation symbol.

The recursive expression 2626 can further include one or more mathematical operators 2629 and/or numerical constants. For example, recursive expression 2626 defines mathematical function to be performed upon one or more prior rows indicated by one or more corresponding instances of the prior output keyword 2627 and/or one or more corresponding prior row index identifiers 2628 based on the one or more mathematical operators 2629 and/or numerical constants. The mathematical operators 2629 and/or numerical constants of the recursive expression 2626 can be in accordance with syntax and/or grammar rules of the query language under which the query language function calls 2619 are written, such as SQL, another existing query language, and/or a new query language as discussed previously.

In particular, the prior index identifier 2628 can follow and/or can otherwise index the prior output keyword 2627 to indicate which particular row from which prior output is being utilized. For example, the prior output is already determined for this particular previous row via execution of the recursive expression upon the previous row and/or via a corresponding initialization output expression 2638. The determined value for this prior output can substitute and/or replace the prior output keyword 2627 and prior index identifier 2628 in the corresponding recursive expression 2626 in executing the recursive expression 2626 to compute the output for the given row.

In some cases, the recursive expression 2626 further includes one or more column identifiers to enable the recursive expression 2626 to be a function of one or more existing column values of the given row and/or previous rows. In some cases, prior index identifier 2628 can follow and/or can otherwise index column identifiers of the ordered set of rows, such as column names of the corresponding relational table 2532 and/or user defined column names, to indicate which particular row from which existing column values is being utilized. The determined value for this identified column of the indicated prior row can substitute and/or replace the column name and prior index identifier 2628 in the corresponding recursive expression 2626 in executing the recursive expression 2626 to compute the output for the given row. In some cases, a column name followed by and/or indexed by no prior index identifier 2628 can denote that the corresponding column value for the given row is to be utilized. The determined value for this identified column of given row can substitute and/or replace the column name in the corresponding recursive expression 2626 in executing the recursive expression 2626 to compute the output for the given row.

Figure 26B:
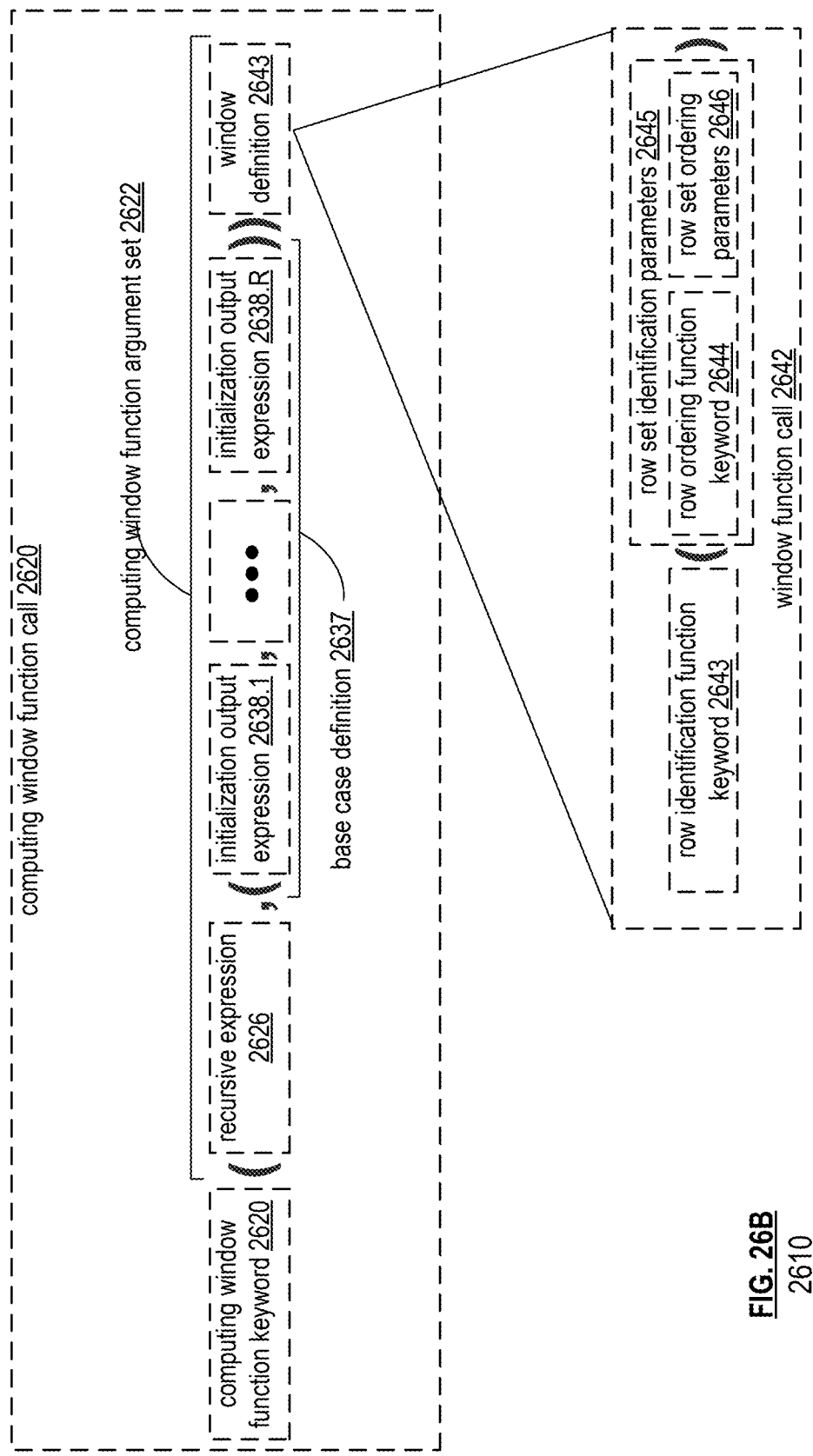
FIG. 26B illustrates an embodiment of the structure of a computing window function call of a query expression in accordance with various embodiments.

FIG. 26B illustrates an example structure of the computing window function call 2620 of FIG. 26A. The computing window function keyword 2621 can be followed by the computing window function argument set 2622. For example, the recursive definition 2625 is included within parenthesis or other bracketing symbols following the computing window function keyword 2621. The first argument within the parenthesis can denote the recursive expression 2626, followed by the base case definition 2637. These arguments can be delimited by a comma and/or by any other delimiter symbol. The arguments of recursive definition 2625 can alternatively be presented in another order. The function call and list of arguments can optionally be formatted to match the syntax of other function calls in the existing query language. The syntax and/or formatting requirements of the function call and list of arguments can be defined and/or indicated in the computing window function definition 2612.

The base case definition 2637 can be presented as a list structure, for example, where the set of initialization output expressions 2638.1-2638.R are included as an ordered list within its own set of parenthesis or other bracketing symbols, separated by commas or other delimiters. In cases where only one initialization output expression 2638 is required due to the value of R being equal to one, the corresponding expression is optionally not included within its own set of parenthesis. For example, the list can be formatted to match the syntax of just structures in the existing query language. The syntax and/or formatting requirements of the list of initialization output expressions can be defined and/or indicated in the computing window function definition 2612.

The window definition 2623 can optionally be included after the parenthesis-bound recursive definition 2625 as illustrated in FIG. 26B. In other cases, some or all of the window definition 2623 is included as an additional argument within the parenthesis or other bracketing symbols following the computing window function keyword 2621.

The window definition 2623 can optionally be expressed as a window function call 2642. For example, the entire window function call 2642 can be in accordance with window functions of the existing query language. The window function call 2642 can include a row identification function keyword 2643 denoting a windowing function to identify the set of rows. The row identification function keyword 2643 can be a reserved keyword corresponding to a window function of the query language, such as "OVER" when the query language is SQL. The row identification function keyword 2643 can be followed by some or all of the row set identification parameters 2645, for example, indicating a subset and/or partition of a set of rows in a table identified in a SELECT function of the query expression.

The row identification function keyword 2643 can be followed by a row ordering function keyword 2644 and corresponding row set ordering parameters. The row identification function keyword 2643 can be a reserved keyword corresponding to a window function of the query language, such as "ORDER BY" when the query language is SQL. The row identification function keyword 2643 can be followed by some or all of the row set ordering parameters 2646, such as the name or one or more columns of the set of rows by which the identified set of rows is to be ordered and/or an ordering scheme defining how the values of the denoted one or more columns of the set of rows are to be ordered.

Figure 26C:
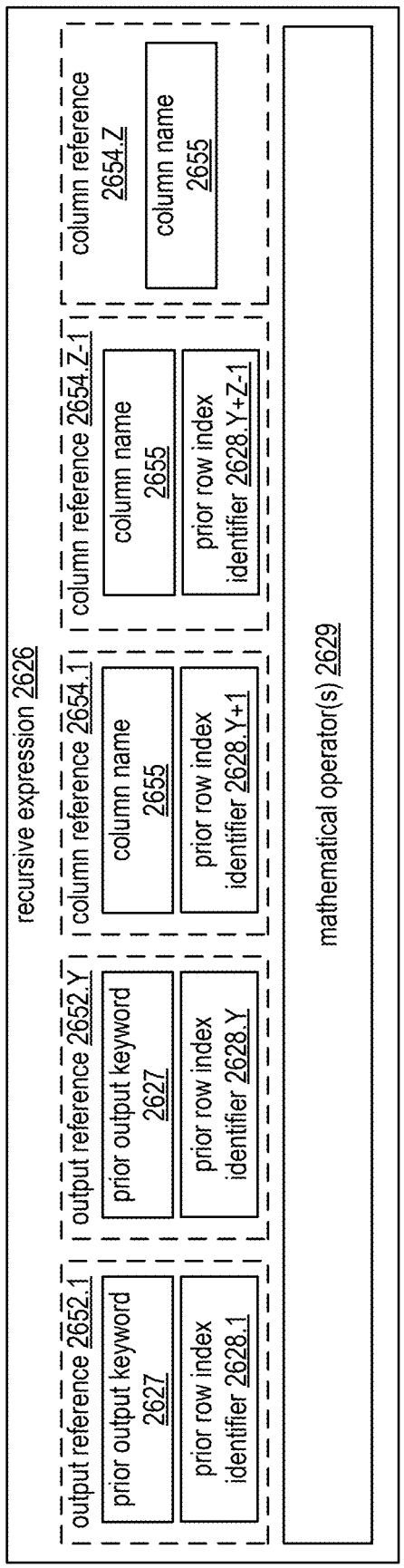
FIG. 26C is an embodiment of a recursive expression of a computing window function call in accordance with various embodiments.

FIG. 26C illustrates an example embodiment of a recursive expressions 2626. The embodiment of recursive expressions 2626 of FIG. 26C can be utilized to implement the recursive expression 2626 of FIG. 26A and/or any other embodiments of recursive expression 2626 discussed herein.

A recursive expression 2626 can include one or more output references 2652, depicted as a number Y of output references 2652.1-2652.Y. Each output reference 2652 can be indicated by a same prior output keyword 2627, which can be implemented as its own reserved keyword, for example, in addition to a plurality of reserved keywords of the corresponding query language.

Each output reference 2652 can be denoted with a corresponding prior row index identifier 2628. Note that some prior row index identifiers 2628.1-2628.Y may have different integer values to denote reference to different previous outputs relative to the given row. In particular, the recursive expression may require and/or include reference to multiple ones of up to R previous output values. Note that some prior row index identifiers 2628.1-2628.Y may have same integer values to denote reference to same previous outputs relative to the given row. In particular, the recursive expression may require and/or include reference to same previous output multiple times. In some cases, all of the prior row index identifiers 2628.1-2628.Y of output references 2652.1-2652.Y are integer values with absolute values that are greater than or equal to 1 and less than or equal to R. The value of Y can correspond to any integer number greater than or equal to one, and can optionally be greater than R when some prior outputs are referenced multiple times.

For example, executing a recursive expression for a given row can include replacing instances of each output reference 2652 with a corresponding output value computed for a previous row indexed a number of rows prior to the given row in an ordered row set determined based on the window definition 2623, where this number of rows prior to the given row is denoted by and/or equal to the value of the corresponding prior row index identifier 2628 of the given output reference 2652. This is discussed in further detail in conjunction with FIGS. 26G-26I.

A recursive expression 2626 can alternatively or additionally include one or more column references 2654 depicted as a number Z of column references 2654.1-2654.Z. Each column reference 2654 can be indicated by a particular column name 2655, which can be indicated by the user and/or known to the database storage system based on rows in a corresponding relational table 2532. These column references 2654 can correspond to values of existing columns of the corresponds rows 2530 being utilized for the recursive definition based on the window definition 2623. For example, the values of these columns are read from the database storage system based on being included as one or more fields of the corresponding rows. As another example, the values of these columns are previously computed, for example, based on executing prior query expressions and/or based on executing other types of query expressions discussed herein to generate relational tables.

Note that all references to a particular column will have the same, identifying column name 2655. The column references 2654.1-2654.Z can optionally include references to multiple different columns of rows 2530 of a given relational table 2532. References to different columns of rows 2530 are denoted with different identifying column names 2655.

Some column references 2654 can correspond to references to columns of prior rows. These are denoted with a corresponding prior row index identifier 2628. For example, the column references 2654.1-2654.Z−1 correspond to references to columns of prior rows based on each having a prior row index identifier 2628. Note that some prior row index identifiers 2628.Y+1-2628.Y+Z−1 may have different integer values to denote reference to column values for different previous rows relative to the given row. In particular, the recursive expression may require and/or include reference to values of a particular column for up to R previous rows. Note that some prior row index identifiers 2628.Y+1-2628.Y+Z−1 may have same integer values to denote reference to values of a same column of a same previous row relative to the given row. In particular, the recursive expression may require and/or include reference to same column value of a previous row multiple times. Note that some prior row index identifiers 2628.Y+1-2628.Y+Z−1 may have same integer values to denote reference to values of multiple different columns of a same previous row relative to the given row. In particular, the recursive expression may require and/or include reference to multiple column values of a given previous row. In some cases, all of the prior row index identifiers 2628.Y+1-2628.Y+Z−1 of column references 2654.1-2654.Z−1 are integer values with absolute values that are greater than or equal to 1 and less than or equal to R. The value of Z−1 can correspond to any integer number greater than or equal to one, and can optionally be greater than R when some prior rows are referenced multiple times and/or when multiple columns of a same row are referenced. Such column references 2654 with references to columns of prior rows as described herein can optionally be included in expressions for any other types of function calls of query expressions 2610, such in custom table-valued function calls of FIGS. 30A-30D; in extrapolation table-valued function calls of FIGS. 33A-3C; in new function calls created in user-defined function creation function calls as described in 33A-33E; and/or in any other types of function call described herein.

Some column references 2654 can correspond to references to columns of the given row. In this example, column reference 2654.Z corresponds to a column reference to a column value of the given row. Note that any number of additional column references 2654 to columns of the given row can be included to reference the same or different column of the given row. These column references can again include the column name 2655 of the corresponding column.

In some cases, only the column name of the given column is included with no prior row index identifier 2628 to denote that the column value of the given row is to be utilized. As a particular example, column references 2654 to columns of the given row can be implemented in accordance with syntax of the existing query language, such as SQL. Column references 2654 to columns of the given row can be implemented in accordance with syntax of references to columns of the given row as used in window function calls 2642 of the existing query language. Column references 2654 for column values of the given row can otherwise be implemented with no prior row index identifier 2628. In other embodiments, a prior row index identifier 2628 with a particular value, such as an integer value of zero, can optionally be included for references to columns of the given row to denote the column value of the given column is being referenced rather than a column value of a prior column.

For example, executing a recursive expression for a given row can include replacing instances of each column reference 2654 with a corresponding column value read from and/or otherwise determined for a previous row indexed a number of rows prior to the given row in an ordered row set determined based on the window definition 2623, where this number of rows prior to the given row is denoted by and/or equal to the value of the corresponding prior row index identifier 2628 of the given column reference 2654. If no prior row index identifier 2628 is included for the given column reference 2654, the column reference is instead replaced with a corresponding column value read for and/or otherwise determined for the given row. This is discussed in further detail in conjunction with FIGS. 26G-26I.

Figure 26D:
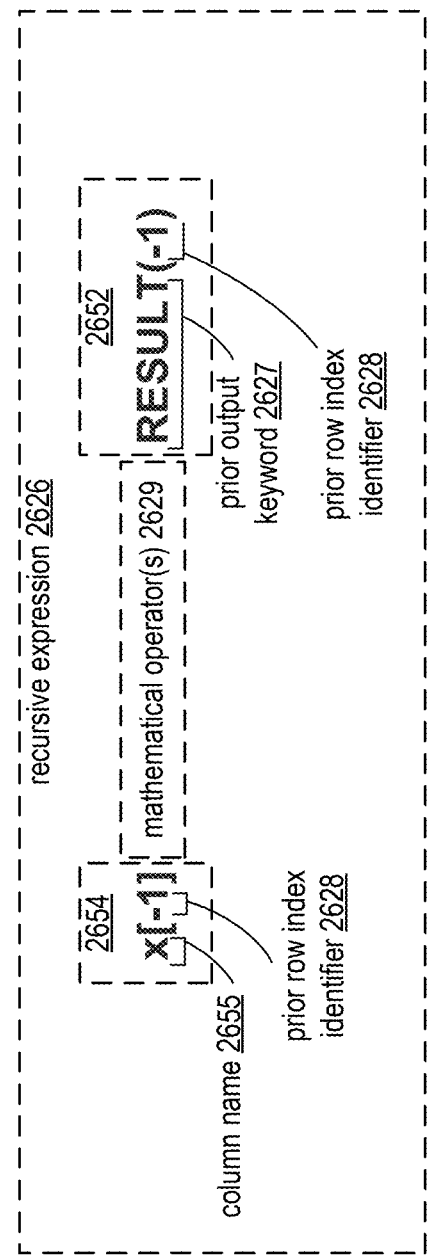
FIG. 26D is an example embodiment of the structure of a recursive expression of a computing window function call in accordance with various embodiments.

FIG. 26D illustrates another example embodiment of a recursive expressions 2626. The embodiment of recursive expressions 2626 of FIG. 26D can be utilized to implement the recursive expression 2626 of FIG. 26C, of FIG. 26A, and/or any other embodiments of recursive expression 2626 discussed herein.

In this example, a particular column reference 2654 is expressed as "x[−1]". Here, a column with column name "x" is referenced based on the column reference 2654 indicating "x". The value of column "x" for an immediately previous row 2530 is being referenced based on the prior row index identifier 2628 for column reference 2654 being '−1'. Note that in this example, the syntax for column reference 2654 includes bracketing the prior row index identifier 2628 after the corresponding column name 2655 in T and T characters. In other embodiments, parenthesis or other bracketing symbols can alternatively be used, for example, based on corresponding syntax of the computing window function definition 2612.

In this example, a particular output reference 2652 is expressed as "RESULT(−1)". In this case, the prior output keyword 2627 is "RESULT", for example, based on this string being denoted as the prior output keyword 2627 in the computing window function definition 2612 and based on this string being distinct from other reserved keywords of the existing query language. The value of output for an immediately previous row 2530 is being referenced based on the prior row index identifier 2628 for output reference 2652 being '−1'. Note that in this example, the syntax for output reference 2652 includes bracketing the prior row index identifier 2628 after the corresponding prior output keyword 2627 in '(' and ')' characters. In other embodiments, square brackets or other bracketing symbols can alternatively be used, for example, based on corresponding syntax of the computing window function definition 2612. In other embodiments, bracketing characters for the prior row index identifiers 2628 of output references 2652 can be the same as or different from bracketing characters for the prior row index identifiers 2628 of column references 2654.

Figure 26E:
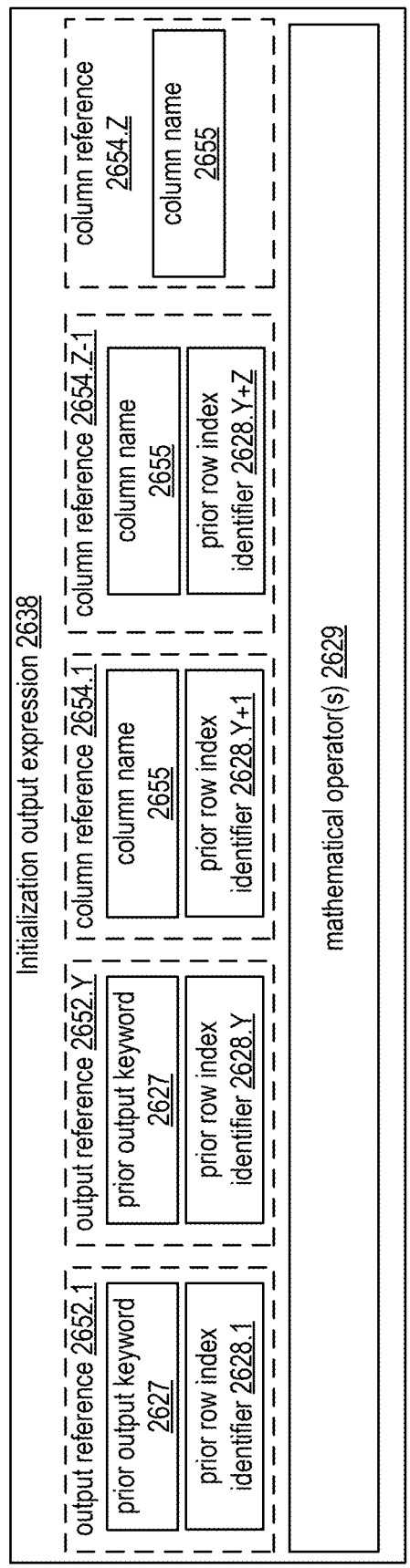
FIG. 26E is an embodiment of an initialization output expression of a computing window function call in accordance with various embodiments.

FIG. 26E illustrates an example embodiment of an initialization output expression 2638. The embodiment of initialization output expression 2638 of FIG. 26C can be utilized to implement the initialization output expression 2638 of FIG. 26A and/or any other embodiments of initialization output expression 2638 discussed herein.

As illustrated in FIG. 26E, the initialization output expression 2638 can optionally have a same structure as recursive expressions 2626 of FIG. 26C. The output references and column references 2654 of initialization output expressions 2638 can optionally have a same syntax structure as recursive expressions 2626, such as the syntax structures discussed in conjunction with FIG. 26D.

Note that the numbers Y and Z of output references and column reference, respectively, can be different from the numbers Y and Z of a corresponding recursive expressions 2626 of FIG. 26C. Note that the numbers Y and Z of output references and column reference, respectively, can be different for different ones of the initialization output expression 2638.1-2638.R. Note that the mathematical operations 2629 performed on output references 2652 and column references 2654 of a initialization output expression 2638 can be the same as or different from the mathematical operations 2629 performed upon output references 2652 and column references 2654 of the corresponding recursive expression 2626. Note that the mathematical operations 2629 performed on output references 2652 and column references 2654 of an initialization output expression 2638 can be the same as or different from the mathematical operations 2629 performed upon output references 2652 and column references 2654 of different initialization output expression 2638.

Note that a given initialization output expression 2638.*i* does not include output references 2652 or column references 2654 with prior row index identifiers 2628 denoting more than i−1 rows prior to the given row, based on initialization output expression 2638.*i* corresponding to the ith row. For example, the prior row index identifiers 2628 cannot have integer values with absolute values greater than i or equal to i. As a particular example, the initialization output expression 2638.1 has no output references 2652 and has no column references 2654 with prior row index identifiers 2628. For example, the initialization output expression 2638.1 can be a function of only column references 2654 for columns of the given row, denoted by column name 2655 only.

Figure 26F:
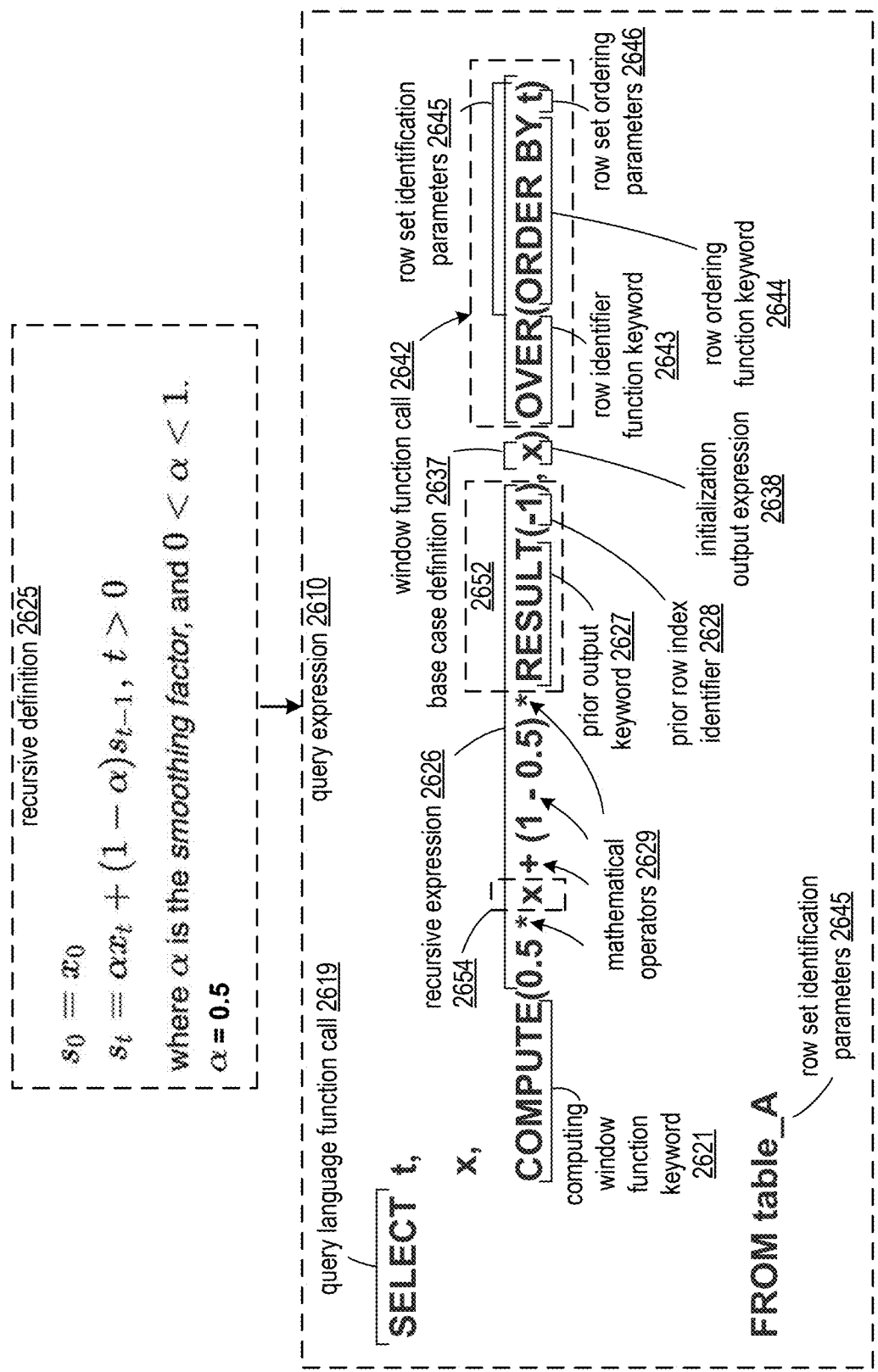
FIG. 26F is an example embodiment of the structure of a computing window function that implements an exponential smoothing function in accordance with various embodiments.

FIG. 26F illustrates an example embodiment of a query expression 2610 that includes a computing window function call 2620. The computing window function call 2620 of query expression 2610 depicted in FIG. 26F can correspond to an example computing window function call 2620 of FIG. 26A and/or FIG. 26B. The query expression 2610 in this example includes a computing window function call 2620 that implements the following example recursive definition 2625 for an exponential smoothing function:

$$s_0 = x_0$$

$$s_t = \alpha x_t + (1-\alpha)s_{t-1}, t>0$$

where α is the smoothing factor, and 0<α<1.

This can be expressed as the following computing window function call 2620 with the smoothing factor is set as 0.5:

COMPUTE(0.5*x+(1−0.5)*RESULT(−1),x)OVER (ORDER BY *t*)

Note that in this example, the computing window function call is expressed utilizing syntax extended from and/or based on SQL syntax. This computing window function call can be executed upon a set of rows with a column "t" and a column "x". For example, row in the set of rows can have values of column t that increment by 1 based on the rows corresponding to time-series data.

In this example, the computing window function keyword 2621 is "COMPUTE." The particular the recursive expression 2626 is based upon $s_t$ in the example recursive definition 2625, and can be written as 0.5*x+(1−0.5)*RESULT (−1). In particular, the prior output keyword 2627 is "RESULT" and the prior row index identifier is the value "−1", denoted as a negative index via the use of '−' as the negation symbol. In this case, the syntax requirements for the computing window function as denoted by the computing window function definition 2612 can require that the prior row index identifier for prior output follow the prior output keyword 2627 bracketed by parenthesis.

In this example, the base case definition 2637 includes a single initialization output expression 2638 indicated as "x", based on $s_0$ being set to $x_0$ in the example recursive definition 2625. This denotes that output of the first row in the ordered set of rows set to its value for column x. The instance of the single initialization output expression 2638 can further denote that all rows after the first row have their output generated by applying the recursive expression 2626 based on only including one initialization output expression 2638.

The window definition 2623 denotes that the set of rows upon which this function is performed be ordered by the values of column t. Note that the window definition 2623 in this example is expressed as a window function call 2642 of FIG. 26B as OVER(ORDER BY t) in accordance with SQL syntax.

This computing window function call 2620 can be included as part of a larger query expression written in accordance with SQL syntax. In this example, query expression 2610 is expressed as:

```
SELECT t,
    x,
    COMPUTE(0.5 * x + (1 - 0.5) * RESULT(-1), x)
    OVER(ORDER BY t)
FROM table_A.
```

In this example, the columns t, x, and a new output column generated via the computing window function call 2620 are returned for the rows in table_A. For example, table_A is a relational table 2532 stored by database storage system 2560.

In other examples, additional query function calls and/or more complex functionality in addition to computing window function call 2620 can be included in query expression 2610. In some cases, table_A is instead generated and/or returned based on execution of previous query expressions 2610 and/or based on execution of other function calls within the same query expression 2610. For example, table_A is generated via execution of a table-valued function of the existing query language and/or as output of other expression of the existing query language. As another example, a call to a custom table-valued function of FIGS. 30A-30D is included in the a given query expression 2610, where a result set outputted by this custom table-valued function is utilized as the row set upon which a computing window function call 2620 included in the same query expression 2610 is performed. As a particular example, the rows can first undergo resampling to institute fixed intervals for the value of t via the resampling table-valued function of FIGS. 31A-31B. As an example of executing this example query expression 2610 of FIG. 26F is illustrated and discussed in conjunction with FIG. 26I.

Figure 26G:
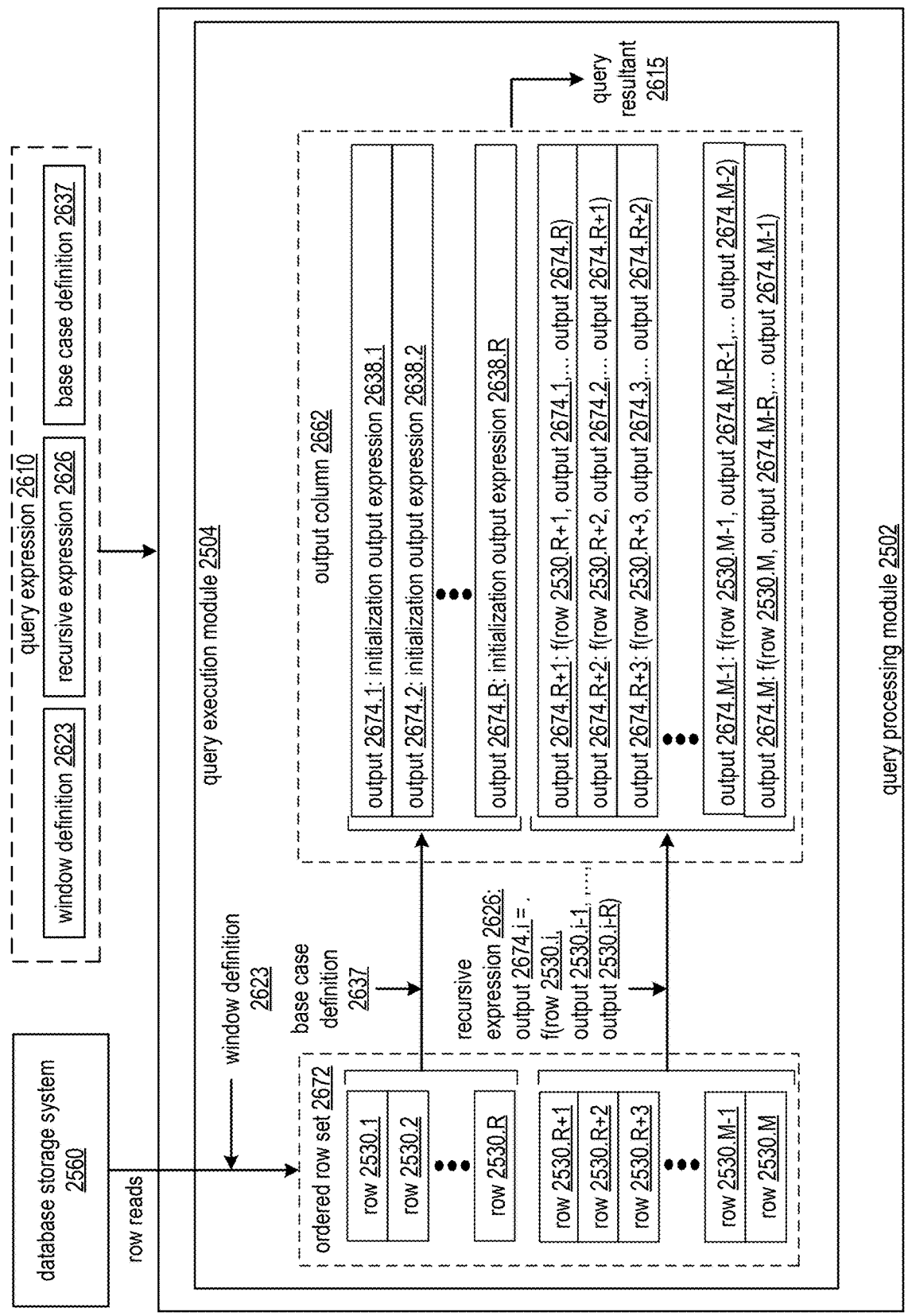
FIGS. 26G-26H are schematic block diagrams of a query processing system that generates an output column based on processing a query expression that includes a computing window function call in accordance with various embodiments.
Figure 26H:
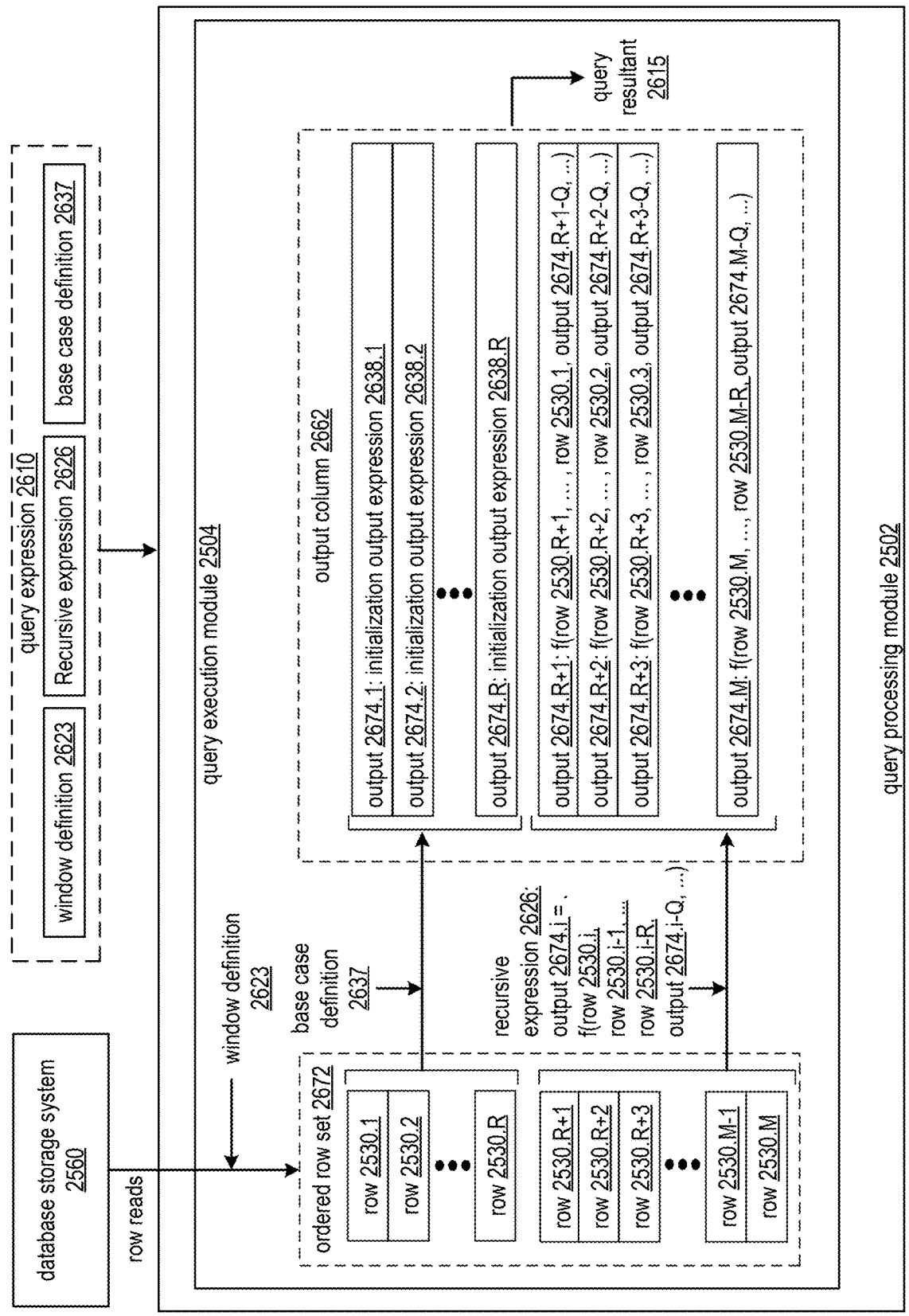

FIGS. 26G-26H illustrate an example of execution of a query based on a query expression 2610 that includes a computing window function call 2620 by a query execution module 2504. Some or all features and/or functionality of the query execution module 2504 of FIG. 26G can be utilized to implement the query execution module 2504 of FIG. 26A and/or any other embodiment of query execution module 2504 discussed herein.

The query execution module 2504 can generate an ordered row set 2672 by utilizing the window definition 2623 of the query expression 2610. This can include performing row reads to rows 2530 of one or more relational tables 2532 of database storage system 2560. For example, these row reads can be performed by one or more nodes 37 at IO level 2416 of a corresponding query execution plan 2405, where the nodes access their own rows 2530 stored in segments and/or otherwise stored in memory drives of these nodes 37.

The ordered row set 2672 can further be generated via collecting, filtering, and/or ordering the read rows 2530 in accordance with the window definition 2623. In some cases, this includes only retrieving and/or including particular columns of the set of rows that are required for access in the given query based on the recursive expression 2626 and/or base case definition 2637.

The determining of ordered row set can optionally be performed by one or more nodes 37 at an inner level 2414 of the query execution plan 2405 and/or a node 37 at root level 2412 of the query execution plan 2405. For example, a single node and/or single query processing module can receive and order the set of rows based on executing corresponding query operators of query operator execution flow 2433 as discussed in conjunction with FIG. 25D. This single node can optionally perform and/or generate output for the full ordered row set 2672 based on executing corresponding query operators of query operator execution flow 2433 as discussed in conjunction with FIG. 25D. This can be ideal to the dependency upon other rows. As another example, a set of multiple nodes at inner level 2414 can receive and/or determine distinct, sequential portions of ordered subsets of the ordered set of rows, and can optionally generate output for their ordered subsets based on executing corresponding query operators of query operator execution flow 2433 as discussed in conjunction with FIG. 25D.

Once the ordered row set 2672 is determined, for example, via one or more nodes 37, an output column 2662 can be generated for the set of rows, where each output value 2674 of output column 2662 corresponds to an output of the recursive definition 2625 for the corresponding row 2530. In particular, a set of output values 2674.1-2674.M are generated for each of the M rows 2530 in the ordered row set 2672.

The first set of output values 2674.1-2674.R are generated based on base case definition 2637. This can include evaluating each initialization output expression 2638.1-2638.R. This can require evaluating each initialization output expression 2638.1-2638.R in order, starting from initialization output expression 2638.1, if some initialization output expressions are dependent on output generated via evaluating previous initialization output expressions. Note that a given initialization output expression 2638.i can be a function of: values of one or more existing columns of the corresponding row 2530.i; values of one or more existing columns of less than R previous rows 2530; and/or values of one or more output values 2674 of less than R previous rows 2530. In some cases, a given initialization output expression 2638.*i* can include the prior output keyword and corresponding prior row index identifier 2628 and/or can include one or more mathematical operators 2629. In some cases, a given initialization output expression 2638.*i* is alternatively set as a constant value and/or a value of an existing column of the corresponding row.

Note that the first initialization output expression 2638.1 cannot be a function of any previous rows. Note that a given initialization output expression 2638.*i* cannot be a function of existing columns and/or output values for rows that are greater than or equal to i rows prior to the given row 2530.*i* in the ordered row set 2672. For example, if a third initialization output expressions 2638 for a third row is included in the base case definition 2637, its initialization output expression 2638.*i* can include prior row index identifiers 2628 of −1 or −2, but can never include prior row index identifier 2628 with absolute values greater than or equal to −3. In some cases, these requirements can be checked and/or confirmed by a query expression validation module discussed in further detail in conjunction with FIG. 26J.

The remaining set of output values 2674.R+1-2674.M are generated based on recursive expression 2626 by evaluating the recursive expression 2626 for each row 2530.R+1+ 2530.M. For example, the recursive expression 2626 is evaluated for each row 2530.R+1+2530.M after the first set of output values 2674.1-2674.R are generated, in order, starting from initialization output expression 2638. R+1.

The recursive expression 2626 can be the same for all remaining rows based on a single recursive expression 2626 being indicated in the query expression 2610. The recursive expression 2626 can denote that output value 2674.*i* for a corresponding row 2530.*i* is a function of: one or more existing columns of the given row 2530; one or more existing columns of up R previous rows 2530; and/or one or more output values 2674 of up to R previous rows 2530. Note that some prior rows may be "skipped." For example, output value 2674.*i* for a given row 2530.*i* can be a function of existing columns and/or output values for prior row 2530.*i*−2, but not existing columns and/or output values for row 2530.*i*−1.

In the example illustrated in FIG. 26G, the recursive expression 2626 is a function of some or all of R prior outputs and one or more columns of the given row. For example, the recursive expression 2626 is a function of some or all of R prior outputs based on the recursive expression 2626 including at least one output reference 2652 with a prior row index identifier 2628 for some or all of R different values, such as having a set of output references 2652 with prior row index identifiers 2628 with integer values having absolute values in the inclusive range of 1-R. Additionally, the recursive expression 2626 can be a function of the given row based on the recursive expression 2626 including at least one column reference 2654 with no prior row index identifier 2628.

In the example illustrated in FIG. 26G, the recursive expression 2626 is a function of the given row, existing columns of some or all of R prior rows, and of one prior output that is Q rows prior to the given row, where Q is less than or equal to R. For example, the recursive expression 2626 is a function of the given row based on the recursive expression 2626 including at least one column reference 2654 with no prior row index identifier 2628. Additionally, the recursive expression 2626 can be a function of some or all of R prior rows based on the recursive expression 2626 including at least one column reference 2654 for one or more different columns with a prior row index identifier 2628 for some or all of R different values, such as having a set of column references 2654 with prior row index identifiers 2628 with integer values having absolute values in the inclusive range of 1-R. Additionally, the recursive expression 2626 can be a function of the prior output based on the recursive expression 2626 including at least one output reference 2652 with a prior row index identifier 2628 with an integer value having an absolute value equal to Q and/or otherwise referencing output of Q rows prior to the given row.

Note that in some embodiments, the recursive expression 2626 is optionally not a function of any existing columns of prior rows based on having no column references 2654 as illustrated in the example of FIG. 26G. For example, the recursive expression 2626 can be implemented as another mathematical expression that is not recursive, but is instead a function of existing values of up to R previous rows.

Note that in some embodiments, the recursive expression 2626 is optionally not a function of any columns of the given row based on having no column references 2654 having no prior row index identifier 2628. Note that in some embodiments, the recursive expression 2626 is optionally not a function of any prior outputs based on having no output references 2652.

Note that recursive expression 2626 cannot be a function of any existing columns and/or output values for rows that are more than R rows prior to the given row 2530.*i* in the ordered row set 2672. For example, if exactly 5 initialization output expressions 2638 are included in the base case definition 2637, recursive expression 2626 can include prior row index identifiers 2628 of −1, −2, −3, −4, and/or −5, but can never include prior row index identifier 2628 with absolute values greater than −5. In some cases, these requirements can be checked and/or confirmed by a query expression validation module discussed in further detail in conjunction with FIG. 26J. In some cases, R is less than M. In particular, R can be much smaller than M based on the ordered row set 2672 including many rows and the base case only requiring a small number of rows.

In cases where different nodes received and/or determine their own ordered subsets as sequentially ordered portions of the ordered row set 2672, each node can generate output for its ordered subsets of the ordered set of rows based on executing corresponding query operators of query operator execution flow 2433 as discussed in conjunction with FIG. 25D. For example, multiple nodes at inner level 2414 can receive and/or determine sequential sets of ordered subsets of the ordered set of rows. In such cases, one node may need to wait to receive a set of R output values and/or R rows 2530 from another node before processing its own ordered subsets. For example, a first node processes its own subset to generate a sequential set of output 2674 for its sequential set of rows 2530. It can send its R last output 2674 and/or its R last rows 2530 to another node, for example, via shuffle network 2480, that will process the sequentially next portion of the ordered row set 2672.

Shuffle networks 2480 can otherwise be utilized to enable implementing of the query execution module 2504 by multiple nodes 37 that intercommunicate rows 2530 and/or that intercommunicate output values 2674. Some or all of the query expression 2610 can otherwise be executed in parallelized manner via operator executions of query operator execution flows 2433 independently by multiple nodes 37.

Figure 26I:
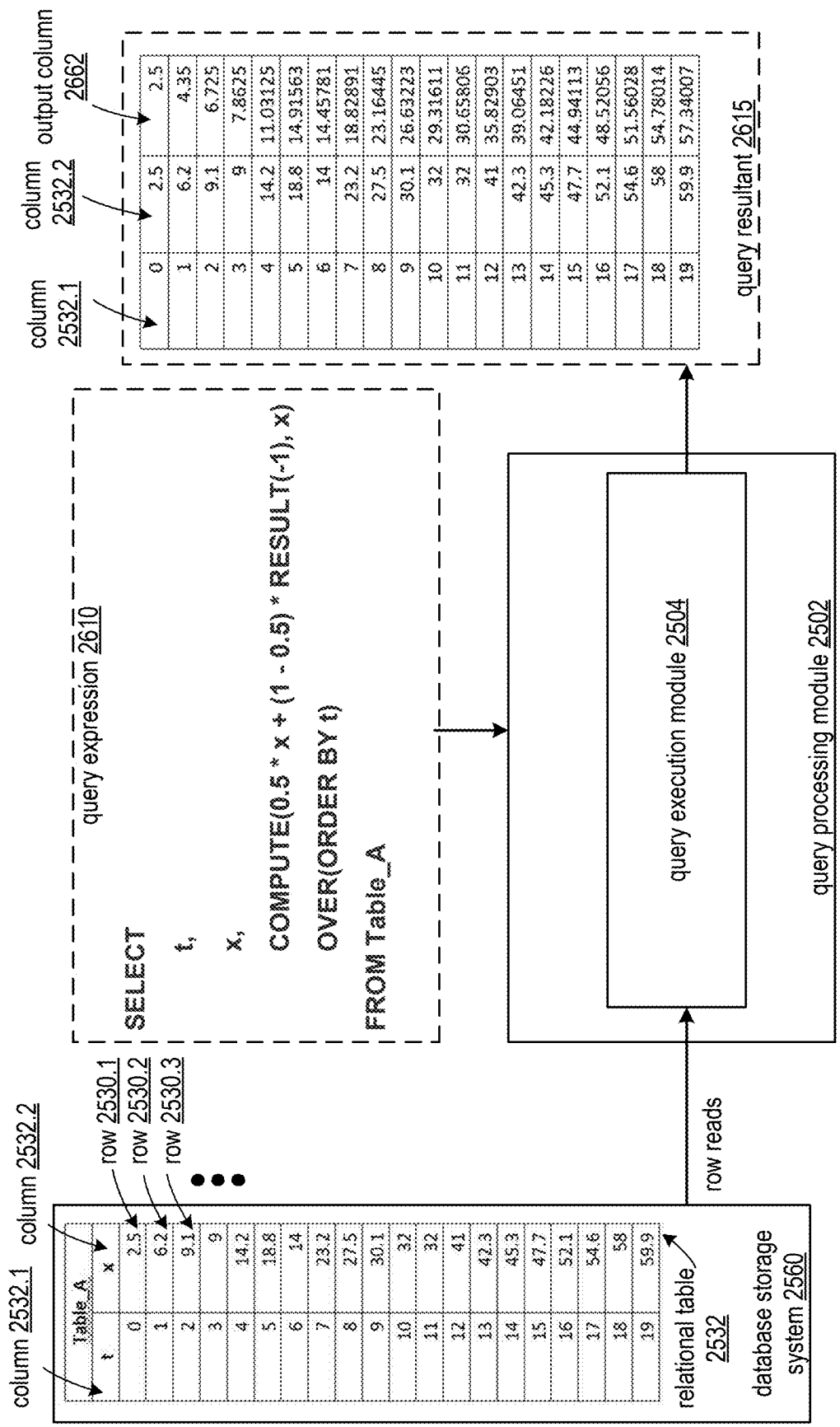
FIG. 26I is a schematic block diagram of an example embodiment of a query processing system that implements an exponential smoothing function based on processing a query expression that includes a computing window function call in accordance with various embodiments.

FIG. 26I illustrates a particular example of a query processing system 2502 that executes a query in accordance with the example query expression of FIG. 26F, for example, by implementing some or all of the features and/or functionality of the query processing system 2502 of FIG. 26G. In this example, values of columns 2532.1 and 2532.2, corresponding to column "t" and column "x" are accessed by query execution module 2504 for some or all rows 2530 of table_A via row reads to database storage system 2560 based on applying window definition 2623. In this simple example, table_A includes 20 rows 2530 with values oft from 0-19 incrementing by one. Note that the rows 2530 may not be stored and/or accessed in order, but they will be included in ordered row set 2672 in the illustrated order based on the window definition 2623 indicating ordering of the rows 2530 by column t.

The computing window function call 2620 causes execution of the corresponding query by query execution module 2504 to include and/or be based on an output column 2662. In this case, output column 2662 is returned for the set of 20 rows 2530 in conjunction with column "t" and column "x".

Determining output column 2662 includes applying recursive definition 2625 as discussed previously. The base case definition 2637 is applied to the first row 2530.1 to render output value 2674.1 for the first row 2530.1 as 2.5 based on the initialization output expression 2638.1 indicating the value of column "x" be applied. The recursive expression 2626 is applied to the rest of the rows the first row 2530.2-2530.20 to render output values 2674.2-2674.20 of output column 2662. For example, output values 2674.2 is generated by multiplying output value 2674.1 with (1−0.5) and adding this product to the product of 0.5 and the value of column "x" for row 2530.2. Substituting the computed output value 2674.1 of 2.5 for "RESULT(−1)" and substituting the column x value of 6.2 into the recursive expression 2626 by query execution module 2504 renders the expression 0.5*6.2+(1−0.5)*2.5. This expression, when evaluated by query execution module 2504, renders output 2674.2 of 4.35. In generating the next output 2674.3 the computed output value 2674.2 of 4.35 for "RESULT(−1)" and the column x value of 9.1 are substituted into the recursive expression 2626 by query execution module 2504 to renders the expression 0.5*9.1+(1−0.5)*4.35, which evaluates as 6.725. This process can be similarly applied by query execution module 2504 to generate the rest of the output values 2674 in order based on accessing the previous output values 2674 and based on accessing the column x value for the previous row.

The query resultant 2615 can include this computed output column 2662 as illustrated in FIG. 26I. The query resultant 2615 can be sent back to the client device 2550 for display via GUI 2555 as discussed previously. In some cases, this query resultant 2615 can optionally be stored in database storage system 2560. For example, column 2662 is stored in conjunction with the relational table 2532 for table_A to enable future access to the output values 2674. In some cases, this computed output column 2662 corresponds to an intermediate query resultant, where additional processing is performed upon output column 2662 based on additional query expressions, such as execution of a custom table-valued function discussed in further detail herein and/or performance of extrapolation upon the output column 2662 via the extrapolation table-valued function of FIGS. 32A-32C.

Figure 26J:
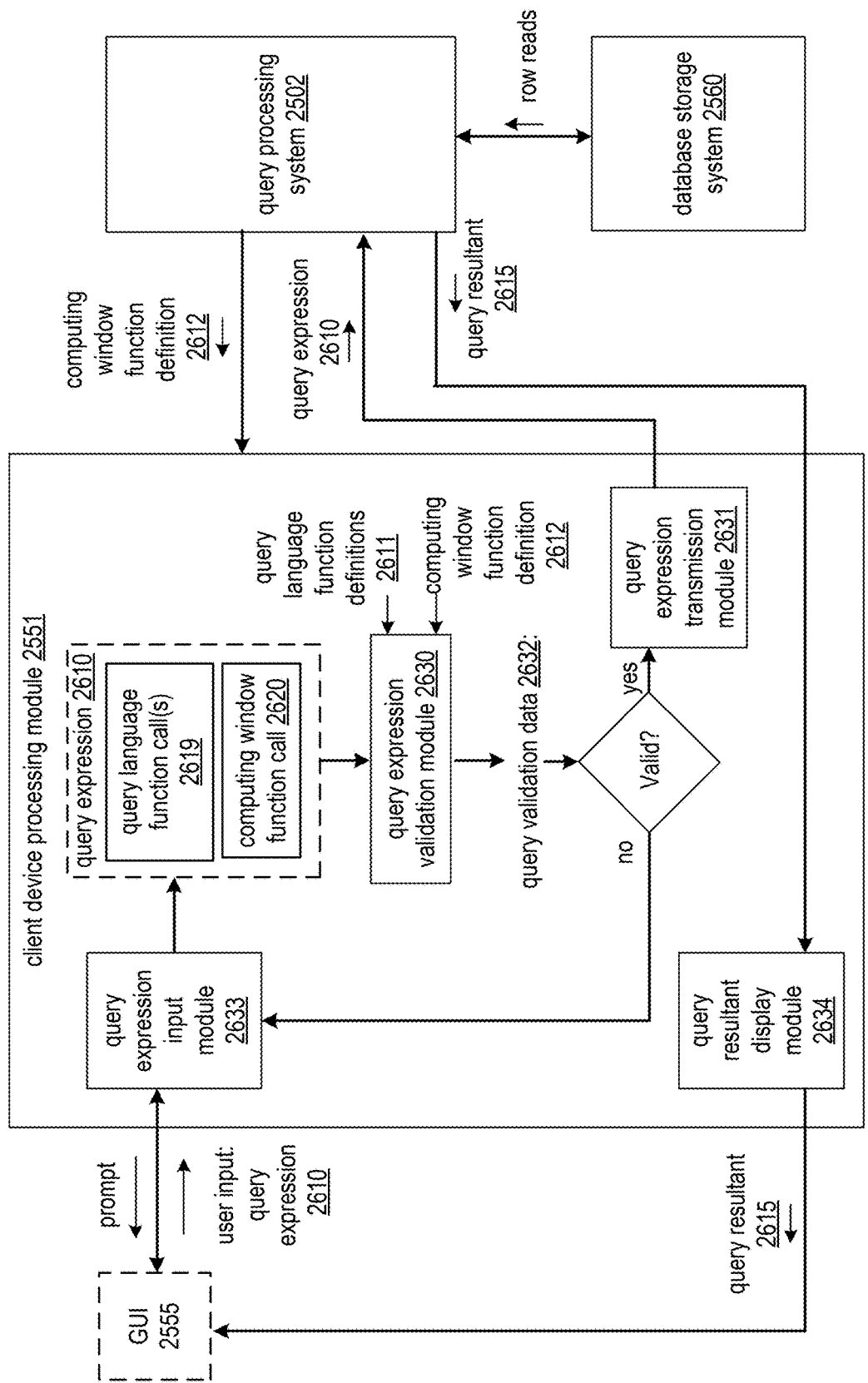
FIG. 26J is a schematic block diagram of a client device processing module that implements a query expression validation module in accordance with various embodiments.

FIG. 26J illustrates an example embodiment of a client device processing module 2551 that utilizes the computing window function definition 2612 to validate query expressions via a query expression validation module 2630. The client device processing module 2551 of FIG. 26J can be utilized to implement the client device 2550 of FIG. 26A, the client device of FIG. 25B, and/or any other embodiment of client device 2550 discussed herein. For example, the functionality of client device processing module 2551 is performed via execution of application data 2553 of FIG. 25B.

The client device processing module 2551 can implement a query expression input module 2633. The query expression input module 2633 can cause the GUI to display a prompt to enter a query via user input, and can receive a proposed query expression 2610 in response. This proposed query expression 2610 can include the computing window function call 2620 of FIG. 26A, for example, in accordance with the formatting discussed in conjunction with FIGS. 26B and/or 26F. This proposed query expression 2610 can include one or more query function calls 2619 of the new or existing query language, such as one or more SQL query function calls as discussed previously.

The client device processing module 2551 can implement a query expression validation module 2630 to generate query validation data 2632 for the proposed query expression 2610 by determining whether the query language function calls 2619 adhere to query language function definitions 2611 defining structure, function keywords, formatting, grammar requirements, syntax, and/or other restrictions for including query language function calls 2619 in query expressions 2610. The query language function definitions 2611 can be in accordance with the corresponding query language, such as SQL or another existing language.

The query expression validation module 2630 can further generate the query validation data 2632 for the proposed query expression 2610 based on further determining whether the computing window function call 2620 adheres to the computing window function definition 2612 defining structure, formatting, grammar requirements, syntax, and/or other restrictions for including computing window function definition 2612 in query expressions 2610. For example, the computing window function definition 2612 can indicate and/or regulate: the computing window function keyword 2621; the prior output keyword 2627; rules regarding the prior row index identifier such as the negation symbol and/or type of bracketing symbols to follow the prior output keyword 2627; rules regarding the structure and/or formatting of base case definition 2637; rules regarding the structure and/or formatting of window definition 2623; rules regarding the structure and/or formatting of recursive expression 2626; and/or other syntax, formatting, rules and/or requirements discussed herein with regards to the computing window function call 2620. For example, the computing window function definition 2612 can indicate some or all formatting of the embodiments of the computing window function call 2620 presented in FIGS. 26B and/or 26F.

The query expression validation module 2630 can generate query validation data 2632 based on: identifying the computing window function keyword 2621 in the given query expression 2610; identifying the computing window function call 2620 from the identified computing window function keyword 2621; and determining whether the identified computing window function call 2620 adheres to all requirements of the computing window function definition 2612. The query expression validation module 2630 can generate query validation data 2632 indicating validation of the given query expression 2610 based on: identifying other query language function keywords in the given query expression 2610; identifying one or more other query language function calls 2619 from the other query language function keywords; and determining whether all of the other query language function calls 2619 adhere to all requirements of the query language function definitions 2611. Note that this can include identifying and determining whether window function calls 2642 adhere to all requirements of the query language function definitions 2611 when these window function calls 2642 are implemented as function calls of the corresponding query language.

The query expression validation module 2630 only generates query validation data 2632 indicating validation of the given query expression 2610 when the query expression is determined to compare favorably to the computing window function definition 2612 and the query language function definitions 2611. For example, the query expression validation module 2630 only generates query validation data 2632 indicating validation of the given query expression 2610 when it determines that any identified computing window function calls 2620 adheres to all requirements of the computing window function definition 2612 and when it further determines that any identified query language function calls 2619 adhere to all requirements of the query language function definitions 2611.

The query expression validation module 2630 generates query validation data 2632 indicating the given query expression 2610 is not validated when the query expression is determined to compare unfavorably to either the computing window function definition 2612 or the query language function definitions 2611. For example, the query expression validation module 2630 generates query validation data 2632 indicating the given query expression 2610 is not validated when it determines that an identified computing window function call 2620 does not adhere to all requirements of the computing window function definition 2612 and/or when it determines that an identified query language function call 2619 does not adhere to all requirements of the query language function definitions 2611.

As a particular example, the query expression validation module 2630 can indicate given query expression 2610 is not validated based on: determining window function calls 2642 of the window definition 2623 do not meet requirements of corresponding query language function definitions 2611; determining a column name or other variable is set as a reserved keyword of query language function definitions 2611, is set as the computing window function keyword 2620, and/or is set as the prior output keyword 2627; determining a number of initialization output expressions 2638 of base case definition 2637 is less than or otherwise compares unfavorably to an absolute value of a prior row index identifier of the recursive expression 2626; determining a given initialization output expressions 2638 includes a prior row index identifier that is greater than or otherwise compares unfavorably to a number of previous initialization output expressions 2638 of the base case definition 2637; determining a function call is denoted with a keyword that does not match the computing window function keyword 2621 or any of the set of reserved keywords for corresponding query language function definitions 2611; or based on other factors that cause the query expression 2610 to not adhere to the query language function definitions 2611 and/or the computing window function definition 2612.

When the query validation data 2632 indicates the given query expression 2610 is validated, a query expression transmission module 2631 can be utilized to send the given query expression 2610 to the query processing system 2502 for execution, for example, by utilizing client device communication interface 2557. A query resultant 2615 can be received in response to execution of this given query expression 2610, and the query resultant 2615 can be displayed via GUI 2555 by utilizing a query resultant display module 2634.

When the query validation data 2632 indicates the given query expression 2610 is not validated, the query expression is not transmitted to query processing system 2502 for execution. The query expression input module 2633 can be utilized to display a prompt via GUI 2555 to enter an updated query expression 2610. The GUI 2555 can optionally display detected problems with the previously entered query expression 2610 based on identified portions of the previously entered query expression 2610 that did not adhere to the query language function definitions 2611 and/or the computing window function definition 2612. This process can repeat for any subsequently entered query expressions 2610 via GUI 2555.

The query language function definitions 2611 and/or computing window function definition 2612 can be determined by the query expression validation module 2630 based on: being received from the query processing system 2502; being stored in accessible memory such as client device memory module 2552; being included in application data 2553; and/or otherwise being determined.

The query expression validation module 2630 of FIG. 26J can optionally be implemented by the query processing system 2502 of FIG. 26A, for example, to determine whether or not a given query can be executed via query execution module 2504 based on determining whether the syntax and/or formatting of the computing window function call 2620 meets the syntax and/or formatting requirements of the computing window function definition 2612.

In various embodiments, query processing system includes at least one processor and a memory that stores operational instructions. The operational instructions, when executed by the at least one processor, cause the query processing system to receive a query expression that includes a call to a computing window function and to execute the computing window function in accordance with execution of the query expression against a database. Execution of the query expression includes accessing an ordered set of rows of the database indicated in the call to the computing window function, and applying a recursive definition indicated in the call to the computing window function to each row in the ordered set of rows to generate output for each row in the ordered set of rows. A query resultant for the query expression is generated based on the output for each row in the ordered set of rows.

Figure 26K:
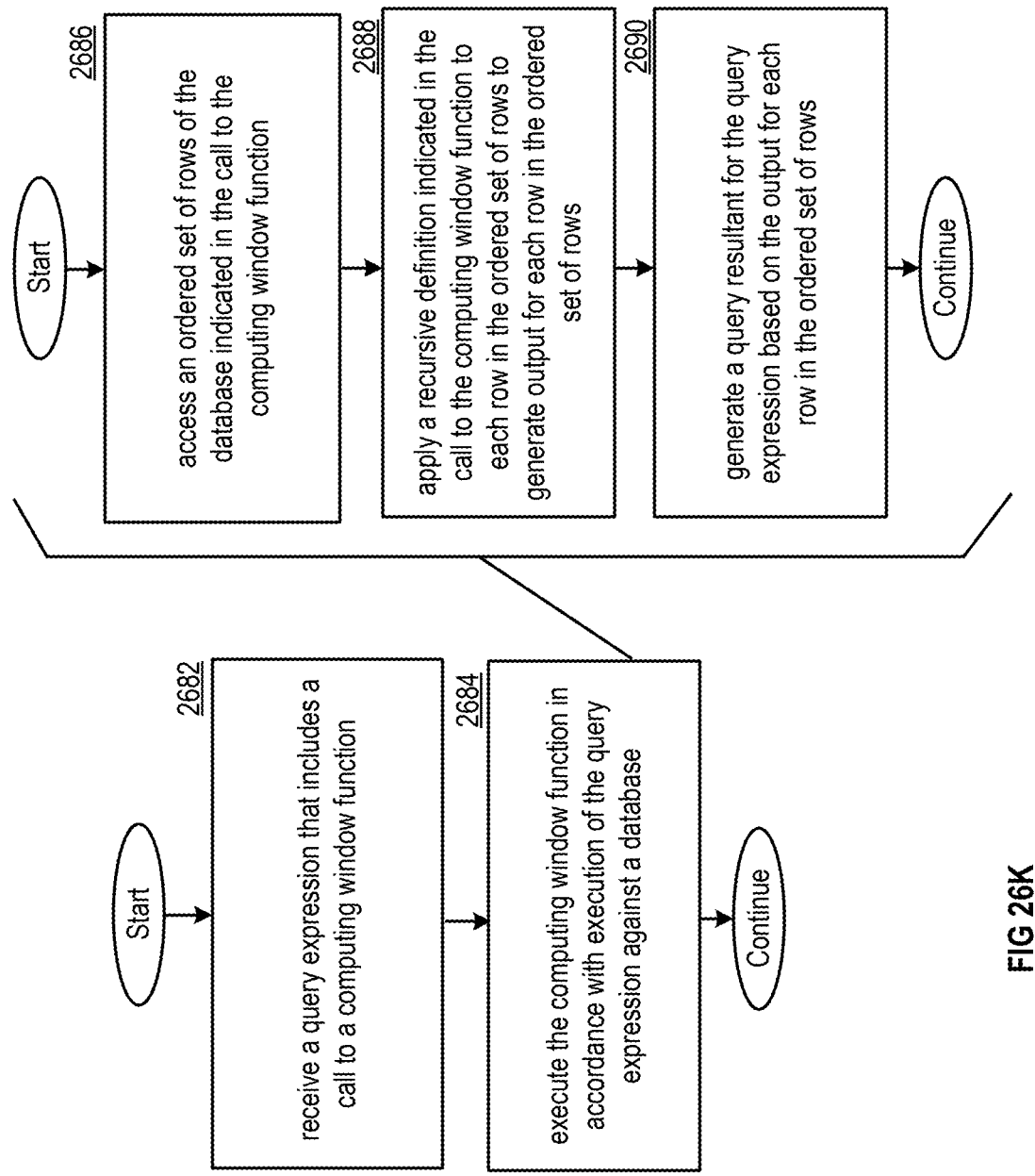
FIG. 26K is a flow diagram illustrating a method of processing a query expression that includes a computing window function call in accordance with various embodiments.

FIG. 26K illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26K. Some or all of the steps of FIG. 26K can be performed by one or more embodiments of node 37 discussed in conjunction with FIGS. 25A-25E. Some or all of the method of FIG. 26K can be performed by the operator flow generator module 2514, the execution plan generating module 2516, and/or the query execution module 2504 of FIG. 26A. Some or all of the method of FIG. 26K can be performed by and/or based on communication with one or more client devices 2550. Some or all of the steps of FIG. 26K can optionally be performed by any other processing module of the database system 10. Some or all of the steps of FIG. 26K can be performed to implement some or all of the functionality of the query processing system of FIG. 25A and/or FIG. 26A. Some or all of the steps of FIG. 26K can be performed to implement some or all of the functionality of the query processing system 2502 of FIG. 26A, and/or FIGS. 26G-26I. Some or all steps of FIG. 26K can be performed by database system 10 in accordance with other embodiments of the database system 10 and/or nodes 37 discussed herein.

Step 2682 includes receiving a query expression that includes a call to a computing window function. For example, the query expression can be implemented as query expression 2610 and can include the call to the computing window function as a computing window function call 2620.

In various embodiments, the call to the computing window function can be structured based on some or all features of one or more embodiments of the computing window function call 2620 of FIGS. 26A-26F. The call to the computing window function can be structured in accordance with requirements of a computing window function definition and/or the computing window function can be written with a syntax in accordance with requirements of a computing window function definition. This computing window function definition can dictate requirements based on some or all features of embodiments of the computing window function call 2620 of FIGS. 26A-26F.

In various embodiments, the query expression can be received from and/or generated by a client device 2550 and/or can be generated based on user input to another computing device. In various embodiments, the method further includes sending the computing window function definition to a client device, for example, in conjunction with application data sent to the client device for storage in memory of the client device. The query expression can be generated by the client device based on executing the application data. The query expression can be validated by the client device based on comparing a query expression entered via user input to requirements of the computing window function definition.

In various embodiments, the query expression 2610 can be structured in accordance with requirements of a query language and/or can be written with a syntax in accordance with requirements of a query language. This query language can be a new query language or an existing query language, such as SQL, a modified form of SQL, and/or a query language that is similar to SQL.

In various embodiments, the call to a computing window function can include and/or indicate a computing window function keyword and/or a computing window function argument set. The computing window function argument set can include a window definition and/or a recursive definition.

In various embodiments, the window definition can include row set identification parameters and/or row set ordering parameters. For example, the query expression includes query language syntax for a window definition indicating the ordered set of rows, and the query expression further includes query language syntax indicating an ordering of the ordered set of rows. This query language syntax can be included in a window function call that includes a row identification function keyword and/or a row ordering function keyword. The query language syntax can be in accordance with SQL syntax. The row identification function keyword and/or the row ordering function keyword can be reserved SQL keywords indicating corresponding function calls of the window function call in SQL.

The recursive definition can include a recursive expression and/or a base case definition. The recursive expression can include at least one instance of a particular prior output keyword, at least one prior row index identifier, and/or at least one mathematical operator. The base case definition can include at least one initialization output expression. For example, the base case definition is included as a list structure with the initialization output expressions as elements of the list structure.

In various embodiments, the query expression can include at least one other function call in accordance with a query language. For example, the query expression includes at least one of a plurality of Structured Query Language (SQL) reserved keywords in accordance with SQL syntax. The call to a computing window function can include an identifier of the computing window function, such as the computing window function keyword 2621, that is distinct from the plurality of SQL reserved keywords. The at least one other function call can optionally include and/or be utilized to determine the window definition of the computing window function call.

Step 2684 includes executing the computing window function in accordance with execution of the query expression against a database. This can include performing steps 2686, 2688 and/or 2690.

Step 2686 includes accessing an ordered set of rows of the database indicated in the call to the computing window function. For example, the ordered set of rows can be determined based on the window definition and/or can be accessed based on performing a set of operator executions of a corresponding window function call in the query expression. Some or all rows of the ordered set of rows can be stored in accordance with one or more relational databases of a database storage system. Some or all rows of the ordered set of rows can be stored and/or read in accordance with any order, and the method can include ordering the set of rows into the ordered set of rows based on the window definition. Some or all rows or all rows of the ordered set of rows can be stored in column formatted record data of one or more segments. These one or more segments can be stored on one or more nodes in memory drives of one or more nodes. Some or all rows or all rows of the ordered set of rows can be read by one or more nodes from their own memory drives and/or can be read by one or more nodes by generating recovered segments based on segments retrieved from other nodes.

Step 2688 includes applying a recursive definition indicated in the call to the computing window function to each row in the ordered set of rows to generate output for each row in the ordered set of rows. For example the recursive definition can be applied as discussed in conjunction with FIG. 26G. The ordered set of rows can be processed one at a time in accordance with an ordering of the ordered set of rows. The ordered set of rows can be processed one at a time based on the windowing definition and/or based on execution of a corresponding window function call of the query expression.

Step 2690 includes generating a query resultant for the query expression based on the output for each row in the ordered set of rows. For example, the query resultant can include the output for each row in the ordered set of rows as an output column for the ordered set of rows. In some cases, the method further includes communicating the query resultant to a requesting entity. For example, the query resultant can be sent to a client device that generated the query expression or to another client device. The client device can display the query resultant to a user, for example, via a GUI displayed on a display device. In some cases, the method further includes storing the query resultant in the database. For example, each row can be updated in a database storage system to include its output value generated in executing the query expression. As another example, a new relational table for the ordered set of rows that includes the corresponding output values can be stored in the database storage system.

In various embodiments, the method can include generating a query operator execution flow based on the query expression. This can include generating the query operator execution flow based a plurality of relational operators included in the query expression and/or other function calls included in the query expression. The query expression can be executed against the database in accordance with the query operator execution flow.

In various embodiments, at least a portion of the query operator execution flow is based on the computing window function call. The method can include generating an equivalent query expression from the computing window function call, for example and generating at least a portion of the query operator execution flow is based on the equivalent query expression. The equivalent query expression can be generated based on the computing window function definition and/or performing a language conversion process upon the computing window function call. The equivalent query expression can be in accordance with SQL, can include SQL operators, and/or can be in accordance with another query language.

In various embodiments, the method can include generating query execution plan data, for example, based on a query operator execution flow generated from the query expression. The query execution plan data can be communicated to and/or utilized by a plurality of nodes to cause the plurality of nodes to execute the query expression against the database by participating in a query execution plan.

In various embodiments, the database includes time-series data as a plurality of rows. The ordered set of rows includes a set of rows from the plurality of rows ordered in accordance with a temporal field of the set of rows, such as a column indicating time values. In various embodiments, the method includes generating the set of rows by resampling a previous set of rows. The temporal field of each of the set of rows can include fixed-interval temporal values generated in the resampling of the previous set of rows. In various embodiments, the recursive definition corresponds to at least one of: an exponential smoothing function, a finite response filter, a kernel function, and/or a digital signal processing function. The query resultant can indicate an output column of the ordered set of rows based on applying the one of: the exponential smoothing function, the finite response filter, the kernel function, or the digital signal processing function. In some cases, the output values generated for each of the ordered set of rows can replace corresponding row values of the ordered set of rows utilized in the recursive definition.

In various embodiments, the call to a computing window function includes a first argument indicating a recursive expression of the recursive definitions and/or a set of additional arguments indicating a set of initialization output expressions as a base case definition of the recursive definition. In various embodiments, the output is generated for each row in the ordered set of rows one at a time in accordance with an ordering of the ordered set of rows. Applying the recursive definition indicated in the call to the computing window function to each row in the ordered set of rows to generate output for each row in the ordered set of rows includes setting the output for each of a first set of rows in the ordered set of rows based on a corresponding one of the set of initialization output expressions. This can include executing and/or evaluating the corresponding one of the set of initialization output expressions. This can include setting the corresponding output as a the corresponding one of the set of initialization output expressions is implemented as a constant value.

In various embodiments, applying the recursive definition indicated in the call to the computing window function to each row in the ordered set of rows to generate output for each row in the ordered set of rows can include generating the output each of a remaining set of rows after the first set of rows in the ordered set of rows by performing the recursive expression for the each of the remaining set of rows. In various embodiments, performing the recursive expression for each of the remaining set of rows includes performing at least one operation indicated by the recursive expression upon output of at least one previous row in the ordered set of rows relative to each row.

In various embodiments, a number of rows between a given row and a least-previous row in the at least one previous row in the ordered set of rows is based on a number of arguments in the set of additional arguments. For example, the number of rows between a given row and a least-previous row in the at least one previous row in the ordered set of rows is strictly less than the number of arguments in the set of additional arguments. In various embodiments, the at least one previous row includes a set of previous rows that is immediately prior to each row in accordance with an ordering of the ordered set of rows. The number of rows in the set of previous rows can be greater than one or equal to one. In various embodiments, a number of rows included in the set of previous rows is equal to a number of arguments in the set of additional arguments and/or is less than a number of arguments in the set of additional arguments.

In various embodiments, the recursive expression further includes a prior output keyword denoting output of a previous row of the ordered set of rows relative to each row. Performing the recursive expression for a given row includes substituting the prior output keyword with a value of the output of the previous row of the ordered set of rows relative to the given row. The prior output keyword can be distinct from a plurality of SQL reserved keywords and/or reserved keywords of another query language associated with the query expression. For example, the at least one operation is indicated in the query expression as at least one of the plurality of SQL reserved keywords and/or symbols in accordance with SQL syntax, such as at least one mathematical operator symbol.

In various embodiments, the recursive expression further includes a prior row index referencing the output of a previous row. Performing the recursive expression for a given row includes identifying one of the ordered set of rows denoted by the prior row index relative to the given row and performing at least one operation indicated by the recursive expression upon the output of the one of the ordered set of rows. In various embodiments, the prior row index includes a negation symbol denoting that the one of the ordered set of rows is prior to the given row in the ordered set of rows. The prior row index can further include an integer value, and the one of the ordered set of rows includes is identified as being a number of rows prior to each row that is equal to the integer value.

In various embodiments, a non-transitory computer readable storage medium includes at least one memory section that stores operational instructions. The operational instructions, when executed by a processing module that includes a processor and a memory, causes the processing module to receive a query expression that includes a call to a computing window function and to execute the computing window function in accordance with execution of the query expression against a database. Execution of the query expression can include accessing an ordered set of rows of the database indicated in the call to the computing window function and applying a recursive definition indicated in the call to the computing window function to each row in the ordered set of rows to generate output for each row in the ordered set of rows. A query resultant for the query expression can be generated based on the output for each row in the ordered set of rows.

Figure 26L:
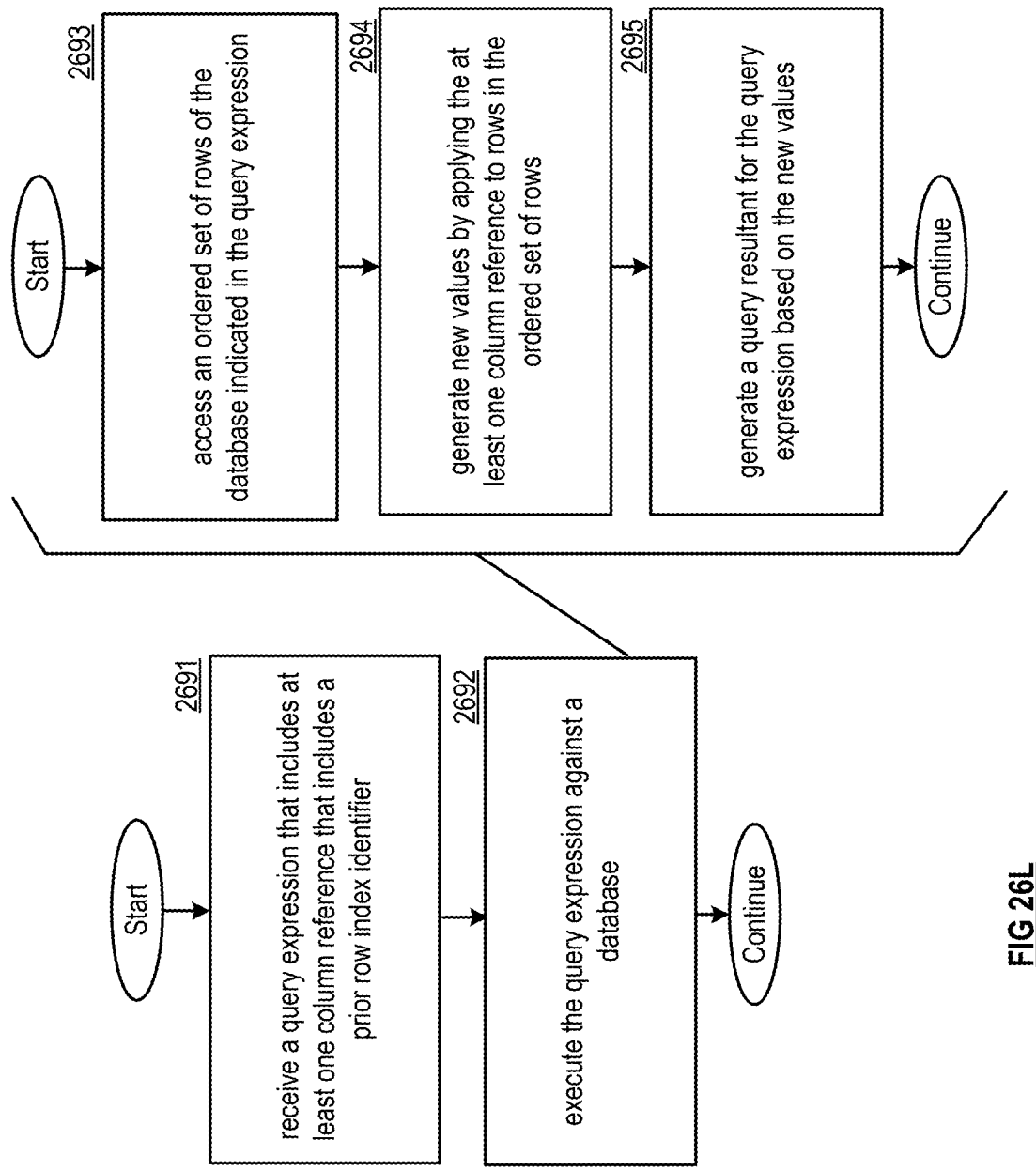
FIG. 26L is a flow diagram illustrating a method of processing a query expression that includes a computing window function call in accordance with various embodiments.

FIG. 26L illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26L. Some or all of the steps of FIG. 26L can be performed by one or more embodiments of node 37 discussed in conjunction with FIGS. 25A-25E. Some or all of the method of FIG. 26L can be performed by the operator flow generator module 2514, the execution plan generating module 2516, and/or the query execution module 2504 of FIG. 26A. Some or all of the method of FIG. 26L can be performed by and/or based on communication with one or more client devices 2550. Some or all of the steps of FIG. 26L can optionally be performed by any other processing module of the database system 10. Some or all of the steps of FIG. 26L can be performed to implement some or all of the functionality of the query processing system of FIG. 25A and/or FIG. 26A. Some or all of the steps of FIG. 26L can be performed to implement some or all of the functionality of the query processing system 2502 of FIG. 26A and/or FIGS. 26G-26I. Some or all steps of FIG. 26L can be performed by database system 10 in accordance with other embodiments of the database system 10 and/or nodes 37 discussed herein. Some or all steps of FIG. 26L can optionally be performed in conjunction with some or all steps of FIG. 26K.

Step 2691 includes receiving a query expression that includes at least one column reference that includes a prior row index identifier. For example, the at least one column reference is included in a call to a computing window function. Step 2691 can be performed in a same or similar fashion as performing step 2682 of FIG. 26K.

In various embodiments, the query expression includes a call to the computing window function that is structured based on some or all features of one or more embodiments of the computing window function call 2620 of FIGS. 26A-26F. The call to the computing window function can be structured in accordance with requirements of a computing window function definition and/or the computing window function can be written with a syntax in accordance with requirements of a computing window function definition. This computing window function definition can dictate requirements based on some or all features of embodiments of the computing window function call 2620 of FIGS. 26A-26F. In particular, the at least one column reference can be implemented as one or more column references 2654 of FIG. 26C, FIG. 26D, and/or FIG. 26E. The at least one column reference can be structured in accordance with a same or similar syntax as discussed in conjunction with FIG. 26D. The prior row index identifier of the at least one column reference can be implemented as the prior row index identifier 2628. The prior row index identifier of the at least one column reference can optionally include a negation symbol such a '−' followed by an integer value denoting a number of rows previous to the given row.

Step 2692 includes executing the query expression against a database. For example, this can include executing a computing window function indicated in the query expression. Performing step 2692 can include performing step 2693, step 2694, and/or step 2695. In some embodiments, performing step 2692 can optionally include performing step 2684 of FIG. 26K. In some embodiments, performing step 2692 can optionally include performing step 2686, step 2688, and/or step 2690 of FIG. 26K.

Step 2693 includes accessing an ordered set of rows of the database indicated in the query expression. For example, the ordered set of rows are indicated in a computing window function call of the query expression. Step 2693 can be performed in a same or similar fashion as performance of step 2686 of FIG. 26K.

Step 2694 includes generating new values based on applying the at least one column reference to rows in the ordered set of rows. For example, the value of at least one column of at least one prior row from a given row included in the ordered set of rows is accessed for generating a new value for a given row. Step 2694 can be performed in a same or similar fashion as performance of step 2688 of FIG. 26K. For example, the new values can correspond to the output generated for each given row in the ordered set of rows based on the value of at least one column of at least on prior row relative to the given row, for example, in conjunction with performing the computing window function call. As another example, the new values can correspond to one or more column values of new rows generated based on column values of previous rows indicated by the art least one column reference, for example, in conjunction with execution of a custom table-valued function call such as an extrapolation table-valued function call.

The at least one column reference can be substituted with the value of the at least one column of the at least one prior row from the given row. The number of rows prior from the given row can be determined based on the prior row index identifier. A particular column of the prior row can be determined based on a column name included in the column reference. Generating the output for a given row can include applying a recursive expression that includes the at least one column reference by utilizing an existing column value of at least one corresponding prior row based on the at least one column reference. Generating the output for a given row can include applying an initialization output expression that includes the at least one column reference by utilizing an existing column value of at least one corresponding prior row based on the at least one column reference. Generating the output for a given row can include applying any other expression that includes the includes the at least one column reference utilizing an existing column value and/or newly generated column value of at least one corresponding prior row based on the at least one column reference. Step 2694 can be performed in a same or similar fashion as performance of step 2688 of FIG. 26K.

Step 2695 includes generating a query resultant for the query expression based on the new value. For example, the query resultant includes and/or is based on the output, such as a new column value, for some or all rows in the ordered set of rows generated in step 2694. As another example, the query resultant includes and/or is based on new rows generated in step 2694 based on the ordered set of rows. Step 2695 can be performed in a same or similar fashion as performance of step 2690 of FIG. 26K.

FIGS. 27A-27D present embodiments of a query processing system 2502 that receives and processes query expressions 2610 that include tuple constructs 2730. Some or all features and/or functionality of the query processing system 2502 discussed in conjunction with FIGS. 27A-27D can be utilized to implement the query processing system 2502 of FIG. 25A, of FIG. 26A, and/or any other embodiment of the query processing system 2502 discussed herein. Some or all features of query expressions 2610 discussed in conjunction with FIGS. 27A-27D can be utilized to implement the query expression 2610 of FIG. 26A and/or any other embodiment of the query processing system 2502 discussed herein.

Some recursive definitions have multiple, recursively defined variables that are co-dependent. The tuple structure data type described herein can be utilized in query expressions 2610, for example, to group interrelated recursive output variables together in computing window function calls 2620 of FIGS. 26A-26J. The tuple data type can optionally be utilized in any other type of query expression to group variables, such as new columns, together. The tuple data type can correspond to a new data type of the existing query language. For example, the syntax rules, restrictions, and/or other features of the tuple structure data type can be defined in the computing window function definition 2612 and/or can be defined in its own tuple structure definition that is known to and/or stored by the query processing system 2502 and/or that is known to and/or stored by client devices 2550.

Figure 27A:
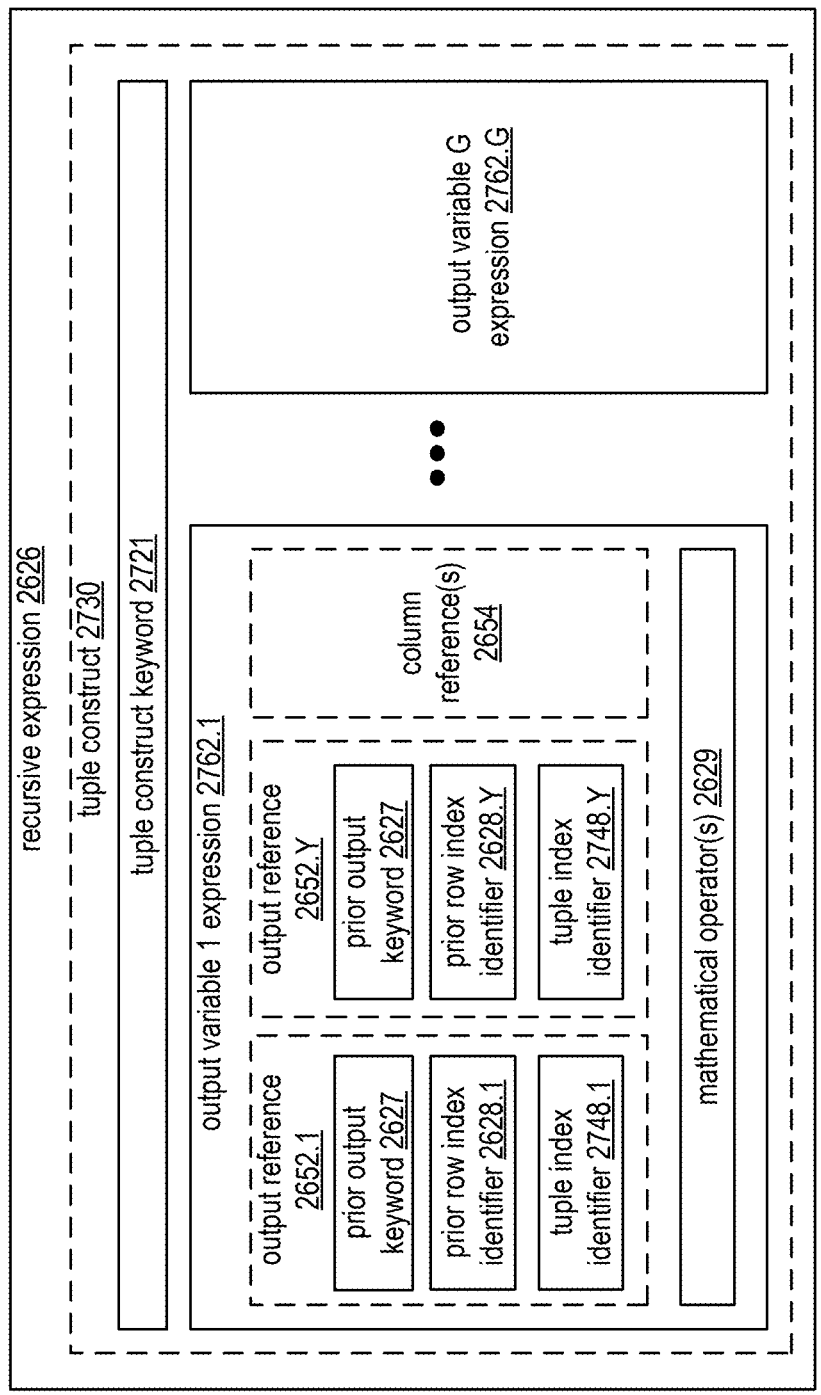
FIG. 27A is an embodiment of a recursive expression of a computing window function call that includes a tuple construct in accordance with various embodiments.

FIG. 27A illustrates an example of a recursive expression 2626 that includes a tuple construct 2730. The recursive expression 2626 of FIG. 27A can be utilized to implement the recursive expression 2626 of FIG. 26C and/or any other embodiment of the recursive expression 2626 described herein.

The tuple construct 2730 can correspond to a data type that includes multiple elements, variables, values, and/or expressions, such as the plurality of G output variable expressions 2762.1-2762.G. G can correspond to any number of variables that is greater than or equal to 1. In some cases, G is strictly greater than 1. For example, if a number of outputs is equal to one, a tuple structure is not utilized, and the output is expressed for a recursive expression 2626 as illustrated in FIG. 27C.

The tuple construct 2730 can be implemented as and/or in a composite data type that groups its multiple variables as a list and/or a set. The tuple construct 2730 can optionally be implemented in a same or similar fashion as an object, struct, and/or tuple implemented in various programming languages. The multiple variables can optionally be type-casted as the same or different data types and/or can otherwise be implemented as the same or different data types.

The tuple construct 2730 can include and/or be denoted by a tuple construct keyword 2721. For example, the tuple construct keyword 2721 can be distinct from a set of reserved keywords of the existing query language. The tuple construct keyword 2721 can optionally correspond to its own reserved keyword that cannot be used as variable names or keywords of new functions defined by users. The tuple construct keyword 2721 can otherwise identify that a set of corresponding output variable expressions 2762.1-2762.G correspond to elements of the tuple construct 2730.

In cases where the tuple construct 2730 is implemented in recursive expression 2626, each of the output variable expressions 2762.1-2762.G can correspond to one of a set of G output variables of the corresponding recursive definition 2625. For example, execution of the corresponding computing window function call 2620 via query execution module 2504 will render a set of output columns 2662.1-2662.G rather than the single output column 2662 as illustrated in FIG. 26G. In particular, the output can correspond to and/or can reflect a tuple structure output for each given row in the ordered row set 2672 based on the applying each output variable expressions 2762.1-2762.G to the given row to render G outputs within the output tuple construct 2730. Execution of a query expressions 2610 that include computing window function calls 2620 with a tuple construct 2730 implemented in recursive expression 2626 is illustrated and discussed in further detail in conjunction with FIG. 27D.

As illustrated in FIG. 27A, a first output variable 1 can be denoted by output variable 1 expression 2762.1. Each subsequent output variable 2-G can similarly be denoted a corresponding one of the other output variable expressions 2762.2-2762.G. Some or all output variable expressions 2762 can include one or more output references 2652.1-2652.Y, one or more column references 2654, and/or one or more mathematical operators 2629. For example, some or all output variable expressions 2762 can be implemented as an embodiment of recursive expression 2626 of FIG. 26C, where each output variable expressions of the tuple construct 2730 corresponds to its own expression as a function of more output references 2652, one or more column references 2654, and/or one or more mathematical operators 2629.

Because output of the recursive expression is expressed as a tuple construct 2730, each output reference 2652 can further include a corresponding tuple index identifier 2748. The tuple index identifier 2748 can correspond to one of G values, such as one of an includes set of integer values 1-G, indicating which particular output variable 1-G of the corresponding prior output denoted by the output reference is being accessed. For example, an output references 2652 can include the prior output keyword 2627 and a prior row index identifier 2628 as discussed previously to denote which prior row's output tuple construct 2730, relative to the given row, will be utilized. The tuple index identifier 2748 further identifies which variable 1-G of the output tuple construct, as identified by the prior row index identifier 2628, is referenced. An example output reference 2652 is discussed in further detail in conjunction with FIG. 27C.

Note that an output reference 2652 of a given output variable expression 2772 can reference the same or different corresponding variable. For example, output variable expression 2672.1 can include references to output variable 1 of prior output in one or more of its output references 2652 and/or can include references to one or more output variable 2-G of prior output in one or more of its output references 2652. In particular, the corresponding output variable can be a function of one or more different variables 1-G of prior output of one or more rows relative to the given row. Note that different output references 2652 of a given output variable expression 2772 can include some of the same tuple index identifiers 2748 to reference a same output variable of a same row and/or to reference a same output variable of different prior rows. Different output references 2652 of a given output variable expression 2772 can include different tuple index identifiers 2748 to reference different output variables of a same row and/or to reference different output variables of different prior rows.

Figure 27B:
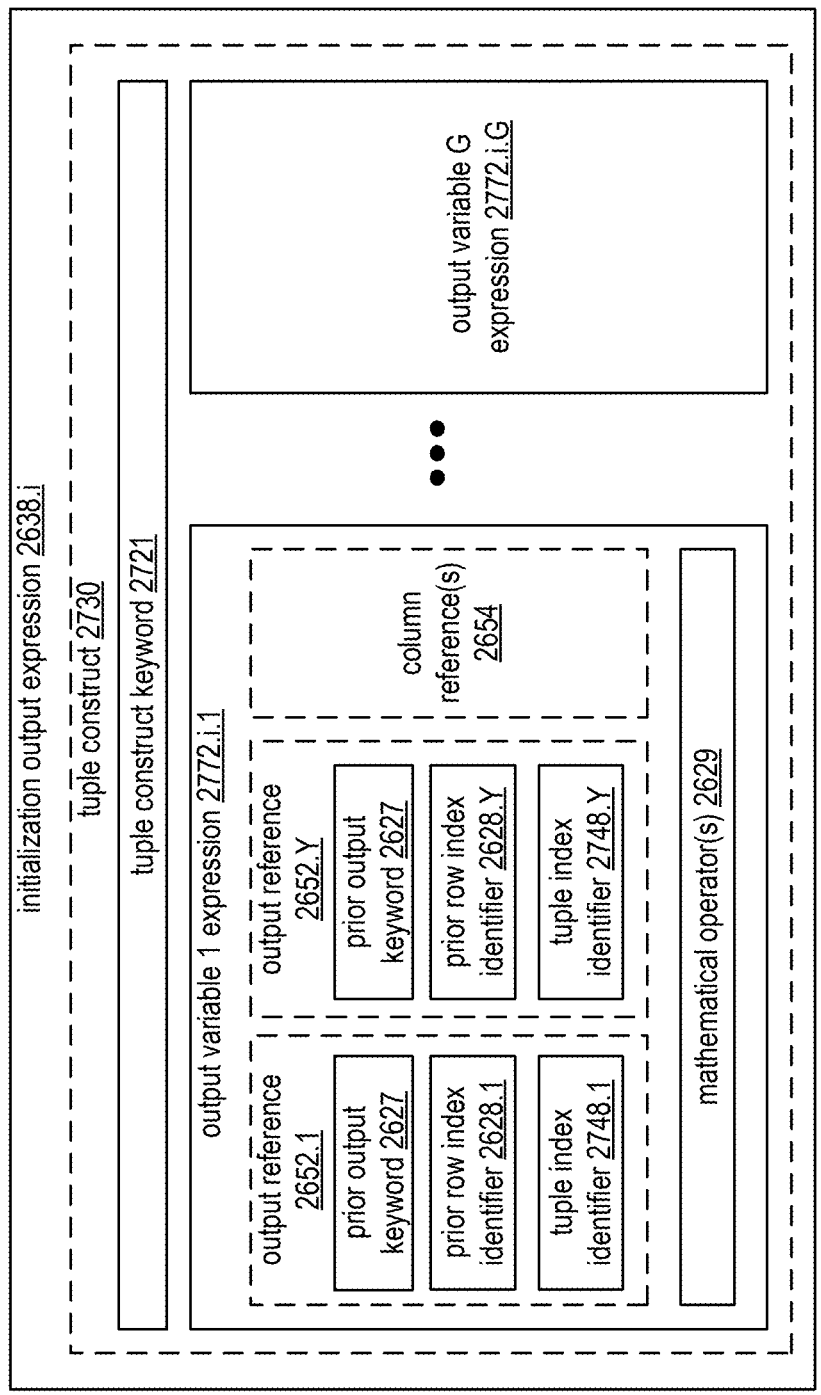
FIG. 27B is an embodiment of an initialization output expression of a computing window function call that includes a tuple construct in accordance with various embodiments.

FIG. 27B illustrates an example of an initialization output expression 2638 that includes a tuple construct 2730. The initialization output expression 2638 of FIG. 27B can be utilized to implement the initialization output expression 2638 of FIG. 26E and/or any other embodiment of the initialization output expression 2638 described herein.

When output in a recursive definition includes a set variables, a set of variables must be included in output of all rows. This requires that all initialization output expressions 2638.1—as 2638.R, as well as the recursive expression 2626, have a same number of output variables G. In cases where G is greater than or equal to 2, this can require that all initialization output expressions 2638.1—as 2638.R, as well as the recursive expression 2626, have a tuple output denoted with the same corresponding number of output variables 1-G. In cases where G is equal to 1, this can require that all initialization output expressions 2638.1-2638.R, as well as the recursive expression 2626, have a non-tuple output denoting a single output variable as illustrated in FIGS. 26C-26E.

Each initialization output expression 2638 can be implemented as illustrated in FIG. 27B to include tuple construct 2730 when G is greater than or equal to 2. Each output variable expression 2772.1-2772.G can be implemented to include its own initialization output expression 2638 as illustrated in FIG. 26E. For example, each output variable expression 2772 can be implemented in a similar fashion as output variable expressions 2762 of FIG. 27A. In particular, output references 2652 of an output variable expression 2772 can similarly include a tuple index identifier 2748 denoting which output variable 1-G is referenced.

Note that as discussed in conjunction with FIG. 26E, any output references 2652 of an output variable expression 2772 of an initialization output expression 2638.$i$ cannot prior outputs and/or prior columns that are more than $i-1$ rows prior to the corresponding given row. For example, corresponding prior row index identifiers 2628 cannot have absolute values of its integer values greater than or equal to $i-1$ for any output variable expressions 2772 of an initialization output expression 2638.$i$. A first initialization output expression 2638.1 cannot denote any columns and/or output of prior rows.

FIG. 27C illustrates an example embodiment of a computing window function call 2620. The example computing window function call 2620 of FIG. 27C can correspond to a computing window function call 2620 adhering to same syntax, requirements, and/or a same computing window function definition 2612 as the computing window function call 2620 of FIG. 26F. For example, the example computing window function call 2620 of FIG. 27C can correspond to a SQL query expression with extensions enabling the computing window function call 2620 as discussed in conjunction with FIG. 26A-26J.

In particular, the computing window function call 2620 of FIG. 27C can utilize a same computing window function keyword 2621, a same prior output keyword 2627, same syntax for column references 2654, same syntax for prior row index identifiers 2628, and/or same syntax and/or function call(s) for window definition 2623. Note that in FIG. 27C, the recursive expression 2626 is denoted first and the base case definition 2637 is denoted second as a list structure in a similar fashion as the syntax, requirements, and/or a computing window function definition 2612 as illustrated in the example of FIG. 26E.

In this example, the computing window function call 2620 implements double exponential smoothing, defined as the following recursive definition 2625

$$s_1 = x_1$$

$$b_1 = x_1 - x_0$$

And for $t>1$ by $$s_t = \alpha x_t + (1-\alpha)(s_{t-1} + b_{t-1})$$

$$b_t = \beta(s_t - s_{t-1}) + (1-\beta) b_{t-1}$$

where $\alpha$ is the data smoothing factor, $0<\alpha<1$, and $\beta$ is the trend smoothing factor, $0<\beta<1$.

This can be expressed as the following computing window function call 2620 with the data smoothing factor set as 0.5 and with the trend smoothing factor set as 0.3:

```
COMPUTE(TUPLE(0.5*x+(1-0.5)*(RESULT(-1)
   [1]+RESULT(-1)[2]),0.3*((0.5*x+(1-0.5)*(RE-
   SULT(-1)[1]+RESULT(-1)[2]))-RESULT(-1)
   [1])+(1-0.3)*RESULT(-1)[2])),(TUPLE(x,0.0),
   TUPLE(x,x-x[-1]))OVER( . . . )
```

In this example, the recursive definition has two output variables s and b. The recursive expression 2626 is therefore implemented as a tuple construct 2730 with two output variable expressions 2762.1 and 2762.2 corresponding to the expressions for $s_t$ and $b_t$, respectively, when t is greater than 1. The base case definition 2637 has two initialization output expressions 2638.1 and 2638.2 for a first row and second row with times t=0 and t=1, respectively.

In particular, recursive expression 2626 and each initialization output expressions 2638.1 and 2638.2 are each denoted as tuple constructs 2730 based on having the tuple construct keyword 2721 and corresponding output variable expressions. In this example, "TUPLE" is implemented as tuple construct keyword 2721. In this example, the output variable expressions 2762 and/or 2772 of the tuple constructs 2730 are bounded by bracketing symbols '(' and ')', with each of the set of output variable expressions 2762 and/or 2772 being delimited by commas ',' In other embodiments, other bracketing symbols and/or delimiting symbols can be applied, and/or the set of output variable expressions 2762 and/or 2772 of a tuple construct 2730 can otherwise be denoted in a corresponding ordering in accordance with corresponding syntax and/or definition of the tuple construct.

Each initialization output expressions 2638.1 and 2638.2 are similarly implemented as tuple constructs 2730 that each have two output variable expressions for s and t. In particular, initialization output expressions 2638.1 has output variable expressions 2772.1.1 and 2772.1.2 corresponding to the expressions for $s_0$ and $b_0$, respectively. Initialization output expressions 2638.2 has output variable expressions 2772.2.1 and 2772.2.2 corresponding to the expressions for $s_1$ and $b_1$, respectively.

Note that tuple construct 2730 of recursive expression 2626 and of both initialization output expressions 2638.1 and 2638.2 are consistent in including the expression for s as the first output variable and the expression for b as the second output variable to ensure the two resulting output columns are consistent for all rows. Thus, reference to the value of s for particular prior output is denoted with a tuple index identifier 2748 with value 1 based on s being the first variable expressed in the tuple constructs 2730. Reference to the value of b for particular prior output is denoted with a tuple index identifier 2748 with value 2 based on b being the second variable expressed in the tuple constructs 2730. In the syntax of this example, tuple index identifiers 2748 is expressed with integer values of 1 or 2, respectively, and are bracketed by square brackets '[' and ']'.

As illustrated, the bracketing symbols for tuple index identifiers 2748 in output references 2652 can be different from the bracketing symbols for prior row index identifiers 2628. In other embodiments, the bracketing symbols for tuple index identifiers 2748 in output references 2652 can be the same as the bracketing symbols for prior row index identifiers 2628.

As illustrated, the tuple index identifiers 2748 in output references 2652 can follow the prior row index identifiers 2628. In other embodiments, the tuple index identifiers 2748 can be ordered differently in output references 2652, and can optionally be indicated before prior row index identifiers 2628.

While not illustrated in FIG. 27C, the computing window function call 2620 can have a window definition 2623 implemented as the window function call 2642 of FIG. 26F. The "OVER" function call of FIG. 27C can optionally be populated with any row set identification parameters 2645 and/or row set ordering parameters 2646, for example, rather than " . . . " and/or where " . . . " denotes the corresponding window definition 2623 from a different portion of query expression 2610 and/or from a prior query expression 2610.

The ordered row set 2672 identified by window definition 2623 for computing window function call 2620 of FIG. 27C can include rows from one or more tables with a column "x". The window definition 2623 for computing window function call 2620 of FIG. 27C can optionally indicate ordering of the identified rows by another column "t". For example, the computing window function call 2620 can be performed on a same ordered row set 2672 as identified in the example of 26F and/or as illustrated in the example of FIG. 26I.

Figure 27D:
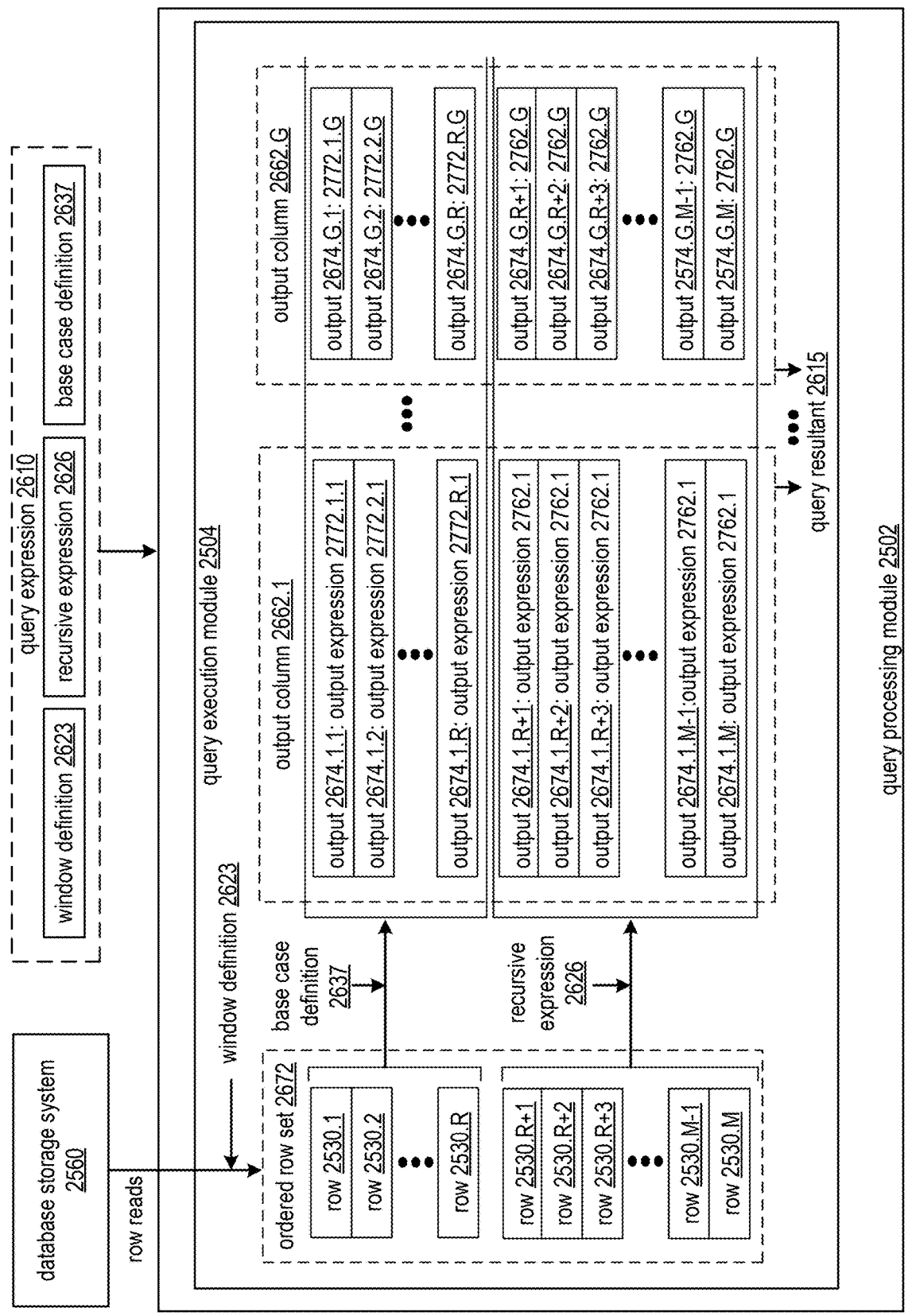
FIG. 27D is a schematic block diagram of a query processing system that generates multiple output columns based on processing a query expression that includes a computing window function call in accordance with various embodiments.

FIG. 27D illustrates an example of a query processing system 2502 that executes a query in accordance with a query expression 2610 that includes a computing window function call 2620 that implements output as a tuple construct 2730. The embodiment of query processing system 2502 and query expression 2610 of FIG. 27D can be utilized to implement and/or can be considered an extension of the query processing system 2502 and query expression 2610 of FIGS. 26G-26H.

In particular, applying the base case definition 2637 to a first set of rows 2530-1-2530 in the ordered row set 2672 renders a set of G output values 2674.1-2674.G for each of the set of R rows, evaluated based on applying the corresponding output variable expressions 2772.1-2772.G in the corresponding tuple construct 2730 of the corresponding one of the set of initialization output expressions 2638.1-2638.R. Similarly, applying the recursive expression 2626 to the remaining set of rows 2530-R+1-2530.M in the ordered row set 2672 renders a set of G output values for each of the remaining set of rows, evaluated based on applying the corresponding output variable expressions 2762.1-2762.G in the corresponding tuple construct 2730 of the corresponding one of the recursive expression 2626R.

As illustrated in FIG. 27D, output of a given row 2530.*i* can be expressed as a set of G output values 2674.*i*.1-2674.*i*.G, where the first output values 2674.*i*.1 corresponds to applying the first output variable expressions 2762 and/or 2772 of the tuple construct to the given row 2530.*i*, where the second output value 2674.*i*.2 corresponds to applying the second output variable expressions 2762 and/or 2772 of the tuple construct to the given row 2530.*i*, and so on. As discussed herein, a given output 2674.*i* for a corresponding row 2530.*i* in FIGS. 26G and/or 26H can optionally be implemented as a set of outputs 2674.*i*.1-2674.G in cases where the corresponding recursive expression include tuple construct 2730 denoting a set of multiple outputs 1-G.

This renders output of the computing window function call 2620 as a set of output columns 2662.1-2662.G rather than a single output column 2662 as illustrated in FIGS. 26G and 26H. Note that for a given row 2530, output for one or more of the columns 2662.1-2662.G can similarly be generated a function of one or more columns of the given row, columns of up to R previous rows, and/or output of up to R previous rows as discussed in the embodiments of FIGS. 26G and/or 26H. Different ones of the output columns 2662.1-2662.G can have its values generated via different corresponding functions of function of one or more columns of the given row, columns of up to R previous rows, and/or output of up to R previous rows, based on applying corresponding output variable expressions 2762.1-2762.G to rows 2530.R+1-2530.M and/or based on applying corresponding output variable expressions 2772.1-2772.G of the corresponding initialization output expression 2638 for each of the first set of rows 1-R.

Figure 27E:
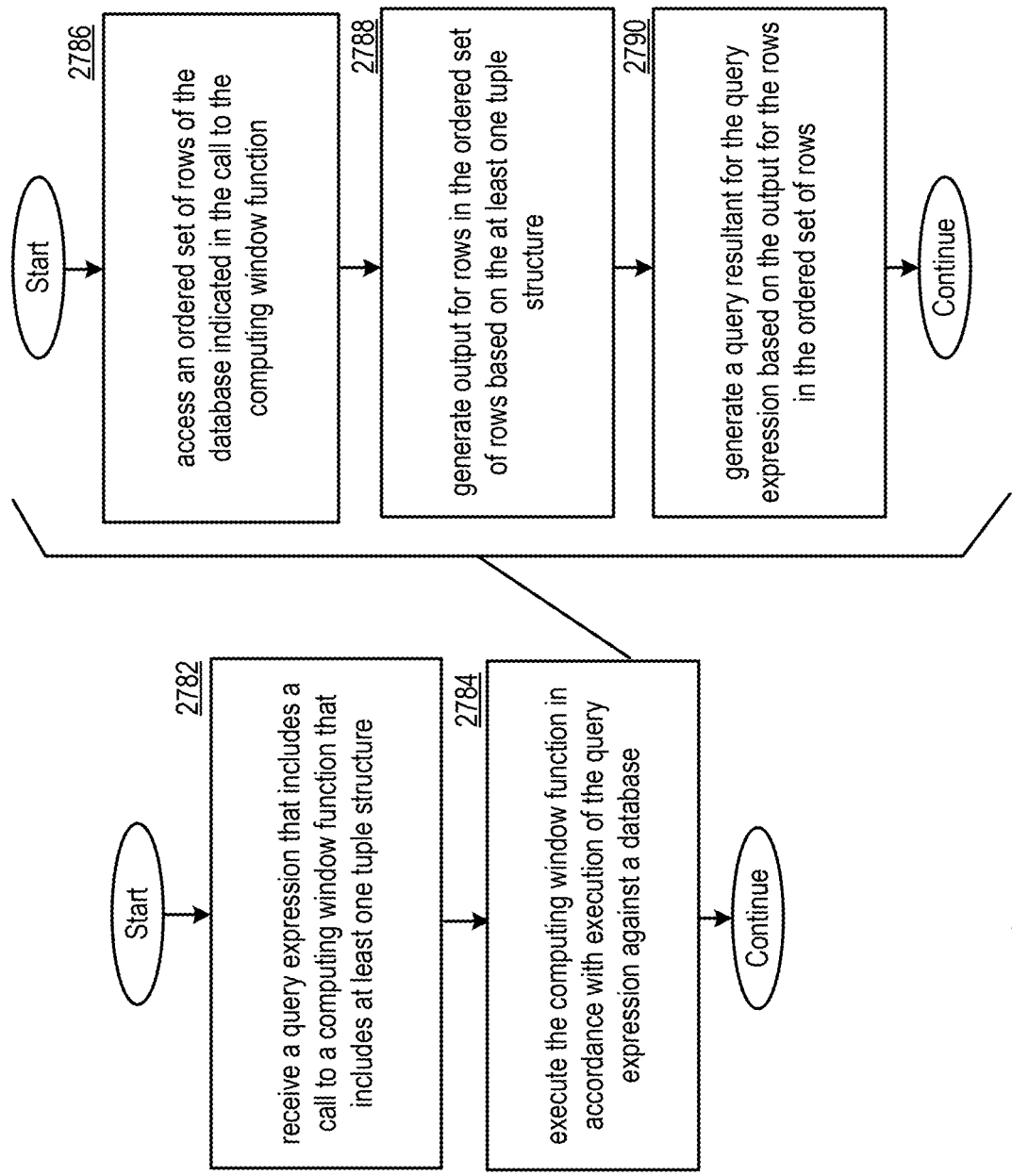
FIG. 27E is a flow diagram illustrating a method of processing a query expression that includes a computing window function call in accordance with various embodiments.

FIG. 27E illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27E. Some or all of the steps of FIG. 27E can be performed by one or more embodiments of node 37 discussed in conjunction with FIGS. 25A-25E. Some or all of the method of FIG. 27E can be performed by the operator flow generator module 2514, the execution plan generating module 2516, and/or the query execution module 2504 of FIG. 26A. Some or all of the method of FIG. 27E can be performed by and/or based on communication with one or more client devices 2550. Some or all of the steps of FIG. 27E can optionally be performed by any other processing module of the database system 10. Some or all of the steps of FIG. 27E can be performed to implement some or all of the functionality of the query processing system of FIG. 25A and/or FIG. 26A. Some or all of the steps of FIG. 27E can be performed to implement some or all of the functionality of the query processing system 2502 of FIGS. 26G-26I and/or FIG. 27D. Some or all steps of FIG. 27E can be performed by database system 10 in accordance with other embodiments of the database system 10 and/or nodes 37 discussed herein. Some or all steps of FIG. 27E can optionally be performed in conjunction with some or all steps of FIG. 26K and/or FIG. 26L.

Step 2782 includes receiving a query expression that includes a call to a computing window function, such as computing window function call 2620, that includes at least one tuple structure, such as tuple construct 2730. For example, performing step 2782 can include and/or can be based on performing step 2682 of FIG. 26K. Step 2784 includes executing the computing window function in accordance with execution of the query expression against a database, such as database storage system 2560. For example, performing step 2784 can include and/or can be based on performing step 2684 of FIG. 26K.

Performing step 2784 can include performing steps 2786, 2788, and/or 2790. Step 2784 includes accessing an ordered set of rows of the database indicated in the call to the computing window function. For example, performing step 2786 can include and/or be based on performing step 2686 of FIG. 26K. Step 2788 includes generating output for rows in the ordered set of rows based on the at least one tuple structure. The output for rows in the ordered set of rows can be expressed as a set of output columns corresponding to a set of output variable expressions indicated in the at least one tuple structure. For example, performing step 2788 can include and/or be based on performing step 2688 of FIG.

26K. Step 2790 includes generating a query resultant for the query expression based on the output for the rows in the ordered set of rows. For example, performing step 2790 can include and/or be based on performing step 2690 of FIG. 26K.

Figure 28A:
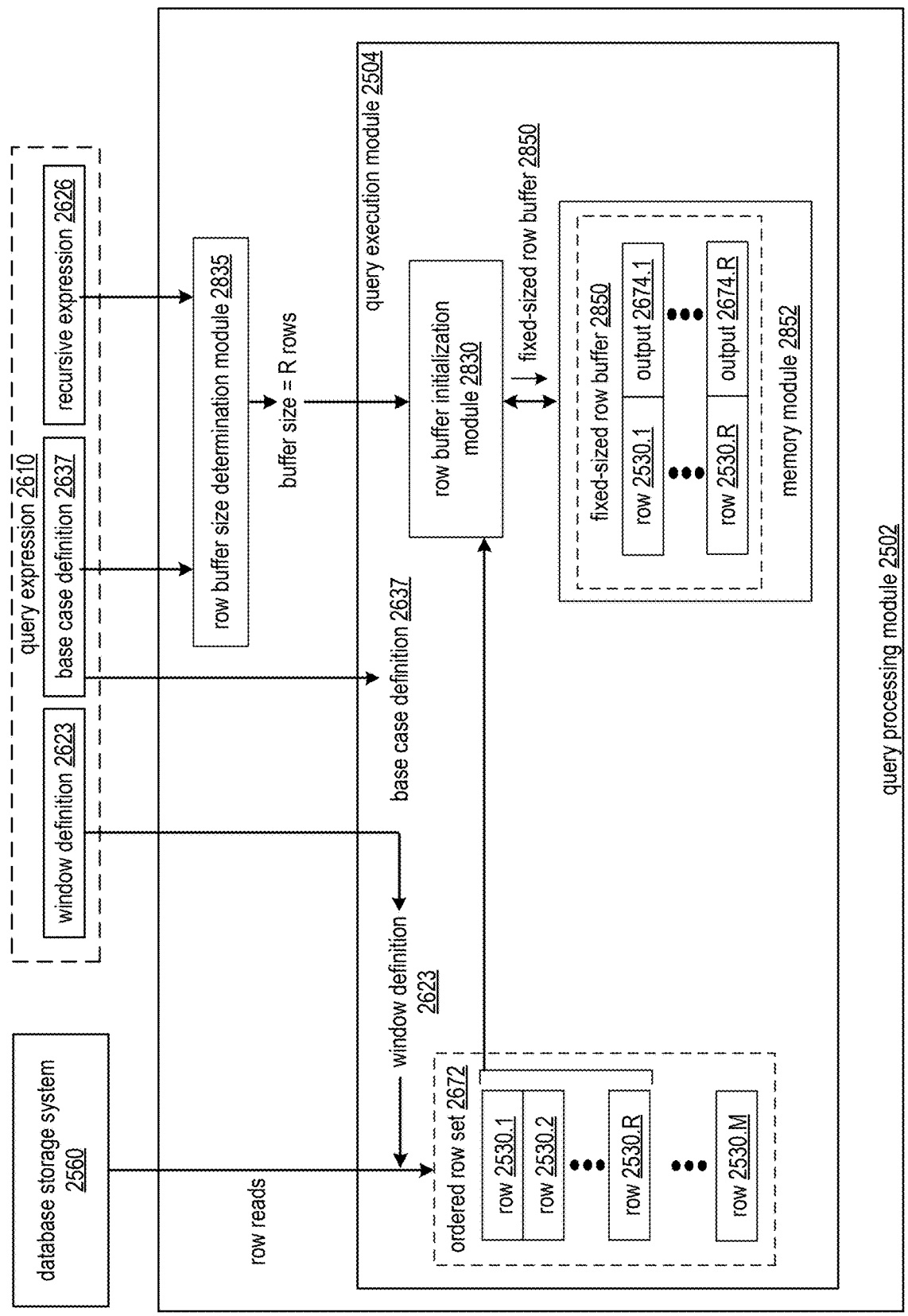
FIGS. 28A and 28B are schematic block diagrams of embodiments of a query processing system that maintains a fixed-sized row buffer when processing query expressions that include a computing window function call in accordance with various embodiments.
Figure 28B:
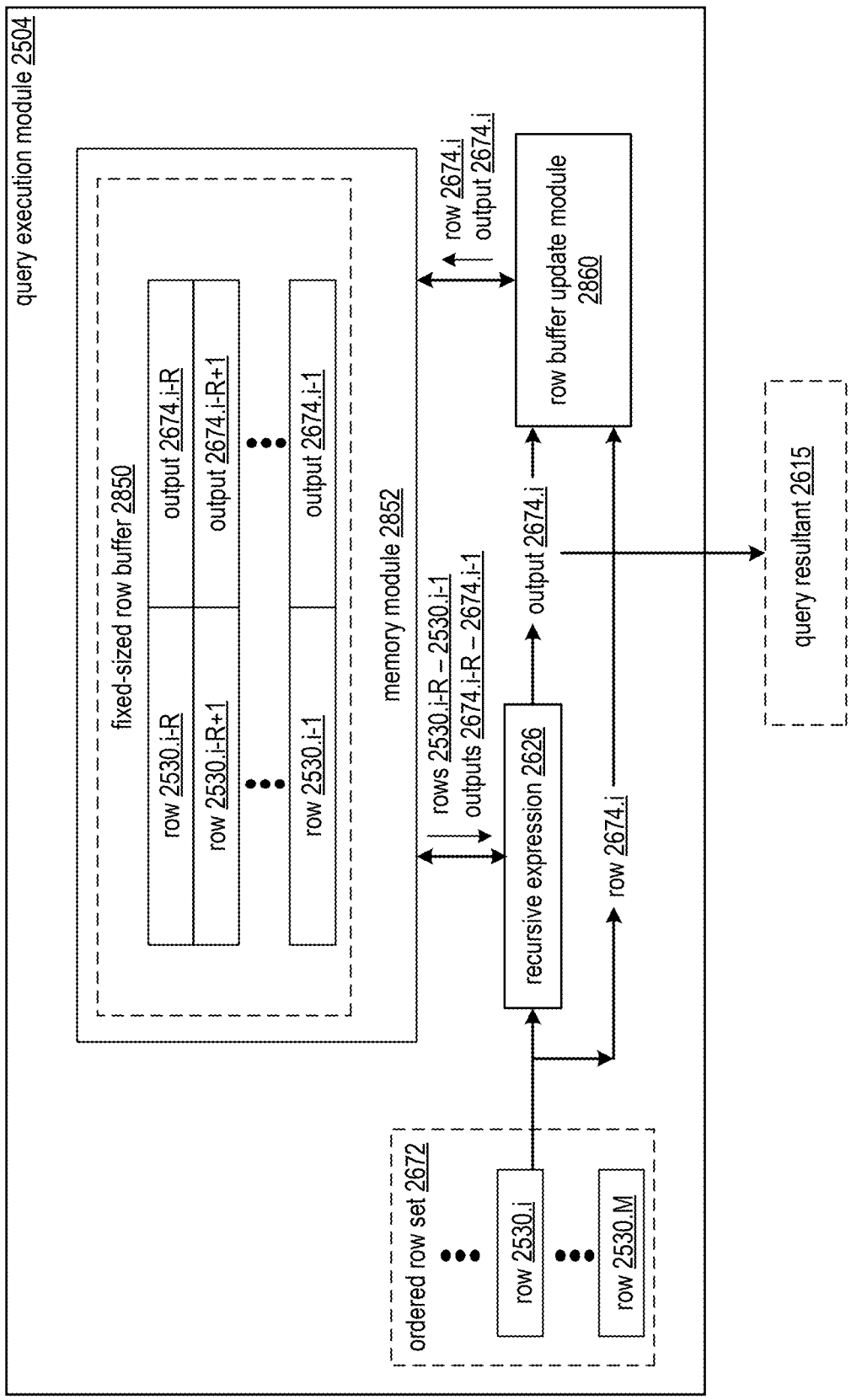
Figure 28C:
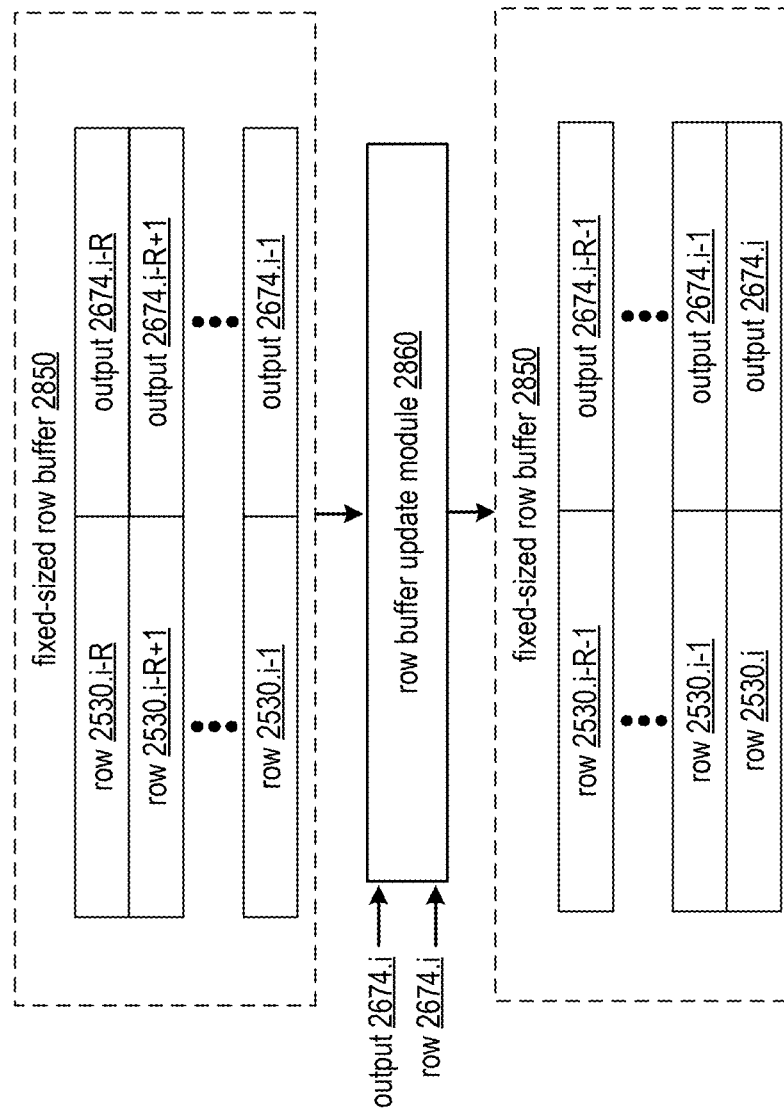
FIG. 28C is a schematic block diagrams of embodiments of a query execution module that maintains a fixed-sized row buffer in accordance with various embodiments.

FIGS. 28A-28C illustrate embodiments of a query processing system 2502 that generates and maintains a fixed-sized row buffer 2850 when executing query expressions that include computing window function calls 2620. Some or all features and/or functionality of the query processing system 2502 of FIGS. 28A-28D can be utilized to implement the query processing system 2502 of FIG. 26A, the query processing system of FIGS. 26G-26H, and/or any embodiments of the query processing system 2502 described herein.

In implementing the recursive functionality of embodiments of the computing window function calls 2620 described in conjunction with some or all of FIGS. 26A-27D, generating output for each row includes accessing previously generated output for previous rows. Rather than maintaining all previous rows/output in a buffer for access in generating output for subsequent rows, a buffer size can be automatically identified based on the recursive definition 2625 supplied as an argument to the computing window function call 2620, and a fixed-sized row buffer 2850 can be initialized and maintained based on this automatically identified buffer size. For example, the recursive definition 2625 can indicate the value of R and/or can otherwise indicate exactly how many prior rows are required in implementing the recursive expression 2626. This fixed-sized row buffer 2850 can be maintained as the rows are processed when the corresponding computing window function is executed. For example, the fixed-sized row buffer 2850 can be maintained to include exactly R prior rows exactly R previously generated output from a given, next row 2530 in ordered row set 2672 to be processed.

In particular, a fixed-sized row buffer 2850 can be initialized based on the value of R and/or based on the number of initialization output expressions 2638 of the computing window function call 2620. As illustrated in FIG. 28A, a row buffer size determination module 2835 can be implemented by the query processing system 2502, for example, in conjunction with parsing the query expression and/or in conjunction with implementing the operator flow generator module 2514. The row buffer size determination module 2835 can determine the buffer size for the fixed-sized row buffer 2850. This can be indicated as a number of rows R. This can optionally be indicated as an amount of memory and/or threshold data size such as a number of bytes, for example, determined as a function of R and/or as a function of known and/or maximum size of corresponding rows.

The row buffer size determination module 2835 can optionally be implemented by the query processing system 2502 prior to initializing execution of the corresponding query via query execution module 2504. For example, the row buffer size determination module 2835 can determine the buffer size based on parsing of the computing window function call 2620 of query expression 2610 prior to execution. The determined buffer size can optionally be included in the query execution plan data, such as query execution plan data 2540 that is communicated to one or more nodes 37 participating in a corresponding query execution plan 2405, and one or more nodes 37 can initialize and/or maintain a fixed-sized row buffer 2850 of determined buffer size indicated in the query execution plan data. The determined buffer size can otherwise be utilized by the query execution module 2504 to initialize and/or maintain a fixed-sized row buffer 2850 to include exactly a corresponding number of rows.

For example, the row buffer size determination module 2835 can determine the number of rows R as the fixed size of fixed-sized row buffer 2850 based on identifying a largest absolute value of a prior row index identifier 2628 in the set of output references 2652 of recursive expression 2626 and/or in the set of column references 2654 of recursive expression 2626. As another example, the row buffer size determination module 2835 can determine the number of rows R as the fixed size of fixed-sized row buffer 2850 based on identifying a number of initialization output expressions 2638 in base case definition 2637, for example, by identifying a number of arguments following the recursive expression 2626 and/or by identifying a size and/or number of elements of a list structure implemented as base case definition 2637.

As illustrated in FIG. 28A, query execution module 2504 can implement a row buffer initialization module 2830, for example, to initialize the fixed-sized row buffer 2850 in accordance with the determined buffer size. In some cases, one or more nodes 37 implement row buffer initialization module 2830 via their own query processing module 2435 in conjunction with generating data blocks by participating in query execution plan 2405. Any processing module of the query execution module 2504 can otherwise implement row buffer initialization module 2830.

Implementing the row buffer initialization module 2830 can include generating the set of R outputs 2674.1-2674.R for the first R rows 2530.1-2530.R included in the ordered row set 2672 read from database storage system 2560 based on window definition 2623. For example, the set of R outputs can correspond to one or more output variables of output 2674.1-2674.R of FIGS. 26G, 26H, and/or 27D. The set of R outputs 2674.1-2674.R can otherwise be generated as discussed in conjunction with FIGS. 26G, 26H, and/or 27D based on applying the set of initialization output expressions 2638.1-2638.R of base case definition 2637. In some cases, the row buffer size determination module 2835 is implemented via the row buffer initialization module 2830 of the query execution module 2504, where the fixed size is determined based on the size of the initialized state of fixed-sized row buffer 2850.

Note that these outputs 2674.1-2674.R can be generated one at a time, where the row buffer initialization module 2830 adds each output 2674 to the fixed-size row buffer 2850 as they are generated for use in generating subsequent ones of the outputs 2674.1-2674.R based on being referenced in output references 2652 of subsequent ones of the outputs 2674.1-2674.R. These instances correspond to the fixed-size row buffer not yet being full, and still being initialized until it includes all R outputs 2674.1-2674.R.

The initialized state of fixed-sized row buffer 2850 can alternatively or additionally be generated to include the existing values of one or more columns of rows 2530.1-2530.R, for example, based on a set of prior columns recursive expression 2626 references in a set of column references 2654 of recursive expression 2626. In some cases, only a subset of columns of rows 2530.1-2530.R are included in fixed-sized row buffer 2850 based on recursive expression 2626 referencing only a subset of columns in column references 2654 to prior row's columns. In some cases, no existing columns of rows 2530.1-2530.R are included in fixed-sized row buffer 2850 based on recursive expression 2626 not having any column references 2654 to prior row's columns.

The initialized the fixed-sized row buffer 2850 can be stored in a memory module 2852 of the query execution module 2504. In some cases, one or more nodes 37 implement memory module 2852 via their own memory resources in conjunction with participating in a corresponding query execution plan 2405. Any memory resources of query execution module 2504, such as at least one cache memory, can otherwise implement memory module 2852 and/or can be utilized to store fixed-sized row buffer 2850.

FIG. 28B illustrates a query execution module 2504 that implements a row buffer update module 2860, for example, to maintain the fixed-size row buffer 2850 as rows of ordered row set 2672 are processed in order. In some cases, one or more nodes 37 implement row buffer update module 2860 via their own query processing module 2435 in conjunction with generating data blocks by participating in query execution plan 2405. Any processing module of the query execution module 2504 can otherwise implement row buffer update module 2860.

In some cases, previously processed rows 2530 included in ordered row set 2672 based on being read from database storage system 2560 are not maintained and/or stored by query execution module 2504 unless they are included in the most previous R rows stored in fixed-sized row buffer 2850. For example, when row 2530.$i$ is next to be processed, rows prior to 2530.$i$ are not stored or included in ordered row set 2672. Alternatively or in addition, previously generated output 2674 are sent to another node as output data blocks, are manipulated and/or processed via additional operators, and/or are otherwise not maintained and/or stored by query execution module 2504 unless they are included in the most previous R rows stored in fixed-sized row buffer 2850. However, accessing the necessary prior rows and/or corresponding output as necessary can be achieved via access to the fixed-sized row buffer 2850, where not all prior rows and not all prior output need be stored and/or accessible at a given time. This can be ideal in cases where R is much smaller than M to preserve memory resources.

In generating output for a given row 2530.$i$ included in the ordered row set 2672 read from database storage system 2560 based on window definition 2623 that is after the first set of rows 2530.1-2530.R, the recursive expression 2626 can be applied to generate corresponding output 2674.$i$. For example, each output 2674.$i$ can correspond to one or more output variables of one corresponding output 2674.R+1-2674.M of FIGS. 26G, 26H, and/or 27D. Each output 2674.$i$ can otherwise be generated based on applying the recursive definition 2626 as discussed in conjunction with FIGS. 26G, 26H, and/or 27D.

As the recursive expression 2626 can be a function of columns and/or output of some or all of R prior rows indicated in output references 2652 and/or column references 2564 as discussed previously, applying the recursive expression 2626 for a given row can include accessing the required prior columns and/or output in the fixed-sized row buffer 2850. For example, the memory module 2852 storing fixed-sized row buffer 2850 is accessed to retrieve the values of columns and/or output of prior rows relative to the given row 2530.$i$ to generate the output 2674.$i$ for the given row. This output 2674.$i$ can be further processed via additional operators, can be transmitted as output data blocks to another node for processing, and/or can otherwise be further processed and/or included in the query resultant 2615.

This output 2674.$i$ is also utilized to update the fixed-sized row buffer 2850 via row buffer update module 2860. Once output 2674.$i$ is generated, the row buffer update module 2860 can update the fixed-sized row buffer 2850 to include output 2674.$i$ and/or one or more existing columns of the corresponding row 2530.$i$ for use in generating output some or all of the rows 2530.$i$+1-2530.$i$+R.

This maintaining of fixed-sized row buffer 2850 in response to generating output 2674.$i$ is illustrated in FIG. 28C. In particular, the row buffer update module 2860 maintains the fixed number of rows R by accessing the fixed-sized row buffer 2850 in memory module 2852 to remove the least recent output 2674.$i$–R from the fixed-sized row buffer 2850 and to add the output 2674.$i$ to fixed-sized row buffer 2850. For example, this output 2674.$i$ will be maintained in fixed-sized row buffer 2850 for processing of the next R rows 2530.$i$+1-2530.$i$+R in generating the next set of R outputs 2674.$i$+1-2674.$i$+R.

In cases where existing columns of rows are also maintained in fixed-sized row buffer 2850, this can further include removing the existing column values of the least recent row 2674.$i$–R from the fixed-sized row buffer 2850 and to add the existing column values 2674.$i$ to fixed-sized row buffer 2850. For example, these existing column values for row 2530.$i$ will be maintained in fixed-sized row buffer 2850 for processing of the next R rows 2530.$i$+1-2530.$i$+R in generating the next set of R outputs 2674.$i$+1-2674.$i$+R.

Figure 28D:
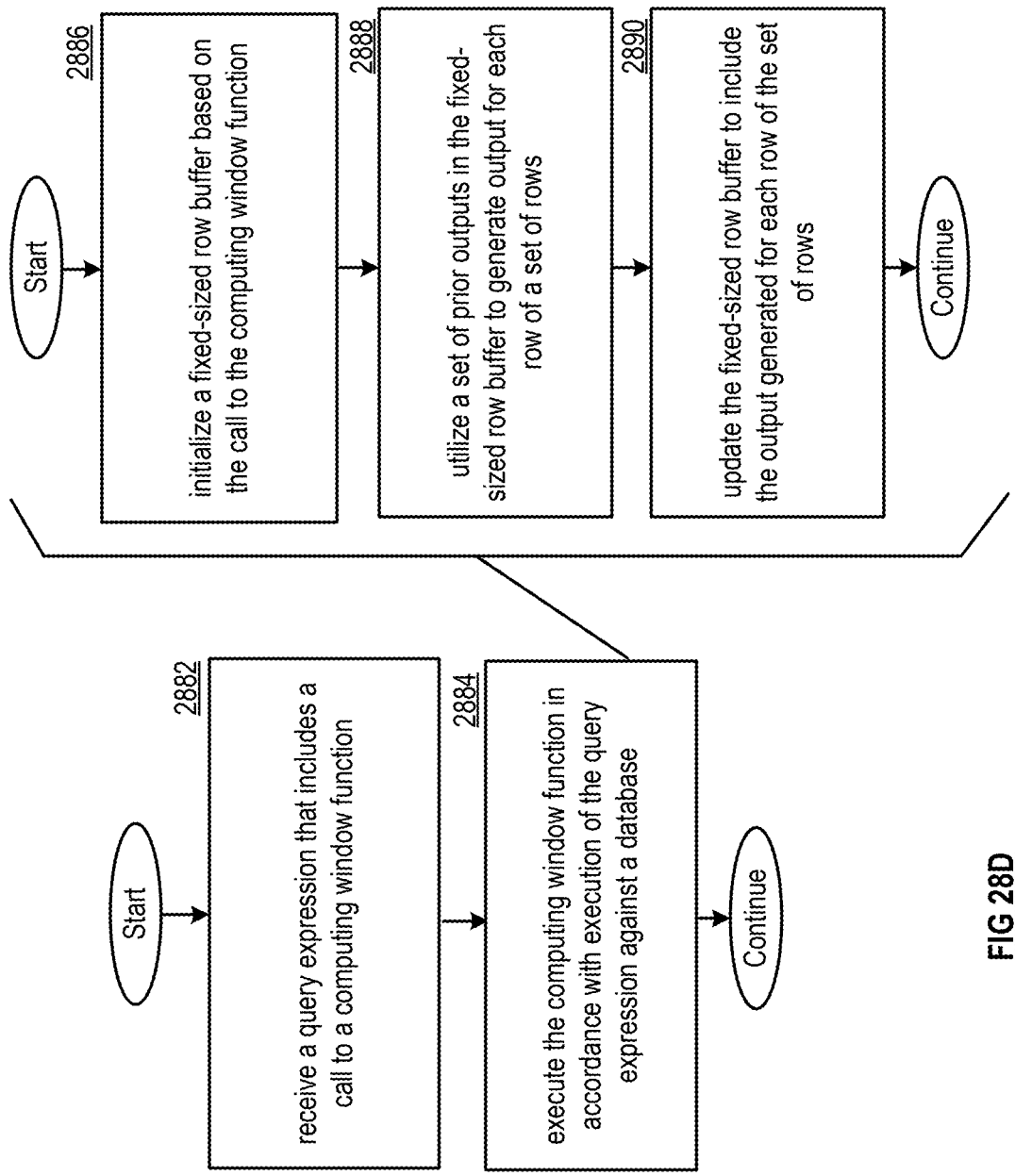
FIG. 28D is a flow diagram illustrating a method of processing a query expression by maintaining a fixed-sized row buffer in accordance with various embodiments.

FIG. 28D illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. Some or all of the steps of FIG. 28D can be performed by one or more embodiments of node 37 discussed in conjunction with FIGS. 25A-25E. Some or all of the method of FIG. 28D can be performed by the operator flow generator module 2514, the execution plan generating module 2516, and/or the query execution module 2504 of FIG. 26A. Some or all of the method of FIG. 28D can be performed by the row buffer size determination module 2835 of FIG. 28A, by the row buffer initialization module 2830 of FIG. 28A, and/or by the row buffer update module 2860 of FIGS. 28B and/or 28C. Some or all of the method of FIG. 28D can be performed by and/or based on communication with one or more client devices 2550. Some or all of the steps of FIG. 28D can optionally be performed by any other processing module of the database system 10. Some or all of the steps of FIG. 28D can be performed to implement some or all of the functionality of the query processing system of FIG. 25A and/or FIG. 26A. Some or all of the steps of FIG. 28D can be performed to implement some or all of the functionality of the query processing system 2502 of FIGS. 26G-26I and/or FIG. 27D. Some or all of the steps of FIG. 28D can be performed to implement some or all of the functionality of the query processing system 2502 of FIGS. 28A-28C. Some or all steps of FIG. 28D can be performed by database system 10 in accordance with other embodiments of the database system 10 and/or nodes 37 discussed herein. Some or all steps of FIG. 28D can optionally be performed in conjunction with some or all steps of FIG. 26K, FIG. 26L, and/or FIG. 27E.

Step 2882 includes receiving a query expression that includes a call to a computing window function, such as computing window function call 2620. For example, performing step 2882 can include and/or can be based on performing step 2882 of FIG. 26K. Step 2884 includes executing the computing window function in accordance with execution of the query expression against a database, such as database storage system 2560. For example, performing step 2884 can include and/or can be based on performing step 2684 of FIG. 26K.

Performing step 2884 can include performing steps 2886, 2888, and/or 2890. Step 2886 includes initializing a fixed-sized row buffer based on the call to the computing window function. This can include automatically determining a number of rows R of the fixed-sized row buffer based on the call to the computing window function. Step 2888 includes utilizing a set of prior outputs in the fixed-sized row buffer to generate output for each row of a set of rows. Step 2890 includes updating the fixed-sized row buffer to include the output generated for each row of the set of rows. This can include removing a least recent output from the fixed-sized row buffer to maintain its fixed number of rows when adding the output generated for a given row.

Figure 29A:
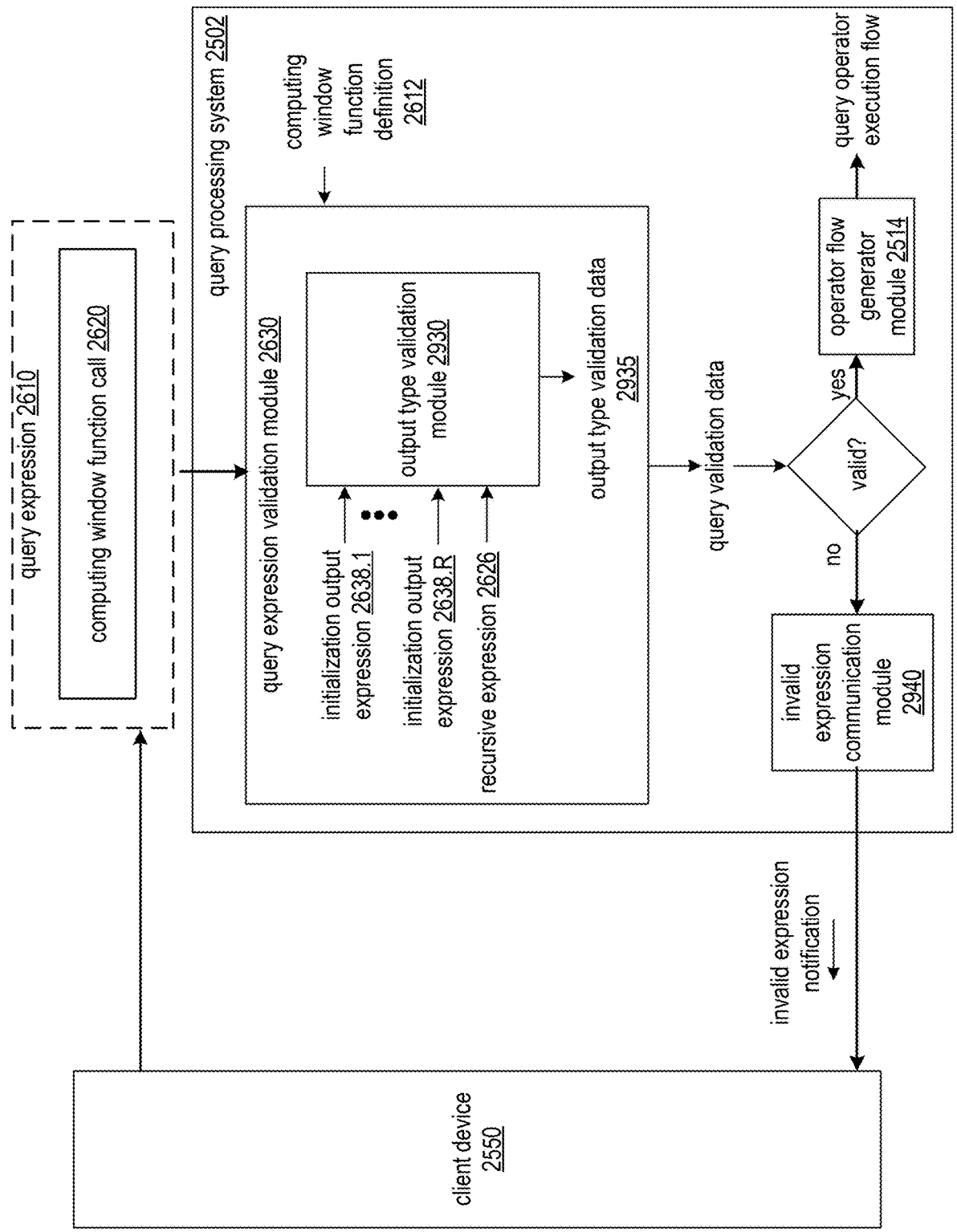
FIG. 29A is a schematic block diagram of an embodiment of a query execution module that implements an output type validation module in accordance with various embodiments.
Figure 29B:
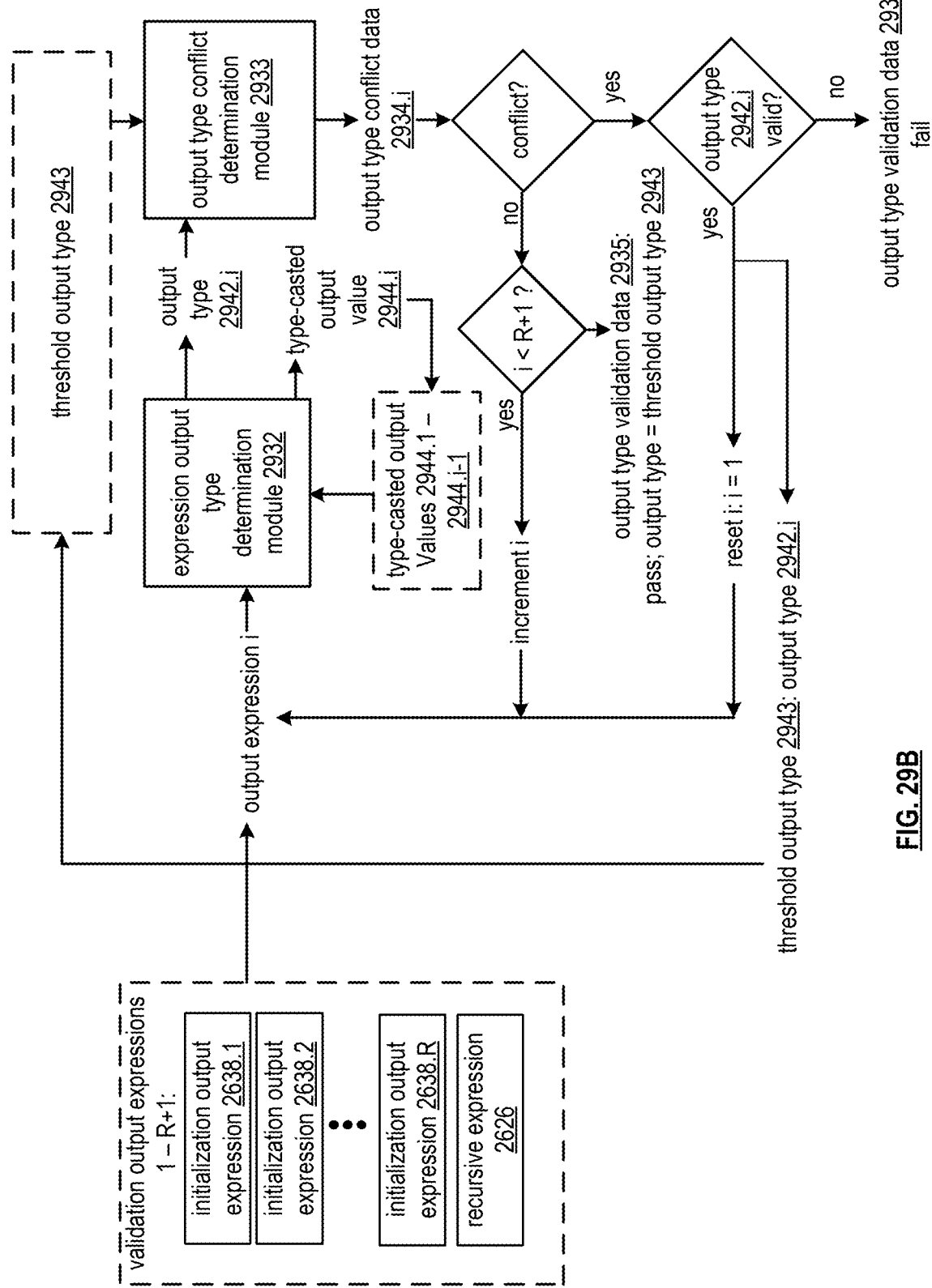
FIG. 29B illustrates example functionality of an output type validation module in accordance with various embodiments.

FIGS. 29A-29B illustrate embodiments of a query expression validation module 2630 that implements an output type validation module 2930. As illustrated in FIGS. 29A, the query expression validation module 2630 can be implemented by query processing system 2502 via one or more processing modules of the query processing system 2502. For example, query expression validation module 2630 is implemented by query processing system 2502 in conjunction with receiving a query expression 2610 to determine whether the query expression 2610 can be executed and/or meets requirements of the query language and/or the computing window function definition 2612. Some or all features and/or functionality of query processing system 2502 of FIG. 29A can be utilized to implement the query processing system 2502 of FIG. 26A and/or any other embodiment of the query processing system 2502 discussed herein.

In some cases, the query expression validation module 2630 is implemented by query processing system 2502 in a same or similar fashion as the query expression validation module 2630 of the client device 2550 of FIG. 26J. The query expression validation module 2630 can implemented by query processing system 2502 to generate query validation data for a received query expression 2610 as illustrated in FIG. 29A alternatively or additionally to being implemented by client device 2550 of FIG. 26J to generate query validation data for a proposed query expression 2610. In some cases, a query expression validation module 2630 that includes the output type validation module 2930 of FIG. 29A and FIG. 29B can optionally implemented by client device 2550 instead of and/or in addition to being implemented by the query processing system 2502 as illustrated in FIG. 29A.

Validation of computing window function calls can be challenging due to numeric types. User-supplied initialization values of initialization output expressions in the base case definition can not necessarily be relied upon to denote output type. For example, if a user supplies an integer data type as an initialization value, the output cannot necessarily be assumed to be an integer. In particular, if the recursive expression implements $x_1=x_0*1.5$, an integer would not be an appropriate output type for output of the recursive expression.

To resolve this problem, a validation step can be performed prior to execution to determine whether all output can evaluate to the same type without inducing conflict in evaluating other output. This can optionally include performing one or more iterations of adjusting the type casting of the outputs of initialization output expressions of the base case definition and the output of the recursive expression. If a "steady state" output type can be achieved for output of all initialization output expressions and the recursive expression, the validation passes. If this iteratively applied type casting renders some error in evaluating an initialization value/recursive output, validation fails.

As illustrated in FIG. 29A, implementing the query expression validation module 2630 can include implementing an output type validation module 2930 that performs an output data type validation step prior to executing the corresponding query. The output type validation module can generate output type validation data 2935 indicating whether all output 2674.1-2674.R generated in accordance with executing a computing window function call 2620 of query expression 2610 can be generated in accordance with a same matching data type. As this validation check is specific to computing window function calls 2620, in some cases, query expression validation module 2630 only implements the output type validation module 2930 for received query expressions 2610 that include a computing window function call 2620, for example, based on the computing window function keyword 2621 being included in the query expression 2610.

This can include extracting initialization output expressions 2638.1-2638.R from the computing window function call 2620 and/or extracting recursive expression 2626 from the computing window function call 2620. This can be accomplished based on a known syntax and/or structure of computing window function call 2620, such as the syntax and/or structure defined in computing window function definition 2612 and/or the syntax and/or structure discussed in conjunction with FIGS. 26A-26F and/or FIGS. 27A-27C.

The output expressions 2638.1-2638.R and recursive expression 2626 can be evaluated to determine whether a same data type can be achieved in evaluating output expressions 2638.1-2638.R and recursive expression 2626. If a same data type can be applied in evaluating all output expressions 2638.1-2638.R and recursive expression 2626, output type validation data 2935 can indicate that the output data type validation step has passed. If a same data type cannot be applied in evaluating all output expressions 2638.1-2638.R and recursive expression 2626, output type validation data 2935 can indicate that the output data type validation step has failed.

The query expression validation module 2630 can generate the query validation data based on the output type validation data and/or optionally based on one or more other validation steps performed based on other criteria corresponding to the computing window function call 2620 and/or other query language function calls 2619 of the query expression 2610, for example, as discussed in conjunction with FIG. 26J. The query validation data only indicates the query expression 2610 is valid if the output type validation data indicates the output data type validation step has passed for the query expression 2610. The query validation data always indicates the query expression 2610 is invalid if the output type validation data indicates the output data type validation step has failed for the query expression 2610.

As illustrated in FIG. 29A, when the query validation data generated by query expression validation module 2630 indicates the corresponding query expression 2610 is valid, the query expression 2610 can be processed for execution as discussed in conjunction with FIG. 26A. For example, when the query validation data indicates the query is valid, operator flow generator module 2514 is applied to generate the query operator execution flow data that is utilized in generating query execution plan data for execution of the query via query execution module 2504 as discussed in conjunction with FIG. 26A.

When the query validation data generated by query expression validation module 2630 indicates the corresponding query expression 2610 is invalid, the query expression 2610 is not executed based on not being valid for execution. For example, when the query validation data indicates the query is invalid, an invalid expression communication module 2940 generates an invalid expression notification that is transmitted to the client device 2550 that generated and/or sent the query expression 2610. As a particular example, the client device 2550 displays the notification via GUI 2555 and/or a user is prompted to enter a new query. The invalid expression notification can indicate particular problems identified by query expression validation module 2630, such as one or more problems identified in the output type validation data 2935 by generated output type validation module 2930.

FIG. 29B illustrates an example embodiment of the output type validation module 2930 of FIG. 29A. The output type validation module can perform the output data type validation step via one or more iterations of a type casting process.

For each iteration of the type casting process, output expressions included in a set of R+1 validation output expressions can be processed via an expression output type determination module 2932 to determine corresponding output types 2942. The set of R+1 validation output expressions can include the set of output initialization output expression 2638.1-2638.R of base case definition 2837 and can further include the recursive expression 2626.

In a given iteration, the initialization output expression 2638.1-2638.R can be processed by the output type determination module 2932 to determine corresponding output types 2942. The initialization output expression 2638.1-2638.R can be processed in order, starting with initialization output expression 2638.1. After all initialization output expressions 2638.1-2638.R are processed, and if the given type-casting iteration is not interrupted, the recursive expression 2626 is processed to determine the final output type 2942.R+1. Note that the recursive expression 2626 need be processed only once regardless of the number of rows that will ultimately be included in the ordered row set during execution, as additional iterations of the recursive expression will render the same output type.

Each output type 2942.$i$ can be evaluated as a cheapest and/or smallest possible data type to which the corresponding output value can be casted, for example, without inducing rounding errors or truncating the corresponding output value. For example, many numeric types may be possible to reflect some expression output. If an integer value is possible, such as a smallest-typed integer value such as TINYINT or other integer type of the corresponding query language, this data type value will be selected as output type 2942.$i$. If the integer value is not possible, for example, based on the expression indicating RESULT(−1)*1.5, then smallest possible data type such as FLOAT or DOUBLE or other type that enables non-integer values in the corresponding query language can be selected as output type 2942.$i$. Note that in cases where the output is expressed as a tuple construct 2730 as discussed in conjunction with FIGS. 27A-27D, a data type can be determined in this fashion for each of the G elements of the tuple via evaluating of the G output variable expressions of the corresponding output expression i.

In some cases, determining each output type 2942.$i$ can include evaluating the corresponding expression i to generate a type-casted output value 2944.$i$. This can include utilizing one or more previously generated type-cased output values 2944.1-2944.$i$−1, as referenced in corresponding output references 2652 of the given expression i.

In some cases, column values of the corresponding row and/or prior rows are referenced via column references 2654 of the given expression i. In some cases, these column values are read from database storage system 2560 to generate some or all type-casted output values 2944. In other cases, rather than reading actual column values, dummy replacement values are supplied for these column values. For example, these dummy replacement values are selected to have a known data type of the corresponding columns in a corresponding relational table.

The output types 2942.1-2942.$i$−1 of prior outputs can otherwise be maintained and utilized to determine the given output type 2942.$i$. Note that a given output type 2942.$i$ can be influenced by prior output types 2492.1-2492.$i$−1 and/or by the expression itself. For example, if the expression indicates RESULT(−1)*4 and the type-casted output value 2944.$i$−1 has a corresponding output type 2942.$i$−1 of type DOUBLE, the output type 2942.$i$ will render type DOUBLE. In some cases, a current threshold output type 2943 is applied to type-cast the first output 2942.1 in a corresponding iteration of the type casting process. The threshold output type 2943 is not utilized to generate output type 2942 for other output 2942.2-2942.R+1 as the prior, type-casted output will propagate to these subsequent output types.

In a given type-casting iteration, the output type 2942.$i$ determined for a given expression can be compared to the threshold output type 2943 via an output type conflict determination module 2933 to generate output type conflict data 2934.$i$. When the output type 2942.$i$ matches the threshold output type 2943, the output type conflict data 2934.$i$ indicates no conflict. When the output type 2942.$i$ does not match this threshold output type 2943, the output type conflict data 2934.$i$ indicates conflict.

The threshold output type 2943 can be determined based on a previous iteration of the type casting process. In the first iteration of the type casting process, this threshold output type 2943 can be initialized as a cheapest and/or smallest possible data type to which the first output value 2942.1 of the first initialization output expression 2638.1 can be casted.

If the output type conflict data 2934.$i$ indicates no conflict, the current iteration of the type casting process continues. In particular, if i is less than R+1 and/or if all expressions in the set of validation output expressions have otherwise not yet been evaluated via expression output type determination module 2932 in the current iteration of the type casting process. For example, i is incremented and/or a next output expression in the set of validation expressions is processed via expression output type determination module 2932 in accordance with the ordering.

This process of determining output types 2942 for each expression via output type determination module 2932 and comparing each output type 2942 to the threshold output type 2943 in a given iteration of the type casting process thus continues until conflict is indicated in output type conflict data 2934.$i$ for a given expression, or until all expressions are processed in the given iteration, where all output types 2942.1-2942.R+1 all have no conflict with the threshold output type 2943 for the given iteration.

If the output type conflict data 2934.$i$ indicates conflict based on the output type 2942.$i$ not matching and/or otherwise comparing unfavorably to the threshold output type 2943, the current iteration of the type-casting process ends. In some cases, this mismatching the output type 2942.$i$ with the threshold output type 2943 can occur based on the threshold output type being cheaper or smaller than the output type 2942.*i*. In such cases, the output type is deemed valid, and a new iteration of the type casting process commences starting again with the first initialization output expression 2638.1. However, for this new iteration of the type casting process, the threshold output type 2943 is updated to reflect the output type 2942.*i*, where all output types 2942.*i* are compared to this threshold output type 2943 in this iteration of the process in generating of the output type conflict data 2934.*i*.

As discussed previously the first type-casted output value 2944.1 in the next iteration can be type casted with the type of the threshold output type 2943 and/or the output type 2942.1 can otherwise be set as the threshold output type 2943, if valid. The type of this first type-casted output value 2944.1 can propagate and/or influence the cheapest and/or smallest type for selection of subsequent output types 2942.2-2942.R+1 in the given iteration. For example, all subsequent output types 2942.2-2942.R+1 are automatically set as the threshold output type 2943 based on the first output type 2942 being set as the threshold output type 2943 unless a more-expensive and/or larger data type than the threshold output type 2943 is required for the subsequent output type 2942, which would render another conflict and require a new iteration to commence with a more-expensive and/or larger data type.

In some cases, the output type conflict data 2934.*i* indicates conflict based on the threshold output type being larger and/or more expensive than the output type 2942.*i* and/or based on generating output not being possible for the given output, where not output type 2942.*i* could be generated based on an irresolvable type error. In such cases, the output type conflict data 2934.*i* indicates no output type is valid, and the output type validation data 2935 indicates failure of the output type validation process. The output type validation data 2935 can indicate the irresolvable expression and/or the mismatch between the output type 2942.*i* and the threshold output type 2943.

If all expressions are processed in the given iteration, where all output types 2942.1-2942.R+1 all have no conflict with the threshold output type 2943 for the given iteration, the output type validation module 2930 can generate output type validation data 2935 indicating the output data type validation step passes. The output type validation data 2935 can further indicate the threshold output type 2943 for the given iteration as the output type for the corresponding computing window function call 2620, for example, to be utilized in execution of the computing window function call 2620. As a particular example, all output can be type-casted to the output type for the corresponding computing window function call 2620. As another example, the query execution plan data can indicate the determined output type to enable the query execution module 2504 to process the query in accordance with the determined output type.

As a particular example, consider the case where an expression i includes mod(RESULT(−1), 5). This expression could be valid in cases where RESULT(−1) is cast as an integer and where all expressions 1-R+1 can be cast as an integer output, as determined via the output data type validation step. In such cases, the output type validation data 2935 would indicate passing of the data type validation step.

However, as second particular example, consider the case where a first initialization output expression 2638.1 includes the constant value 1, a second initialization output expression 2638.2 includes RESULT(−1)*1.5, and a third initialization output expression 2638.3 includes mod(RESULT (−1), 5). The first iteration of the type casting process would begin with the threshold output type 2943 as an integer type such as a BIGINT, for example, based on the first expression 2638.1 having the constant value 1 being capable of being evaluated as an integer. This first iteration of the type casting process would abort based on expression 2638.2 including RESULT(−1)*1.5, which requires a float or double typed output that conflicts with the threshold output type 2943 of integer.

Continuing with this second example, a next iteration of the type casting process commences with the first expression 1 with the constant value 1 being type-casted as a double based on the threshold output type 2943 being updated. The first expression 2638.1 and second expression 2638.2 both pass in this iteration, as the first expression with constant value 1 is cast to a double, and the second expression RESULT(−1)*1.5 resolves as a double based on the first expression being cast as a double. The third expression 2638.3 that includes mod(RESULT(−1), 5) results in an irresolvable error in this iteration, as a modulo function cannot be performed on a double and can only be performed on integers. This results in an irresolvable conflict where no valid data type is available, as the second expression RESULT(−1)*1.5 must resolve as a double or float, but is used as input to the modulo function of the third expression, which must be integer input and is not defined for double input. In particular, plugging in a double value for RESULT (−1) to determine the output type based on the prior output being cast as a double causes this irresolvable conflict. In this case, the output type validation data 2935 would indicate failure of the data type validation step.

As a third particular example to illustrate this process when expressions are presented in a different order, consider the case where the first initialization output expression 2638.1 again includes the constant value 1, the second initialization output expression 2638.2 includes mod(RESULT(−1), 5), and the third initialization output expression 2638.3 includes RESULT(−1)*1.5. The first iteration of the type casting process would begin with the threshold output type 2943 as an integer type such as a BIGINT, for example, based on the first expression 2638.1 having the constant value 1 being capable of being evaluated as an integer. The second initialization output expression 2638.2 would also pass in this first iteration based on mod(RESULT(−1), 5) being having an output type of an integer based on the modulo function, and based on the modulo function having the input RESULT(−1) being plugged in as the required integer based on the first expression being evaluated as an integer. This first iteration of the type casting process would abort based on expression 2638.3 including RESULT(−1) *1.5, which requires a float or double typed output that conflicts with the threshold output type 2943 of integer.

Continuing with this third example, a next iteration of the type casting process commences with the first expression 1 with the constant value 1 being type-casted as a double based on the threshold output type 2943 being updated. The second expression 2638.2 fails in this iteration, as the first expression with constant value 1 is cast to a double, but second expression 2638.3 that includes mod(RESULT(−1), 5) results in an irresolvable error, as the modulo function is not defined for double data types and can only be performed on integers. This again results in an irresolvable conflict where no valid data type is available, as the third expression RESULT(−1)*1.5 must resolve as a double or float. Even though the constant value of the first expression supplied as input to the modulo function of the second expression could be cast as either an integer or a double without knowledge of the other expression, it must be cast as a double because the third expression must be cast as a double and because all expressions must resolve as a same type of output. However, casting all output to double to render same output type requires that a double type is supplied as input to the modulo function of the second expression rather than the required integer input. In this case, the output type validation data 2935 would indicate failure of the data type validation step.

Figure 29C:
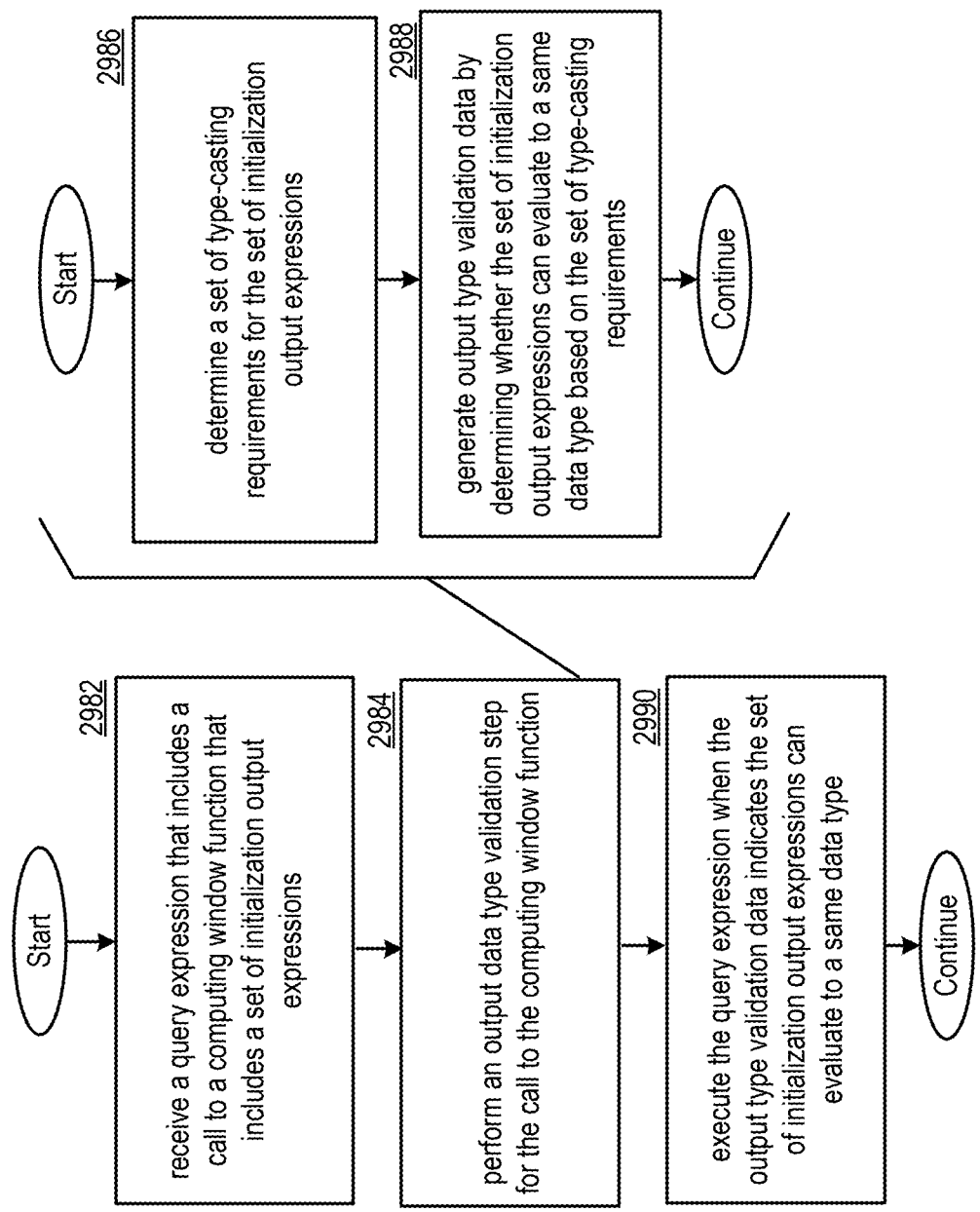
FIG. 29C is a flow diagram illustrating a method of performing an output data type validation step for a query expression in accordance with various embodiments.

FIG. 29C illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29C. Some or all of the steps of FIG. 29C can be performed by one or more embodiments of node 37 discussed in conjunction with FIGS. 25A-25E. Some or all of the method of FIG. 29C can be performed by the operator flow generator module 2514, the execution plan generating module 2516, and/or the query execution module 2504 of FIG. 26A. Some or all of the steps of FIG. 29C can be performed by the query expression validation module 2630 of FIG. 29A, for example, by utilizing the output type validation module 2930 of FIG. 29A and/or FIG. 29B. Some or all of the method of FIG. 29C can be performed by and/or based on communication with one or more client devices 2550, for example, by utilizing the query expression validation module 2630 of FIG. 26J. Some or all of the steps of FIG. 29C can optionally be performed by any other processing module of the database system 10. Some or all of the steps of FIG. 29C can be performed to implement some or all of the functionality of the query processing system of FIG. 25A and/or FIG. 26A. Some or all of the steps of FIG. 29C can be performed to implement some or all of the functionality of the query processing system 2502 of FIGS. 26G-26I and/or FIG. 27D. Some or all steps of FIG. 29C can be performed by database system 10 in accordance with other embodiments of the database system 10 and/or nodes 37 discussed herein. Some or all steps of FIG. 29C can optionally be performed in conjunction with some or all steps of FIG. 26K, FIG. 26L, FIG. 27E, and/or FIG. 28D.

Step 2982 includes receiving a query expression that includes a call to a computing window function that includes a set of initialization output expressions. This call to the computing window function can be implemented as computing window function call 2620 and can indicate the set of initialization output expressions as initialization output expressions 2938.1-2938.R. The call to the computing window function can further include a recursive expression 2626. For example, performing step 2982 can include and/or be based on performing step 2682 of FIG. 26K. Step 2984 includes performing an output data type validation step for the call to the computing window function, for example, by implementing some or all of the functionality of the output type validation module 2930 of FIGS. 29A and/or 29B.

Performing step 2984 can include performing step 2986 and/or step 2988. Step 2986 includes determining a set of type-casting requirements for the set of initialization output expressions and/or for a recursive expression. Performing step 2984 can include determining type-casting requirements for each of the for the set of initialization output expressions in order, starting with the first initialization output expression. Performing step 2984 can include determining type-casting requirements for a given one of the for the set of initialization output expressions based on type-casting requirements determined for previous ones of the set of initialization output expressions. Performing step 2984 can include determining type-casting requirements for the recursive expression after determining type-casting requirements for each of the for the set of initialization output expressions in order, for example, based on type-casting requirements determined for the set of initialization output expressions.

Performing step 2984 can include performing one or more iterations of a iterations of the type casting process of FIG. 29B. Performing step 2984 can be based on generating output types 2942 for the set of initialization output expressions and/or generating type casted output values 2944 in one or more iterations of the type casting process of FIG. 29B. Performing step 2984 can be based on determining and/or updating a threshold output type 2943 for one or more corresponding iterations of the type casting process. Performing step 2984 can include, for a given iteration of the type casting process, setting an output type 2942.1 for a first initialization output expression as the threshold output type 2943 determined in a previous iteration of the type casting process. Performing step 2984 can include, for a given iteration of the type casting process, type-casting type-casted output value 2944.1 for a first initialization output expression based on the threshold output type 2943 determined in a previous iteration of the type casting process. Performing step 2984 can include determining a required data type for a given output of a particular initialization output expressions based on this output being input of a next initialization output expression and/or based on being input of the recursive expression.

Step 2988 includes generating output type validation data by determining whether the set of initialization output expressions can evaluate to a same data type based on the set of type-casting requirements. For example, performing step 2988 can include performing one or more iterations of the type casting process of FIG. 29B. This can include determining whether an output type determined for each of the set of initialization output expressions match and/or compare favorably to one another. Performing step 2988 can include determining, for a given iteration of the type casting process, whether an output type determined for each of the set of initialization output expressions match and/or compare favorably to the threshold output type 2943 determined in a prior iteration of the type casting process. Performing step 2988 can include determining whether a given expression of the set of initialization output expressions can or cannot be evaluated based on a type-casting requirement of output of a previous initialization output expressions utilized as input to the given expression and/or based on input data type requirements of one or more mathematical operators and/or function calls of the given expression. Performing step 2988 can include determining whether the recursive expression can or cannot be evaluated based on a type-casting requirement of output of a previous initialization output expressions utilized as input to the given expression and/or based on input data type requirements of one or more mathematical operators and/or function calls of the given expression.

Step 2990 includes executing the query expression. For example, performing step 2990 can include and/or be based on performing step 2684 of FIG. 26K. Step 2990 is performed only when the output data type validation step for the call to the computing window function is determined to pass in performing step 2984. For example, the output data type validation step for the call to the computing window function is determined to pass based on the output type validation data generated in step 2988 indicating the set of initialization output expressions can evaluate to a same data type. When the output data type validation step for the call to the computing window function is determined to fail in performing step 2984, the query expression is not executed and/or a notification indicating the query expression is invalid is generated and transmitted to a client device that generated and/or sent the query expression.

FIGS. 30A-30D illustrate embodiments of a query processing system 2502 that processes and executes query expressions 2610 that include custom table-valued function calls 3020. Some or all features and/or functionality of embodiments of query processing system 2502 of FIGS. 30A-30D can be utilized to implement the query processing system 2502 of FIG. 25A and/or any other embodiment of query processing system 2502 discussed herein. Some or all features of embodiments of query expression 2610 of FIGS. 30A-30D can be utilized to implement some or all query expressions of FIG. 25A and/or any other embodiment of query expressions 2610 discussed herein.

Note that some query expressions of FIG. 25A that are received, processed and/or executed by query processing system 2502 can include custom table-valued function calls 3020 of FIGS. 30A-30D while other query expressions of FIG. 25A that are received, processed and/or executed by query processing system 2502 can include computing window function calls 2620 as discussed in conjunction with FIG. 26A-29C. Note that some query expressions of FIG. 25A that are received, processed and/or executed by query processing system 2502 can include both custom table-valued function calls 3020 and computing window function calls 2620.

Traditional database structures can implement very simple table-valued functions (TVFs). These traditional TVFs return result sets when called, so they can be used in a SQL statement anywhere a table could be used. Typically they have no input arguments, or just take scalar input arguments.

However, many desired time-series applications require configurable result set output that is not supported by the simple TVFs of these traditional databases. FIGS. 30A-30D present more configurable table-valued functions that enable any result set to be generated. For example, the result set can be configured to include a brand new table with brand new columns and/or with modified columns of existing tables. Users and/or administrators can define broader, customizable TVFs to generate result set based on custom criteria. These custom TVFs can take a set of scalar argument as input. These custom TVFs can be applied to one or more existing tables as input, for example, based on repurposing a traditional SQL OVER( ) clause and/or other windowing function calls of an existing query language. The custom scalar arguments of the custom TVF can be functions of values in one or more existing tables to render output tables with the same and/or different number of columns. For example, these columns of the result set can be expressed as scalar functions of the one or more tables supplied as input to the table valued function. This improves the technology of database systems by enabling more configurable result sets to be generated via calls to table-valued functions in query expressions.

As illustrated in FIG. 30A, a query expression 2610 can be received by query processing system 2502 that includes a custom TVF call 3020 and/or one or more query language function calls 2619. The custom TVF call 3020 can include a custom TVF keyword 3021 and/or a custom TVF argument set 3022. The custom TVF keyword 3021 and/or a custom TVF argument set 3022 can be in accordance with a corresponding custom TVF definition 3012.

The custom TVF keyword 3021 can identify the custom TVF and/or can be unique to the custom TVF. For example, the query expression 2610 can be written in accordance with an existing query language such as SQL, and the custom TVF keyword 3021 can be distinct from a plurality of reserved keywords of the existing query language. The custom TVF keyword 3021 can be implemented as an additional reserved keyword, where column names and/or new function names supplied by users cannot utilize the custom TVF keyword 3021.

The custom TVF argument set 3022 can include a set of one or more scalar arguments 3023.1-3023.S. Each scalar argument 3023 included in the custom TVF call 3020 can correspond to constant values and/or expressions such as subqueries supplied as input. Some scalar arguments 3023 can optionally include one or more query language function calls 2619 and/or one or more mathematical operators 2629 to implement a corresponding expression.

The custom TVF argument set 3022 can include a set of one or more input row set identification parameters 3045.1-3045.V. For example, the set of input row set identification parameters 3045.1-3045.V can indicate one or more relational tables and/or can include filtering parameters designating which rows be accessed to render an input row set. The input row set identification parameters can identify rows stored in database storage system 2560. In other cases, a set of rows included in a result set outputted by another TVF indicated in the query expression and/or outputted by a previous query expression is utilized as input row set identification parameters. For example, output of one custom TVF call 3020 included in the query expression 2610, can be utilized as the input row set for another custom TVF call 3020 included in the query expression 2610.

In some cases, the custom TVF argument set 3022 does not include any input row set identification parameters, where the result set generated by the custom TVF is not a function of existing rows and is instead a function of the set of scalar arguments 3023.1-3023.S alone. In some cases, the custom TVF argument set 3022 does not include any scalar arguments, where the result set generated by the custom TVF is not a function of supplied scalar arguments and is instead a fixed function of the custom TVF argument set 3022.

As a particular example, a custom TVF call 3020 with two scalar arguments performed upon two input row sets can be structured as "TVF_FUNCTION(scalar_arg1, scalar_arg2) OVER(SELECT . . . , SELECT . . . )." Note that "TVF_FUNCTION" can correspond to any TVF keyword 3021 of a corresponding custom TVF, such as any corresponding string, word, and/or set of symbols. "scalar_arg1" and "scalar_arg2" can populated by two scalar arguments 3023.1 and 3023.2, such as constant values or expressions supplied in the custom TVF call 3020. The "OVER" keyword can be utilized to denote a corresponding set of input, where the " . . . " following the first "SELECT" keyword is populated with parameters in accordance with SQL syntax to implement the input row set identification parameters 3045.1 and where the" . . . " following the second "SELECT" is populated with parameters in accordance with SQL syntax to implements input row set identification parameters 3045.2. Other custom TVF calls 3020 can have different structure and/or syntax that denotes the TVF keyword 3021, the scalar arguments 3023.1-3023.S, and/or the set of input row set identification parameters 3045.1-3045.V.

The operator flow generator module 2514 can generate the query operator execution flow based on extracting the custom TVF call 3020 and utilizing a custom TVF definition for the custom TVF call 3020. The resulting query operator execution flow can include a set of operators that, when executed by the query execution module, implement the custom TVF call 3020 in accordance with the supplied set of scalar arguments 3023.1-3023.S based on reading one or more sets of rows based on the identified input row set parameters 3045.1-3045.V. The resulting query execution plan data generated by the execution plan generating module 2516 can cause the query execution module to generate a result set in accordance with the custom TVF definition 3012, the supplied set of scalar arguments 3023.1-3023.S, and/or the identified input row set parameters 3045.1-3045. V. The query resultant 3015 can include this result set and/or can be based on further processing of this result set, for example, in accordance with query language function calls 2619.

The query expression 2610 can be sent from and/or generated by a client device 2550 can include a custom TVF call 3020. The query expression can be generated by the client device 2550 to include the custom TVF call 3020 via user input to GUI 2555. For example, the application data 2553 can include one or more one or more custom TVF definitions 3012 that is utilized to generate and/or validate the custom TVF call 3020 in a same or similar fashion as generating and validating computing window function calls 2620 based on computing window function definition 2612 as discussed in conjunction with FIG. 26J.

FIG. 30B illustrates an embodiment of a query processing system 2502 that includes a function definition library 3030 that includes a plurality of different custom TVF definitions 3020.1-3020.T. For example, multiple different custom TVFs that have different functionality can be defined and called in query expressions 2610 received from one or more client devices 2550 for execution. The function definition library 3030 can be stored by the query processing system 2502 in at least one memory module of the query processing system 2502 and/or can be otherwise determined by the query processing system 2502. The query processing system 2502 of FIG. 30B can be utilized to implement the query processing system 2502 of FIG. 30A.

Each custom TVF definition 3012 of the set of custom TVF definitions 3021.1-3021.T can have its own custom TVF keyword 3021. The set of custom TVF keywords 3021.1-3021.T can all be distinct from one another to uniquely identify the corresponding custom TVF definition.

Each custom TVF definition 3012 can indicate argument set data 3032 indicating requirements and/or information regarding the set of arguments 3023.1-3023.S to be included in custom TVF calls 3020 for the corresponding custom TVF. For example, the argument set data 3032 of a particular TVF definition can indicate: a number S of scalar arguments of the custom TVF; an ordering of the S scalar arguments of the custom TVF; a data type of some or all of the scalar arguments 3023.1-3023.S, and/or syntax and/or structure requirements for the S scalar arguments. Different TVF definitions 3012 can indicate different numbers, orderings, and/or types of scalar arguments, the argument set data 3032 of a particular TVF definition can alternatively or additionally indicate: a number V of input row sets; an ordering of the V input row sets, syntax and/or structure requirements for the identification parameters of each input row set; requirements for the input row sets such as number of rows, number of columns, and/or data types of columns. Different TVF definitions 3012 can have input row set identification data indicating different numbers, orderings, and/or types of row sets.

Each custom TVF definition 3012 can indicate execution instruction data 3034 indicating how the result set outputted by the TVF is generated as a function of the scalar arguments 3023.1-3023. S and/or the input row sets identified in the identified input row set parameters 3045.1-3045.V. The execution instruction data 3034 can indicate instructions indicating how each scalar arguments 3023.1-3023.S will be applied to the input row sets identified by the identified input row set parameters 3045.1-3045.V to generate the result set outputted by the custom TVF. For example, the execution instruction data 3034 expresses how to generate one or more rows of the result set as functions, configured by the scalar arguments 3023.1-3023.S, of the rows in identified input row sets. As another example, the execution instruction data 3034 expresses values of one or more columns of the rows in the result set as functions, configured by the scalar arguments 3023.1-3023.S, of one or more column values in the identified input row sets.

Some or all custom TVF definitions 3012 of the function definition library 3030 can be generated via user input, can be retrieved from memory of the query processing system 2502, and/or can otherwise be determined by the query processing system 2502. A given custom TVF definition 3012 can be generated via user input to a client device 2550 via GUI 2555. A given custom TVF definition 3012 can be generated by utilizing administrative sub-system 15 and/or configuration sub-system 16. For example, a given custom TVF definition 3012 is generated and/or configured by an administrator of the database system 10 as a custom, built-in function in addition to a plurality of function of the existing query language. As another example, a given custom TVF definition 3012 is generated and/or configured by an end user of the database system 10 as a custom function to be called in future query expressions as discussed in conjunction with FIGS. 33A-33E.

The operator flow generator module can include a function call extraction module 3040 that identifies and extracts various function calls, such as custom TVF calls 3020, computing window function calls 2620, and/or query language function calls 2619. Execution data can be generated for the query expression 2610 by function call extraction module 3040 based on one␣ore function calls extracted via function call extraction module 3040. This execution data can indicate the query operator execution flow and/or can be utilized to generate the query operator execution flow.

In particular, the function call extraction module 3040 can include a custom TVF call extraction module 3042 that generates execution data for one or more custom TVF calls 3020 included in query expressions 2610. The custom TVF call extraction module 3042 can identify the custom TVF keyword 3021 of a given custom TVF call 3020 in the query expression. The custom TVF call extraction module 3042 can access and/or utilize the function definition library 3030 to determine execution data for the custom TVF call, such as a serial and/or parallelized ordering of one or more operators of the resulting query operator execution flow that implement the corresponding custom TVF call. This can be based on accessing and/or utilizing the argument set data 3032 of the corresponding custom TVF definition 3012 and/or can be accessing and/or utilizing the execution instruction data 3034 of the given custom TVF definition 3021. This can further be based on applying the argument set data 3032 of the corresponding custom TVF definition 3012 to the custom TVF argument set 3022.2 supplied in the given custom TVF call 3020. This can further be based on applying the execution instruction data 3034 of the corresponding custom TVF definition 3012 to the custom TVF argument set 3022.2 supplied in the given custom TVF call 3020.

In the example illustrated in FIG. 30B, the received query expression 2610 includes a custom TVF call 3020 that includes a particular custom TVF keyword 3021.2, denoting a corresponding custom TVF definition 3012.2. The custom TVF call extraction module 3042 identifies the custom TVF keyword 3021.2 in the query expression 2610 and accesses the corresponding function definition 3012.2 in the function definition library. In particular, the argument set data 3021.2 and/or execution instruction data 3034.2 is accessed and applied to the custom TVF argument set 3022 of the given query expression 2610 to generate execution data foe the given custom TVF call 3020 of the given query expression 2610. Not that if the query expression includes multiple custom TVF calls 3020 to the same or different custom TVF in the function definition library, each of these custom TVF calls 3020 can be extracted and processed by the custom TVF call extraction module 3042 accordingly.

FIG. 30C illustrates an embodiment of query execution module 2504 that executes a query in accordance with a query expression 2610 that includes a custom TVF call 3020. Some or all features and/or functionality of the query execution module 2504 of FIG. 30C can be utilized to implement the query execution module 2504 of FIG. 30A, FIG. 25A, and/or any other embodiment of query execution module 2504 described herein. Some or all features and/or functionality of the query execution module 2504 of FIG. 30C can optionally be implemented by query processing modules 2435 of one or more nodes 37 participating in a corresponding query execution plan 2405.

One or more row sets 3072 can be read from database storage system 2560 based on input row set identification parameters 3045.1-3045.V. For example, a set of rows 2530.1-2530.M are read from one or more relational tables 2532 based on the input row set identification parameters 3045.1-3045.V. In this example, the set of rows 2530.1-2530.M each have a set of column values 3076.1-3076.B for a same set of fields 1-B, for example, in accordance with some or all of a set of columns of a corresponding relational table 2532.

Execution of the custom TVF call 3020 can include utilizing the custom TVF definition 3012 by applying the given scalar arguments 3023.1-3023.S of the given query expression to generate a new row set 3062. The new row set 3062 can correspond to the output result set, and can be included in and/or further processed to generate query resultant 3015.

This new row set can include a plurality of L new rows 3074.1-3074.L. The number of new rows L can be the same as or different from the number of rows M in row set 3072. For example, the number of new rows L can be the same as the number of rows M when the custom TVF includes modifying each row 2530.i, processing each row 2530.i, and/or generating new columns for each row 2530.i in the row sets 3072 to render a corresponding new row 3074.i in the new row set 3062.

The plurality of L new rows 3074.1-3074.L can have column values 3076.1-3076. C for a set of fields 1-C of the new row set 3062, for example, in accordance with some or all of a new set of columns of a new corresponding relational table 2532. This number of columns C in the new row set can be the same as or different from the number of columns B in the row set 3072. For example, the number of new columns C can be the same as the number of columns M when the custom TVF includes modifying some or all columns 1-B of some or all rows 2530 to render modified columns 1-C for new rows 3074. In some cases, one or more columns of the new row set 3062 can have its column values for some or all new rows 3074.1-3074.L identical to the original column values in rows of row set 3072 for corresponding rows 2530.

FIG. 30D illustrates a particular example of a function definition library 3030. The function definition library of FIG. 30D can be utilized to implement the function definition library 3030 of FIG. 30B.

The function definition library 3030 can include a resampling TVF definition 3112 that implements one of the custom TVF definitions 3012.1-3012.T of FIG. 30B. For example, the resampling TVF definition 3112 can be utilized to implement the resampling TVF calls described in conjunction with FIGS. 31A-31B. The resampling TVF definition 3112 can optionally correspond to a built-in function that is defined and/or configured by an administrator and/or that is available for use by all end users in their query expressions 2610. For example, the resampling TVF definition 3112 can be sent to client devices 2550 and/or can be included in application data 2553.

The function definition library 3030 can alternatively or additionally include an extrapolation TVF definition 3212 that implements one of the custom TVF definitions 3012.1-3012.T of FIG. 30B. For example, the extrapolation TVF definition 3212 can be utilized to implement the extrapolation TVF calls described in conjunction with FIGS. 32A-32C. The extrapolation TVF definition 3212 can optionally correspond to a built-in function that is defined and/or configured by an administrator and/or that is available for use by all end users in their query expressions 2610. For example, the extrapolation TVF definition 3212 can be sent to client devices 2550 and/or can be included in application data 2553.

The function definition library 3030 can alternatively or additionally include a plurality of user-defined function definitions 3312.1-3312.U that implements a corresponding set of U custom TVF definitions in the set of custom TVF definitions 3012.1-3012.T of FIG. 30B. For example, the user-defined function definitions 3312.1-3312.U can be utilized to implement the new function calls described in conjunction with FIGS. 33A-33E. As a particular example, some or all user-defined function definitions 3312 can be defined based on corresponding user-defined function creation calls described in conjunction with FIGS. 33A-33E.

In some cases, the set of user-defined function definitions 3312.1-3312.U can be generated by one or more client devices 2550 based on application data 2553. For example, a set of different users generated some or all of the set of user-defined function definitions 3312.1-3312.U via client devices 2550. In some cases, a given user-defined function definition 3312 is not made available to all users. For example, a given user-defined function definition 3312 is only available for use by one or more users corresponding to the client device 2550 that generated and/or sent a corresponding user-defined function creation call. As a particular example, the function definition library 3030 will access a given user-defined function definitions 3312 based on a keyword identified in a corresponding new function call when the user-defined function definitions 3312 was created by a corresponding client device 2550 and/or corresponding user.

The function definition library 3030 can alternatively or additionally include any other custom TVF definition 3012, for example, corresponding to other built-in and/or user defined TVFs in accordance with features and/or functionality of TVFs described herein. While not illustrated, the function definition library can further a set of include built-in and/or user-defined scalar functions and/or further a set of include built-in and/or user-defined window functions, such as the computing window function definition 2612 as a built-in function. While not illustrated, the function definition library can further include existing TVFs, existing scalar functions, and/or existing window functions of a corresponding existing query language under which query expressions 2610 are written, such as SQL TVFs, SQL scalar functions, and/or SQL window functions.

FIG. 30E illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30E. Some or all of the steps of FIG. 30E can be performed by one or more embodiments of node 37 discussed in conjunction with FIGS. 25A-25E. Some or all of the method of FIG. 30E can be performed by the operator flow generator module 2514, the execution plan generating module 2516, and/or the query execution module 2504 of FIG. 30A. Some or all of the method of FIG. 30E can be performed by the function call extraction module 3040 of FIG. 30B, for example, by utilizing the custom TVF call extraction module. Some or all of the steps of FIG. 30E can be performed by the query execution module 2504 of FIG. 30C. Some or all of the method of FIG. 30E can be performed by and/or based on communication with one or more client devices 2550. Some or all of the steps of FIG. 30E can optionally be performed by any other processing module of the database system 10. Some or all of the steps of FIG. 30E can be performed to implement some or all of the functionality of the query processing system of FIG. 25A and/or FIG. 30A. Some or all steps of FIG. 30E can be performed by database system 10 in accordance with other embodiments of the database system 10 and/or nodes 37 discussed herein.

Step 3082 includes receiving a query expression that includes a call to a custom table-valued function, such as a custom TVF call 3020. The call to the custom table-valued function can include at least one scalar argument and/or can indicate at least one set of rows. The call to the custom table-valued function can be in accordance with a corresponding custom TVF definition 3012. Step 3084 includes executing the custom table-valued function in accordance with execution of the query expression against a database, for example, by utilizing query execution module 2504 and/or by accessing database storage system 2560.

Performing step 3084 can include performing step 3086 and/or 3088. Step 3086 includes applying the at least one scalar argument to the at least one set of rows in accordance with a function definition corresponding to the custom table-valued function to generate a result set. For example, step 3086 is performed as illustrated and discussed in conjunction with FIG. 30C. Step 3088 includes generating a query resultant based on the result set.

FIG. 31A illustrates an embodiment of a query processing system 2502 that processes and executes query expressions 2610 that include a resampling table-valued function call 3120. Some or all features and/or functionality of the embodiment of query processing system 2502 of FIG. 31A can be utilized to implement the query processing system 2502 of FIG. 25A, the query processing system 2502 of FIGS. 30A-30D, and/or any other embodiment of query processing system 2502 discussed herein. Some or all features and/or functionality of embodiments of query processing system 2502 described in conjunction with FIGS. 30A-30D can be utilized to implement the query processing system 2502 of FIG. 31A. Some or all features of embodiments of resampling table-valued function calls 3120 of FIGS. 31A-31B can be utilized to implement at least one table-valued function call 3020 of FIGS. 30A-30D and/or can be implemented by utilizing features of table-valued function calls 3020 of FIGS. 30A-30D.

Uniformly sampled time-series data is ideal in various data analysis applications. For example, exponential smoothing, FFTs, and/or digital signal processing functions are ideally performed upon time-series data that is uniformly sampled. Resampling of raw data is therefore desired in processing and/or analyzing raw time-series data, such as corresponding rows 2530 of database storage system 2560, as it may not have been uniformly sampled. However, implementing resampling can be challenging with standard SQL constructs. A custom table-valued function of FIGS. 30A-30D can be defined and utilized to implement resampling as a resampling TVF to resample the supplied input data based on user-specified fixed intervals in some user-specified dimension.

As illustrated in FIG. 31A, a resampling TVF call 3120 can include a corresponding resampling TVF keyword 3121 and resampling TVF argument set 3122, for example, implemented as the custom TVF argument set 3022 of FIG. 30A. The resampling TVF call can optionally include a corresponding resampling TVF argument keyword set 3124. For example each keyword in resampling TVF argument keyword set 3124 denotes a corresponding argument in resampling TVF argument set 3122 supplied in the resampling TVF call 3120. A particular example of structure of the resampling TVF call 3120 is discussed in conjunction with FIG. 31B.

The resampling TVF call 3120 can be in accordance with a resampling TVF definition 3112, which can be stored in function definition library 3030, can be sent to client device 2550, and/or can otherwise be determined by the query processing system 2502 and/or client device 2550. The operator flow generator module 2514 can utilize the resampling TVF definition 3112 to generate a query operator execution flow in accordance with the supplied arguments of resampling TVF argument set 3122 in the given resampling TVF call 3120. For example, the operator flow generator module 2514 of FIG. 31A can implement the custom TVF call extraction module 3042 to identify the resampling TVF keyword 3121 in the query expression 2610 and can determine to apply the corresponding resampling TVF definition 3112 accordingly. This can include extracting each of the arguments in the resampling TVF argument set 3122 from the query expression 2610, for example, based on syntax and/or structure defined in the resampling TVF definition 3112 and/or based on identifying the corresponding resampling TVF argument keyword in the resampling TVF argument keyword set. The extracted arguments of the resampling TVF argument set 3122 can be utilized to generate the query operator execution flow based on the argument set data 3032 and/or the execution instruction data 3034 of the resampling TVF definition 3112. A query resultant 3015 can be generated to include and/or be based on a resampled row set 3162 outputted via performance of the resampling TVF in accordance with the supplied values and/or expressions of the resampling TVF argument set 3122, for example, based on query execution module 2504 executing query execution plan data generated based on the query operator execution flow. The resampled row set 3162 can be implemented as the new row set 3062 of FIG. 30C.

Because there are multiple different ways that data can be resampled, the syntax and/or structure of the resampling TVF calls is ideally flexible enough to handle as many of these possibilities to cover more user-desired implementation of resampling. The resampling TVF argument set 3122 of FIG. 31A can enable end users to configure many criteria constraining and/or dictating how the resampling of a given set of rows is performed. For example, these end users can write resampling TVF calls 3120 in query expressions 2610 for execution by query processing system 2502 via user input to client device 2550 via GUI 2555, for example, in accordance with execution of application data 2553 and/or in accordance with the resampling TVF definition 3112 that is received, stored and/or determined by the client device 2550.

In writing a resampling TVF call 3120, a user can identify how to start the resampling. One possibility is that a user may wish to resample starting on some aligned boundary, such as like exactly midnight. The other possibility is that we just want to start on the first row of the data. The resampling TVF argument set 3122 can provide a way to handle both of those possibilities. In particular, both of these possibilities can be expressed by allowing the start value to be an expression that can refer to values in the first row. This information can be supplied as a starting value argument 3141 of the resampling TVF argument set 3122 in accordance with the resampling TVF definition 3112. In some cases, no starting value argument 3141 is supplied in the resampling TVF call 3120 and the corresponding resampling TVF is instead executed based on the query processing system 2502 automatically selecting a starting value and/or generating the starting value argument 3141.

Alternatively or in addition, the user can specify the rule for when to create a new sample, can specify the fixed intervals to be applied, and/or can specify value to put in the sampling dimension column for every row created. This information can be supplied as an interval argument 3142 of the resampling TVF argument set 3122 in accordance with the resampling TVF definition 3112. As a particular example, if the resampling is performed on the time dimension, the interval can denote a number of seconds, such as a value of 1 second or a value of 5 seconds. In some cases, no interval argument 3142 is supplied in the resampling TVF call 3120 and the corresponding resampling TVF is instead executed based on the query processing system 2502 automatically selecting an interval and/or generating the interval argument 3142.

Alternatively or in addition, the user can specify a dimension, such as a particular column of the input row set that the fixed intervals of the interval argument 3142 will be against. This can include specifying that fixed intervals be generated for a time field of the input row set. In some cases, another dimension is selected in cases where the resampling is desired for a different dimension such as a field corresponding to volume, tick, dollar, bars, and/or another user-specified dimension. This information can be supplied as a dimension argument 3143 of the resampling TVF argument set 3122 in accordance with the resampling TVF definition 3112. In particular, the query processing system 2502 can facilitate execution of the query expression to generate the resampled row set 3162 to be resampled from an input row set 3072 in accordance with resampling of the dimension specified as dimension argument 3143, starting with the starting value argument 3141 and in accordance with the interval data specified as interval argument 3142. In some cases, the resampling TVF definition 3112 requires that an expression indicated in as dimension argument 3143 cannot include aggregation. In some cases, no dimension argument 3143 is supplied in the resampling TVF call 3120 and the corresponding resampling TVF is instead executed based on the query processing system 2502 automatically selecting a corresponding column and/or generating the dimension argument 3143.

Alternatively or in addition, the user can specify how to generate other columns that are not the fixed dimension. This can include specifying rules for the values for the other columns that are part of the output. This information can be supplied as one or more column generation arguments 3144 of the resampling TVF argument set 3122 in accordance with the resampling TVF definition 3112, corresponding to one or more various columns. The query processing system 2502 can facilitate execution of the query expression to generate the resampled row set 3162 to include additional columns generated in accordance with the one or more column generation arguments 3144.

The column generation arguments 3144 can include selection of a rule from a discrete set of options corresponding to a previous value, previous not null value, next value, or interpolation. In some cases, the column generation arguments 3144 can include one of a set of corresponding keywords denoting the set of rules, where this set of keywords is denoted in the resampling TVF definition 3112. As a particular example, this corresponding set of keywords includes "PREVIOUS VALUE", "PREVIOUS NOT NULL VALUE", "NEXT VALUE OF", "INTERPOLATION OF", and/or other keywords for additional options in the set of rules. A column name 2655 identifying the corresponding column in the input set rows can follow the selected keyword.

In some cases, if interpolation is to be used to generate an output column, then the data type for that output column is double. It's nullability can depend on the nullability of the input column. Otherwise if PREVIOUS NOT NULL VALUE is chosen, the output type is the not nullable version of the input type. If the input column was already not nullable, this is equivalent to PREVIOUS VALUE. If PREVIOUS VALUE is chosen and the input column is nullable, then the output column can be the same type and nullability as the input column. NEXT VALUE can utilize a current value. In some cases, no column generation arguments 3144 are supplied in the resampling TVF call 3120 and the corresponding resampling TVF is instead executed based on the query processing system 2502 automatically generating the one or more column generation arguments 3144.

Alternatively or in addition, the user can specify that the data be partitioned to enable generation of separate re-sampled series for different groups. For example, separate time-based resampling can be performed for each of a set of different financial symbols when the data is partitioned by financial symbol. This information can be supplied as an input row set partitioning argument 3145 of the resampling TVF argument set 3122 in accordance with the resampling TVF definition 3112. This can include specifying a column and/or specifying a set of columns by which the data should be partitioned, for example, in accordance with a corresponding partitioning function call of the existing query language, such as a partitioning function call in SQL. In such cases, a reserved keyword of the existing query language, such as "PARTITION BY" can implement the input row set partitioning argument keyword 3155. The query processing system 2502 can otherwise facilitate partitioning of the input data via execution of the partitioning function call prior to applying the resampling as defined by starting value argument 3141, interval argument 3142, and dimension argument 3143. In some cases, the partitioning argument 3145 is optional. In some cases, the partitioning argument 3145 is the only optional argument of the resampling TVF argument set 3122 in FIG. 30A, where all other arguments of the resampling TVF argument set 3122 of FIG. 30A are required.

Alternatively or in addition, the user can specify how the input data be ordered to enable the resampling. For example, the input data is designated to be ordered by a column denoted as the dimension argument 3143. This information can be supplied as an input row set partitioning argument 3145 of the resampling TVF argument set 3122 in accordance with the resampling TVF definition 3112. This can include specifying a column and/or specifying a set of columns by which the data should be ordered, for example, in accordance with a corresponding ordering function call of the existing query language, such as an ordering function call in SQL. In such cases, a reserved keyword of the existing query language, such as "ORDER BY" can implement the input row set ordering argument keyword 3156. The query processing system 2502 can otherwise facilitate ordering of the input data prior to applying the resampling as defined by starting value argument 3141, interval argument 3142, and dimension argument 3143 via execution of the ordering function call. In some cases, no input row set ordering argument 3146 is supplied in the resampling TVF call 3120 and the corresponding resampling TVF is instead executed based on the query processing system 2502 automatically selecting a column by which to be ordered and/or by generating the input row set ordering argument 3146. In some cases, the input row set ordering argument 3146 is automatically selected as the dimension argument 3143 and/or is selected based on the dimension argument 3143.

Alternatively or in addition, the user can specify which set of data upon which the resampling is to be performed. This can be implemented as an input row set identification parameters 3045 of FIGS. 30A-30D. This can include specifying the input row set in accordance with a corresponding function call of the existing query language, such as an over function call in SQL. In such cases, a reserved keyword of the existing query language, such as "OVER" can implement the input row set identification keyword 3157. The user can specify the input row set identification parameters 3045 as a SELECT statement or other function call to indicate reading of existing rows stored in database storage system 2560. The user can alternatively specify the input row set identification parameters 3045 as output of another TVF, such as output of a custom TVF call 3020. The query processing system 2502 can apply the resampling as defined by starting value argument 3141, interval argument 3142, and dimension argument 3143 upon the input row set denoted by the input row set identification parameters 3045, once the input row set identification parameters 3045 is ordered in accordance with input row set ordering argument 3146 and optionally partitioned in accordance with input row set partitioning argument 3145.

As an example of execution of a resampling TVF call 3120, the input data can first be shuffled and sorted, for example, in a same or similar fashion as performed for a window operator, such as by utilizing shuffle by partitioning. Sort by partitioning can be appended with the order by. Partition boundaries can be detected, and a guarantee that all the data for a given partition will be in one data block partition can be ensured. Flags can be established to indicate which input columns require the previous value and/or which columns require the previous not null value.

Starting with the first row of input data for the partition, and the start value is evaluated. The step size, which is constant, can be evaluated by an optimizer of the query processing system 2502. The step size can be the same for all partitions, while the start value can be different for different partitions. An example embodiment of a process implemented the query processing system 2502 to execute a resampling TVF call 3120 is illustrated in FIG. 31C as pseudo-code.

FIG. 31B illustrates a particular example of the syntax and structure of a resampling TVF call 3120. In particular, the resampling TVF call 3120 can be structured as:

RESAMPLE(START WITH <expression which can refer to values in the first row> USING STEP <constant expression> OVER DIMENSION <expression> GENERATING VALUES [PREVIOUS VALUE OF |PREVIOUS NOT NULL VALUE OF |NEXT VALUE OF |INTERPOLATION OF]<column>, . . . PARTITION BY <list of columns> ORDER BY<order by specification>) OVER( . . . )

The information denoted in "< >" can correspond to the information to be included as the user supplied arguments of the resampling TVF argument set 3122. In this example, the resampling TVF keyword 3121 is implemented as "RESAMPLE". In other embodiments, another string, word, and/or set of symbols can be utilized to implement the resampling TVF keyword 3121. Following the resampling TVF keyword 3121, some or all arguments of resampling TVF argument set 3122 can follow and can optionally be bracketed in '(' and ')' and/or by other bracketing symbols and/or can optionally be delimited by a delimiter symbol. The arguments of resampling TVF argument set 3122 can be presented in a different structure, syntax, and/or order in other embodiments of the resampling TVF call 3120. Note that exactly one of the set of options "PREVIOUS VALUE OF", "PREVIOUS NOT NULL VALUE OF", "NEXT VALUE OF" and INTERPOLATION OF" is selected to follow "GENERATING VALUES" for a given resampling TVF call in the above example. As discussed previously, the "OVER" function call can optionally be populated with any row set identification parameters 2645 and/or row set ordering parameters 2646, for example, rather than " . . . " and/or where " . . . " denotes the corresponding window definition 2623 from a different portion of query expression 2610 and/or from a prior query expression 2610.

The starting value argument keyword 3151 can be implemented as "START WITH", and can followed by the starting value argument 3141 as an expression which can refer to values in the first row. The interval argument keyword 3152 can be implemented as "USING STEP", and can be followed by interval argument 3142 as a constant expression. The interval argument keyword 3152 can be implemented as "OVER DIMENSION" and can be followed by dimension argument 3143 as an expression.

The additional argument keyword can be implemented as "GENERATING VALUES" and can be followed by one or more column generation arguments 3144. This can include indicating one of the exactly one of the set of options "PREVIOUS VALUE OF", "PREVIOUS NOT NULL VALUE OF", "NEXT VALUE OF" and INTERPOLATION OF" followed by the column name 2655 of one or more columns.

The row set partitioning argument keyword 3155 can be implemented as "PARTITION BY" and can be followed by output row set partitioning argument 3145 as a list of one or more column names 2655. The row set ordering argument keyword 3156 can be implemented as "ORDER BY" and can be followed by output row set ordering argument 3146 specifying how the input rows are ordered.

The input row set identification keyword 3157 can be implemented as "OVER" and can be followed by input row set identification parameters 3045 such as a select statement and/or another TVF call that, when executed, renders the input set of rows. As illustrated, the input row set identification keyword 3157 and input row set identification parameters 3045 can optionally follow the prior set of arguments and the closing bracketing symbol of the resampling TVF call 3120.

A particular example of a resampling TVF call can be implemented to resample in accordance with one minute time bars per stock symbol that emits the previous not null bid and the previous not null ask for that symbol, with time aligned on actual minute boundaries. An example resampling TVF call example that implements this functionality read as follows:

```
RESAMPLE(START WITH TIMESTAMP((BIGINT
  (time_col)/60000)*60000)USING STEP MIN-
  UTES(1)OVER DIMENSION time_col GEN-
  ERATING VALUES PREVIOUS NOT NULL
  VALUE OF bid_col,PREVIOUS NOT NULL
  VALUE OF ask_col PARTITION BY symbol_
  col ORDER BY time_col)
```

In this example, the input row set ordering argument 3146 indicates order by time to resampling based on time. The input row set partitioning argument 3145 indicates partitioning by a column named symbol to enable resampling separately for each symbol. The START WITH expression calculates the nearest minute boundary prior to the first row of data for each partition. A step size of 1 minute is specified, and the values in the time column to compute those steps over are indicated to be used directly. For each row outputted, the new time value is outputted, which can always be minute-aligned as denoted by the start value argument 3141 and the interval argument 3142. As denoted in the column generation arguments 3144, the most recent, such as the prior, bid of the column "bid_col" will also be outputted, and the ask values for that symbol in the column "ask_col" that were not null will also be outputted.

Another example of a resampling TVF call 3120 upon an input data set with column names that include "transaction_volume", "bid_price", and "time_col" can include the following:

```
RESAMPLE(START WITH 0 USING STEP 10000
  OVER DIMENSION SUM(transaction_volume)
  GENERATING VALUES PREVIOUS VALUE
  OF bid_price ORDER BY time_col)
```

Another example of a resampling TVF call 3120 upon an input data set with column names that include bid_price" and "time_col" can include the following:

```
RESAMPLE(START WITH 1 USING STEP 10
  OVER DIMENSION COUNT(*)GENERAT-
  ING VALUES PREVIOUS VALUE OF
  bid_price ORDER BY time_col)
```

Another example of a resampling TVF call 3120 upon an input data set with column names that include "transaction_volume", "unit transaction_price", "bid_price", and "time_col" can include the following:

```
RESAMPLE(START WITH 0 USING STEP
  1000000 OVER DIMENSION SUM
  (transaction_volume*unit transaction_price)GE-
  NERATING VALUES PREVIOUS VALUE OF
  bid_price ORDER BY time_col)
```

Another example of a resampling TVF call 3120 upon an input data set with column names that include "time_col" and "signal_level" can include the following:

```
RESAMPLE(START WITH TIMESTAMP(BIGINT
  (time_col))USING STEP MILLISECONDS(1)
  OVER DIMENSION time_col GENERATING
  VALUES INTERPOLATION OF signal_level
  ORDER BY time_col)
```

FIG. 31D illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31D. Some or all of the steps of FIG. 31D can be performed by one or more embodiments of node 37 discussed in conjunction with FIGS. 25A-25E. Some or all of the method of FIG. 31D can be performed by the operator flow generator module 2514, the execution plan generating module 2516, and/or the query execution module 2504 of FIG. 30A. Some or all of the method of FIG. 31D can be performed by the function call extraction module 3040 of FIG. 30B, for example, by utilizing the custom TVF call extraction module. Some or all of the steps of FIG. 31D can be performed by the query execution module 2504 of FIG. 30C. Some or all of the method of FIG. 31D can be performed by and/or based on communication with one or more client devices 2550. Some or all of the steps of FIG. 31D can optionally be performed by any other processing module of the database system 10. Some or all of the steps of FIG. 31D can be performed to implement some or all of the functionality of the query processing system of FIG. 25A, FIG. 30A, and/or FIG. 31A. Some or all steps of FIG. 31D can be performed by database system 10 in accordance with other embodiments of the database system 10 and/or nodes 37 discussed herein. Some or all steps of FIG. 31D can be performed in conjunction with some or all steps of FIG. 30E.

Step 3182 includes receiving a query expression that includes a call to a resampling table-valued function that includes a set of scalar arguments and further indicates an input set of rows. Performing step 3182 can include and/or can be based on performing step 3082 of FIG. 30E. Step 3184 includes executing the resampling table-valued function in accordance with execution of the query expression against a database storage system. Performing step 3184 can include and/or can be based on performing step 3084 of FIG. 30E.

Performing step 3184 can include performing step 3186 and/or step 3188. Step 3186 includes access the input set of rows from the database storage system. Alternatively, the set of input rows can be generated as output of performing another function, such as a performing a TVF call included in the query expression and utilizing an output result set of the TVF call as the input set of rows. Step 3188 includes applying a set of scalar argument to the input set of rows in accordance with a function definition corresponding to the resampling table-valued function to generate a resampled set of rows from the input set of rows.

FIG. 32A illustrates an embodiment of a query processing system 2502 that processes and executes query expressions 2610 that includes an extrapolation table-valued function call 3220. Some or all features and/or functionality of embodiments of query processing system 2502 of FIG. 32A can be utilized to implement the query processing system 2502 of FIG. 25A, the query processing system 2502 of FIGS. 30A-30D, and/or any other embodiment of query processing system 2502 discussed herein. Some or all features and/or functionality of embodiments of query processing system 2502 described in conjunction with FIGS. 30A-30D can be utilized to implement the query processing system 2502 of FIG. 32A. Some or all features of embodiments of extrapolation table-valued function calls 3220 of FIGS. 32A-32C can be utilized to implement at least one table-valued function call 3020 of FIGS. 30A-30D and/or can be implemented by utilizing features of table-valued function calls 3020 of FIGS. 30A-30D.

An extrapolation table-valued function can be defined as another custom table-valued function of FIGS. 30A-30D. The extrapolation table-valued function can optionally output all input rows of the input table exactly as is, and can also generate and output new, extrapolated rows from the input rows. User-supplied parameters to the extrapolation function can indicate how many new rows to generate and how to generate the values for the various columns.

In particular, given the resampling TVF of FIGS. 31A-31C and/or another resampling means of resampling data at even intervals, and given the computing window function of FIGS. 26A-29C which enables recursive functionality like exponential smoothing, these functionalities can be applied to resample data and to generate a model from the resampled data. For example, exponential smoothing can be applied to filter high-frequency noise out of the data set and return a smoothed model representing that same data. In some cases, it is ideal to then apply this model into the future, past any most recent data collected and/or stored in database storage system 2560, for the purpose of making predictions. An extrapolation table-valued function of FIGS. 31A-31C can be applied to such resampled and smoothed data sets to generate output data corresponding to predicted, future rows via a query expression 2610 that includes an extrapolation table-valued function call 3220. The extrapolation table-valued function can optionally be applied to any other input set of rows stored in database storage system 2560 and/or generated as output of another TVF call such as output of another custom TVF call 3020.

As illustrated in FIG. 32A, an extrapolation TVF call 3220 can include a corresponding extrapolation TVF keyword 3221 and extrapolation TVF argument set 3222, for example, implemented as the custom TVF argument set 3022 of FIG. 30A. The extrapolation TVF call can optionally include a corresponding extrapolation TVF argument keyword set 3224. For example, each keyword in extrapolation TVF argument keyword set 3224 denotes a corresponding argument in the extrapolation TVF argument set 3222 supplied in the extrapolation TVF call 3220. A particular example of structure of the extrapolation TVF call 3220 is discussed in conjunction with FIGS. 32B and 32C.

The extrapolation TVF call 3220 can be in accordance with an extrapolation TVF definition 3212, which can be stored in function definition library 3030, can be sent to client device 2550, and/or can otherwise be determined by the query processing system 2502 and/or client device 2550. The operator flow generator module 2514 can utilize the extrapolation TVF definition 3212 to generate a query operator execution flow in accordance with the supplied arguments of extrapolation TVF argument set 3222 in the given extrapolation TVF call 3220. For example, the operator flow generator module 2514 of FIG. 32A can implement the custom TVF call extraction module 3042 to identify the extrapolation TVF keyword 3221 in the query expression 2610 and can determine to apply the corresponding extrapolation TVF definition 3212 accordingly. This can include extracting each of the arguments in the extrapolation TVF argument set 3222 from the query expression 2610, for example, based on syntax and/or structure defined in the extrapolation TVF definition 3212 and/or based on identifying the corresponding extrapolation TVF argument keyword in the extrapolation TVF argument keyword set. The extracted arguments of the extrapolation TVF argument set 3222 can be utilized to generate the query operator execution flow based on the argument set data 3032 and/or the execution instruction data 3034 of the extrapolation TVF definition 3212. A query resultant 3015 can be generated to include and/or be based on an extrapolated row set 3262 outputted via performance of the extrapolation TVF in accordance with the supplied values and/or expressions of the extrapolation TVF argument set 3222, for example, based on query execution module 2504 executing query execution plan data generated based on the query operator execution flow. The extrapolated row set 3262 can be implemented as and/or can be included in the new row set 3062 of FIG. 30C. The query resultant can optionally further include and/or be based on the original row set.

Because there are multiple different ways that data can be extrapolated, the syntax and/or structure of the extrapolation TVF calls is ideally flexible enough to handle as many of these those possibilities to cover more user-desired implementation of extrapolation. The extrapolation TVF argument set 3222 of FIG. 32A can enable end users to configure many criteria constraining and/or dictating how the resampling of a given set of rows is performed. For example, these end users can write extrapolation TVF calls 3220 in query expressions 2610 for execution by query processing system 2502 via user input to client device 2550 via GUI 2555, for example, in accordance with execution of application data 2553 and/or in accordance with the extrapolation TVF definition 3212 that is received, stored and/or determined by the client device 2550.

In writing an extrapolation TVF call 3220, a user can identify how many new rows will be created. This information can be supplied as a number of new rows value argument 3241 of the extrapolation TVF argument set 3222 in accordance with the extrapolation TVF definition 3212. In some cases, no number of new rows value argument 3241 is supplied in the extrapolation TVF call 3220 and the corresponding extrapolation TVF is instead executed based on the query processing system 2502 automatically selecting a number of new rows that will be generated and/or generating the number of new rows value argument 3241.

Alternatively or in addition, the user can specify how each column of the given set of rows will be generated for the new, predicted rows. This information can be supplied as one or more column generation arguments 3242, such as a set of column generation expressions for each of a set of columns. This set of columns can correspond to some or all existing columns of the given input set of rows. Each expression can be applied to generate corresponding column values for each of a plurality of new rows, where the number of new rows in this plurality of new rows corresponds to the number of new rows argument 3241.

Furthermore, formulas for generating new column values generated via extrapolation can often be recursive and/or be based on values of previous rows in an ordered row set. A same or similar structure and/or syntax described in conjunction with the computing window function of FIGS. 26A-29C can be applied to reference values of previous columns. For example, the column generation arguments 3242 of extrapolation TVF calls 3220 can include one or more column references 2654 that include prior row index identifiers 2628 to prior rows. In some cases, the extrapolation TVF calls 3220 do not include any output references 2652, for example, due to the extrapolation TVF not generating any new columns and only generating values of existing columns. Any existing columns for which the user does not supply a corresponding generation expression in the column generation arguments 3242 can be filled with null values.

Alternatively or in addition, the user can specify which set of data upon which the resampling is to be performed. This can be implemented as an input row set identification parameters 3045 of FIGS. 30A-30D. This can include specifying the input row set in accordance with a corresponding function call of the existing query language, such as an over function call in SQL. In such cases, a reserved keyword of the existing query language, such as "OVER" can implement the input row set identification keyword 3157. The user can specify the input row set identification parameters 3045 as a SELECT statement or other function call to indicate reading of existing rows stored in database storage system 2560. The user can alternatively specify the input row set identification parameters 3045 as output of another TVF, such as output of a custom TVF call 3020.

The query processing system 2502 can apply the extrapolation as defined by number of new rows argument 3241 and the column generation arguments 3242 upon the input row set denoted by the input row set identification parameters 3045 to generate a corresponding set of new rows with column values generated in accordance with the column generation arguments 3242.

In some cases, the input row set identification parameters 3045 can further include and/or the extrapolation TVF call 3220 can further include ordering parameters and/or partitioning parameters to be applied to the input data set, such as the input row set partitioning argument 3145 and/or the input row set ordering argument 3146 of FIGS. 31A-31B. In some cases, the corresponding input row set partitioning argument keyword 3155 and input row set ordering argument keyword 3156 can further be applied to denote the ordering and partitioning arguments. In some cases, these parameters are included within an OVER clause and/or after an input row set identification keyword 3157 that denotes the input row set identification parameters 3045. For example an ordering function and partitioning function can be applied to the input row set via corresponding function calls in the existing query language to ensure the extrapolation TVF call 3220 is applied to ordered and/or partitioned data.

FIGS. 32B and 32C illustrate a particular example of the syntax and structure of an extrapolation TVF call 3220. In particular, the extrapolation TVF call 3220 can be structured as:

EXTRAPOLATE(CREATE <number> NEWS
        ROWS BY GENERATING
        <expression>→<column name>,
        <expression>→<column name>, . . . )OVER
        ( . . . )

The information denoted in "< >" can correspond to the information to be included as the user supplied arguments of the extrapolation TVF argument set 3222. In this example, the extrapolation TVF keyword 3221 is implemented as "EXTRAPOLATE". In other embodiments, another string, word, and/or set of symbols can be utilized to implement the extrapolation TVF keyword 3221. Following the extrapolation TVF keyword 3221, some or all arguments of extrapolation TVF argument set 3222 can follow and can optionally be bracketed in '(' and ')' and/or by other bracketing symbols and/or can optionally be delimited by a delimiter symbol. The arguments of extrapolation TVF argument set 3222 can be presented in a different structure, syntax, and/or order in other embodiments of the extrapolation TVF call 3220. As discussed previously, the "OVER" function call can optionally be populated with any row set identification parameters 2645 and/or row set ordering parameters 2646, for example, rather than " . . . " and/or where " . . . " denotes the corresponding window definition 2623 from a different portion of query expression 2610 and/or from a prior query expression 2610.

The number of new rows keyword 3251 can optionally be implemented as two separate keywords 3251.A and 3251.B. For example, the number of new rows argument 3241 can be presented in between these two number of new rows keywords 3251.A and 3251.B. In this example, the number of new rows keyword 3251.A is implemented as "CREATE" and number of new rows keyword 3251.B is implemented as "NEW ROWS". In some cases, any other argument of any function call described herein can similarly be denoted by and/or can be included in between multiple corresponding argument keywords.

The column generation argument keyword 3252 can be implemented as "BY GENERATING", and can be followed by one or more column generation argument 3242. An example structure of column generation arguments 3242 is illustrated in FIG. 32C.

The input row set identification keyword 3157 can be implemented in a same or similar fashion as discussed in conjunction with the resampling TVF call 3120 of FIGS. 31A-31B. In this example, the input row set identification keyword 3157 is again implemented as "OVER" and/or another function call keyword of the existing query language, and can be followed by input row set identification parameters 3045 such as a select statement and/or another TVF call that, when executed, renders the input set of rows. As illustrated, the input row set identification keyword 3157 and input row set identification parameters 3045 can optionally follow the prior set of arguments and the closing bracketing symbol of the extrapolation TVF call 3220.

As illustrated in FIG. 32C, the column generation argument keyword 3252 can be followed with one or more of a set of column generation arguments 3242.1-3242.B. This set of column generation arguments can include a corresponding set of column generation expressions for some or all columns 1-B of the input row set such as some or all columns 1-B of the row set 3072 implemented as the input row set identified via input row set identification parameters 3045. In this example, the syntactical structure denoted by the extrapolation TVF definition 3212 can denote that the set of column generation arguments 3242.1-3242.B are delimited via a comma and/or via any other delimiter symbol.

Each column generation argument 3242 can identify a particular column via a corresponding column name 2655 for the column, and can include a corresponding column generation expression 3243 indicating how the corresponding column will be generated for each new row included in the output of the extrapolation TVF call 3220. As discussed previously, some or all column generation expressions 3243 can include one or more column references 2654 with prior row index identifiers 2628, for example, with column names 2655 for the same column of the given column generation argument 3242 and/or with different column names 2655 of the input set of rows. Some or all column generation expressions 3243 can further include one or more mathematical operators 2629 and/or one or more query language function calls 2619.

In this example, the syntactical structure denoted by the extrapolation TVF definition 3212 can denote that a "→" symbol is included in between the column generation expression 3243 and the column name 2655 of each column generation argument 3242. The column generation expression 3243 and the column name 2655 can be indicated in each column generation expression 3243 in accordance with any other symbols and/or keywords.

A particular example of an extrapolation TVF call can be implemented to read as follows:

```
EXTRAPOLATE(CREATE 10 NEW ROWS BY
    GENERATING 2*x[-1]-x[-2]→x,2*y[-1]-y
    [-2]→y)OVER( ... )
```

In this example, the number of new rows argument 3241 indicates that ten new rows be generated. For example, if corresponding input row set 3072 includes M rows, the new row set 3062 can include M+10 rows, where the first M rows are exactly the same as the M rows of input row set 3072. In other cases, the new row set 3062 can include only the 10 new rows.

Two column generation arguments 3242 are included for two columns with column names "x" and "y". For example, the over clause indicates input row set identification parameters denoting an input row set with a set of columns having a column "x" and a column "y". The input row set identification parameters of the over clause can further indicate the input set of rows be ordered, for example, by a time column or another column. For each of the 10 new rows generated, the column value for column x is generated via a column generation expression 3243 that includes 2*x[-1]-x[-2], denoting that value of column x of two rows prior is subtracted from the value of column x of one row prior multiplied by two to render the value of x for the new row. Similarly, the column value for column y is generates via a column generation expression 3243 that that includes 2*y[-1]-y[-2], denoting that value of column y of two rows prior is subtracted from the value of column y of one row prior multiplied by two to render the value of y for the new row. Note that in this example, the column references 2654 are structured in accordance with a same syntax as discussed in conjunction with FIGS. 26B-26F.

FIG. 32D illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32D. Some or all of the steps of FIG. 32D can be performed by one or more embodiments of node 37 discussed in conjunction with FIGS. 25A-25E. Some or all of the method of FIG. 32D can be performed by the operator flow generator module 2514, the execution plan generating module 2516, and/or the query execution module 2504 of FIG. 30A. Some or all of the method of FIG. 32D can be performed by the function call extraction module 3040 of FIG. 30B, for example, by utilizing the custom TVF call extraction module. Some or all of the steps of FIG. 32D can be performed by the query execution module 2504 of FIG. 30C. Some or all of the method of FIG. 32D can be performed by and/or based on communication with one or more client devices 2550. Some or all of the steps of FIG. 32D can optionally be performed by any other processing module of the database system 10. Some or all of the steps of FIG. 32D can be performed to implement some or all of the functionality of the query processing system of FIG. 25A, FIG. 30A, and/or FIG. 31A. Some or all steps of FIG. 32D can be performed by database system 10 in accordance with other embodiments of the database system 10 and/or nodes 37 discussed herein. Some or all steps of FIG. 32D can be performed in conjunction with some or all steps of FIG. 30E.

Step 3282 includes receiving a query expression that includes a call to an extrapolation table-valued function that includes a set of scalar arguments and further indicates an input set of rows. Performing step 3282 can include and/or can be based on performing step 3082 of FIG. 30E. Step 3284 includes executing the extrapolation table-valued function in accordance with execution of the query expression against a database storage system. Performing step 3284 can include and/or can be based on performing step 3084 of FIG. 30E.

Performing step 3284 can include performing step 3286 and/or step 3288. Step 3286 includes accessing the input set of rows from the database storage system. Alternatively, the set of input rows can be generated as output of performing another function, such as a performing a TVF call included in the query expression and utilizing an output result set of the TVF call as the input set of rows. Step 3288 includes applying the set of scalar argument to the input set of rows in accordance with a function definition corresponding to the extrapolation table-valued function to generate an extrapolated set of rows from the input set of rows.

FIGS. 33A-33E present embodiments of a query processing system 2502 that receives and/or processes user-defined function (UDF) creation function calls 3320 that define new, user-configured functions. Corresponding function definitions for these new functions can be determined and stored in function definition library 3030. Subsequent query expressions 2610 can include function calls to these new functions, and the query processing system 2502 can access the function definitions for these new functions in function definition library 3030 to facilitate execution of the query expressions against a database storage system 2560, as defined previously in corresponding user-defined function creation function calls 3320. Some or all features and/or functionality of embodiments of the query processing system 2502 of FIGS. 33A-33F can be utilized to implement the query processing system 2502 of FIG. 25A and/or any other embodiment of query processing system 2502 described herein.

Ideally, other custom functionality can be defined by end users or administrators as additional custom functions that can be saved and called, for example, rather than requiring users to re-enter complicated and/or length SQL expressions each time they wish to implement particular functionality. The query processing system 2502 enables to save their own custom functions, rather than requiring administrators and/or content creators to generate built-in functions that specifically handle these user-specific formulas via a UDF creation function call 3320. The UDF creation function call 3320 can enable users to configure their own scalar functions, window functions, aggregation function, and/or TVFs as new functions saved in function definition library 3030. In particular, this enables users to "save" complicated SQL expressions so that these expressions can be easily called just using a simple function call.

In such cases, different users may be capable of calling their own user-defined functions, but may not be able to call user-defined functions created by other users, for example, based on the corresponding function definition not being sent to and/or accessible by some or all other client devices 2550 that did not create the corresponding new function. In some cases, some users such as administrators and/or content generators can generate user-defined functions that are made public for use by all end users, where their corresponding function definitions are optionally sent to client devices 2550 of many different users. For example, administrators and/or content generators can generate well-known/highly demanded functionality as user-defined functions via a UDF creation function call 3320 that are automatically available for use by end users, for example, in a newly installed system.

FIG. 33A illustrates an example of a query processing system 2502 that receives and processes a UDF creation function call 3320 to extract and save a function definition for a new function defined by the user in the UDF creation function call 3320 in function definition library 3030. The query processing system 2502 can be utilized to implement the query processing system 2502 of FIG. 25A and/or any other embodiment of the query processing system 2502 described herein.

The UDF creation function call 3320 can be structured and/or have syntax in accordance with a UDF creation function call definition. This UDF creation function call definition can be configured via user input, accessible in memory of, and/or otherwise can be determined by query processing system 2502. For example, the UDF creation function call definition can be stored in and/or accessible in function definition library 3030. This UDF creation function call definition can alternatively or additionally be communicated to client devices 2550, for example, in application data 2553, to enable end users to write and include UDF creation function calls 3320 in their query expressions 2610 in accordance with the UDF creation function call definition.

The UDF creation function call 3320 can be included in a query expression 2610. However, in this case, the query expression 2610 is optionally not executed against the database storage system 2560, for example, based on the query expression 2610 only defining a new function via UDF creation function call 3320. The UDF creation function call 3320 can otherwise be written and/or included in any other type of expression and/or data generated via a client device 2550, for example, in conjunction with execution of the application data 2553 and/or via user input to GUI 2555.

The UDF creation function call 3320 can include a UDF creation function keyword 3321 denoting the call to the UDF creation function, for example, in accordance with the UDF creation function call definition. The UDF creation function keyword 3321 can be distinct from a set of reserved keywords of the existing query language such as SQL and/or can be utilized as an additional reserved keyword, for example, where column names and/or new functions cannot have names matching the UDF creation function keyword 3321. The UDF creation function keyword 3321 can otherwise identify the query expression includes a UDF creation function call 3320.

The UDF creation function call 3320 can include a UDF creation function argument set 3322. The UDF creation function argument set 3322 can include a function type argument 3341 denoting the type of function being defined in the UDF creation function call 3320. For example, the function type argument 3341 can indicate one of: a scalar function type, a window function type, an aggregation function type, and/or a window function type. In some cases, each of these discrete set of options has a corresponding keyword, for example, where the function type argument 3341 includes exactly one of the keywords of this discrete set of options. For example, the function type argument 3341 indicates exactly one of: "SCALAR," "TABLE VALUED," "WINDOW," and/or "AGGREGATION."

The UDF creation function argument set 3322 can include a function name argument 3342 that indicates a new function keyword for the new function as new function keyword 3362. This new function keyword 3362 can be required to be distinct from all other function keywords and/or reserved keywords of the existing query language. This new function keyword 3362 can be required to be distinct from all other function keywords and/or reserved keywords included in function definition library 3030, such as the computing window function keyword 2621, the resampling TVF keyword 3121, the extrapolation TVF keyword 3221, and/or any other custom TVF keywords 3021 for any other custom TVF functions. This new function keyword 3362 can be required to be distinct from all other new function keywords 3362 for previously defined functions generated in accordance with UDF creation function calls 3320 by the same user and/or client device 2550 and/or across all users and/or client devices 2550.

The UDF creation function argument set 3322 can include a function argument set argument 3343 denoting the set of arguments for the new function and/or their data types. The function argument set argument 3343 can denote variable names for each argument.

The UDF creation function argument set 3322 can include a function body argument 3344 denoting how the function executes and/or which mathematical operations and/or query language function calls are performed upon the arguments of new function argument set argument 3343 to generate output. The function body argument 3344 can further denote the type and/or structure of the output. The function argument set argument 3343 can denote variable names for each argument. The function body argument 3344 can include: one or more mathematical operations 2629; one or more query language function calls 2619; one or more computing window function calls 2620; one or more resampling TVF calls 3120; one or more extrapolation TVF calls 3220; one or more custom TVF calls 3020 for one or more other custom TVF functions; one or more new function calls 3330 to new functions previously defined via previous UDF creation function calls 3320; and/or any other function calls for any other functions with definitions included in function definition library 3030.

The UDF creation function call 3320 can optionally include one or more argument keywords of a UDF creation function argument keyword set 3324. For example each keyword in UDF creation function argument keyword set 3324 denotes a corresponding argument in UDF creation function argument set 3322 supplied in the UDF creation function call 3320. A particular example of structure of the UDF creation function call 3320 is discussed in conjunction with FIGS. 33-33D.

The query processing module can implement a new function validation module 3350 that utilizes query language requirement data to generate new function validation data indicating whether or not the new function indicated in a received UDF creation function call 3320 is valid in accordance with structure and/or syntax requirements of the query language, such as SQL and/or any other new structure and/or new syntax described herein. The new function validation module 3350 can determine whether the new function keyword 3362 of the new function matches any existing function keywords in a reserved keyword set 3352. Where the new function validation data indicates the function is not valid if the new function keyword 3362 matches any existing function keywords in the reserved keyword set 3352. In some cases, the new function keyword 3362 can match an existing function keyword if the corresponding new functions have different types and/or have different numbers, types, and/or sets of arguments in their respective argument sets. The reserved keyword set 3352 can include reserved keywords of the query language and/or some or all keywords included in function definitions of the function definition library 3030. In some cases, the reserved keyword set 3352 does not include keywords for functions created by other users that are not public and/or are not available for calling by the user that generated the given UDF creation function call 3320.

In some cases, the new function validation module 3350 is optionally implemented by client device 2550, for example, where the query expression validation module 2630 of FIG. 26J implements the new function validation module 3350 for proposed query expressions 2610 that include UDF creation function calls 3320, where UDF creation function calls 3320 are only sent to the query processing system 2502 if the new function validation module 3350 indicates they are validated in the new function validation data. In some cases, the new function validation module 3350 is implemented by client device 2550 based on execution of the application data 2553.

If the new function validation data indicates the new function is validated, the query processing system can implement a new function saving module 3316 to save the new function as a UDF definition 3312 to be included in the function definition library. This can include generating UDF definition 3312 to include and/or be based on the new function keyword 3362 indicated in function name argument 3342 of the UDF creation function call 3320; the function argument set argument 3343 of the UDF creation function call 3320; and/or the function body argument 3344 of the UDF creation function call 3320. The new function keyword 3362 can additionally be added to the reserved keyword set 3352 for use in validating future UDF creation function calls 3320 to ensure no subsequent functions, for example, with same types and/or numbers and/or types of arguments, use the new function keyword 3362. The UDF definition 3312 can be added to the function definition library 3030 and/or can otherwise be stored in memory accessible by the query processing system 2502 for access. The UDF definition 3312 can optionally be sent to the client device 2550 and/or to one or more other client devices 2550 to enable these client devices to generate query expressions 2610 that include calls to the new function.

In some cases, the new function saving module 3316 is optionally implemented by client device 2550, for example, where the query expression validation module 2630 of FIG. 26J implements the new function validation module 3350 for proposed query expressions 2610 that include UDF creation function calls 3320, and where validated new functions are locally saved and/or added to a locally accessible function library 3030 stored in memory accessible by the client device 2550. In some cases, the new function saving module 3316 is implemented by client device 2550 based on execution of the application data 2553.

FIGS. 33B-33D illustrate example syntax and/or structure of a UDF creation function call 3320. In particular, the UDF creation function call 3320 can be structured as:

CREATE <SCALAR |TABLE VALUED |WINDOW |AGGREGATION> SQL UDF <name> (<argument name>[optional type], <argument name>[optional type], . . . ) AS (<expression>);

The information denoted in "< >" can correspond to the information to be included as the user supplied arguments of the UDF creation function argument set 3322. In this example, the UDF creation function keyword 3321 is implemented as "CREATE". In other embodiments, another string, word, and/or set of symbols can be utilized to implement the UDF creation function keyword 3321. Some or all arguments of UDF creation function argument set 3322 can follow and can optionally be bracketed in '(' and ')' and/or by other bracketing symbols and/or can optionally be delimited by a delimiter symbol. The arguments of UDF creation function argument set 3322 can be presented in a different structure, syntax, and/or order in other embodiments of the UDF creation function call 3320.

Following the UDF creation function keyword 3321, the function type argument 3341 can optionally be supplied as one of "SCALAR", "TABLE VALUED", "WINDOW", and/or "AGGREGATION." A new function name argument keyword 3352 can be implemented as "SQL UDF" and can be followed by the function name argument 3342. In this example, the function argument set argument 3343 can follow the function name argument 3342, for example, bracketed by bracketing symbols such as '(' and ').' A new function body argument keyword 3354 can be implemented as "AS" and can be followed by function body argument 3344.

FIG. 33C illustrates an example embodiment of the new function argument set argument 3343. The new function argument set argument 3343 can include an argument name 3354, optionally followed by an argument type 3346, for each of a set of D arguments 1-D. Each argument name 3354 and optional argument type 3346 can be delimited by commas and/or another delimiting symbol.

FIG. 33D illustrates an example embodiment of the function body argument 3344. The function body argument 3344 include a query expression as a function of the set of D arguments 1-D of the new function argument set argument 3343. Each argument can be referenced in one or more argument references 3355 for the corresponding argument. Each argument reference 3355 can include an argument reference symbol 3356, such as '$' and/or any other string and/or keyword that denotes that one of the set of D arguments 1-D is being referenced in a corresponding argument reference 3355. Each argument reference 3355 can further include the argument name 3345 of the corresponding argument being referenced. In some cases, the argument reference symbol 3356 is not a reserved symbol and/or keyword of SQL and/or of another existing query language of the query expression 2610. In some cases, the argument reference symbol 3356 is included as an additional reserved keyword and/or symbol in processing and/or validating query expressions 2610.

FIG. 33E illustrates an example of a query processing system 2502 that receives new function calls 3330 for functions previously defined and saved as new functions by the query processing system 2502 based on corresponding UDF creation function calls 3320 as described in FIG. 33A. A new function calls 3330 can indicate a corresponding new function keyword 3362 and a set of argument expressions 3363.1-3363.D, for example, corresponding to the set of D arguments of the new function argument set argument 3343 of the corresponding UDF definition 3312.

The operator flow generator module 2514 can implement a function call extraction module 3040, such as the function call extraction module 3040 of FIG. 30A. The function call extraction module 3040 can implement a new function call extraction module 3340 that identifies new function keywords 3362 corresponding to new function calls 3330 of given query expressions 2610. The corresponding UDF definition 3312 can be accessed in function definition library 3030, where the execution data for the new function call 3330 is generated based on applying the argument expressions 3363.1-3363.D to the corresponding new function body argument 3344 of the corresponding UDF definition 3312.

In this example, the new function call 3330 indicates a new function keyword 3362.2 for a corresponding UDF definition 3312.2. The new function call extraction module 3340 identifies the corresponding new function definition 3312.2 in the function definition library 3030 based on the new function keyword 3362.2 to access the corresponding new function argument set argument 3343.2 and/or the new function body argument 3344.2 of the UDF definition 3312.2. The argument expressions 3363.1-3363.D can be applied to the new function argument set argument 3343.2 and/or new function body argument 3344 to generate the execution data for the new function call 3330. The resulting query operator execution flow can include a serial and/or parallelized ordering of one or more operators that implement the corresponding execution data for the new function call 3330 to render execution of the new function call 3330 in execution of the query operator execution flow via query execution module 2504.

For example, processing and/or execution of new function calls by the query processing system 2502 can include applying the function body argument 3344 by replacing each argument reference 3355 with a user-supplied argument for the one of the set of arguments in the new function argument set argument 3343 with the corresponding argument name 3345. In particular, each instance of the argument reference symbol 3356 can denote a portion of the function body argument 3344 to be replaced by a corresponding user-supplied argument. In some cases, instances of the argument reference symbol 3356 are ignored if included in single quotes and/or double quotes and/or if included in a string.

Once all argument references 3355 are replaced by corresponding user-supplied arguments, the function body argument 3344 can indicate an executable query expression, for example, in accordance with the given query language. For example, this executable query expression can be generated in the execution data for a new function call 3330.

In some cases, the function body argument 3344 can additionally indicate output of an over clause, such as an "OVER" function call in SQL, as a reference to an input set of rows. This can be indicated as one or more input row references, which can be by as an input row reference symbol and/or keyword such as "( . . . )" in the function body argument 3344. In some cases, the input row reference symbol is not a reserved symbol and/or keyword of SQL and/or of another existing query language of the query expression 2610. In some cases, the input row reference symbol is included as an additional reserved keyword and/or symbol in processing and/or validating query expressions 2610. When the function is called as a new function call 3330, the new function call 3330 can be followed with an over clause that includes a corresponding window definition 2623 and/or input row set identification parameters 3045. This over clause can be executed to render an input set of rows, which can be applied for each instances of input row reference, such as instances of "( . . . )", in the function body argument 3344.

As a particular example, a UDF creation function call 3320 can be written as follows:

CREATE TABLE VALUED SQL UDF tvfudf(filter_
  col NUMBER)AS (SELECT*from ( . . . )
  where $filter_col>5)

In this example, a table-valued function is created with a new function keyword 3362 of "tvfudf". This new function is defined to have one argument named "filter_col" with type NUMBER. The function body arguments 3344 indicates "SELECT*from ( . . . ) where $filter_col>5". When executing this new function and/or when generating the execution data for new function call 3330, the instance of "$filter_col" is replaced by a corresponding value and/or expression supplied as a corresponding argument expression 3363 in the new function call 3330, for example, based on having the argument reference symbol '$'. When executing this new function and/or when generating the execution data for new function call 3330, the instance of "( . . . )" is replaced by and/or denoted as output of a corresponding expression supplied in the new function call 3330, such as an over clause included in the new function call 3330.

As a particular example, a query expression 2610 that included new function call 3330 for this UDF could include:

SELECT*FROM tvfudf($c1$)OVER(select*from sys.
  dummy10)

The function definition for the tvfudf function defined as discussed above could be identified based on the query expression 2610 including the corresponding new function keyword 3362 of "tvfudf." For example, this query expression 2610 could be rewritten by the query processing system 2502 based on applying the function body argument 3344 of the example UDF creation function call 3320 described above and by applying the supplied argument expression 3363 of this new function call 3330. In particular, this query expression 2610 could thus be rewritten as the following equivalent query expression:

SELECT*FROM (SELECT*from sys.dummy10)
  where $c1$>5;

The execution data for query expression 2610 can indicate and/or be based on this equivalent query expression, where the query operator execution flow is generated based on this equivalent query expression.

In some cases, the new function call extraction module 3340 is optionally implemented by client device 2550. For example, prior to sending query expressions 2610 to the query processing system 2502, the execution data for query expression 2610 can be generated by rewriting the proposed query expression 2610 as discussed above to render an equivalent query expression that does not include the call to the new function. This can be based on the client device 2550 accessing its own local function library 3030 that includes the UDF definition, for example, based on being previously validated and/or saved by client device 2550 and/or based on being previously validated and/or received from query processing system 2502 based on a corresponding UDF creation function call. In such cases, the query processing system 2502 can simply receive and execute the equivalent query expression, for example, without necessitating access to and/or maintaining of its function library 3030 to include these UDF definitions.

FIG. 33F illustrates a method for execution by a query processing system 2502. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33F. Some or all of the steps of FIG. 33F can be performed by one or more embodiments of node 37 discussed in conjunction with FIGS. 25A-25E. Some or all of the method of FIG. 33F can be performed by the new function validation module 3350 and/or the new function saving module 3316 of FIG. 33A. Some or all of the method of FIG. 33F can be performed by the operator flow generator module 2514, the execution plan generating module 2516, and/or the query execution module 2504 of FIG. 33E. Some or all of the method of FIG. 33F can be performed by and/or based on communication with one or more client devices 2550. Some or all of the steps of FIG. 33F can optionally be performed by any other processing module of the database system 10. Some or all of the steps of FIG. 33F can be performed to implement some or all of the functionality of the query processing system of FIG. 25A, FIG. 33A, and/or FIG. 33E. Some or all steps of FIG. 33F can be performed by database system 10 in accordance with other embodiments of the database system 10 and/or nodes 37 discussed herein.

Step 3382 includes receiving a first expression that includes a call to a user-defined function (UDF) creation function that includes a set of arguments defining a new function. Step 3384 includes generating function definition data for the new function by executing the UDF creation function. Step 3386 includes receiving a query expression that includes a call to the new function. Step 3388 includes executing the new function in accordance with executing the query expression against a database by utilizing the function definition data to apply a second set of arguments included in the call to the new function.

FIGS. 34A-37F present embodiments of a database system 10 that are operable to perform differentiation and/or integration functionality. Some or all features and/or functionality of FIGS. 34A-37F can be utilized to implement any embodiment of database system 10 described herein.

Enabling differentiation and/or integration functionality in databases can have many uses. For example, rows in the database system could store values corresponding to samples of an objects position at a point in time, and such functionality can be utilized to ask questions and generate corresponding information regarding its velocity and/or acceleration, its total distance traveled, etc.

Another use case can be implementing time series forecasting capabilities. Many time series forecasting algorithms have a prerequisite that the data is stationary (e.g. the mean of the data does not change over time). Anything linear has a mean that is always increasing with respect to time, where any future window will have a higher mean than any past window. If it's quadratic, the mean is either increasing or decreasing over time. Differentiation can help with this: taking the derivative of something that's linear or substantially linear renders this stationary trait (e.g. the data, has the same mean and/or substantially the same mean everywhere). Similarly, taking the $2^{nd}$ degree derivative of something that's quadratic renders this stationary trait.

Real time series data is typically never as simple as totally linear or totally quadratic, but the same idea can still hold true. For example, as long as the data isn't exponential, differentiation can be used to make it stationary, or at least stationary enough over the time period in question.

In some embodiments, the query processing system can perform one or more time series forecasting algorithms, such as an extrapolation function or other function, after first generating a stationary data set where a mean value of one or more target columns is stable and/or substantially stable based on performing integration and/or differentiation one or more times, for example, via executing one or more queries with corresponding differentiation function calls and/or integration function calls to the derivative function, delta function, or other one or more functions. The one or more time series forecasting algorithms can be implemented as TVF functions or other functions implementing machine learning functionality, linear algebra functionality, or other functionality.

FIGS. 34A-34K present embodiments of a database system 10 that executes query expressions 2610 that indicate requests to perform differentiation. Some or all features and/or functionality of the query execution and/or corresponding query expressions of FIGS. 34A-34K can be implemented via any other features and/or functionality of query executions and/or processing of corresponding query expressions described herein.

As used herein, a differentiation request can correspond to a function call or other indication in a query request to perform mathematical differentiation, such as computation of derivative values and/or delta values for ordered rows, such as time series data. The differentiation can correspond to discrete differentiation (e.g. discrete derivative) performed upon a discrete set of rows and/or can be implemented to approximate a continuous derivative by treating the set of rows as a sampling of corresponding continuous data. The differentiation can be performed with respect to time in cases where the set of rows corresponds to time series data. The differentiation can be performed with respect to any other type of value.

The differentiation performed as described herein in response to a differentiation request can be implemented via a delta function (e.g. operating independent of step size and based on row order only), or a derivative function (e.g. operating while considering step size, and optionally being implemented as a discrete derivative and/or difference quotient). For example, different function calls to a same function can induce performance of either a mathematical delta function or a mathematical derivative function, based on configuring a corresponding argument to the function denoting whether step size of the variable dictating the ordering of rows (e.g. time) be computed/processed in generating corresponding output. Alternatively or in addition, different function calls to different functions with different function definitions can be implemented to induce performance of delta functions vs. derivative functions.

The differentiation performed as described herein in response to a differentiation request can be implemented as first order differentiation, second order differentiation, and/or any other positive, integer degree of differentiation. For example, different function calls to a same function can induce performance of different degrees of differentiation, based on configuring a corresponding argument to the function denoting which degree of differentiation be performed. Alternatively or in addition, different function calls to different functions with different function definitions can be implemented to induce performance of different degrees of differentiation.

As used herein, a differentiation request can optionally correspond to a function call or other indication in a query request to perform mathematical integration, for example, based on indicating a corresponding degree of differentiation as a negative degree of differentiation where integration (e.g. anti-differentiation) is performed as a result. The integration can correspond to discrete integration performed upon a discrete set of rows and/or can be implemented to approximate a continuous integral by treating the set of rows as a sampling of corresponding continuous data. The integration can be performed with respect to time in cases where the set of rows corresponds to time series data. The integration can be performed with respect to any other type of value.

For example, different function calls to a same function can induce performance of either mathematical differentiation or integration, based on configuring a corresponding argument to the function denoting whether a positive or negative degree of differentiation be performed, or otherwise configuring a corresponding argument denoting whether differentiation or anti-differentiation (e.g. integration) be performed. Alternatively or in addition, different function calls to different functions with different function definitions can be implemented to induce performance of differentiation vs. integration. Examples of query expressions denoting requests to perform integration, and examples of processing these query requests to perform integration accordingly, are discussed in further detail in conjunction with FIGS. 35A-35F.

As used herein, a differentiation request can optionally correspond to a function call or other indication in a query request to perform mathematical fractional differentiation and/or fractional integration, for example, based on indicating a corresponding degree of differentiation as a non-integer degree of differentiation where fractional differentiation is performed as a result. The fractional differentiation can correspond to discrete int fractional differentiation performed upon a discrete set of rows and/or can be implemented to approximate a continuous differential by treating the set of rows as a sampling of corresponding continuous data. The fractional differentiation can be performed with respect to time in cases where the set of rows corresponds to time series data. The fractional differentiation can be performed with respect to any other type of value. This fractional differentiation is optionally fractional integration in cases where the non-integer degree is further negative.

For example, different function calls to a same function can induce performance of either fractional or non-fractional differentiation, based on configuring a corresponding argument to the function denoting whether an integer or non-integer degree of differentiation be performed, or otherwise configuring a corresponding argument denoting whether an integer or non-integer order/degree of differentiation be performed. Different function calls to this same function can further induce performance of either fractional differentiation or fractional integration, based on configuring a corresponding argument to the function denoting whether a positive non-integer or negative non-integer degree of differentiation be performed, or otherwise configuring a corresponding argument denoting whether fractional integration or fractional differentiation be performed. Alternatively or in addition, different function calls to different functions with different function definitions can be implemented to induce performance of different fractional degrees of differentiation and/or integration. Examples of query expressions denoting requests to perform fractional differentiation, and examples of processing these query requests to perform fractional differentiation accordingly, are discussed in further detail in conjunction with FIGS. 36A-36G.

FIG. 34A illustrates an example of a database system 10 that processes query expressions 2610 that indicate a differentiation request 3415 based on generating a corresponding query operator execution flow 2517 via an operator flow generator module 2514 and/or executing the corresponding query operator execution flow 2517 via a query execution module 2504. Some or all features and/or functionality of generating and/or executing query operator execution flows 2517 of FIGS. 24A-25E, and/or some or all features and/or functionality of processing and/or executing corresponding queries as discussed in conjunction with of FIGS. 24A-25E, can be utilized to implement the generation and/or execution of query operator execution flow 2517 to implement execution of queries indicating requests to perform differentiation as differentiation requests 3415.

The differentiation request 3415 can indicate row set identification parameters 2645, which can optionally be implemented in a same or similar fashion as any other embodiment of row set identification parameters 2645 described previously. The query operator execution flow 2517 can include one or more serialized and/or parallelized operators 2520 implemented as input set determination operators 3432 that are executed to render identification and/or generation of an ordered row set 2672 that includes an ordered plurality of rows 2530.1-2530.M in accordance with the row set identification parameters 2645.

The differentiation request 3415 can alternatively or additionally indicate differentiation parameters 3447 denoting attributes of the corresponding differentiation to be performed. The query operator execution flow 2517 can include one or more serialized and/or parallelized operators 2520 implemented as differentiation operators 3434 that are executed to implement a corresponding differentiation process 3435 to render generation of a plurality of output values 2674.1-2674.M of one or more output columns 2662 in accordance with the differentiation parameters 3447.

In some embodiments, each of the plurality of output values 2674.1-2674.M can correspond to a differentiation value computed for a corresponding one of the plurality of rows 2530, where all rows 2530 have a corresponding output value 2674 generated as a function of the row and a function of some or all prior rows in the ordering. Example of generating output values for rows 2530 for different types of differentiation are discussed in further detail herein.

The ordered plurality of rows 2530.1-2530.M can include one or more columns having values utilized to order the rows from an unordered set and/or to generate output values of the differentiation based on being processed via a corresponding differentiation function. The ordered plurality of rows 2530.1-2530.M can be retrieved from a relational database. For example, values 2708 of some or all columns 2707 of some or all records 2422 of one or more database tables 2712 are retrieved from one or more tables based on the query expression 2610, and are optionally ordered by values 2707 of a particular column and/or are otherwise further pre-processed. The ordered plurality of rows 2530.1-2530.M can be generated based on other rows retrieved from a relational database, for example, where a corresponding set of rows are retrieved and processed to generate a new set of rows via a table value function and/or other pre-processing. In cases where the differentiation is implemented in conjunction with time series functionality such as time series forecasting, the ordered plurality of rows 2530.1-2530.M are optionally generated based on first performing a resampling function, extrapolation function, smoothing function, and/or any TVF function discussed previously upon a set of rows accessed in database storage. This can include performing a built-in and/or user-defined TVF or other function, for example, to generate values in one or more new columns as a user-defined mathematical function of rows in relational database tables, where the differentiation is performed upon one or more new columns. This can include first performing differentiation and/or integration function one or more times upon a set of rows, and performing the differentiation upon the output of this differentiation and/or integration.

The plurality of output values 2674.1-2674.M can be outputted as some or all of the query resultant and/or can be further processed. The plurality of output values 2674.1-2674.M can be optionally stored as a new column of the given table and/or as one or more corresponding columns of a new table in the database system 10, for example, in conjunction with the query expression indicating that an insert function and/or Create Table As Select (CTAS) functionality be performed to store the outputted values in new and/or existing tables that are accessible in future query executions of future query expressions 2610.

FIG. 34B illustrates an embodiment of a database system 10 that executes a query expression indicating a differentiation request 3415 via a corresponding differentiation function call 3420. Some or all features and/or functionality of the processing of a differentiation function call 3420 of FIG. 34B can be utilized to implement execution of the differentiation request 3415 of FIG. 34A, and/or any other performance of differentiation described herein.

The differentiation function call 3420 can be denoted via a corresponding differentiation function keyword 3421. The differentiation function call 3420 can further indicate row set identification parameters, for example, denoted via a corresponding row identification keyword 2643. The corresponding ordering of the respective identified row set can be performed based on row set ordering parameters 2626, for example, denoted via a corresponding row ordering function keyword 2644. The row identification keyword 2643, row ordering function keyword 2644, and/or any other keywords for other arguments can be denoted based on being keywords of a differentiation function argument keyword set 3424, for example, that is mapped to corresponding functionality in a function definition of function library 3030 for the differentiation function called in the differentiation function call 3420.

The row ordering function keyword 2644 and/or row identification keyword 2643 of FIG. 34B can optionally be implemented in a same or similar fashion as any embodiment of row ordering function keyword 2644 and/or row identification keyword 2643 discussed previously. The row set ordering parameters 2626 can optionally be implemented in a same or similar fashion as any embodiment of row set ordering parameters 2626 discussed previously.

The row set ordering parameters 2646 can denote a with-respect-to (wrt) variable argument 3441. This argument 3441 can indicate a column utilized dictate the ordering of the ordered row set 2742, and/or can indicate column storing values corresponding to a variable that the corresponding differentiation be performed with respect to.

The differentiation parameters 3447 can further indicate a differentiation variable argument 3442. This argument 3442 can indicate a column of ordered row set 2742, for example, that is optionally different from the column denoted by argument 3441. This argument 3442 can alternatively or additionally indicate column storing values corresponding to a variable that be differentiated.

For example, in the case where corresponding differentiation is denoted mathematically by dy/dx, denoting that y be differentiated with respect to x, variable y can be identified by differentiation variable argument 3442 and the variable x can be identified by wrt variable argument 3441.

FIG. 34C illustrates an example embodiment of syntax of a differentiation function call 3432. Some or all of the syntactical structure, arguments, keywords, and/or other features of differentiation function call 3420 of FIG. 34C can implement the differentiation function call 3420 of FIG. 34B and/or any embodiment of differentiation function call 3420 and/or differentiation request 3415 described herein.

The differentiation function call 3432 can be denoted by differentiation function keyword 3421, which can optionally be followed by differentiation function argument set data 3445. The differentiation function argument set data 3445 can otherwise be denoted based on being otherwise syntactically mapped to the differentiation function keyword 3421.

This differentiation function keyword 3421 keyword can be distinct from all other keywords of other functions and/or operators of the query language under which other query language function calls 2619 are written in the query expression 2610. In some cases, this differentiation function keyword 3421 can be implemented as an additional reserved keyword, for example, where query expressions 2610 and/or relational tables cannot include column names or other variable names that match the differentiation function keyword 3421. The query processing system 2502 can identify and parse a differentiation function keyword 3421 of the differentiation function call 3420 accordingly to generate the resulting query operator execution flow of the query expression, for example, via operator flow generator module 2514.

The differentiation function call 3432 can first be followed by a differentiation variable argument 3442, for example, surrounded by parenthesis, or other spacing, bracketing, etc. The differentiation variable argument 3442 can otherwise be syntactically identifiable in differentiation function argument set data 3445.

The differentiation variable argument 3442 can be denoted by a corresponding column identifier and/or can be denoted by a TVF function call and/or other function call for a function to be executed in conjunction with executing the query that outputs the respective column to be treated as the column storing the variables that be differentiated.

The differentiation variable argument 3442 can be followed by row set identification parameters 2645. The row set identification parameters 2645 can otherwise be syntactically identifiable in differentiation function argument set data 3445.

The row set identification parameters 3445 can optionally be denoted via a corresponding window definition 2623. The window definition 2623 of FIG. 34C can implemented via some or all features and/or functionality of any embodiment of window definition 2623 described herein.

The row set identification parameters 3445 can indicate row identification function keyword 2643 followed by row ordering function keyword 2644 and with variable argument 3441, for example, optionally encased in parenthesis and/or other, or other spacing, bracketing, etc. The with variable argument 3441 can optionally be implemented as row set ordering parameters 2646 in a same or similar fashion as any embodiment of row set ordering parameters 2646 described herein, in addition to optionally further dictating the column that the differentiation be performed with respect to. The wrt variable argument 3441 can be denoted by a corresponding column identifier and/or can be denoted by a TVF function call and/or other function call for a function to be executed in conjunction with executing the query that outputs the respective column to be treated as the column storing the variables that be differentiated.

FIG. 34D illustrates an example embodiment of a function library 3030 that includes a plurality of functions that include a delta function definition 3451 and/or a derivative function definition 3452. The delta function definition 3451 and/or a derivative function definition 3452 of FIG. 34D can be implemented as additional built-in and/or user-defined TVF function definitions of function library 3030 of FIG. 30D and/or any embodiment of function library described herein. The delta function definition 3451 and/or a derivative function definition 3452 can be accessed to facilitate execution of a corresponding differentiation function call 3420 of FIG. 34B to facilitate corresponding generation and execution of a corresponding query operator execution flow 2517.

The delta function definition 3451 and/or a derivative function definition 3452 can otherwise be implemented as any type of function definition that can be accessed by operator flow generator module 2512 and/or query execution module 2504 to render execution of corresponding functionality dictated by delta function execution instruction data 3455 and/or derivative function execution instruction data 3458, respectively, as configured by arguments in the function call as specified by delta function argument data 3454 and/or delta function argument data 3457, respectively. The delta function execution instruction data 3455 and/or derivative function execution instruction data 3458 can be implemented via any features and/or functionality of execution instruction data 3134, 3234, and/or 3334 described herein. The delta function argument set data 3454 and/or delta function argument set data 3457 can be implemented via any features and/or functionality of argument set data 3132, 3232, and/or 3332 described herein.

In some cases, different types of differentiation are performed via calls to different functions. For example, a first query expression calling the delta function definition 3451 via delta function keyword 3453 renders performance of a first, delta type of differentiation, while another query expression calling the derivative function definition 3452 via derivative function keyword 3456 renders performance of a second, derivative type of differentiation that is different from the first, delta type of differentiation. For example, calling of a corresponding delta function vs. a corresponding derivative function upon the same data and/or with the same arguments can render generation of different output values based on differences in how the respective differentiation is performed. Examples of performing differentiation via a delta type vs. a derivative type is discussed in further detail in conjunction with FIGS. 34G-34H.

The delta function definition 3451 can thus correspond to a first of differentiation function definition 3450.A, called via delta function keyword 3453 as a first differentiation function keyword 3421.A. Alternatively or in addition, the derivative function definition 3452 can thus correspond to a second of differentiation function definition 3450.B, called via derivative function keyword 3456 as a second differentiation function keyword 3421.B. In other embodiments, further forms of differentiation are included via corresponding function definitions. Alternatively, only one form of differentiation (e.g. only delta, or only derivative) is implemented.

FIGS. 34E and 34F illustrate embodiments of differentiation function calls 3420 for performing delta-type differentiation vs. derivative-type differentiation, respectively, for example, based on inducing access and utilization of their respective different function definitions 3451 and 3452 of FIG. 34D. Some or all features and/or functionality of the differentiation function call 3420 of FIGS. 34E and/or 34F can implement the differentiation function call 3420 of FIG. 34B, of FIG. 34C, and/or any embodiment of differentiation function call 3420 and/or differentiation request 3415 described herein.

As illustrated in FIG. 34E, differentiation function keyword 3421 can be implemented via delta function keyword 3453, which can be implemented as "DELTA" or as another keyword, which can be unique from SQL syntax and/or can be unique from other keywords of other functions of the function library. As illustrated in FIG. 34F, differentiation function keyword 3421 can be implemented via derivative function keyword 3456, which can be implemented as "DERIVATIVE" or as another keyword, which can be unique from SQL syntax and/or can be unique from other keywords of other functions of the function library.

As illustrated in FIGS. 34E and 34F, the row identification function keyword 2643 can be implemented as "OVER" as discussed previously, or as any other keyword, which can be unique from other keywords of other functions of the function library. The row ordering function keyword 2644 can be implemented as "ORDER BY" as discussed previously, or as any other keyword, which can be unique from other keywords of other functions of the function library. The OVER and ORDER BY keywords can implement defining and/or use of a corresponding window definition in accordance with SQL for implementing the differentiation function as a window function via a corresponding computing window function call, for example, based on implementing some or all features and/or functionality of implementing recursion and/or computing window function calls as discussed in conjunction with some or all of FIGS. 26A-29C.

FIGS. 34G and 34H illustrate example embodiments of executing a differentiation request 3415 via query execution module 2504. Some or all features and/or functionality of processing differentiation request 3415 of FIGS. 34G and/or 34H can implement the processing of differentiation request 3415 of FIG. 34A and/or any other processing of differentiation request 3415 and/or a differentiation function call 3420 described herein.

Window definition 2623 denoted in differentiation request can be utilized to generate an ordered row set 2672, for example, ordered by the wrt variable column 3461.$x$ ("column x") indicated by with variable argument 3441. Differentiation operators can perform a local operation upon each given row 2530 to generate corresponding output 2674 as a function of y values of the differentiation variable column 3461.$y$ ("column y"), indicated by differentiation variable argument 3442, of the given row and of at least one other consecutive row. For example, y values of a set of multiple consecutive rows that include the given row are utilized to generate corresponding output for this given row.

The set of multiple consecutive rows can optionally only include rows prior to and/or up to the given row, and no rows after the given row. The number of rows in this set of multiple consecutive rows can be constant across all rows. In particular, the number of rows in this set of multiple consecutive rows can be a function of the order of the respective differentiation, where a number of prior rows is equal to the order (i.e. degree) of differentiation, for example, when the order/degree of differentiation is a positive integer value, and/or where a total number of rows in the set of multiple consecutive rows processed as input for a given row is one more than the order of the respective differentiation.

For example, such processing of rows to generate output as a function of multiple prior rows and/or the row itself can be performed via some or all features and/or functionality of processing recursive function calls and/or computing window function calls discussed in conjunction with FIG. 26A-29C, for example, where the corresponding function definition for the differentiation function (e.g. the delta function definition or the derivative function definition)

inherently define/dictate the recursive expression 2626 in accordance with the mathematical definition for differentiation at the respective order.

Furthermore, as discussed in conjunction with FIG. 26A-29C, in the case where output 2674 is generated as a function of multiple prior rows (e.g. R prior rows), the first R rows can optionally have its output 2674 generated in accordance with a corresponding base case definition 2637, which can be preset and/or automatically generated based on the corresponding query expression. The first R rows that do not have enough prior rows to enable generation of output by the set of multiple rows can otherwise have non-null values generated in accordance with another predetermined and/or dynamically generated mathematical expression, which can be can be based on applying the fundamental theorem of calculus and/or can be based on ensuring that integrating the respective differentiated values renders the original values (or approximately the original values, for example, being deemed substantially similar enough to account for rounding errors and/or the fact that the differentiation is discrete vs. continuous, for example, by meeting and/or otherwise comparing favorably to a predefined numerical stability condition, such as a threshold average raw and/or proportional difference from the original values).

FIGS. 34G and 34H illustrate examples of first order differentiation, where R is thus equal to 1 and where only the current row and immediately prior row are utilized. Examples of higher orders of differentiation where R is greater than one are illustrated and discussed in conjunction with FIGS. 34I-34K.

In the example of FIG. 34G, a first-order delta-type differentiation is performed, for example, based on applying the delta function definition 3451, where output 2674 for a given row 2530.$i$ is a function of both the value y.$i$ of the given row in column y and also the value of y.$i-1$ of the row immediately prior to the given row, for example, as dictated by a delta expression 3461 utilized to generate output 2674 for any given row 2530 and/or any given row after the first row 2530.1, as the first row does not have any prior rows. In particular, delta expression 3461 can dictate that output 2674.$i$ for row 2530.$i$ be generated as and/or based on the following difference: y.$i$−y.$i-1$. Note that the delta expression 3461 optionally does not account for step size, for example, in accordance with a mathematical delta function definition, where the values of x are not applied, and are only utilized to sort the original data set. The use of delta expression 3461 can be preferred and/or appropriate in cases where the x value is implicit in the corresponding ordering of rows, where only the successive difference and/or discrete difference is important.

In the example of FIG. 34H, a first-order derivative-type differentiation is performed, for example, based on applying the derivative function definition 3452, where output 2674 for a given row 2530.$i$ is dictated by a derivative expression 3462 utilized to generate output 2674 for any given row 2530 and/or any given row after the first row 2530.1, as the first row does not have any prior rows. Like the delta function of FIG. 34G, output 2674 for a given row 2530.$i$ can be a function of the value y.$i$ of the given row in column y and the value of y.$i-1$ of the row immediately prior to the given row. Unlike the delta function of FIG. 34G, the output 2674 can further depend on x values, where the output 2674.$i$ of the given row 2530.$i$ is further a function of value x.$i$ of the given row in column x and the value of x.$i-1$ of the row immediately prior to the given row. In particular, derivative expression 3462 can dictate that output 2674.$i$ for row 2530.$i$ be generated as and/or based on the following quotient: (y.$i$−y.$i-1$)/(x.$i$−x.$i-1$). Note that the derivative expression 3462 thus accounts for step size, for example, in accordance with a mathematical derivative function definition, where the values of x are applied in addition to being utilized to sort the original data set. This can be useful in cases where step size impacts the derivative (e.g. where the derivative of values accounts for whether they were sampled hourly vs. daily based on accounting for the respective step size differences, and thus reflects the rate with respect to time appropriately regardless of this sampling rate).

In some embodiments, the query processing module can optionally automatically determine whether step sizes between x values in consecutive rows is equal and/or approximately equal in ordered row set 2672, where a user is notified and/or an error occurs if the step size between x values in consecutive rows is not equal and/or deviates by at least a threshold amount. In the case where the delta function and/or derivative function is applied to time series data of records 2422 stored in database storage that was captured in regular intervals (e.g. measurements or other data taken every second; every day; etc.) the step sizes can automatically be inherently equal, where these values are appropriate for use in ordered row set 2672.

In some cases where uneven step size occurs in time series data to be differentiated, the a resampling function, such as the resampling function of FIGS. 31A-31D or a different resampling function, can be user-configured to be first applied based on a user denoting that the ordered row set be selected from output of the resampling function, based on the resampling function being called in the same query expression or having its rows stored as its own table for access via output of a CTAS query, etc. Alternatively or in addition, some or all features and/or functionality of the resampling function of FIGS. 31A-31D or other resampling functionality are applied automatically prior to performing the differentiation when differentiation function is called. Alternatively or in addition, a notification is sent to the user suggesting that the resampling function be called to in cases where non-even step sizes are detected, for example, where an auto generated query expression that includes a call to the resampling function to first resample the data prior to differentiation is sent to the user as a suggestion and/or is automatically executed.

In some embodiments, rather than inducing the delta vs. derivative functionality of FIGS. 34G and 34H, respectively, via calling of a delta function vs. a derivative function, respectively, via different keywords as illustrated in FIGS. 34E and 34F, the different functionality can be induced via a configurable argument of a same differentiation function, for example, denoted in and/or processed in conjunction with differentiation parameters 3447, for example, of a corresponding argument set of the respective function.

In cases where equal step sizes is assumed and/or required, the corresponding constant step size h can be precomputed. For example, the precomputed value of h is computed based on being specified in user input as an argument to the function and/or based on computing the difference between any pair of consecutive rows (and/or identifying whether all pairs of consecutive rows have this same step size, and/or in cases where the step sizes are roughly similar, computing an average step size over all step sizes as h). This step size h can be applied automatically in evaluating the derivative expression 3462, where output 2674.$i$ for row 2530.$i$ is evaluated as (y.$i$−y.$i-1$)/h, and where x values are thus optionally not read and/or utilized for some or all rows 2530.

FIG. 34I illustrates an embodiment of a differentiation function call 3420 that includes a differentiation degree argument 3443 denoting which degree (i.e. order) of differentiation be performed. Some or all features and/or functionality of differentiation function call 3420 and/or its respective execution of FIG. 34I can implement the differentiation function call 3420 of FIG. 34B, and/or any embodiment of the differentiation function call 3420 and/or processing of a corresponding differentiation request 3415 described herein.

In some embodiments, the differentiation degree argument 3443 is configured as a positive integer value denoting the degree of differentiation, where the value of R in this example is a positive integer value. For example, where a value of 1 denotes first-order differentiation, a value of 2 denotes a second-order differentiation, etc. Other datatypes can be utilized to similarly specify the degree of differentiation. In some embodiments, the differentiation degree argument 3443 is an optional argument where, when not specified, a default of performing first-order differentiation is determined. In some embodiments, as discussed in further detail herein in accordance with further examples of the differentiation function call, the differentiation degree argument 3443 can be optionally configured to denote that integration be performed (e.g. when the differentiation degree argument 3443 specifies a negative number) and/or that fractional differentiation or integration be performed (e.g. when the differentiation degree argument 3443 specifies a non-integer number).

The query operator execution flow 2517 can be configured to execute Rth-order differentiation upon the ordered row set 2672 accordingly via implementing of an Rth-order differentiation process 3435 implemented via execution of the one or more differentiation operators 3435.

Corresponding performance of higher order differentiation where R is greater than 1 can correspond to iteratively performing differentiation upon ordered row set 2672 multiple corresponding times (e.g. performing first-order differentiation, such as a derivative function or delta function, upon output of a prior performance of the first-order differentiation, where the first-order differentiation is performed a number of times equal to the order of differentiation), and/or can be semantically equivalent to performing differentiation multiple corresponding times (e.g. R times) Alternatively, the higher-order differentiation can be optionally performed directly upon the ordered input row set based on evaluating a corresponding expression that utilizes more than one prior row as input, for example as discussed in conjunction with FIG. 34K.

FIG. 34J illustrates an example embodiment of the syntactical structure of a differentiation function call 3420 that includes differentiation degree argument 3443 configured as numeric value R. For example, the differentiation degree argument 3443 follows the differentiation variable argument 3443, for example separated by a comma. The differentiation degree argument 3443 can otherwise be syntactically identifiable in the differentiation function argument set data 3445. Some or all features and/or functionality of the differentiation function call 3420 of FIG. 34J can implement the differentiation function call 3420 of FIG. 34C, and/or any embodiment of the differentiation function call 3420 and/or processing of a corresponding differentiation request 3415 described herein.

FIG. 34K illustrates example execution of a query expression 2610 indicating a differentiation function call 3420 denoting a differentiation order degree 3443 of R in the case where R is a positive integer. A corresponding Rth order derivative expression 3462.R can be performed to generate output for a given row 2530.$i$ as a function of the x and y values of the given row 2530.$i$, as well as the x and y values of exactly R prior rows, where R+1 rows in total are utilized as input. This function can be semantically equivalent and/or approximately equivalent to the discrete derivative function for the given row at order R (i.e. equal to and/or approximating $d^R/dx^R$). Note that the first R rows optionally have output 2674 generated via a different deterministic and/or dynamically determined function to account for the fact not enough prior rows are available, for example, in a fashion that renders sufficient numerical stability and/or that satisfies the fundamental theorem of calculus, and/or based on a constant of integration determined for an antiderivative that, when applied using the constant of integration to the output of the derivative with the respective values, renders the approximately of exactly the original values. In some embodiments, the constant of integration can be automatically determined by the query processing system from the input set of rows (e.g. based on automatically measuring step size h) and/or can be configured via user input (e.g. as an argument to the function call). Further note that, while a derivative expression is illustrated in FIG. 34K, the delta function can similarly be performed at any order R similarly as a function of the given row and exactly R prior rows, where R+1 rows in total are utilized as input, but where only the R+1 y values y.$i$–R–y.$i$ are utilized and where the x values of the x column 3461.$y$ are not utilized as discussed previously.

An example of derivative expression 3462.1 for first-order derivation where R is equal to one was presented in conjunction with FIG. 34H:

1st–order output 2674.$i$ =

$$f_1(y.i, x.i, y.i-1, x.i-1) = (y.i - y.i-1)/(x.i - x.i-1)$$

An example derivative expression 3462.2 for second-order derivation where R is equal to two can be expressed as, can be approximately equal to, can be semantically equivalent to, and/or can be based on:

2nd–order output 2674.$i$ = $f_2(y.i, x.i, y.i-1, x.i-1, y.i-2, x.i-2)$ =

$$f_1(f_1(y.i, x.i, y.i-1, x.i-1), x.i, f_1(y.i-1, x.i-$$

$$1, y.i-2, x.i-2), x.i-1) = (((y.i - y.i-1)/(x.i - x.i-1)) -$$

$$((y.i-1 - y.i-2)/(x.i-1 - x.i-2)))/(x.i - x.i-1)$$

Note that this $2^{nd}$ order output is equivalent to the first-order derivative expression $f_1$ applied to the output of the first-order derivative expression $f_1$ for the given row and the prior row. In some embodiments, This recursive nature can similarly be extended, where the R-order expression can be deterministically determined based on expanding the recursive application of the first-order derivative expression $f_1$. Rth-order derivation where R is a positive integer be expressed as, can be approximately equal to, can be semantically equivalent to, and/or can be based on:

$$Rth\text{-order output } 2674.i = f_R(y.i, x.i, y.i-1, x.i-1, \ldots, y.i-R, x.i-R) =$$

$$f_1(f_{R-1}(y.i, x.i, \ldots, y.i-(R-1), x.i-(R-1)),$$

$$x.i, f_{R-1}(y.i-1, x.i-1, \ldots, y.i-R, x.i-R), x.i-1)$$

While not illustrated, the expanded form of this expression for a given value of R can thus be applied by the differentiation operators 3434 to evaluate output 2671.$i$ for each given row (e.g. after the first R rows) as a function of the R prior rows. The Rth-order differentiation when R is a positive integer can thus be implemented as a local expression, as only the R+1 consecutive rows from row 2530.$i$–R-2530.$i$ need be accessed and applied in generating R.

While not illustrated, such recursive expansion can similarly be applied to implement Rth order delta functions 3461.R based on similar recursive application of delta functions 3461.1 of FIG. 34G. Rth-order delta where R is a positive integer be expressed as, can be approximately equal to, can be semantically equivalent to, and/or can be based on:

$$Rth\text{-order output } 2674.i = f^*_R(y.i, y.i-1, \ldots, y.i-R) =$$

$$g_1(g_{R-1}(y.i, \ldots, y.i-(R-1)), g_{R-1}(y.i-1, \ldots, y.i-R))$$

where $g_1(a,b) = a - b$

Closed-form solutions for such expressions when R is a positive integer can include computing at least one binomial coefficients and applying the at least one binomial coefficient to generate the corresponding output 2674.$i$. In some embodiments, the same binomial coefficients are utilized across computations for multiple rows, and can be cached once generated to enable these values to be retrieved for subsequent rows as needed rather than being recomputed. Generating and utilizing binomial coefficients when generating output 2674 is discussed in further detail in conjunction with FIG. 36F.

In some embodiments, differentiation can be performed in accordance with multivariable calculus, where one or more additional columns of rows 2530.$i$ are processed, for example, where values of three or more columns are utilized. Output differential values of the output column can correspond to partial derivatives and/or higher order differentiation can be iteratively performed as first order differentiation with respect to different variables. Output differential values of the output column can correspond to Jacobian matrix values, gradient values, and/or other values.

FIG. 34L illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34L. In particular, a node 37 can utilize their own query execution memory resources 3045 to execute some or all of the steps of FIG. 34L, where multiple nodes 37 implement their own query processing modules 2435 to independently execute the steps of FIG. 34L for example, to facilitate execution of a query as participants in a query execution plan 2405. Some or all of the steps of FIG. 34L can optionally be performed by any other processing module of the database system 10. Some or all of the steps of FIG. 34L can be performed to implement some or all of the functionality of the database system 10 as described in conjunction with FIGS. 34A-34K, for example, by implementing some or all of the functionality of processing and/or executing query expressions that include differentiation requests via differentiation operators performed upon ordered sets of input rows to generate output columns that include corresponding ordered sets of output values, and/or can be performed in conjunction with other performance of differentiation/integration described in conjunction with FIGS. 34A-34K and/or 35A-35G. Some or all of the steps of FIG. 34L can be performed to implement some or all of the functionality regarding execution of a query via the plurality of nodes in the query execution plan 2405 as described in conjunction with some or all of FIGS. 24A-25E. Some or all steps of FIG. 34L can be performed by database system 10 in accordance with other embodiments of the database system 10 and/or nodes 37 discussed herein. Some or all steps of FIG. 34L can be performed in conjunction with one or more steps of any other method described herein.

Step 3482 includes receiving a query expression that includes a call to a differentiation function. Step 3484 includes executing the query expression.

Performing step 3484 can include performing step 3486 and/or step 3488. Step 3486 includes determining an ordered set of input rows to the differentiation function based on accessing a corresponding plurality of relational database rows in at least one relational database table. Step 3488 includes generating an ordered set of output values as output of executing the differentiation function upon the ordered set of input rows based on performing a window function upon each row in the ordered set of input rows to return a differentiation output value for the each row as a function of a set of multiple consecutive rows in the ordered set of input rows that includes the each row.

In various examples, the set of multiple consecutive rows includes a number of rows equal to one more than a degree of differentiation.

In various examples, the degree of differentiation is one degree option of a plurality of degree options based on the call to the differentiation function indicating configuration of the one degree option.

In various examples, the method further includes: receiving a second query expression that includes a second call to the differentiation function indicating configuration of a different degree option of the plurality of degree options and/or executing the second query expression. Executing the second query expression can be based on: determining a second ordered set of input rows to the differentiation function based on accessing a second corresponding plurality of relational database rows; and/or generating a second ordered set of output values as output of executing the differentiation function upon the second ordered set of input rows based on performing a second window function upon each row in the second ordered set of input rows to return a second differentiation output value for the each row in the second ordered set of input rows as a function of a second set of multiple consecutive rows in the second ordered set of input rows that includes the each row of the second ordered set of input rows. A second number of rows in the second set of multiple consecutive rows can be different from the number of rows in the set of multiple consecutive rows based on the different degree option of the plurality of degree options being different from the one degree option of the plurality of degree options.

In various examples, the plurality of degree options include a first degree option corresponding to first order differentiation and a second degree option corresponding to second order differentiation. In various examples, the number of rows is equal to two based on the one degree option indicating the first degree option. In various examples, the number of rows is equal to three based on the one degree option indicating the second degree option.

In various examples, the plurality of degree options includes one or more additional degree options corresponding to other positive orders of differentiation, where the number of rows is equal to one less than corresponding integer value denoted by the given degree option and/or wherein the number of rows in the multiple consecutive rows prior to the given row is equal to the given degree option.

In various examples, the plurality of degree options include at least one negative degree option corresponding to integration. In various examples, executing the differentiation function includes generating integration output as the ordered set of output values based on the one degree option indicating a negative degree option of the at least one negative degree option.

In various examples, the plurality of degree options includes a plurality of fractional degree options. In various examples, executing the differentiation function includes generating fractional differentiation output as the ordered set of output values based on the one degree option indicating a fractional degree option of the plurality of fractional degree options.

In various examples, the ordered set of output values are computed as discrete derivative values in accordance with a discrete derivative function.

In various examples, the corresponding plurality of relational database rows correspond to time series data having temporal values indicated in at least one column. In various examples, the ordered set of input rows is generated based on ordering by the temporal values in the at least one column.

In various examples, the ordered set of output values compare favorably to a stationary data condition based on executing the differentiation function. In various examples, the query processing system further executes at least one time series forecasting algorithm upon the ordered set of output values based on the ordered set of output values comparing favorably to the stationary data condition.

In various examples, performing the discrete derivative function is based on computing a difference between values of at least one other column for the set of multiple consecutive rows.

In various examples, performing the discrete derivative function is further based on computing the difference between temporal values for the for the set of multiple consecutive rows.

In various examples, performance of the discrete derivative function does not utilize temporal values as input based on the temporal values indicated in the at least one column having a constant temporal change for consecutive ones of the ordered set of input rows based on being implemented as a delta function.

In various examples, the call to the differentiation function is based on indicating a first function keyword corresponding to a first differentiation function type. In various examples, the ordered set of input rows includes a first column and a second column. In various examples, the ordered set of input rows are determined based on ordering a corresponding set of input rows by the first column in accordance with an increasing numeric ordering. In various examples, the differentiation output value for the each row is computed based on dividing a first difference between a first value of the second column for the each row and a second value of the second column for a row immediately prior to the each row in the ordered set of input rows by a second difference between a third value of the first column for the each row and a fourth value of the first column for the row immediately prior to the each row in the ordered set of rows.

In various examples, the method further includes: receiving a second query expression that includes a second call to a second differentiation function based on indicating a second function keyword corresponding to a second differentiation function type; and/or executing the second query expression. In various examples, executing the second query expression is based on determining a second ordered set of input rows to the second differentiation function based on accessing a second corresponding plurality of relational database rows in at least one relational database table. In various examples, the second ordered set of input rows includes a third column and a fourth column. In various examples, executing the second query expression is further based on generating a second ordered set of output values as output of executing the differentiation function upon the ordered set of input rows based on performing a second window function upon another each row in the second ordered set of input rows to return a second differentiation output value for the another each row as a second function of a second set of multiple consecutive rows in the ordered set of input rows that includes the another each row. In various examples, the second ordered set of input rows are determined based on ordering a second corresponding set of input rows by the third column in accordance with the increasing numeric ordering. In various examples, the second differentiation output value for the another each row is computed based on a first difference between a fifth value of the fourth column for the another each row and a sixth value of the fourth column for another row immediately prior to the another each row in the ordered set of input rows. In various examples, the second differentiation output value for the another each row is computed without utilizing any values of the third column.

In various examples, the first function keyword corresponds to a derivative function type, and wherein the second function keyword corresponds to a delta function type.

In various examples, executing the differentiation function upon the ordered set of input rows includes: performing a plurality of calculations via a first numeric datatype having a first precision, and/or truncating output of the plurality of calculations to generate a value for a second numeric datatype having a second precision that is less precise than the first precision. In various examples, the ordered set of output values are generated as values of the second numeric datatype.

In various examples, the second numeric datatype is a 64-bit double datatype, and wherein the first numeric datatype is an 80-bit floating point datatype.

In various examples, the ordered set of output values are generated via a plurality of parallelized processes based on implementing window partitioning.

In various embodiments, any one of more of the various examples listed above are implemented in conjunction with performing some or all steps of FIG. 34L. In various embodiments, any set of the various examples listed above can implemented in tandem, for example, in conjunction with performing some or all steps of FIG. 34L, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 34L described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 34L, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to determine a query expression that includes a call to a differentiation function and/or execute the query expression based on: determining an ordered set of input rows to the differentiation function based on accessing a corresponding plurality of relational database rows in at least one relational database table; and/or generating an ordered set of output values as output of executing the differentiation function upon the ordered set of input rows based on performing a window function upon each row in the ordered set of input rows to return a differentiation output value for the each row as a function of a set of multiple consecutive rows in the ordered set of input rows that includes the each row.

FIGS. 35A-35F present embodiments of a database system 10 that executes query expressions 2610 that indicate requests to perform integration. Some or all features and/or functionality of the query execution and/or corresponding query expressions of FIGS. 35A-35F can be implemented via any other features and/or functionality of query executions and/or processing of corresponding query expressions described herein.

As used herein, an integration request can correspond to a function call or other indication in a query request to perform mathematical integration, such as computation of integral values for ordered rows, such as time series data. The integration can correspond to discrete integration performed upon a discrete set of rows and/or can be implemented to approximate a continuous integral by treating the set of rows as a sampling of corresponding continuous data, for example, by approximating area under a corresponding curve via Reimann sums (e.g. left, right, or midpoint Riemann sums, or other summation or rectangles), and/or via summations of other shapes such as trapezoids by applying the trapezoid rule, or applying another approximation for area under a corresponding curve. The integration can be performed with respect to time in cases where the set of rows corresponds to time series data. The integration can be performed with respect to any other type of value.

The integration performed as described herein in response to an integration request can be implemented via a delta function (e.g. operating independent of step size and based on row order only), or a derivative function (e.g. operating while considering step size). For example, different function calls to a same function can induce performance of either the anti-delta of a mathematical delta function or the anti-derivative of a mathematical derivative function, based on configuring a corresponding argument to the function denoting whether step size of the variable dictating the ordering of rows (e.g. time) be computed/processed in generating corresponding output. Alternatively or in addition, different function calls to different functions with different function definitions can be implemented to induce performance of anti-delta functions vs. anti-derivative functions.

The integration performed as described herein in response to an integration request can be implemented as first order integration, second order integration, and/or any other positive, integer degree of integration. For example, different function calls to a same function can induce performance of different degrees of integration, based on configuring a corresponding argument to the function denoting which degree of integration be performed. Alternatively or in addition, different function calls to different functions with different function definitions can be implemented to induce performance of different degrees of integration.

As used herein, an integration request can optionally correspond to a function call or other indication in a query request to perform mathematical fractional integration, for example, based on indicating a corresponding degree of integration as a non-integer degree of integration where a fractional integral values are generated as a result.

For example, different function calls to a same function can induce performance of either fractional or non-fractional integration, based on configuring a corresponding argument to the function denoting whether an integer or non-integer degree of integration be performed, or otherwise configuring a corresponding argument denoting whether an integer or non-integer order/degree of integration be performed. Examples of query expressions denoting requests to perform fractional integration, and examples of processing these query requests to perform fractional integration accordingly, are discussed in further detail in conjunction with FIGS. 36A-36G.

FIG. 35A illustrates an example of a database system 10 that processes query expressions 2610 that indicate an integration request 3515 based on generating a corresponding query operator execution flow 2517 via an operator flow generator module 2514 and/or executing the corresponding query operator execution flow 2517 via a query execution module 2504. Some or all features and/or functionality of generating and/or executing query operator execution flows 2517 of FIGS. 24A-25E, and/or some or all features and/or functionality of processing and/or executing corresponding queries as discussed in conjunction with of FIGS. 24A-25E, can be utilized to implement the generation and/or execution of query operator execution flow 2517 to implement execution of queries indicating requests to perform integration as integration requests 3515.

The integration request 3515 can indicate row set identification parameters 2645, which can optionally be implemented in a same or similar fashion as any other embodiment of row set identification parameters 2645 described previously. The query operator execution flow 2517 can include one or more serialized and/or parallelized operators 2520 implemented as input set determination operators 3432 that are executed to render identification and/or generation of an ordered row set 2672 that includes an ordered plurality of rows 2530.1-2530.M in accordance with the row set identification parameters 2645.

The integration request 3515 can alternatively or additionally indicate integration parameters 3547 denoting attributes of the corresponding integration to be performed. The query operator execution flow 2517 can include one or more serialized and/or parallelized operators 2520 implemented as integration operators 3534 that are executed to implement a corresponding integration process 3535 to render generation of a plurality of output values 2674.1-2674.M of one or more output columns 2662 in accordance with the integration parameters 3547.

In some embodiments, each of the plurality of output values 2674.1-2674.M can correspond to an integration output value (e.g. integral value) computed for a corresponding one of the plurality of rows 2530, where all rows 2530 have a corresponding output value 2674 generated as a function of the row and a function of some or all prior rows in the ordering. Example of generating output values for rows 2530 for different types of integration are discussed in further detail herein The ordered plurality of rows 2530.1-2530.M can include one or more columns having values utilized to order the rows from an unordered set and/or to generate output values of the integration based on being processed via a corresponding integration function. The ordered plurality of rows 2530.1-2530.M can be retrieved from a relational database. For example, values 2708 of some or all columns 2707 of some or all records 2422 of one or more database tables 2712 are retrieved from one or more tables based on the query expression 2610, and are optionally ordered by values 2707 of a particular column and/or are otherwise further pre-processed. The ordered plurality of rows 2530.1-2530.M can be generated based on other rows retrieved from a relational database, for example, where a corresponding set of rows are retrieved and processed to generate a new set of rows via a table value function and/or other pre-processing. In cases where the integration is implemented in conjunction with time series functionality such as time series forecasting, the ordered plurality of rows 2530.1-2530.M are optionally generated based on first performing a resampling function, extrapolation function, smoothing function, and/or any TVF function discussed previously upon a set of rows accessed in database storage. This can include performing a built-in and/or user-defined TVF or other function, for example, to generate values in one or more new columns as a user-defined mathematical function of rows in relational database tables, where the integration is performed upon one or more new columns. This can include first performing differentiation and/or integration function one or more times upon a set of rows, and performing the integration upon the output of this differentiation and/or integration.

The plurality of output values 2674.1-2674.M can be outputted as some or all of the query resultant and/or can be further processed. The plurality of output values 2674.1-2674.M can be optionally stored as a new column of the given table and/or as one or more corresponding columns of a new table in the database system 10, for example, in conjunction with the query expression indicating that an insert function and/or Create Table As Select (CTAS) functionality be performed to store the outputted values in new and/or existing tables that are accessible in future query executions of future query expressions 2610.

FIG. 34B illustrates an embodiment of a database system 10 that executes a query expression indicating an integration request 3515 via a corresponding integration function call 3520. Some or all features and/or functionality of the processing of the integration function call 3520 of FIG. 35B can be utilized to implement execution of the integration request 3515 of FIG. 35A, and/or any other performance of integration described herein.

The integration function call 3520 can be denoted via a corresponding integration function keyword 3521. The integration function call 3520 can further indicate row set identification parameters, for example, denoted via a corresponding row identification keyword 2643. In some cases, this corresponding integration function keyword 3521 can be implemented as an additional reserved keyword, for example, where query expressions 2610 and/or relational tables cannot include column names or other variable names that match the corresponding integration function keyword 3521. The query processing system 2502 can identify and parse a corresponding integration function keyword 3521 of the integration function call 3520 accordingly to generate the resulting query operator execution flow of the query expression, for example, via operator flow generator module 2514.

The corresponding ordering of the respective identified row set can be performed based on row set ordering parameters 2626, for example, denoted via a corresponding row ordering function keyword 2644. The row identification keyword 2643, row ordering function keyword 2644, and/or any other keywords for other arguments can be denoted based on being keywords of an integration function argument keyword set 3524, for example, that is mapped to corresponding functionality in a function definition of function library 3030 for the integration function called in the integration function call 3520.

The row ordering function keyword 2644 and/or row identification keyword 2643 of FIG. 34B can optionally be implemented in a same or similar fashion as any embodiment of row ordering function keyword 2644 and/or row identification keyword 2643 discussed previously. The row set ordering parameters 2626 can optionally be implemented in a same or similar fashion as any embodiment of row set ordering parameters 2626 discussed previously.

The row set ordering parameters 2646 can denote a with-respect-to (wrt) variable argument 3441. This argument 3441 can indicate a column utilized dictate the ordering of the ordered row set 2742, and/or can indicate column storing values corresponding to a variable that the corresponding integration be performed with respect to.

The integration parameters 3547 can further indicate an integration variable argument 3542. This argument 3542 can indicate a column of ordered row set 2742, for example, that is optionally different from the column denoted by argument 3441. This argument 3542 can alternatively or additionally indicate column storing values corresponding to a variable that is to be integrated. This argument 3542 can optionally be implemented in a same or similar fashion as any embodiment of the differentiation variable argument 3442 described herein.

For example, in the case where corresponding integration is denoted mathematically by $\int y \, dx$, denoting that y be integrated with respect to x, the variable y can be identified by integration variable argument 3542 and the variable x can be identified by wrt variable argument 3441.

In some embodiments, the integration function call 3520 calls an integration function having an integration function definition in function library 3030 that is distinct from the one or more differentiation function definitions 3450, such as the function definitions for the delta function and/or the derivative function discussed previously in conjunction with FIGS. 34A-34K. In such cases, the integration function keyword 3521 can be distinct from the differentiation function keyword 3421 to denote this different function be called and performed.

Alternatively or in addition to having a separate function call/function keyword for integration that is different from the function call/function keyword for performing differentiation, the integration function call 3520 is implemented as a call to a differentiation function having differentiation function definition 3450, such as the function definition for the delta function and/or the derivative function discussed previously in conjunction with FIGS. 34A-34K. In such cases, the integration function keyword 3521 can be identical to the differentiation function keyword 3421 (e.g. "DELTA" or "DERIVATIVE"). To denote the performance of integration rather than differentiation, a configurable argument of the differentiation function argument set can denote that integration be performed rather than differentiation, where the integration process 3535 is performed rather than differentiation process 3435 based on this configurable argument denoting integration rather than differentiation be performed.

FIG. 35C illustrates an example of such an embodiment integration request 3515 that is implemented via a differentiation function call 3420, for example, discussed in conjunction with FIGS. 34A-34K. The differentiation function call 3420 of FIG. 35C can implement the differentiation function call 3420 of FIG. 34I, where differentiation degree argument 3443 is a negative number to denote integration be performed, and/or can implement any differentiation function call 3420 described herein. The differentiation function call 3420 of FIG. 35C can alternatively or additionally implement the integration function call 3520 of FIG. 35B, and/or can implement any embodiment of the integration function call 3520 and/or integration request 3515 described herein.

For example, the differentiation function call 3420 can denote differentiation be performed when R is a positive value to denote a positive order of differentiation (e.g. further denoting a corresponding positive order of anti-differentiation and denoting a negative order of corresponding integration), and that integration be performed when R is a negative value to denote a negative order of differentiation (e.g. further denoting a corresponding positive order of anti-differentiation and denoting a positive order of corresponding integration). This relation of Rth order differentiation being negative-Rth order integration is consistent with the principles of applying orders to integration and differentiation in calculus principles, and can thus induce user-friendly designation of whether integration or differentiation be performed in the function call based on this intuitive, known relationship.

FIG. 35D illustrates an example embodiment of the syntactical structure of a differentiation function call 3420 that includes differentiation degree argument 3443 configured as a negative numeric value R, as denoted by negation symbol 3545 (e.g. a dash character '-', negative sign, or other symbol or syntactic structure denoting negation) optionally followed by an integration degree argument having value R' (e.g. a positive numeric value and/or value equal to the negation of R, or other value whose magnitude denotes the order of integration that be performed). Some or all features and/or functionality of the differentiation function call 3420 of FIG. 35C can implement the differentiation function call 3420 of FIG. 34C and/or of FIG. 35J, and/or any embodiment of the differentiation function call 3420, integration function call 3520, and/or processing of a corresponding integration request 3515 described herein.

R can be implemented as negative one (e.g. where R' is 1) to indicate first order integration. An example of performing first order integration is illustrated in FIG. 35E.

R can alternatively or additionally be implemented as other negative integers one to indicate higher orders of integration (e.g. where R' is a positive integer strictly greater than one). Corresponding performance of higher order integration where R' is greater than 1 can correspond to iteratively performing integration upon ordered row set 2672 multiple corresponding times (e.g. performing first-order integration upon output of a prior performance of the first-order integration, where the first-order integration is performed a number of times equal to the order of integration), and/or can be semantically equivalent to performing integration multiple corresponding times (e.g. R' times) Alternatively, the higher-order differentiation can be optionally performed directly upon the ordered input row set based on evaluating a corresponding expression that utilizes all than prior rows as input.

FIGS. 35E and 35F illustrate example embodiments of executing a differentiation request 3415 via query execution module 2504. Some or all features and/or functionality of processing differentiation request 3415 of 35E and/or 35F can implement the processing of integration request 3415 of FIG. 35A and/or any other processing of integration request 3515 and/or an integration function call 3520 described herein.

Window definition 2623 denoted in differentiation request can be utilized to generate an ordered row set 2672, for example, ordered by the wrt variable column $3461.x$ ("column x") indicated by wrt variable argument 3441. Integration operators can perform a upon each given row 2530 to generate corresponding output 2674 as a function of y values of the differentiation variable column $3461.y$ ("column y"), indicated by integration variable argument 3542, of the given row and of at least one other consecutive row. The set of multiple consecutive rows can optionally only include rows prior to and/or up to the given row, and no rows after the given row.

In particular, as illustrated in FIG. 35E, unlike the local function implementation of performing differentiation as discussed in conjunction with FIGS. 34G, 34H, and 34K where all rows after the first R rows are processed in conjunction with same number of prior rows, the output $2674.i$ for any given row can be a function of all prior rows, where different numbers of prior rows are thus utilized for generating the output of any given row.

For example, such processing of rows to generate output as a function of multiple prior rows and/or the row itself can be performed via some or all features and/or functionality of processing recursive function calls and/or computing window function calls discussed in conjunction with FIG. 26A-29C, for example, where the corresponding function definition for the integration function (e.g. the delta function definition or the derivative function definition with a negative degree specified) inherently define/dictate the recursive expression 2626 in accordance with the mathematical definition for differentiation at the respective order.

In the example of FIG. 35E, a first-order delta-type integration is performed, for example, based on applying the delta function definition 3451 in the case where R=-1, where output 2674 for a given row $2530.i$ is a function of all values y starting from the first row 2530.1 (i.e. values y.1-y.i), as dictated by an integration expression 3561.1 utilized to generate output 2674 for any given row 2530. In particular, integration expression 3561 $g'_1$ can dictate that output 2674.$i$ for row 2530.$i$ be generated as and/or based on the following summation: $\Sigma_{j=1}^{i}$y.i (i.e. y.1+y.2+ . . . y.i). Note that this expression $g'_1$ can also be expressed as the summation of the value y.i of the y column of the current row with the outputted value of the prior row: output 2674.$i$=y.i+output 2674.$i$−1.

This relationship can be leveraged to enable caching of a miming sum 3541 denoting the most recently generated output 2674.$i$−1 in cache memory resources (e.g. query execution memory resources utilized by query execution module 2504 in executing queries), and/or the most recently generated output is otherwise maintained and utilized to generate the next output, rather than re-reading all prior rows again and producing this summation for each individual row.

For example, row 2530.1 is processed by accessing its y value y.1, and, as no other prior rows exist (e.g. the running sum is initialized at zero), the output 2674.1 is generated as the value y.1, and the running sum 3541 is updated to reflect output 2674.1 (i.e. the value y.1).

Next row 2530.2 is processed by accessing its y value y.2, and, while output 2674.2 is dependent on the y.1 value of row 2530.1, row 2530.1 need not be re-read/re-processed, as all necessary information is stored in the running sum 3541. In particular, the output 2674.2 is generated by summing y.2 with the value of running sum 3541 (i.e. y.1) to render output 2674.2 equal to y.1+y.2, and updating of the running sum accordingly. The miming sum 3541 is updated to reflect output 2674.2 (i.e. the value y.1+y.2).

This process can continue where each output 2674.$i$ is generated by processing the y.i value of the given row 2530.$i$ and the running sum 3541, where the value of each row is only accessed/processed once, when the output of the given row is generated. This process can require that the rows 2530 are processed, in order, sequentially.

Note that the integration expression 3561 optionally does not account for step size, for example, in accordance with being the anti-differentiation of a mathematical delta function definition, where the values of x are not applied, and are only utilized to sort the original data set. The use of integration expression 3561 can be preferred and/or appropriate in cases where the x value is implicit in the corresponding ordering of rows, where only the successive difference and/or discrete difference is important.

Furthermore, integration expression 3561 can be considered an inverse process of delta expression 3461. For example, the integration expression 3561 and/or derivative expression 3461 can be configured such that, when a given ordered input row set is processed via integration expression 3561 to generate a corresponding output column 2662, this output column, when processed via delta expression 3461 as the y column of a second given ordered input row set for this same set of rows with the original x column, the identical (and/or substantially similar, due to rounding error) y values of the original given ordered input row set. Similarly, this configuration can guarantee that, when a given ordered input row set is processed via delta expression 3461 to generate a corresponding output column 2662, this output column, when processed via integration expression 3561 as the y column of a second given ordered input row set for this same set of rows with the original x column, the identical (and/or substantially similar, due to rounding error) y values of the original given ordered input row set.

In the example of FIG. 35F, a first-order derivative-type integration is performed, for example, based on applying the derivative function definition 3452 in the case where R=−1, where output 2674 for a given row 2530.$i$ is dictated by an integration expression 3562 utilized to generate output 2674 for any given row 2530. Like performing the integration expression 3561 of FIG. 34G, output 2674 for a given row 2530.$i$ can be a function of the value y.i of the given row in column y and the value of all y.1–y.i−1 for all rows prior to the given row. Unlike the delta function of FIG. 34G, the output 2674 can further depend on x values, where the output 2674.$i$ of the given row 2530.$i$ is further a function of values x.1–x.i of the given row and all prior rows in column.

In particular, integration expression 3462 can dictate that output 2674.$i$ for row 2530.$i$ be generated as and/or based on the following summation: $\Sigma_{j=1}^{i}$: y.i*h, where h is the step size and/or the measured difference x.i–x.i−1 (e.g. where step size is optionally required and/or recommended to be constant as discussed previously, and/or is determined for each given row from the prior row and/or from the next row), where this summation is equal to h*(y.1+y.2++y.i).

Note that this expression $f'_1$ can also be expressed as the summation of the product of values y.i and x.i, of the y column and x column, respectively, of the current row with the outputted value of the prior row: output 2674.$i$=y.i*(x.i−x.i−1)+output 2674.$i$−1. Note that this functionality implements computing of a left Riemann sum. In other embodiments, the summation is adapted to compute right Riemann sums, midpoint Riemann sums, implement the trapezoid rule, or perform another type of approximation of the respective integration.

Thus, similar to the running sum of FIG. 35E, this relationship can be leveraged to enable caching of a running sum 3541 denoting the most recently generated output 2674.$i$−1 in cache memory resources (e.g. query execution memory resources utilized by query execution module 2504 in executing queries), and/or the most recently generated output is otherwise maintained and utilized to generate the next output, for example, by adding the miming sum 3541 updating after processing row 2530.$i$−1 with the product h*y.i to generate output of the given row 2530.$i$, and updating the running sum 3541 as this output 2530.$i$ for use in generating output 2530.$i$+1, rather than re-reading all prior rows again and producing this summation for each individual row. Applying the value of h can be implemented when h is predetermined as discussed previously, for example, based on user input and/or based on automatically measuring step size between one pair of consecutive rows in cases where h is known to be constant and/or checking whether h is constant for all pairs of consecutive rows.

In cases where h is not necessarily constant, the output 2674.$i$ can be generated as y.i*(x.i–x.i−1)+output 2674.$i$−1. This can include applying a determined constant and/or base case definition for evaluating the first row due to x.i−1 not existing for this row, for example, in accordance with the fundamental theorem of calculus and/or achieving numerical stability.

Note that the integration expression 3562 thus accounts for step size, for example, in accordance with an anti-differentiation of a mathematical derivative function definition, where the values of x are applied in addition to being utilized to sort the original data set. This can be useful in cases where step size impacts the derivative (e.g. where the derivative of values accounts for whether they were sampled hourly vs. daily based on accounting for the respective step size differences, and thus reflects the rate with respect to time appropriately regardless of this sampling rate).

Furthermore, integration expression 3562 can be considered an inverse process of derivative expression 3462. For example, the integration expression 3562 and/or derivative expression 3462 can be configured such that, when a given ordered input row set is processed via integration expression 3562 to generate a corresponding output column 2662, this output column, when processed via derivative expression 3462 as the y column of a second given ordered input row set for this same set of rows with the original x column, the identical (and/or substantially similar, due to rounding error) y values of the original given ordered input row set. Similarly, this configuration can guarantee that, when a given ordered input row set is processed via derivative expression 3462 to generate a corresponding output column 2662, this output column, when processed via integration expression 3562 as the y column of a second given ordered input row set for this same set of rows with the original x column, the identical (and/or substantially similar, due to rounding error) y values of the original given ordered input row set.

FIG. 35G illustrates an embodiment of performing integration for any positive R' (e.g. $1^{st}$ order integration or $2^{nd}$ order integration or $3^{rd}$ order integration . . . , etc.). Extending the notion of maintaining a miming sum (which is optionally multiplied with h in the case of anti-derivative), higher order integration can be performed by maintaining and applying miming sums of miming sums.

For example, For a −1 degree delta function call, the output is just the miming sum of input values as discussed previously. For a −2 degree delta function call, the output is just the running sum of the $1^{st}$ degree miming sum. E.g. consider the case where they column of the input data set is (1, 2, 3, 4, . . . ). A first order running sum 3541.1 (e.g. output of first order integration) is thus computed as (1, 3, 6, 10, . . . ). A second order running sum 3541.2 (e.g. output of the second order integration, such as −2 degree delta function call) is thus computed as (1, 4, 10. 20, . . . ). For a −3 degree delta function call, corresponding third order integration includes just maintaining the running sum of the second order miming sum, etc.

As illustrated in FIG. 35G, such output 2674.$i$ can be computed 1 row at a time as new rows come in, where the result for a given row is just the most recently computed value of the largest order miming sum. This can include maintaining R corresponding miming sums in cache memory resources 3540. In particular, when processing a given row 2530.$i$. each miming sum 3541 reflecting the update when processing prior row 2530.$i$−1 is applied to update the respective miming sums and ultimately generate the output 2674.$i$. These updated values generated in processing row 2530.$i$ can overwrite the prior miming sum values, where these most recent miming sum values generated for row 2530.$i$ are processed and further updated when processing row 2530.$i$+1 is processed to render output 2674.$i$+1.

For example, using the $2^{nd}$ order integration example from above, when the first row is processed with y.1=1, miming sum 3541.1 is updated as 0+y.1=1, and miming sum 3541.2 is updated as 0+3541.1=1, which is outputted as output 2674.1 for $2^{nd}$ order integration (or further summed and processed in higher orders of integration). When the second row is processed with y.2=2, miming sum 3541.1 is updated as y.2+current miming sum 3541.1=2+1=3, and miming sum 3541.2 is updated as updated 3541.1+current miming sum 3541.2=3+1=4, which is outputted as output 2674.2 for $2^{nd}$ order integration (or further summed and processed in higher orders of integration). When the third row is processed with y.3=3, miming sum 3541.1 is updated as y.3+current miming sum 3541.1=3+3=6, and miming sum 3541.2 is updated as updated 3541.1+current miming sum 3541.2=6+4=10, which is outputted as output 2674.3 for $2^{nd}$ order integration (or further summed and processed in higher orders of integration). When the fourth row is processed with y.4=4, miming sum 3541.1 is updated as y.4+current miming sum 3541.1=4+6=10, and running sum 3541.2 is updated as updated 3541.1+current running sum 3541.2=10+10=20, which is outputted as output 2674.4 for $2^{nd}$ order integration (or further summed and processed in higher orders of integration). This means of performing R'th order integration in the case where R' is a positive integer (e.g. where a corresponding function call to differentiation function denotes R as a negative integer) can be ideal as it does not require computation of binomial coefficients, which can improve processing efficiency.

In some cases, each of the R running sums can be handled as a vector as part of a strategy of minimizing error (e.g. when summing doubles) as described in further detail herein, for example, in conjunction with FIGS. 37I and 37J.

FIG. 35H illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 35H. In particular, a node 37 can utilize their own query execution memory resources 3045 to execute some or all of the steps of FIG. 35H, where multiple nodes 37 implement their own query processing modules 2435 to independently execute the steps of FIG. 35H for example, to facilitate execution of a query as participants in a query execution plan 2405. Some or all of the steps of FIG. 35H can optionally be performed by any other processing module of the database system 10. Some or all of the steps of FIG. 35H can be performed to implement some or all of the functionality of the database system 10 as described in conjunction with FIGS. 35A-35F, for example, by implementing some or all of the functionality of processing and/or executing query expressions that include integration requests via integration operators performed upon ordered sets of input rows to generate output columns that include corresponding ordered sets of output values. Some or all of the steps of FIG. 35H can be performed to implement some or all of the functionality regarding execution of a query via the plurality of nodes in the query execution plan 2405 as described in conjunction with some or all of FIGS. 24A-25E. Some or all steps of FIG. 35H can be performed by database system 10 in accordance with other embodiments of the database system 10 and/or nodes 37 discussed herein. Some or all steps of FIG. 35H can be performed in conjunction with one or more steps of the method of FIG. 34L, and/or one or more steps of any other method described herein.

Step 3582 includes determining a query expression that indicates a request to perform integration. Step 3584 includes executing the query expression.

Performing step 3584 can include performing step 3586 and/or step 3588. Step 3586 includes determining an ordered set of input rows based on accessing a corresponding plurality of relational database rows in at least one relational database table. Step 3588 includes generating an ordered set of output values based on performing a window function upon each row in the ordered set of input rows to return an integration output value for the each row as a function of the each row and of all prior consecutive rows in the ordered set of input rows from the each row.

In various examples, the request to perform integration indicates a degree of integration. In various examples, the ordered set of output values are generated in accordance with applying the degree of integration.

In various examples, all prior consecutive rows in the ordered set of input rows have equal weight based on the degree of integration having a magnitude of one.

In various examples, the ordered set of output values is generated based on maintaining a miming summation, and wherein each output value in the ordered set of output values is generated based on adding a newly computed value to a value of an immediately prior output value in the ordered set of output values based on storing and updating the miming summation in cache memory resources.

In various examples, the all prior consecutive rows in the ordered set of input rows have non-equal weight with rows greater numbers of rows prior from the each row having greater weight than other rows fewer number of rows prior from the each row based on the degree of the integration having a magnitude of greater than one.

In various examples, the request to perform integration is indicated in a call to a differentiation function included in the query expression based on the call to the differentiation function having a value for a configurable degree parameter indicating a negative numeric value. In various examples, the degree of integration is indicated by a magnitude of the negative numeric value. In various examples, the negative numeric value is a negative integer value.

In various examples, the method further includes receiving a second query expression that includes a second call to the differentiation function having the value for the configurable degree parameter indicating a positive numeric value, and executing the second query expression based on: determining a second ordered set of input rows to the differentiation function based on accessing a second corresponding plurality of relational database rows; and generating a second ordered set of output values based on performing a second window function upon each row in the second ordered set of input rows to return a differentiation output value for the each row in the second ordered set of input rows as a function of a set of consecutive rows in the second ordered set of input rows that includes the each row of the second ordered set of input row based on the positive numeric value.

In various examples, the set of consecutive rows includes a proper subset of prior input of all prior consecutive rows in the second ordered set of input rows from the each row for at least some of the second ordered set of input rows based on the positive numeric value being a positive integer value. In various examples, the set of consecutive rows includes all prior consecutive rows in the second ordered set of input rows from the each row for at least some of the second ordered set of input rows based on the positive numeric value being a positive non-integer value.

In various examples, the second ordered set of input rows includes the ordered set of output values. In various examples, a similarity score between an ordered set of input values of the ordered set of input rows of the query expression and the second ordered set of output values compares favorably to a numerical stability condition based on the magnitude of the negative numeric value being equal to a magnitude of the positive numeric value.

In various examples, the similarity score is computed as a total and/or average error (e.g. computed difference) between values in the ordered set of input values of the ordered set of input rows and corresponding values in the second ordered set of output values (e.g. the difference between these values for the same given row $2530.i$). In various examples, the numerical stability condition has a predetermined threshold error, for example, corresponding to a minimum required corresponding similarity score, where the numerical stability condition is met when the total and/or average error is less than and/or equal to the predetermined threshold error.

In various examples, execution of the query expression has a first processing efficiency meeting a processing efficiency condition based on applying at least one first approximation, wherein the second query expression has a second processing efficiency meeting the processing efficiency condition based on applying at least one second approximation. In various examples, the ordered set of input values is different from the second ordered set of output values based on the at least one first approximation and the at least one second approximation.

In various examples, the at least one first approximation is based on a precision of a numeric datatype utilized when performing at least one computation in generating integration output values. In various examples, the at least one second approximation is based on the precision of the numeric datatype utilizes when performing at least one computation in generating differentiation output values. In various examples, the similarity score compares favorably to the numerical stability condition further based on the precision of the numeric datatype, a number of rows in the ordered set of input rows falling below a threshold row count (e.g. a maximum row count of 500,000 rows), and/or the magnitude being less than or equal to a threshold magnitude (e.g. a magnitude of 2).

In various examples, output of a plurality of calculations performed utilizing the numeric datatype is truncated to generate the ordered set of output values as values of a second numeric datatype having a lower precision than the numeric datatype. In various examples, the numeric datatype is an 80-bit floating point datatype, and/or the second numeric datatype is a 64-bit double datatype.

In various examples, the corresponding plurality of relational database rows correspond to time series data having temporal values indicated in at least one column. In various examples, the ordered set of input rows is generated based on ordering by the temporal values in the at least one column.

In various examples, the ordered set of output values compare favorably to a stationary data condition based on performing the integration. In various examples, the query processing system further executes at least one time series forecasting algorithm upon the ordered set of output values based on the ordered set of output values comparing favorably to the stationary data condition.

In various embodiments, any one of more of the various examples listed above are implemented in conjunction with performing some or all steps of FIG. 35H. In various embodiments, any set of the various examples listed above can implemented in tandem, for example, in conjunction with performing some or all steps of FIG. 35H, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 35H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 35H, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to: determine a query expression that indicates a request to perform integration and/or execute the query expression based on: determining an ordered set of input rows based on accessing a corresponding plurality of relational database rows in at least one relational database table; and/or generating an ordered set of output values based on performing a window function upon each row in the ordered set of input rows to return an integration output value for the each row as a function of the each row and of all prior consecutive rows in the ordered set of input rows from the each row.

FIGS. 36A-36G illustrate embodiments of database system 10 operable to perform fractional integration and/or fractional differentiation in executing corresponding fractional integration requests and/or fractional differentiation requests. Some or all features and/or functionality of the query execution and/or corresponding query expressions of FIGS. 36A-36G can be implemented via any other features and/or functionality of query executions and/or processing of corresponding query expressions described herein.

FIG. 34A illustrates an example of a database system 10 that processes query expressions 2610 that indicate a fractional differentiation request 3615 based on generating a corresponding query operator execution flow 2517 via an operator flow generator module 2514 and/or executing the corresponding query operator execution flow 2517 via a query execution module 2504. Some or all features and/or functionality of generating and/or executing query operator execution flows 2517 of FIGS. 24A-25E, and/or some or all features and/or functionality of processing and/or executing corresponding queries as discussed in conjunction with of FIGS. 24A-25E, can be utilized to implement the generation and/or execution of query operator execution flow 2517 to implement execution of queries indicating requests to perform differentiation as fractional differentiation requests 3615.

The fractional differentiation requests 3615 can be implemented as a type of differentiation request 3415 denoting a fractional, non-integer degree of differentiation be performed, where R is a fractional degree 3643 that is a non-integer greater than 0 (or optionally greater than negative 1). Fractional differentiation operators 3634 can be executed to perform an Rth order fractional differentiation process 3635 upon ordered row set 2672 to render generation of output column 2662 that denotes Rth order differentiation output values accordingly.

FIG. 36B illustrates an example of a database system 10 that processes query expressions 2610 that indicate a fractional integration request 3616 based on generating a corresponding query operator execution flow 2517 via an operator flow generator module 2514 and/or executing the corresponding query operator execution flow 2517 via a query execution module 2504. Some or all features and/or functionality of generating and/or executing query operator execution flows 2517 of FIGS. 24A-25E, and/or some or all features and/or functionality of processing and/or executing corresponding queries as discussed in conjunction with of FIGS. 24A-25E, can be utilized to implement the generation and/or execution of query operator execution flow 2517 to implement execution of queries indicating requests to perform differentiation as fractional integration requests 3616.

The fractional integration requests 3616 can be implemented as a type of integration request 3416 denoting a fractional, non-integer degree of integration be performed, where R is a fractional degree 3643 that is a non-integer less than 0 (or optionally less than negative 1). Fractional differentiation operators 3634 can be executed to perform an Rth order fractional integration process 3636 upon ordered row set 2672 to render generation of output column 2662 that denotes Rth order integration output values accordingly.

The fractional integration request 3616 can optionally be considered a type of fractional differentiation request 3615, where fractional differentiation request 3615 denote execution of any positive or negative, non-integer degree of differentiation be performed.

FIGS. 36C and 36D illustrates embodiment of a database system 10 where fractional differentiation requests 3515 and/or fractional integration requests 3516, respectively, are denoted in calls to a same differentiation function call 3420, denoting whether fractional differentiation or fractional integration be performed, respectively, based on the value R of differentiation degree argument 3443 denoting either fractional differentiation or fractional integration.

The differentiation function call 3420 of FIGS. 36C and/or 36D can optionally correspond to calls to the same differentiation function 3420 of FIG. 34B, 34I, and/or FIG. 35C (e.g. all called via a same differentiation function keyword 3421, such as "DELTA" or "DERIVATIVE" or another keyword), where configured non-integer values of R denote fractional differentiation requests 3515 and/or fractional integration requests 3516, and where integer values of R denote differentiation requests 3415 and/or integration requests 3515. For example, the differentiation function call 3420 of FIGS. 36C and/or 36D correspond to function calls to the differentiation function denoted by differentiation function definition 3450, such as the delta function or derivative function described previously.

Handling different degrees of R when executing different performances of this same function can implement different respective functionality (e.g. positive integer-order differentiation vs. positive integer-order integration vs. fractional order integration vs. fractional order differentiation). This can include executing different respective processes to perform the respective degree of differentiation/integration respectively via query operator execution flow 2520.

FIG. 36E illustrates an embodiment of a differentiation function definition 3450 having differentiation function execution instruction data 3655 that denotes different execution processes 3665 for different cases 3661. These different cases can correspond to different values of R. Some or all features and/or functionality of the case-based differentiation function execution instruction data 3655 can be utilized to implement any execution of differentiation, integration, fractional differentiation, and/or fractional differentiation described herein, for example, based on which case their respective degree falls under, and handling different cases differently. The differentiation function execution instruction data 3655 can optionally implement the delta function execution instruction data 3455 and/or the derivative function execution instruction data 3458 executed for calls to the delta or derivative functions, respectively, described herein, enabling these functions to handle both positive and negative values of R that are integer or non-integer.

Case 3661.1 can correspond to R being equal to zero, where performing execution process 3665.1 optionally includes outputting the input values.

Alternatively or in addition, case 3661.2 can correspond to R being greater than one and being a positive integer. The corresponding execution process 3665.2 can thus be implemented via any performance of differentiation described herein, for example, as discussed in conjunction with some or all of FIGS. 34A-34K, and/or, when executed, can implement execution of differentiation requests 3415.

Alternatively or in addition, case 3661.3 can correspond to R being negative 1, and case 3661.4 can correspond to R being a negative integer with magnitude greater than 1. The corresponding execution processes 3665.3 and/or 3665.4 can thus be implemented via any performance of integration described herein, for example, as discussed in conjunction with some or all of FIGS. 35A-35G, and/or, when executed, can implement execution of integration requests 3415.

Alternatively or in addition, case 3661.5 can correspond to R being a non-integer number greater than negative 1. The corresponding execution process 3665.5 can thus be implemented via any performance of fractional differentiation described herein, and/or, when executed, can implement execution of fractional differentiation requests 3615. The definition of fractional differentiation requests 3615 described herein can optionally be extended to cover negative degrees greater than −1.

Alternatively or in addition, case 3661.6 can correspond to R being a non-integer number less than negative 1. The corresponding execution process 3665.6 can thus be implemented via any performance of fractional integration described herein, and/or, when executed, can implement execution of fractional integration requests 3616.

In other embodiments, different cases are employed, for example, where some of these cases are combined and/or are further broken up into additional cases.

As discussed previously, integration can always depend on all prior points (and they all have equal weight in the case of first order integration). Higher order integration can likewise depend on all prior points, but points farther in the past can actually have larger weights. Differentiation can be different: First degree differentiation depends on only the current point and the previous point. Second degree differentiation depends on the current point and the previous 2 points, etc. Thus, differentiation is a local operation.

However, the definition of differentiation and/or integration can be extended to degrees implemented via any real number and not just integers. Differentiation, when the degree is not an integer, can depend on ALL prior data points, where older data points are weighted less than more recent data points. This means that fractional differentiation, unlike differentiation with positive integer degree, is not implemented via local operators, but instead are locally weighted. This can imply that the value at any given point contains some information about the entire prior history, which can make fractional derivatives (as they are called) attractive for model building. Furthermore, there may be series where first order differentiation is not enough to make the data stationary, but 2nd order differentiation is too much (for example y=x^1.5–the 1.5th derivative is what's needed).

Implementing any differentiation and/or integration can be based on applying a same, common expression, where the derivative for any degree can be expressed as and/or based on the following formula F: the Rth degree derivative of f(x) is Limit[Sum[(−1^j)*Binomial[R,j] *f(x−j*h), {j, 0, Infinity}]/h^R, h→0] where h is the step size (i.e. delta uses h=1, and/or where y=f(x)). For example, the Rth degree derivative of y=f(x) can be expressed as and/or can be based on the following expression:

$$\lim_{h \to 0} \frac{\sum_{j=0}^{\infty} j * \binom{R}{j} * f(x - j*h)}{h^R}$$

Thus, while different cases can be applied to execute requests for different degrees of differentiation/integration, all cases can optionally adhere to implementing this same definition, where some cases implement optimizations to reduce the processing needed based on known properties and/or simplifications of the expression F for corresponding degrees R, where some or all execution processes 3665.1-3666.6 semantically implement this same function F, optionally via different techniques and/or strategies to improve processing efficiency in different cases.

FIG. 36F illustrates an example of executing differentiation and/or integration requests in accordance with the formula F above to implement generation of output for any fractional or non-fractional, positive or negative degree. Some or all features and/or functionality of FIG. 36F can implement any embodiment of executing a differentiation request 3415, integration request 3515, fractional differentiation request 3615, fractional integration request 3617 described herein, or execution of any differentiation function call 3420 and/or integration function call 3520 described herein.

This expression actually be converted to several different closed form solutions that don't have limits in them depending on ranges of certain variables. For example, rather than applying one single closed-form solution, multiple closed-form solutions are utilized and applicable to different cases. Furthermore, applying different solutions cases to different cases can be helpful in improving processing efficiency for different cases, such as some or all of the cases of FIG. 36E.

For example, following from this expression and/or applying this expression to the discrete nature of the set of rows being processed, generating of output can be expressed as and/or based on the some or all of the following expression:

$$Rth\text{-order output } 2674.i \approx \frac{\sum_{j=0}^{i-1} j * \binom{R}{j} * y.(i - j)}{h^R}$$

For a first example of a case and corresponding solution: a reason that integer derivatives are local is that that Binomial function call (e.g. to binomial coefficient $$\binom{R}{j})$$

is always zero for large enough values or i. This case of integer derivatives (e.g. when executing differentiation with positive integer values for the degree) can be handled based on automatically determining when all subsequent summations are all zero, and stops the sum to "infinity" once this is determined to be the case (e.g. rather than summing over all prior rows, and localizing the summation instead). This first example case can optionally be implemented as execution process 3665.2 and/or can be implemented via some or all features and/or functionality discussed in conjunction with executing differentiation for positive degree R, for example, as illustrated in FIGS. 34G, 34H, and/or 34K.

Note that the implementing of generating corresponding output as a function of prior rows can include generating and applying corresponding binomial values. For example, the computation to generate output value can include applying a dot product, for example, as part of implementing expression 3662 and/or expression 3462. This dot product could optionally have hundreds of thousands of terms and/or can otherwise be essentially a dot product of a set of multiple different binomial coefficient values with the corresponding input data values, e.g.: bc1*d1+bc2*d2+bc3*d3 . . . , (with bc being some binomial coefficient value and d being some data value such as a y value).

However, in the optimization described where the summation is only applied back R rows prior to the given row as discussed previously, only R corresponding binomial coefficient values 3675 of FIG. 36F (and/or another fixed number of corresponding binomial coefficient values 3675, rather than a number of corresponding binomial coefficient values 3675 corresponding to the total number of prior rows for any given row) need be generated and/or processed, which can improve processing efficiency for handling this case. Note that running sums 3541 are optionally not implemented in this case.

As a second example of a case and corresponding solution: for derivative of degree zero, the input value is returned. This first example case can optionally be implemented as execution process 3665.1, for example, where the running sums 3541 and/or binomial coefficient values 3675 of FIG. 36G are not implemented due to this case having a simplified form that renders increased processing efficiency by alleviating the need to generate and/or process these values, where the output 2674.$i$ is simply generated by emitting y.i.

As a third example of a case and corresponding solution: For degree of −1 (i.e. a request to perform first order integration), it's just a running sum: by tracking the value emitted for the previous row, the y from the current row is added to that sum and that's my value for this row. This first example case can optionally be implemented as execution process 3665.3 and/or can be implemented via some or all features and/or functionality discussed in conjunction with executing integration for R'=1, for example, as illustrated in FIGS. 35E and/or 35F. Note that binomial coefficient values 3675 of FIG. 36G are optionally not implemented due to this case having a simplified form that renders increased processing efficiency by alleviating the need to generate and/or process these values.

With these first three example cases handled, this leaves degrees with integers <−1 and everything non-integer.

As a fourth example of a case and corresponding solution: in the cases where degree it's not an integer, but it's >−1, the weights decay to zero as rows go further back in the past. The query processing system can determine check when the weights are so small that it's not changing the result any more, and terminate early. For example, similar to the first example, rather binomial coefficient values 3675 being generated/processed for all prior rows (e.g. where a number of binomial values is equal to and/or an increasing function of the total number of prior rows for any given row), the number of necessary rather binomial coefficient values 3675 can be a fixed number, can be an increasing function of R, and/or can otherwise dictate that not all previously utilized binomial values need be applied for a given output, which can improve processing efficiency for handling this case. Note that running sums 3541 are optionally not implemented in this case. In some embodiments, applying this case include generating a dot product of a set of multiple different binomial coefficient values with the corresponding input data values in a same or similar fashion as discussed in conjunction with the first example.

In the other remaining cases, the weights get bigger further back in the past, so this solution does not apply. However, all of this linearly (albeit, sometimes with a large constant) for some or all degree <−1, for example, based on the property of derivative and delta being additive operators. In other words, DELTA[x, n]=DELTA[DELTA[x, n+1], −1] So, any degree could be represented by repeated application of −1 (linear) possibly followed by some positive fractional degree (linear). This can correspond to applying a fifth example of a case and corresponding solution.

Note that in some embodiments, negative integer degrees can be handled without utilizing binomial values, for example, as illustrated in conjunction with FIG. 35G, where this further case can thus correspond to a sixth case and corresponding solution. This sixth example case can optionally have its solution implemented as execution process 3665.4 and/or can be implemented via some or all features and/or functionality discussed in conjunction with executing integration for integer R' >1, for example, as illustrated in FIG. 35G. Note that binomial coefficient values 3675 of FIG. 36G are optionally not implemented due to this case having a simplified form that renders increased processing efficiency by alleviating the need to generate and/or process these values.

The fifth case described above can optionally correspond to only non-integer degrees less than negative one, where its solution is optionally implemented as execution process 3665.6 and/or can be implemented via some or all features and/or functionality discussed in conjunction with executing non-integer R<−1, for example, via a combination of applying running sums as illustrated in FIG. 35G with utilizing binomial coefficients as illustrated in FIGS. 36F and/or 36G.

In some embodiments, executing queries falling under this case can cause the numerically stable region to shrink (e.g. unless higher precision datatypes are utilized, which can be unfavorable as it can make processing speed inefficient. In some cases, limits on number of input rows are enforced to ensure both numerical stability and reasonable processing efficiency.

One improvement to efficiency can include caching those binomial values. When "sum to infinity" is indicated in the formula F above, this can be implemented as "sum to as many rows back as the dataset goes". Truncating the series in this fashion can render computing of the correct coefficients of integration that are applied as the output to the first R rows when performing differentiation. But this means that for the first row, Binomial[n, 0] is called; for the second row, Binomial[n, 0] and Binomial[n, 1] are called, and so on, where, for each subsequent row, all the same binomial( ) calls are repeated as the previous row (up until a point where the weights are determined to converge to zero as discussed in the fourth example case) plus one new call. So, if we haven't seen the call before, the binomial is computed and cached. Otherwise, its accessible (e.g. in an array indexed by 0, 1, 2, . . . )

FIG. 36G illustrates an embodiment where binomial values are cached in this fashion to execute differentiation or integration requests. This caching and/or accessing binomial values can implement any differentiation or integration requests described herein, or are optionally only used for some degrees R as discussed previously where special cases are employed to reduce the need for generating binomial values. For example, the cached binomial coefficient values 3675 are utilized in execution processes 3665.2, 3665.5, and/or 3665.6 only, for values of R falling under corresponding cases 3661.2, 3661.5, and/or 3661.6 only. As new binomial values are required to for new rows, they can be computed and cached for future use. Thus, any given binomial coefficient is optionally generated only once, and future use of that binomial coefficient is performed via accessing the previously computed value.

Alternatively, rather than computing new binomial coefficient values during query execution as more rows are processed, some or all binomial coefficient values are precomputed, for example, using a thread pool to parallelize all the computations, where all of these precomputed binomial coefficient values are cached prior to any input row processing (e.g. all the binomial coefficient values needed for whole query are computed, for example, in a couple seconds, stored in cache memory resources, and accessed as needed during query execution).

Generating the binomial coefficient values, for example, during query execution and/or prior to query execution, can be based on applying the Gamma function. For example, the binomial coefficient values 3675 are generated based on applying the following formula, a semantically equivalent formula, or an approximation of the following formula that applies the Gamma function (note that x and y in this case can be substituted as R and j of function F above):

$$\binom{x}{y} = \frac{\Gamma(x+1)}{\Gamma(y+1)\Gamma(x-y+1)}.$$

This relation can be utilized to handle cases where degree R is non-integer, for example, in the cases where fractional differentiation and/or integration is performed. For example, the binomial coefficient values are computed based on applying the following formula, a semantically equivalent formula, or an approximation of the following formula that applies the Gamma function (note that x and y in this case can again be substituted as R and j of function F above):

$$\binom{x}{y} = \frac{(x)_y}{y!} = \frac{x(x-1)(x-2)\ldots(x-y+1)}{y(y-1)\ldots 2\cdot 1},$$

Alternatively or in addition, cases where degree R is negative, for example, in the cases integration is performed, can also be handled, for example, based on applying the following formula, a semantically equivalent formula, or an approximation of the following formula that applies the Gamma function (note that n and k in this case can again be substituted as R and j of function F above):

$$\binom{n}{k} = \begin{cases} (-1)^k \binom{-n+k-1}{k} & \text{for } k \geq 0 \\ (-1)^{n-k} \binom{-k-1}{n-k} & \text{for } k \leq n \\ 0 & \text{otherwise} \end{cases}$$

Various strategies can be applied in computing gamma functions and/or binomial coefficient values, for example, to render numerical stability. Examples of such strategies are discussed in further detail herein in conjunction with FIGS. 37I and 37J.

FIG. 36H illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 36H. In particular, a node 37 can utilize their own query execution memory resources 3045 to execute some or all of the steps of FIG. 36H, where multiple nodes 37 implement their own query processing modules 2435 to independently execute the steps of FIG. 36H for example, to facilitate execution of a query as participants in a query execution plan 2405. Some or all of the steps of FIG. 36H can optionally be performed by any other processing module of the database system 10. Some or all of the steps of FIG. 36H can be performed to implement some or all of the functionality of the database system 10 as described in conjunction with FIGS. 36A-36F, for example, by implementing some or all of the functionality of processing and/or executing query expressions that include fractional differentiation requests via integration operators performed upon ordered sets of input rows to generate output columns that include corresponding ordered sets of output values, and/or can be performed in conjunction with other performance of differentiation/integration described in conjunction with FIGS. 34A-35G. Some or all of the steps of FIG. 36H can be performed to implement some or all of the functionality regarding execution of a query via the plurality of nodes in the query execution plan 2405 as described in conjunction with some or all of FIGS. 24A-25E. Some or all steps of FIG. 36H can be performed by database system 10 in accordance with other embodiments of the database system 10 and/or nodes 37 discussed herein. Some or all steps of FIG. 36H can be performed in conjunction with one or more steps of FIG. 34L, of FIG. 35H, and/or of any other method described herein.

Step 3682 includes receiving a query expression that indicates a request to perform a fractional order of differentiation. Step 3684 includes executing the query expression.

Performing step 3684 can include performing step 3686 and/or 3688. Step 3686 includes determining an ordered set of input rows based on accessing a corresponding plurality of relational database rows in at least one relational database table. Step 3688 includes generating an ordered set of output values in accordance with the fractional order of differentiation based on performing a window function upon each row in the ordered set of input rows to return an integration output value for the each row as a function of the each row and of all prior consecutive rows in the ordered set of input rows from the each row.

In various examples, the request to perform integration is indicated in a call to a differentiation function included in the query expression based on the call to the differentiation function having a value for a configurable degree parameter indicating a non-integer numeric value.

In various examples, the fractional order of differentiation is implemented as fractional order derivation based on the non-integer numeric value being a positive numeric value. In various examples, the fractional order of differentiation is implemented as fractional order integration based on the non-integer numeric value being a negative numeric value.

In various examples, the method further includes receiving a second query expression that includes a second call to the differentiation function having the value for the configurable degree parameter indicating a different non-integer numeric value corresponding to a different order of fractional differentiation. In various examples, the method further includes executing the second query expression based on: determining a second ordered set of input rows to the differentiation function based on accessing a second corresponding plurality of relational database rows; and/or generating a second ordered set of output values corresponding to the different order of fractional differentiation based on performing a second window function upon each row in the second ordered set of input rows to return a differentiation output value for the each row in the second ordered set of input rows as a function the each row of the second ordered set of input rows and of all prior consecutive rows in the second ordered set of input rows from the each row in the second ordered set of input rows.

In various examples, the method further includes receiving a second query expression that includes a second call to the differentiation function having the value for the configurable degree parameter indicating an integer numeric value corresponding to an integer order of differentiation. In various examples, the method further includes executing the second query expression based on: determining a second ordered set of input rows to the differentiation function based on accessing a second corresponding plurality of relational database rows; and/or generating a second ordered set of output values corresponding to the integer order of differentiation based on performing a second window function upon each row in the second ordered set of input rows to return a differentiation output value for the each row in the second ordered set of input rows as a function the each row of the second ordered set of input rows and of a set of prior consecutive rows in the second ordered set of input rows from the each row in the second ordered set of input rows.

In various examples, the second window function and the window function apply a same mathematical algorithm. In various examples, a first one of a set of cases for the mathematical algorithm is automatically selected to be applied when applying the window function based on the non-integer numeric value. In various examples, a second one of the set of cases for the mathematical algorithm applied to the mathematical algorithm when applying the window function based on the integer numeric value.

In various examples, the set of cases includes some or all of: a first case selected when the configurable degree parameter is zero; a second case selected when the configurable degree parameter is a positive integer value; a third case selected when the configurable degree parameter is negative one; a fourth case selected when the configurable degree parameter is a non-integer value greater than negative one; and/or a fifth case selected when the configurable degree parameter is a value less than negative one. In various examples, the first one of the set of cases is one of: the fourth case of the fifth case; and wherein the second one of the set of cases is one of: the first case, the second case, the third case, or the fifth case. In various examples, the fifth case has two sub-cases, where a first sub-case of the two sub-cases is selected when the configurable degree parameter is an integer value less than negative one, and where a second sub-case of the two sub-cases is selected when the configurable degree parameter is a non-integer value less than negative one.

In various examples, the first case is applied to execute the second query expression based on generating each output value of the second ordered set of output values as a corresponding input value of a corresponding input row of the second ordered set of input rows.

In various examples, the second case is applied to execute the second query expression based on generating the each output value of the second ordered set of output values by truncating a summation of the mathematical algorithm based on a plurality of values of the mathematical algorithm being zero-valued based on the configurable degree parameter being the positive integer value.

In various examples, the third case is applied to execute the second query expression based on generating the each output value of the second ordered set of output values as a sum of the corresponding input value of the corresponding input row of the second ordered set of input rows with an immediately prior output value of the second ordered set of output values.

In various examples, the fourth case is applied to execute the query expression based on generating each output value of the ordered set of output values by truncating the summation of the mathematical algorithm based on a plurality of values of the mathematical algorithm being approximately zero-valued based on the configurable degree parameter.

In various examples, the fifth case is applied to execute the query expression based on generating the each output value of the ordered set of output values by linearly applying the third case a plurality of times with the fourth case.

In various examples, generating the each output value of the ordered set of output values is based on identifying a set of required binomial coefficient values for generating the each output value and/or, for each required binomial coefficient value of the set of required binomial coefficient values: accessing the required binomial coefficient value in cache memory based on the required binomial coefficient value having been previously generated for a prior output value of the ordered set of output values; and/or computing the required binomial coefficient value and storing the required binomial coefficient value in the cache memory based on the required binomial coefficient value not having been previously generated for any prior output value of the ordered set of output values.

In various examples, executing the query expression is further based on, prior to generating any of the ordered set of output values: precomputing a plurality of required binomial coefficient values for generating the ordered set of output values; and/or storing the plurality of required binomial coefficient values in cache memory. In various examples, generating the each output value of the ordered set of output values is based on: identifying a subset of the plurality of required binomial coefficient values for generating the each output value; and/or accessing the subset of the plurality of required binomial coefficient value in the cache memory, wherein the each output value is generated as a function of the subset of the plurality of required binomial coefficient values.

In various examples, output of a plurality of calculations performed utilizing a first numeric datatype is truncated to generate the ordered set of output values as values of second numeric datatype having a lower precision than the first numeric datatype. In various examples, the first numeric datatype is an 80-bit floating point datatype, and wherein the second numeric datatype is a 64-bit double datatype.

In various examples, the corresponding plurality of relational database rows correspond to time series data having temporal values indicated in at least one column, and wherein the ordered set of input rows is generated based on ordering by the temporal values in the at least one column.

In various examples, the ordered set of output values compare favorably to a stationary data condition based on performing the fractional order of differentiation, and wherein the query processing system further executes at least one time series forecasting algorithm upon the ordered set of output values based on the ordered set of output values comparing favorably to the stationary data condition.

In various embodiments, any one of more of the various examples listed above are implemented in conjunction with performing some or all steps of FIG. 36H. In various embodiments, any set of the various examples listed above can implemented in tandem, for example, in conjunction with performing some or all steps of FIG. 36H, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 36H described above, for example, in conjunction with further implementing any one or more of the various examples described above.

In various embodiments, a database system includes at least one processor and at least one memory that stores operational instructions. In various embodiments, the operational instructions, when executed by the at least one processor, cause the database system to perform some or all steps of FIG. 36H, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to: receive a query expression that indicates a request to perform a fractional order of differentiation; and/or execute the query expression based on: determining an ordered set of input rows based on accessing a corresponding plurality of relational database rows in at least one relational database table; and/or generating an ordered set of output values in accordance with the fractional order of differentiation based on performing a window function upon each row in the ordered set of input rows to return an integration output value for the each row as a function of the each row and of all prior consecutive rows in the ordered set of input rows from the each row.

FIGS. 37A-37H illustrate example embodiments of query output data 3710 that includes output columns 2662 generated by executing query expressions 2610 that include differentiation function calls 3420 and/or integration function calls 3520. The query output data 2710 can be displayed via a display device, for example, associated with a computing device and/or user that generated and/or sent the corresponding query expression 2610. Some or all features and/or functionality of query expressions 2610 that include differentiation function calls 3420 and/or integration function calls 3520, and/or their respective processing to generate output columns 2662 of query output data 3710, can be implemented based on implemented some or all features and/or functionality discussed in conjunction with FIGS. 34A-36G.

In cases where database system 10 is implemented as a time-series database, it can be useful to have time series forecasting capabilities, which can involve implementation of differentiation and integration. These capabilities can be useful in a time-series context, and can be further useful for other types of data that doesn't correspond to time series data.

This functionality can be implemented via enabling function calls in query expressions that are implemented as and/or similar to "derivative(y)", for example, as discussed previously, to implement the derivative of y with respect to x, and computes the discrete derivative (because rows of data stored in database system 10 are essentially samples vs. true continuous data. The discrete derivative can be exact in its own way, but it can also be thought of as an approximation for the continuous derivative, for the case where data points (e.g. input rows) are considered samples of a larger population.

It can be a common case where the x value is implicit (e.g. it's just the series 1, 2, 3 . . . ). In these cases, the x values themselves are not necessarily important, and it's the successive differences (e.g. discrete difference) that is important. Handling the discrete differences without depending on step sizes/actual x values can be implemented via enabling function calls in query expressions that are implemented as and/or similar to "delta(y) over(order by t)". Note that there is still the requirement of specifying what to order by (i.e. column t), but in this case it don't matter what those values oft are, and/or it doesn't matter what the step size is, where the step size is automatically treated as though. It's 1.

These can be implemented as backwards differences. For example, the delta function implements and/or is based on: y_current_row−y_previous_row. Alternatively or in addition, the derivative function (e.g. the discrete derivative or the difference quotient) implements (y_current_row−y_previous_row)/(x_current_row−x_previous_row).

Furthermore, the delta and derivative functions can be implemented as window functions (e.g. as indicated by the "over(order by x)" portions of the respective expressions). As discussed previously window functions depends on previous or subsequent rows unlike scalar functions, which only depends on values for columns in the current row. The utilization of a window function to implement the derivative is thus useful, as one or more prior rows are utilized in determining the derivative value of a given row. As both the delta and derivative functions depend on both the current row and at least one previous row, they are thus both window functions.

FIG. 37A presents a first example where a delta function is called in query expression 2610. In this example, the input can correspond to (x, y) pairs from the expression y=2x+1. Note that in this example, the delta function is called, but step size is already 1, so the same would be generated either way with derivative or delta for this input data.

Note that the first row has a different value due to no prior rows being available to render generation of output "normally". This value can be generated based on satisfying the fundamental theorem of calculus as discussed previously.

FIGS. 37B and 37C presents examples where a delta function and derivative function, respectively, are called in query expression 2610. In these examples, the input can again correspond to (x, y) pairs from the expression y=2x+1, but the step size is now 0.5 rather than 1. Note that in the example of FIG. 37B where the delta function is called, the output changes from FIG. 37A due to the change in step size. However, the change in step size is considered in applying the derivative function called in FIG. 37C, rendering the same output of FIG. 37A.

Notice that the value for the first row was different in all 3 of these example queries of FIGS. 37A-37C. Given that the value for the first row depends on itself and the previous row (which doesn't exist), the first row could optionally be NULL. However, this is not the case, for example, due to properties of integration. The fundamental theorem of calculus dictates that differentiation and integration undo each other. Suppose delta and derivative functions are implemented to take a second argument, called degree, which defaults to 1. The normal delta and derivative are first-order or first degree. It can make sense that first order integration would be a denoted by a value of −1.

FIG. 37D illustrates an example where a delta function is called with a degree argument of −1, which renders the sum of the y values from all the previous rows up to and including the current row, for example, in accordance with computing a discrete antiderivatives or Riemann sums where the step size is treated as one. If step size is not zero, it can change the output if altered (essentially scales the area under the curve).

FIG. 37E illustrates an example where a derivative function is called with a degree argument of −1, which renders the sum of the y values multiplied by the x values from all the previous rows up to and including the current row, for example, in accordance with computing a discrete antiderivatives or Riemann sums where the x values are applied to render step size that is not necessarily one.

Note that when integration is performed mathematically, the constant of integration (e.g. the starting point for the sum) can be required to be specified. The constant of integration value can be utilized to generate all values, for example, based on being automatically determined based on the step size or other attributes of the input data set, or based on being denoted in the function call and/or being set to a predetermined default value. Note that when repeated integration is performed, multiple constants of integration may be needed and/or inherently utilized. The value for the first row in the derivate/delta examples above can correspond to the correct value such that integration and differentiation correctly undo each other.

FIG. 37F illustrates such an example of integration and differentiation correctly undo each other. In particular, the query expression 2610 includes a function call to a derivative function with the default degree of 1 being denoted by not specifying the degree argument. The differentiation variable argument is specified via another, nested function call to the derivative function, this time with a degree of −1 being denoted. Thus, integration of they column of the given input data is first performed with respect to column x to generate an intermediate set of output values, where differentiation of this intermediate set of output values is performed with respect to x to arrive back at the original y column for the set of input rows as outputted column d. As illustrated, the outputted column d matches the original column y as expected, for example, based on appropriately determining the output for the first row when applying the derivative to satisfy the fundamental theorem of calculus as discussed previously herein.

FIG. 37G illustrates an example where a derivative function is called with a degree argument of 2, which renders second order differentiation. Note that in this case, the first 2 terms seem to have unexpected values. This can be because there are 2 constants of integration, and these are the 2 needed values such that integration and differentiation will correctly undo each other.

FIG. 37H illustrates an example where a derivative function is called with a degree argument of −2 upon the output of a functional call to the derivative function with a degree argument of 2. Thus, similar to the example of FIG. 37F, second order differentiation is "undone" by second order integration. In this example, there is rounding error in the output. In some embodiments, some or all of the backend math can be performed done with 80-bit floating point instead of 64-bit to aid in minimizing this error.

Note that while the input data in the examples of FIGS. 37A-37H correspond to auto-generated values as points on a corresponding mathematical function for sake of providing illustrative examples, the delta and/or derivative function can be applied to perform corresponding differentiation and/or integration upon real-world values (e.g. measurements or other data captured over time as time-series data, and/or any other data that is collected and ultimately stored in database system 10, where the use of these functions enables analysis of this data, for example, to ultimately make the data stable and/or to implement forecasting such as extrapolation, to run machine learning functionality to generate machine learning models upon the data, and/or otherwise facilitate analysis of the real-world data.

FIG. 37I present an embodiment of a database system 10 that executes query expressions to implement differentiation and/or integration based on applying one or more numerical stability strategies 3766. Some or all features and/or functionality of the embodiments of executing query expressions by applying numerical stability strategies 3766 of FIG. 37I can implement the execution of queries that include differentiation and/or integration requests of fractional or non-fractional degree, such as the execution of query requests 2610 of FIG. 34A, of FIG. 35A, of FIG. 36A, of FIG. 36B, and/or any other query requests 2610 described herein.

Some or all calculations required to perform various types of differentiation and/or integration described herein can be complicated and involve approximations (e.g. of the gamma function), and when it involves ALL prior points (especially in the integration case where the weights don't trend towards zero), this can render summing of a lot of approximations and can create challenges with handling floating point error.

For example, when not handled by employing various strategies to minimize error, the calculations required to perform differentiation and/or integration can be numerically unstable and/or can otherwise introduce error due to accumulation of error over many points where error occurs and/or due to the massive number of calculations involved (e.g. essentially $n*(n+1)/2$ multiplications and addition, and n binomial coefficient calculations, where n is the number of input rows. At 1 million rows, this can induce over 1 trillion basic floating point operations, before any binomial coefficient computations discussed herein are introduced).

Various numerical stability strategies 3766 can be employed by the database system 10 to help in and/or guarantee meeting of a numerical stability condition 3750. Meeting of the numerical stability condition 3750 can be desired in executing differentiation and/or integration, and/or can be optionally required and/or aimed for when implementing differentiation and/or integration correctly. The numerical stability condition 3750, and/or corresponding "numerical stability" can be defined as, when integration is performed upon data followed by differentiation (or vice versa), the output is reasonably close to our original results (e.g. error is within a threshold similarity score and/or is less than a threshold total and/or average error). The measurement of error can be implemented as absolute error or relative error. In some embodiments, the threshold error is 0.05, where all errors and/or average error is required to be less than 0.05 to meet the numerical stability condition. In some cases, minimization of errors by employing one or more of the strategies discussed herein renders errors being less than 0.05, for example, where error is substantially less than 0.05 in some or all cases.

In some embodiments, the database system 10 can be guaranteed to achieve numerical stability for all integration and/or differentiation requests, and/or for integration and/or differentiation within a given degree range (e.g. the degree range [−2, 2] when applies to time series sets of within a threshold number of rows, such as 500,000 rows or less). In some embodiments, the database system 10 can be guaranteed to achieve numerical stability beyond this degree range and/or for some or all possible integer and/or non-integer degrees, for example, based on employing one or more of the various strategies to minimize error discussed herein. The numerical stability can be impacted by the degree of differentiation/integration, the precision of variables utilized to perform computations, the number of rows being processed, and/or other factors.

The database system 10 can achieve numerical stability based on employing one or more corresponding strategies, such as one or more strategies 3766 to reduce error and/or to otherwise improve numerical stability.

FIG. 37J illustrates an embodiment of function library 3030 that includes a differentiation function definition 3450 with differentiation function execution instruction data that denotes that or more execution processes 3665 be implemented based on execution of one or more numerical stability strategies 3766. The execution processes 3665 can include a single execution process or multiple execution processes 3665 corresponding to different cases (e.g. different degrees R) as discussed in conjunction with FIG. 36E. Some or all different execution processes 3665 can be employed via some or all of the same or different numerical stability strategies 3766, for example, as applicable in the corresponding type of execution for the corresponding case.

The one or more numerical stability strategies 3766 of FIGS. 37I and/or 37J implemented to reduce error and/or achieve numerical stability can include any strategy discussed previously with regards to executing differentiation and/or integration requests for reducing error and/or achieving numerical stability.

The one or more numerical stability strategies 3766 of FIGS. 37I and/or 37J implemented to reduce error and/or achieve numerical stability can include applying a higher precision datatype for internal calculations, and truncating this datatype to a lower precision datatype when ultimately outputting a result. For example, to improve numerical stability, 80-bit floating point can be utilized for all internal calculations, where the values are only truncated back to a normal double (64 bit) at the end (e.g. when values are outputted as output values 2674).

The one or more numerical stability strategies 3766 of FIGS. 37I and/or 37J implemented to reduce error and/or achieve numerical stability can alternatively or additionally include enforcing thresholds upon input row count (e.g. input row set must be less than half a million rows or less than a million rows, or less than another threshold).

The one or more numerical stability strategies 3766 of FIGS. 37I and/or 37J implemented to reduce error and/or achieve numerical stability can alternatively or additionally include enforcing thresholds upon degree (e.g. based on bounding the degree from an upper or lower bound, enforcing a limit on decimal precision that can be applied for fractional degrees, etc.).

Note that while numerical stability is desirable, in some embodiments, accuracy tradeoff can be desired to increase processing efficiency, for example, where numerical stability condition is tuned based on increasing processing efficiency automatically and/or in response to user input.

Note that in some embodiments, the performance of integration/differentiation often applied to a single item (e.g. trying to forecast the change for a single stock over the next day, where corresponding differentiation and/or integration is optionally separately to each item, and/or many "items" can be processed in parallel via window partitioning. In some cases, the time windows of rows required to process a given item are small enough such that the number of rows to be processed for a single item is less than the threshold number of rows (e.g. the time window corresponds to a sample every second for the last 5 days is only 432k rows).

The one or more numerical stability strategies 3766 of FIGS. 37I and/or 37J implemented to reduce error and/or achieve numerical stability can alternatively or additionally include the utilizing of Kahan summation and/or the maintaining of a small vector (e.g. of less than 10 values) to reflect the unevaluated sum for a given running summation as discussed previously. For example, the inputs can be doubles, for example, based on being a highest precision native data type that the database supports in some embodiments. Thus, all of this can be considered nothing but summations of doubles. In some cases, every time two doubles are summed and the result gets converted to the nearest double, error is introduced. In some embodiments, a strategy that implements and/or is based on Kahan summation can be utilized to reduce such error.

In some embodiments, such a strategy can be implemented such that little or no error is introduced in the summation of doubles based on maintaining a vector of doubles (or optionally long doubles), such that the actual answer is the sum of those doubles, where the doubles are maintained as an unevaluated sum. Rather than storing all doubles to be summed in a vector as an unevaluated sum, the strategy can include maintaining the smallest possible array to improve memory usage and/or future processing requirements, while ensuring the error is minimized and/or eliminated by holding an exact, unevaluated result. In some cases, this strategy can further extend the strategy of employing Kahan summation.

This strategy can optionally be implemented by performing some or all functionality and/or corresponding logic outlined by the example code below:

```
template <class T>
inline void add(T x, std::vector<T>& partials)
{
    size_t i = 0;
    for (T y : partials)
    {
        if (abs(x) < abs(y)) {
            std::swap(x, y);
        }
        T hi = x + y;
        T lo = y - (hi - x);
        if (lo != 0)
        {
            partials[i]} = lo;
            ++i;
        }
        x = hi;
    }
    size_t size = partials.size( );
    for (size_t j = 0; j < size - i; ++j)
    {
        partials.pop_back( );
    }
    partials.emplace_back(x);
}
```

This function can add a new floating point value, x, to a vector that contains an unevaluated sum (e.g. "partials"). the vector size can be maintained based on keeping i elements and then adding a new one and thus popping pop size ( )−i elements. The result can reflect an exact result with no rounding error. The size of the vector can vary based on the data, but optionally grows to be no larger than 10 elements in some or all cases. Such a vector can be maintained alternatively to a single value for some or all of the R different running sums 3541 (or for the single running sum 3541 in the case of $1^{st}$ order integration).

While the unevaluated sum reflects the correct value, eventually the elements themselves need to be summed these things together so a single double that can be the result of the function gets passed back to the rest of the database runtime. Alternatively, in some embodiments, the database runtime can be implemented via an unevaluated vector of values data type in a similar fashion. This can still render having one rounding error at the very end to the nearest double (and/or having n−1 rounding errors at the very end where n is the number of elements in the final vector), but this can be an improvement over not implementing the vector and/or can render error that meets the numerically stable condition.

In some embodiments, integration can be performed in accordance with multivariable calculus, where one or more additional columns of rows 2530.$i$ are processed, for example, where values of three or more columns are utilized. Output integration values of the output column can correspond to multiple integration values, such as double integrals, triple integrals, or other integration over multiple variables.

The one or more numerical stability strategies 3766 of FIGS. 37I and/or 37J implemented to reduce error and/or achieve numerical stability can alternatively or additionally include reducing errors when applying dot products, such as the dot products applied to binomial coefficients and corresponding values as discussed previously (e.g. computing bc1*d1+bc2*d2+bc3*d3 . . . , with bc being some binomial coefficient value and d being some data value such as a y value), for example, in cases where running sums are not applied (e.g. some or all orders of differentiation >−1).

Achieving numerical stability for the summation portion can be based on applying the Kahan summation and/or the maintaining of a small vector as discussed previously. However, the multiplication and computation of these binomial coefficient values can introduce error. For example, just like how adding 2 floating point numbers can result in some error, similar error can be induced when applying multiplication. However, similar to handling errors accrued via summation via a vector, a strategy can be employed to render exact multiplication via a vector. In this case, a vector of size 2 can be implemented. The exact value of x*y can be the unevaluated sum of these 2 terms, for example, based on implementing Dekker multiplication:

double term1=$x*y$ double term2=std::*fma*(*x,y*,−1*term1);

The first term term1 can correspond to the double generated via performing the multiplication, and/or the second term can correspond to the error then.

This is where FMA (fused multiply/add) can be implemented. FMA can be defined as multiplying the first 2 arguments and adding the third, but only rounding to the nearest double at the very end instead of after the multiplication and again after the addition. This can render returning of exactly, or close to, the error term most or all of the time. In some embodiments, the FMA function calls can be implemented via a two-product algorithm to further improve processing efficiency and/or numeric stability.

An exponent underflow or overflow problem that can occur, which could induce further problems in error, (e.g. exponent overflow more so than exponent underflow). In some cases, the cases of exponent underflow or overflow do not occur in most executions of query requests 2610.

In some embodiments, all the multiplications can be performed as discussed above (e.g. via Dekker multiplication, where each one returns 2 doubles back. Some of all of the strategies applied to handling summation can then be applied, which can mean calling a corresponding functionality (e.g. an add( ) function implementing the maintaining of a vector storing the exact unevaluated sum as discussed herein) 2n times instead of n times because it needs both values from the result of each multiplication. This renders the ability to both multiply and add and only have vector-.size( )−1 roundoff errors at the end.

The one or more numerical stability strategies 3766 of FIGS. 37I and/or 37J implemented to reduce error and/or achieve numerical stability can alternatively or additionally include reducing errors when performing binomial coefficient value calculations to generate some or all binomial coefficient values 3675. In some cases, when unhandled via a numerical stability strategy 3766, the error induced from the binomial coefficient calculations is large and can render numerical instability.

The binomial coefficient function (i.e. n choose k) can be performed to generate binomial coefficient values (e.g. by performing R choose j for given values of R and j). The corresponding function definition optionally only works properly with positive integers. Real numbers (and/or complex numbers) can be handled as discussed previously, for example, in terms of the gamma function. Three gamma function calls can be applied to determine the value of the binomial coefficient function.

The actual choice of which three gamma functions are needed can depend on the inputs to the binomial function, for example, to avoid the singularities in the gamma function that happen at negative integers. However, the gamma function can result in very large values for reasonable inputs, for example, that are too large to represent as a double. For example, consider the following output of Γ(1000000)

$$\Gamma(1000000) == 8.2639316883312400623766461031726662911353479789638730451\ldots \times$$

$$10^{5565702} = 10^{10^{6.745520021101539}}$$

To handle inputs with 1 million rows, this calculation is performed as just one portion of computing the full output (e.g. for the final row i). In some embodiments, rather than applying the gamma function, the binomial coefficient values can be computed using the lgamma function instead, which can compute the natural logarithm of the absolute value of the gamma function of arg, for example, via implementing the corresponding c++ lgamma function or otherwise implementing an expression rendering semantic equivalence and/or approximate equivalence.

When using gamma to generate binomial coefficients, gamma outputs are multiplied and divided together to compute the corresponding binomial coefficient value. Thus, in some embodiments, taking the log of that manes instead just adding and subtracting them. As the log has to be done on a positive number, it takes the absolute value first. Three lgamma values can be computed and then summed (multiplying by −1 first if needed so that the add is a subtract). Applying e to the power of that value to the power of that value can be computed to undo the log (e.g. via the c++ exp function). The sign the actual result can be determined, where the output of the prior expression is multiplied by −1 if the output is currently of the wrong sign.

One problem posed by this implementation is that every binomial coefficient calculation now involves 3 lgamma calls, 2 additions, and an exponent call (e.g. the c++ exp or other implementation of ^(input)). There can be numerous error in these function calls. For example, complex functions like exp and lgamma are not guaranteed to be correct to the closest double: the only functions that have this guarantee are optionally only addition, subtraction, multiplication, division, and square root, where the more complicated functions don't have this guarantee in standard implementations (e.g. in their function implementation in c++ or another existing language utilized to implement computations and/or function definitions for some or all functionality described herein). In some of these implementations, output is typically 3 or 4 values away from the correct value in terms of the next closest numbers that can be represented by the floating point type.

Numerical stability can be improved by reducing error in generating binomial coefficients based first upon implementing the summation capabilities discussed previously already discussed to minimize the error for the 2 additions. Further strategies can be necessary to improve the accuracy on the lgamma and exp calls as required to render numeric stability.

In some embodiments, the worst case scenario for the number of different binomial coefficient values needed for the whole query is the same as the number of input rows, and these calculations can be cached as discussed previously so that they only need be computed once (e.g. binomial coefficient values are ultimately required for all values of i from i–M, and many of these values are utilized many times based on accessing them in cache after they are precomputed once). Because these values can be precomputed (e.g. optionally before the processing of each input row begins as discussed previously via parallel threads, since all binomial coefficient value input is known from the value of M, i.e. the number of input rows, in some cases, processing speed/efficiency for computing these individual values is not too important, and can be outweighed by the importance of meeting the numerical stability condition.

In some embodiments, the one or more numerical stability strategies 3766 implemented to reduce error and/or achieve numerical stability when computing binomial coefficient values can include utilizing a quad-precision floating point type for all lgamma and exp calculations. This can be a reason for implementing the add( ) function as being is templated on T, so it works with doubles, long doubles, and quads. However quad precision can be very slow, for example, as its not supported by the hardware, and is just software emulation. Thus, quad floating point is not ideal to be utilized for all the sums and products discussed previously because it is too slow to render query executions in reasonable amount of time.

However, a similar strategy can be employed: instead of having the binomial coefficient function return a single double, It can return a vector of doubles. While a quad floating point number optionally cannot be converted to a vector of doubles with no error, the error can be greatly minimized in such conversion to a vector of doubles rather than a single double value.

In some embodiments, a quad precision floating point number has 113 bits of precision, where a double has 53 bits of precision. Thus, it can take 3 doubles, in the worst case, to represent an unevaluated sum that is as close to the original quad-precision value as possible. In some embodiments, long doubles are utilized to improve efficiency: these vectors were typically size 3, it can triple the work required to do over the case where it was a single value and if these vectors were size 2, the work would only be doubled. The long double type has 64 bits of precision and has a larger exponent range than double, which can render keeping the vectors to size 2, where the unevaluated sum is more.

The algorithm for splitting the quad-float (128-bit number) into 2 long double (80-bit) numbers can be implemented via some or all functionality of the code and/or corresponding logic of the example implementation shown below (note that the precision and total bit size are optionally not the same):

```
inline std::vector<long double> split(const float 128& x)
{
    std::vector<long double> retval;
    retval.reserve(2);
    long double d1 = static_cast<long double>(x);
    retval.emplace_back(d1);
    auto x1 = static_cast<boost::multiprecision::float128>(d1);
    auto x2 = x - x1;
    long double d2 = static_cast<long double>(x2);
    if (d2 != 0)
    {
        retval.emplace_back(d2);
    }
    else
    {
        return retval;
    }
    return retval;
}
```

In some embodiments, these same steps can be performed over and over if input and output types are such that the vectors could be larger than size 2, and can optionally be written as a loop, or can be implemented via continual casting the last emitted value back to the higher precision data type and subtracting it off the current error.

With this binomial coefficient function that returns a vector of values rendering substantially less error, the corresponding output can be one of the terms that feeds into the multiplication. Rather than having x*y 2, the x is itself already 2 terms. In some embodiments, the first term is taken out of the binomial coefficient, the Dekker multiplication is performed, and then the 2 terms that result from that are added into the sum, and then this process is repeated with the next term in the binomial coefficient result (note that m_vals [lastIndex−i] is just the "data" value here). Some or all of this functionality can be implemented via some or all functionality of the code and/or corresponding logic of the example implementation shown below:

```
        std::vector<long double> b = getBinomial(i);
        for (long double d : b)
        {
          long double newTerm = d * m_vals[lastIndex - i];
          add(newTerm * sign, m_partials);
            add(sign * std::fma(d, m_vals[lastIndex - i],
            -1.0 * newTerm), m_partials);
        }
```

Applying some or all of these strategies, some or all of the resulting algorithm for handling binomial coefficient values when evaluating a corresponding expression to generate output for a given row can be implemented via some or all functionality of the code and/or corresponding logic of the example implementation shown below:

```
    long double sign = 1.0;
    for (size_t i = 0; i <= limit; ++i)
    {
      std::vector<long double> b = getBinomial(i);
      for (long double d : b)
      {
        long double newTerm = d * m_vals[lastIndex - i];
        add(newTerm * sign, m_partials);
          add(sign * std::fma(d, m_vals[lastIndex - i],
          -1.0 * newTerm), m_partials);
      }
      sign *= -1.0;
    }
    {
    double tempd = static_cast<double>(getSum(m_partials));
```

In some embodiments, all of the input data so far, as it comes in a row at a time, is in m_vals, and limit has computed how many binomial coefficient terms are not zero (e.g. how far back in history it is necessary to go before convergence to zero). For a fractional delta, it's going to be the same as the number of values in m_vals. The final step is the getSum( ) call which can evaluate the unevaluated sum and casts it to a double so it can be output.

Such implementation can increase the range of numerically stable differentiation and/or degrees from [−2, 2] to [−3, 3] for the same 500k row input, and can render low error meeting the numeric stability condition. The later rows have larger errors, as they have more terms involved in computing them. For example, the last row when first doing a 2.9 degree differentiation followed by a 2.9 degree integration over the function sin(c1/360.0)+(rand( )*0.1−0.05) fed with the integers from 1 to 500k can have a computed value of 0.33010271828777576, where the correct result is 0.33017232672653746.

Notice that this could be even more accurate still if conversion back to a double after differentiation, and then again after integration, was not performed. However, in embodiments where the native floating point types for the database engine are limited to float and double, this conversion can be necessary and/or ideal, despite the decrease in accuracy.

In some embodiments, some or all of this functionality is implemented via implementing a new database type that is a vector of an unevaluated sum, where the result is not evaluated until the result is sent to the user, or optionally afterwards. This can further improve accuracy.

In some embodiments, the implementation of the loop in the example implementation above renders slower results than if this loop were broken into pieces processed in parallel via a thread pool. Each piece can be returned with a vector of long doubles as a result, where add( ) (e.g. implementing the maintaining of the vector with values of the unevaluated sum) is called over all of the elements of all the results. This can substantially improve processing efficiency (e.g. rendering performance 40-50× faster, which render favorably efficient runtime efficiency of corresponding query executions. For example, a 2.9 degree derivative over 500k rows is computed in less than or equal to one hour.

Implementing some or all of this functionality can render that the degree range [−3, 3] can be numerically stable up to 1 million rows. However, as the algorithm efficiency is optionally quadratic, the same derivative over 1M rows can optionally take about 4 times as long.

In some embodiments, because there are no binomial coefficient calls when doing integer degree integration and fewer binomial coefficient calls when doing integer degree differentiation, this algorithm can be stable (and fast) on larger input sets of rows. For example, it can be numerically stable as defined previously up to about 5M rows over {−3, −2, −1, 1, 2, 3}.

In some embodiments, when implementing the derivative function, generating the output includes dividing by step size to some power at the end. The one or more numerical stability strategies 3766 of FIGS. 37I and/or 37J implemented to reduce error and/or achieve numerical stability can alternatively or additionally include performing an exact division algorithm to handle derivative (e.g. vs. computing delta). This can include computing the power (pow( )) at a higher accuracy and/or return a corresponding vector. This power can optionally be precomputed once since it's the same for every row, and the value can be cached and applied to some or all rows. In some embodiments, the sign of the power can be flipped to render a multiplication instead of a division, where the multiplication implementation implementing Dekker multiplication described previously is optionally implemented.

In some embodiments, quad precision is implemented, where the power and is computed and is then down-split into 2 long doubles. In some embodiments, this result is then multiplied by the result of a dot-product (for example, this is a multiplication vs. a divide based on negating the exponent on the pow( ) call). This can be optionally performed before this is evaluating the sum: Dekker multiplication is performed for each pair of values, for example, because both sides that we are multiplying are vectors, and then all of this is summed up into a zero initialized sum, and then the sum is evaluated from the values of a corresponding vector at the end.

Some or all of this functionality can be implemented via some or all functionality of the code and/or corresponding logic of the example implementation shown below:

```
    std::vector<long double> tempPartials;
    for (long double d1 : m_h)
    {
      for (long double d2 : m_partials)
      {
        long double new Term = d1 * d2;
        std::array<long double, 2> a = split(d1);
        std::array<long double, 2> b = split(d2);
        long double err1 = new Term - (a [0] * b[0]);
        long double err2 = err1 - (a[1] * b[0]);
        long double err3 = err2 - (a[0] * b[1]);
        long double newTerm2 = a[1] * b [1] - err3;
        add(newTerm, tempPartials);
        add(new Term2, tempPartials);
      }
    }
    double tempd = static_cast<double>(getSum (tempPartials)),
```

In various embodiments, any of the functionality of executing compute window functions, recursive functions, TVF functions, differentiation functions, integration functions, extrapolation functions, resampling functions, and/or time series forecasting functions, for example, applied to stationary datasets and/or applied to output generated via performance of differentiation functions and/or integration functions, can be implemented via non-relational functionality, machine learning functionality, linear algebra functionality, and/or via any features and/or functionality of the set of non-relational operators 2524-1-2524-Y, and/or other non-relational functionality, disclosed by: U.S. Utility application Ser. No. 16/838,459, entitled "IMPLEMENTING LINEAR ALGEBRA FUNCTIONS VIA DECENTRALIZED EXECUTION OF QUERY OPERATOR FLOWS", filed Apr. 2, 2020, which is hereby incorporated herein by reference in its entirety and made part of the present U.S. Utility patent application for all purposes; and/or U.S. Utility application Ser. No. 18/328,238, entitled "DISPERSING ROWS ACROSS A PLURALITY OF PARALLELIZED PROCESSES IN PERFORMING A NONLINEAR OPTIMIZATION PROCESS", filed Jun. 2, 2023, which is hereby incorporated herein by reference in its entirety and made part of the present U.S. Utility patent application for all purposes.

FIG. 38A illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 38A. In particular, a node 37 can utilize their own query execution memory resources 3045 to execute some or all of the steps of FIG. 38A, where multiple nodes 37 implement their own query processing modules 2435 to independently execute the steps of FIG. 38A for example, to facilitate execution of a query as participants in a query execution plan 2405. Some or all of the steps of FIG. 38A can optionally be performed by any other processing module of the database system 10. Some or all of the steps of FIG. 38A can be performed to implement some or all of the functionality of the database system 10 as described in conjunction with FIGS. 36A-36F, for example, by implementing some or all of the functionality of generating, storing, and/or accessing precomputed binomial coefficient values in conjunction with executing a query, and/or can be performed in conjunction with other performance of differentiation/integration described in conjunction with FIGS. 34A-37J. Some or all of the steps of FIG. 38A can be performed to implement some or all of the functionality regarding execution of a query via the plurality of nodes in the query execution plan 2405 as described in conjunction with some or all of FIGS. 24A-25E. Some or all steps of FIG. 38A can be performed by database system 10 in accordance with other embodiments of the database system 10 and/or nodes 37 discussed herein. Some or all steps of FIG. 38A can be performed in conjunction with one or more steps of FIG. 34L, of FIG. 35H, FIG. 36H, and/or of any other method described herein.

Step 3802 includes determining a query for execution against at least one relational database table. Step 3804 includes executing the query.

Performing step 3804 can include performing some or all of steps 3806, 3808, 3810, and/or 3812. Step 3806 includes identifying a plurality of required binomial coefficient values required for generating a set of output values for the query. Step 3808 includes precomputing the plurality of required binomial coefficient values. Step 3810 includes storing the plurality of required binomial coefficient values in cache memory resources. Step 3812 includes generating the set of output values.

Performing step 3812 can include generating each output value of the set of output values based on performing step 3814 and/or 3816. Step 3814 includes, for each output value the set of output values, identifying a subset of the plurality of required binomial coefficient values for generating the each output value. Step 3816 includes, for the each output value of the set of output values, accessing the subset of the plurality of required binomial coefficient value in the cache memory. In various examples, the each output value is generated as a function of the subset of the plurality of required binomial coefficient values.

In various examples, generating a first one of the set of output values is based on accessing a first proper subset of the plurality of required binomial coefficient values in the cache memory. In various examples, generating a second one of the set of output values is based on accessing a second proper subset of the plurality of required binomial coefficient values in the cache memory. In various examples, the first proper subset and the second proper subset have a non-null intersection that includes at least one of the plurality of required binomial coefficient values.

In various examples, the at least one of the plurality of required binomial coefficient values is computed exactly once for the query based on precomputing the plurality of required binomial coefficient values.

In various examples, executing the query is based on: determining an ordered set of input rows based on accessing a corresponding plurality of relational database rows in the at least one relational database table; and/or generating the set of output values as an ordered set of output values based on performing a window function upon each row in the ordered set of input rows to return an output value for the each row as a function of the each row and further as a function of at least one binomial coefficient value of the plurality of required binomial coefficient values. In various examples, the output value for the each row is generated based on accessing the least one binomial coefficient value in the cache memory resources.

In various examples, the output value for the each row is generated further as a function of all prior consecutive rows in the ordered set of input rows from the each row.

In various examples, the method further includes determining a query expression for execution indicating performance of a fractional degree of differentiation. In various examples, the query is indicated by the query expression. In various examples, the plurality of required binomial coefficient values are identified based on a fractional value of the fractional degree of differentiation.

In various examples, request to perform the fractional order of differentiation is indicated in a call to a differentiation function included in the query expression based on the call to the differentiation function having a configured non-integer numeric value as a configurable degree parameter indicating the fractional order of differentiation.

In various examples, the fractional order of differentiation is implemented as fractional order derivation based on the non-integer numeric value being a positive numeric value. In various examples, the fractional order of differentiation is implemented as fractional order integration based on the non-integer numeric value being a negative numeric value.

In various examples, the method further includes receiving a second query expression that includes a second call to the differentiation function having a second fractional value for the configurable degree parameter indicating a different non-integer numeric value corresponding to a different order of fractional differentiation. In various examples, the second query expression is executed based on identifying a second plurality of required binomial coefficient values required for generating a second set of output values. In various examples, the second plurality of required binomial coefficient values are different from the plurality of required binomial coefficient values based on the second fractional value being different from the fractional value. In various examples, the second query expression is executed further based on precomputing the plurality of required binomial coefficient values; storing the second plurality of required binomial coefficient values in the cache memory resources; and/or generating a second set of output values based on accessing binomial coefficient values of the second plurality of required binomial coefficient values in the cache memory resources.

In various examples, the least one relational database table includes a corresponding plurality of relational database rows corresponding to time series data having temporal values indicated in at least one column. In various examples, the set of output values is generated as an ordered set of output values based processing an ordered set of input values generated based on ordering by the temporal values in the at least one column.

In various examples, the ordered set of output values meet a stationary data condition based on performing a fractional order of differentiation. In various examples, the query processing system further executes at least one time series forecasting algorithm upon the ordered set of output values based on the ordered set of output values meeting the stationary data condition.

In various examples, the method further includes removing the plurality of required binomial coefficient values from the cache memory resources based on completing execution of the query.

In various examples, execution of the query is completed at a first time. In various examples, the plurality of required binomial coefficient values are removed from the cache memory resources at a second time after the first time. In various examples, during a temporal period between the first time and the second time, the method further comprises: determining a second query for execution and/or executing the second query. In various examples, executing the second query is based on identifying a second plurality of required binomial coefficient values required for generating a second set of output values for the second query. In various examples, the second plurality of required binomial coefficient values has a non-null set intersection with the plurality of required binomial coefficient values. In various examples, executing the second query is further based on: precomputing an additional set of binomial coefficient values set corresponding to only ones of the second plurality of required binomial coefficient values not included in the plurality of required binomial coefficient values; storing the additional set of binomial coefficient values in the cache memory resources; and/or generating the second set of output values. In various examples, generating each output value of the second set of output values is based on: identifying a second subset of the second plurality of required binomial coefficient values for generating the each output value; and/or accessing the second subset of the second plurality of required binomial coefficient value in the cache memory resources. In various examples, the each output value is generated as a function of the subset of the plurality of required binomial coefficient values. In various examples, at least one output value of the second set of output values is generated based on accessing at least one binomial coefficient value precomputed for the query based on being included in the non-null set intersection with the plurality of required binomial coefficient values (e.g. based on the plurality of required binomial coefficient values not yet being removed from the cache memory resources).

In various embodiments, any one of more of the various examples listed above are implemented in conjunction with performing some or all steps of FIG. 38A. In various embodiments, any set of the various examples listed above can implemented in tandem, for example, in conjunction with performing some or all steps of FIG. 38A, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 38A described above, for example, in conjunction with further implementing any one or more of the various examples described above.

In various embodiments, a database system (e.g. a corresponding query processing system of a database system) includes at least one processor and at least one memory that stores operational instructions. In various embodiments, the operational instructions, when executed by the at least one processor, cause the database system to perform some or all steps of FIG. 38A, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to: determine a query for execution against at least one relational database table and/or execute the query based on: identifying a plurality of required binomial coefficient values required for generating a set of output values for the query; precomputing the plurality of required binomial coefficient values; storing the plurality of required binomial coefficient values in cache memory resources; and/or generating the set of output values. In various examples, generating each output value of the set of output values is based on: identifying a subset of the plurality of required binomial coefficient values for generating the each output value; and/or accessing the subset of the plurality of required binomial coefficient value in the cache memory resources, wherein the each output value is generated as a function of the subset of the plurality of required binomial coefficient values.

FIG. 38B illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 38B. In particular, a node 37 can utilize their own query execution memory resources 3045 to execute some or all of the steps of FIG. 38B, where multiple nodes 37 implement their own query processing modules 2435 to independently execute the steps of FIG. 38B for example, to facilitate execution of a query as participants in a query execution plan 2405. Some or all of the steps of FIG. 38B can optionally be performed by any other processing module of the database system 10. Some or all of the steps of FIG. 38B can be performed to implement some or all of the functionality of the database system 10 as described in conjunction with FIGS. 37A-37J, for example, by implementing some or all of the functionality of applying one or more numerical stability strategies 3766 in conjunction with executing a query, and/or can be performed in conjunction with other performance of differentiation/integration described in conjunction with FIGS. 34A-37J. Some or all of the steps of FIG. 38B can be performed to implement some or all of the functionality regarding execution of a query via the plurality of nodes in the query execution plan 2405 as described in conjunction with some or all of FIGS. 24A-25E. Some or all steps of FIG. 38B can be performed by database system 10 in accordance with other embodiments of the database system 10 and/or nodes 37 discussed herein. Some or all steps of FIG. 38B can be performed in conjunction with one or more steps of FIG. 34L, of FIG. 35H, FIG. 36H, FIG. 38A, and/or of any other method described herein.

Step 3822 includes determining a query for execution against at least one relational database table. Step 3824 includes executing the query to generate each of a set of output values.

Performing step 3824 can include performing step 3826 and/or 3828. Step 3826 includes performing a plurality of calculations upon numeric values of a first numeric datatype having a first precision to generate an initial output value. Step 3828 includes truncating the initial output value to generate a truncated output value of a second numeric datatype having a second precision that is less precise than the first precision. In various examples, the ordered set of output values are generated as values of the second numeric datatype.

In various examples, the second numeric datatype is a 64-bit double datatype, and/or the first numeric datatype is an 80-bit floating point datatype.

In various examples, the set of output values meets a numerical stability condition based on performing the plurality of calculations via the first numeric datatype having the first precision.

In various examples, the set of output values are generated based on performing the plurality of calculations upon a set of input values in executing the query. In various examples, the query indicates differentiation at a numeric degree having a first sign. In various examples, the method further includes determining a second query that indicates opposing differentiation at the numeric degree having a second sign opposite the first sign based on the second query being configured to revert the set of output values of the query back to the set of input values. In various examples, the method further includes executing the second query upon the set of output values to generate each of a second set of output values. In various examples, executing the second query upon the set of output values to generate each of the second set of output values is based on: performing a second plurality of calculations upon second numeric values of the first numeric datatype having the first precision to generate a second initial output value; and/or truncating the second initial output value to generate a second truncated output value of the second numeric datatype having the second precision that is less precise than the first precision. In various examples, wherein the second ordered set of output values are generated as second values of the second numeric datatype. In various examples, a numeric difference between the set of input values and the second set of output values falls below a threshold maximum difference based on the set of output values meeting the numerical stability condition.

In various examples, the differentiation of the query is implemented as derivation and the differentiation of the second query is implemented as integration. In various examples, the differentiation of the query is implemented as integration and the differentiation of the second query is implemented as derivation. In various examples, the respective integration and derivation is first order integration and derivation. In various examples, the respective integration and derivation is higher order integration and derivation (e.g. 2nd order, third order, etc.). In various examples, the respective integration and derivation is fractional order integration and derivation.

In various examples, executing the query is based on: determining an ordered set of input rows based on accessing a corresponding plurality of relational database rows in the at least one relational database table; and/or generating the set of output values as an ordered set of output values based on performing a window function upon each row in the ordered set of input rows to return an output value for the each row as a function of the each row and further as a function of at least one binomial coefficient value of the plurality of required binomial coefficient values. In various examples, the output value for the each row is generated based on accessing the least one binomial coefficient value in the cache memory.

In various examples, the output value for the each row is generated further as a function of all prior consecutive rows in the ordered set of input rows from the each row.

In various examples, the method further includes determining a query expression for execution indicating performance of a degree of differentiation based on including a call to a differentiation function included in the query expression having a configured numeric value as a configurable degree parameter indicating the degree of differentiation. In various examples, the plurality of calculations are performed to generate the set of output values in accordance with the degree of differentiation.

In various examples, at least one of: the degree of differentiation is implemented as derivation based on the configured numeric value being a positive numeric value; the degree of differentiation is implemented as derivation based on the configured numeric value being a negative numeric value; and/or the degree of differentiation is implemented as fractional order differentiation based on the configured numeric value being a non-integer numeric value.

In various examples, the least one relational database table includes a corresponding plurality of relational database rows corresponding to time series data having temporal values indicated in at least one column. In various examples, the set of output values is generated as an ordered set of output values based processing an ordered set of input values generated based on ordering by the temporal values in the at least one column.

In various examples, the ordered set of output values meet a stationary data condition based on implementing a differentiation function via the plurality of calculations. In various examples, the method further includes executing at least one time series forecasting algorithm upon the ordered set of output values based on the ordered set of output values meeting the stationary data condition.

In various examples, the query is executed based on applying at least one numerical stability strategy. In various examples, the plurality of calculations are performed upon numeric values of the first numeric datatype having the first precision that is higher precision that the second numeric datatype based on implementing the at least one numerical stability strategy.

In various embodiments, any one of more of the various examples listed above are implemented in conjunction with performing some or all steps of FIG. 38B. In various embodiments, any set of the various examples listed above can implemented in tandem, for example, in conjunction with performing some or all steps of FIG. 38B, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 38B described above, for example, in conjunction with further implementing any one or more of the various examples described above.

In various embodiments, a database system (e.g. a corresponding query processing system of a database system) includes at least one processor and at least one memory that stores operational instructions. In various embodiments, the operational instructions, when executed by the at least one processor, cause the database system to perform some or all steps of FIG. 38B, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to determine a query for execution against at least one relational database table; and/or execute the query to generate each of a set of output values based on: performing a plurality of calculations upon numeric values of a first numeric datatype having a first precision to generate an initial output value; and/or truncating the initial output value to generate a truncated output value of a second numeric datatype having a second precision that is less precise than the first precision. In various examples, the ordered set of output values are generated as values of the second numeric datatype.

FIG. 38C illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 38C. In particular, a node 37 can utilize their own query execution memory resources 3045 to execute some or all of the steps of FIG. 38C, where multiple nodes 37 implement their own query processing modules 2435 to independently execute the steps of FIG. 38C for example, to facilitate execution of a query as participants in a query execution plan 2405. Some or all of the steps of FIG. 38C can optionally be performed by any other processing module of the database system 10. Some or all of the steps of FIG. 38C can be performed to implement some or all of the functionality of the database system 10 as described in conjunction with any performance of differentiation/integration described in conjunction with FIGS. 34A-37J. Some or all of the steps of FIG. 38C can be performed to implement some or all of the functionality regarding execution of a query via the plurality of nodes in the query execution plan 2405 as described in conjunction with some or all of FIGS. 24A-25E. Some or all steps of FIG. 38C can be performed by database system 10 in accordance with other embodiments of the database system 10 and/or nodes 37 discussed herein. Some or all steps of FIG. 38C can be performed in conjunction with one or more steps of FIG. 34L, of FIG. 35H, FIG. 36H, FIG. 38A, FIG. 38B, and/or of any other method described herein.

Step 3842 includes determining a query indicating performance of differentiation. Step 3844 includes executing the query.

Performing step 3844 can include performing some or all of steps 3846, 3848, and/or 3850. Step 3846 includes determining a set of input rows based on accessing a corresponding plurality of relational database rows in at least one relational database table. Step 3848 includes determining a plurality of subsets of the set of input rows for separate performance of the differentiation. Step 3850 includes generating a plurality of sets of output values based on generating, via each a plurality of parallelized processes corresponding to the plurality of subsets, a corresponding set of output values of the plurality of sets of output values as output of executing the differentiation upon a corresponding subset of the plurality of subsets of the set of input rows.

In various examples, the plurality of sets of output values are generated based on performing a window function upon each row in the corresponding subset of the plurality of subsets of the set of input rows.

In various examples, the plurality of subsets of the set of input rows are identified based on window partitioning applied to the window function.

In various examples, the window partitioning is performed in accordance with implementing functionality of a PARTITION BY clause applied to the window function.

In various examples, the set of input rows includes a plurality of columns. In various examples, the plurality of subsets of the set of input rows are identified based on grouping ones of the plurality of rows having a same value for a first one of the plurality of columns into a same one of the plurality of subsets. In various examples, the differentiation is performed based on processing values of a second one of the plurality of columns. In various examples, a first one of the plurality of columns corresponds to a category identifier type, and/or a second one of the plurality of columns corresponds to a numeric value type.

In various examples, the category identifier type corresponds to a stock identifier type. In various examples, the first one of the plurality of columns includes a first plurality of values each identifying a particular stock from a plurality of different stocks. In various examples, the numeric value type corresponds to a stock price type. In various examples, the second one of the plurality of columns includes a second plurality of values each identifying a particular stock price for a corresponding particular stock of the first column.

In various examples, the differentiation is performed based on processing values of the second one of the plurality of columns for the corresponding subset of the plurality of subsets of the set of input rows in accordance with applying a corresponding window function to an ordered subset of rows ordered by a third column of the plurality of columns different from the first column and the second column.

In various examples, the third column stores temporal values. In various examples, the corresponding window function is applied to the ordered subset of rows based on the corresponding subset being ordered by the temporal values.

In various examples, the first column is a stock identifier column. In various examples, the second column is a stock price column. In various examples, the third column is a temporal column (e.g. indicating date and/or time). In various examples, each row of the set of input rows indicates a stock price for a corresponding stock identifier at a corresponding temporal period (e.g. date and/or time), and wherein a first set of output values of the plurality of sets of output values corresponds to differentiation of a first plurality of stock prices for a first stock identifier over time, and wherein a second set of output values of the plurality of sets of output values corresponds to differentiation of a second plurality of stock prices for a second stock identifier over time.

In various examples, different sets of output values of the plurality of sets of output values are generated via different ones of the plurality of parallelized processes independently.

In various examples, the method further includes determining a query expression for execution indicating performance of a degree of the differentiation based on including a call to a differentiation function included in the query expression having a configured numeric value as a configurable degree parameter indicating the degree of the differentiation. In various examples, each set of output values of the plurality of sets of output values are generated in accordance with the degree of the differentiation.

In various examples, at least one of: the degree of the differentiation is implemented as derivation based on the configured numeric value being a positive numeric value; the degree of the differentiation is implemented as derivation based on the configured numeric value being a negative numeric value; and/or the degree of the differentiation is implemented as fractional order differentiation based on the configured numeric value being a non-integer numeric value.

In various embodiments, any one of more of the various examples listed above are implemented in conjunction with performing some or all steps of FIG. 38C. In various embodiments, any set of the various examples listed above can implemented in tandem, for example, in conjunction with performing some or all steps of FIG. 38C, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 38C described above, for example, in conjunction with further implementing any one or more of the various examples described above.

In various embodiments, a database system (e.g. a corresponding query processing system of a database system) includes at least one processor and at least one memory that stores operational instructions. In various embodiments, the operational instructions, when executed by the at least one processor, cause the database system to perform some or all steps of FIG. 38C, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to determine a query indicating performance of differentiation, and/or execute the query based on: determining a set of input rows based on accessing a corresponding plurality of relational database rows in at least one relational database table; determining a plurality of subsets of the set of input rows for separate performance of the differentiation; and/or generating a plurality of sets of output values based on generating, via each a plurality of parallelized processes corresponding to the plurality of subsets, a corresponding set of output values of the plurality of sets of output values as output of executing the differentiation upon a corresponding subset of the plurality of subsets of the set of input rows.

FIG. 38D illustrates a method for execution by at least one processing module of a database system 10, such as via query execution module 2504 in executing one or more operators 2520, and/or via an operator flow generator module 2514 in generating a query operator execution flow 2517 for execution. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 38D. In particular, a node 37 can utilize their own query execution memory resources 3045 to execute some or all of the steps of FIG. 38D, where multiple nodes 37 implement their own query processing modules 2435 to independently execute the steps of FIG. 38D for example, to facilitate execution of a query as participants in a query execution plan 2405. Some or all of the steps of FIG. 38D can optionally be performed by any other processing module of the database system 10. Some or all of the steps of FIG. 38B can be performed to implement some or all of the functionality of the database system 10 as described in conjunction with FIGS. 37A-37J, for example, by implementing some or all of the functionality of applying one or more numerical stability strategies 3766 in conjunction with executing a query, and/or can be performed in conjunction with other performance of differentiation/integration described in conjunction with FIGS. 34A-37J. Some or all of the steps of FIG. 38D can be performed to implement some or all of the functionality regarding execution of a query via the plurality of nodes in the query execution plan 2405 as described in conjunction with some or all of FIGS. 24A-25E. Some or all steps of FIG. 38D can be performed by database system 10 in accordance with other embodiments of the database system 10 and/or nodes 37 discussed herein. Some or all steps of FIG. 38D can be performed in conjunction with one or more steps of FIG. 34L, of FIG. 35H, FIG. 36H, FIG. 38A, FIG. 38B, FIG. 38C, and/or of any other method described herein.

Step 3862 includes determining a query for execution against at least one relational database table indicating performance of differentiation. Step 3864 includes executing the query to generate a set of output values based on implementing at least one numerical stability strategy.

Performing step 3864 can include performing some or all of steps 3866, 3868, and/or 3870, for example, in implementing the at least one numerical stability strategy to generate each output value of the set of output values. Step 3866 includes initializing at least one vector corresponding to unevaluated output of at least one corresponding function. Step 3868 includes updating multiple numeric values of the at least one vector to reflect the unevaluated output. Step 3870 includes generating the each output value based on processing the multiple numeric values of the at least one vector.

In various examples, the at least one vector is generated in accordance with generating a plurality of binomial coefficient values.

In various examples, at least one of the plurality of binomial coefficient values is generated based on computing a natural logarithm of an absolute value of a gamma function.

In various examples, the at least one vector is implemented as having a maximum size. In various examples, the at least one vector is maintained in accordance with the maximum size based on removing at least one numeric value in response to at least one new numeric value being added.

In various examples, the at least one vector is maintained via a plurality of updates to the multiple numeric values via a plurality of iterations executed via implementing of at least one for loop structure.

In various examples, the at least one vector includes a plurality of vectors corresponding to unevaluated output of a plurality of intermediate values. In various examples, the each output value is generated based on processing the plurality of vectors.

In various examples, the at least one vector corresponds to unevaluated output of a dot product.

In various examples, the at least one vector is implemented to include multiple long double data type values representing a full value of a quad-precision floating point type.

In various examples, the multiple long double data type values includes exactly two long double data type values based on each long double data type values being represented via 80 bits and further based on the full value of the quad-precision floating point type being represented via 128 bits.

In various examples, the multiple long double data type values represent output of an exponential function.

In various examples, the each output value is generated based on casting a value generated based on evaluating the unevaluated output by processing the multiple numeric values of the at least one vector to a predetermined data type.

In various examples, implementing the at least one numerical stability strategy is based on reducing rounding error in generating the set of output values.

In various examples, the at least one value of the multiple numeric values is a tracked error value. In various examples, processing the multiple numeric values includes applying the tracked error value to reduce the rounding error.

In various examples, the at least one vector is implemented based on at least one of: a Kahan summation technique, or a Dekker multiplication technique.

In various examples, the at least one vector is implemented as unevaluated output of at least one of: as summation, or a dot product.

In various examples, the query is further based on: determining an ordered set of input rows based on accessing a corresponding plurality of relational database rows in the at least one relational database table; and/or generating the set of output values as an ordered set of output values based on performing a window function upon each row in the ordered set of input rows to return an output value for the each row as a function of the each row.

In various examples, the output value for the each row is generated further as a function of all prior consecutive rows in the ordered set of input rows from the each row.

In various examples, the implementing the at least one numerical stability strategy is further based on enforcing a maximum input row count. In various examples, the ordered set of input rows is configured based on not exceeding the maximum input row count requirement.

In various examples, the least one relational database table includes a corresponding plurality of relational database rows corresponding to time series data having temporal values indicated in at least one column. In various examples, the set of output values is generated as an ordered set of output values based processing an ordered set of input values generated based on ordering by the temporal values in the at least one column.

In various examples, the method further includes determining a query expression for execution indicating performance of a degree of the differentiation based on including a call to a differentiation function included in the query expression having a configured numeric value as a configurable degree parameter indicating the degree of the differentiation. In various examples, the set of output values are generated in accordance with the degree of the differentiation.

In various examples, at least one of: the degree of the differentiation is implemented as derivation based on the configured numeric value being a positive numeric value; the degree of the differentiation is implemented as derivation based on the configured numeric value being a negative numeric value; and/or the degree of the differentiation is implemented as fractional order differentiation based on the configured numeric value being a non-integer numeric value.

In various examples, the set of output values meets a numerical stability condition based on implementing the at least one numerical stability strategy.

In various examples, the set of output values are generated based on processing a set of input values in executing the query. In various examples, the query indicates differentiation at a numeric degree having a first sign. In various examples, the method further includes determining a second query that indicates opposing differentiation at the numeric degree having a second sign opposite the first sign based on the second query being configured to revert the set of output values of the query back to the set of input values; and/or executing the second query upon the set of output values to generate each of a second set of output values. In various examples, executing the second query upon the set of output values to generate each of the second set of output values is based on: initializing at least one second vector corresponding to second unevaluated output of at least one second corresponding function; updating multiple second numeric values of the at least one second vector to reflect the second unevaluated output; and/or generating the each of the second set of output values based on processing the multiple second numeric values of the at least one second vector. In various examples, a numeric difference between the set of input values and the second set of output values falls below a threshold maximum difference based on the set of output values meeting the numerical stability condition.

In various embodiments, any one of more of the various examples listed above are implemented in conjunction with performing some or all steps of FIG. 38D. In various embodiments, any set of the various examples listed above can implemented in tandem, for example, in conjunction with performing some or all steps of FIG. 38D, and/or in conjunction with performing any other steps of any other method described herein.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 38D described above, for example, in conjunction with further implementing any one or more of the various examples described above.

In various embodiments, a database system (e.g. a corresponding query processing system of a database system) includes at least one processor and at least one memory that stores operational instructions. In various embodiments, the operational instructions, when executed by the at least one processor, cause the database system to perform some or all steps of FIG. 38D, for example, in conjunction with further implementing any one or more of the various examples described above, and/or in conjunction with further implementing any other one or more of the various examples described in conjunction with other methods presented herein.

In various embodiments, the operational instructions, when executed by the at least one processor, cause the database system to determine a query for execution against at least one relational database table indicating performance of differentiation, and/or execute the query to generate a set of output values. In various examples, generating each output value of the set of output values includes implementing at least one numerical stability strategy based on: initializing at least one vector corresponding to unevaluated output of at least one corresponding function; updating multiple numeric values of the at least one vector to reflect the unevaluated output; and/or generating the each output value based on processing the multiple numeric values of the at least one vector.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e. machine/non-human intelligence.

One or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions associated with the methods and/or processes described herein can be implemented in a system that is operable to electronically store digital data in a memory device. Such storage cannot practically be performed by the human mind because the human mind is not equipped to electronically store digital data.

One or more functions associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a database system, comprising:
receiving a query expression indicating a query for execution against at least one relational database table; and
executing the query based on:
identifying a plurality of required binomial coefficient values required for generating a set of output values for the query based on a configured non-integer numeric value included in the query expression;
utilizing a thread pool of the database system to generate the plurality of required binomial coefficient values as a function of the configured non-integer numeric value via a plurality of parallelized threads of the thread pool, wherein each of the plurality of parallelized threads generates a corresponding subset of the plurality of required binomial coefficient values in parallel with other ones of the plurality of parallelized threads generating other corresponding subsets of the plurality of required binomial coefficient values;
storing the plurality of required binomial coefficient values in cache memory resources; and
generating the set of output values, wherein generating each output value of the set of output values is based on:
identifying a subset of the plurality of required binomial coefficient values for generating the each output value;
accessing the subset of the plurality of required binomial coefficient values in the cache memory resources, wherein the each output value is generated as a function of the subset of the plurality of required binomial coefficient values;
generating a query resultant for the query based on the set of output values; and
removing the plurality of required binomial coefficient values from the cache memory resources based on completing execution of the query.

2. The method of claim 1, wherein generating a first one of the set of output values is based on accessing a first proper subset of the plurality of required binomial coefficient values in the cache memory resources, wherein generating a second one of the set of output values is based on accessing a second proper subset of the plurality of required binomial coefficient values in the cache memory resources, wherein the first proper subset and the second proper subset have a non-null intersection that includes at least one of the plurality of required binomial coefficient values.

3. The method of claim 1, wherein the at least one of the plurality of required binomial coefficient values is computed exactly once for the query based on generating the plurality of required binomial coefficient values.

4. The method of claim 1, wherein executing the query is further based on:
determining an ordered set of input rows based on accessing a corresponding plurality of relational database rows in the at least one relational database table; and
generating the set of output values as an ordered set of output values based on performing a window function upon each row in the ordered set of input rows to return an output value for the each row as a function of the each row and further as a function of at least one binomial coefficient value of the plurality of required binomial coefficient values, wherein the output value for the each row is generated based on accessing the least one binomial coefficient value in the cache memory resources.

5. The method of claim 4, wherein the output value for the each row is generated further as a function of all prior consecutive rows in the ordered set of input rows from the each row.

6. The method of claim 1, wherein the query expression indicates performance of a fractional degree of differentiatio, and wherein the plurality of required binomial coefficient values are identified based on a fractional value of the fractional degree of differentiation.

7. The method of claim 6, wherein a request to perform the fractional degree of differentiation is indicated in a call to a differentiation function included in the query expression based on the call to the differentiation function having the configured non-integer numeric value as a configurable degree parameter indicating the fractional degree of differentiation.

8. The method of claim 7, wherein one of:
the fractional degree of differentiation is implemented as fractional degree derivation based on the configured non-integer numeric value being a positive numeric value; or
the fractional degree of differentiation is implemented as fractional degree integration based on the configured non-integer numeric value being a negative numeric value.

9. The method of claim 7, further comprising:
receiving a second query expression that includes a second call to the differentiation function having a second fractional value for the configurable degree parameter indicating a different non-integer numeric value corresponding to a different degree of fractional differentiation;
executing the second query expression based on:
identifying a second plurality of required binomial coefficient values required for generating a second set of output values, wherein the second plurality of required binomial coefficient values are different from the plurality of required binomial coefficient values based on the second fractional value being different from the fractional value;
generating the second plurality of required binomial coefficient values;
storing the second plurality of required binomial coefficient values in the cache memory resources; and
generating a second set of output values based on accessing binomial coefficient values of the second plurality of required binomial coefficient values in the cache memory resources.

10. The method of claim 1, wherein the least one relational database table includes a corresponding plurality of relational database rows corresponding to time series data having temporal values indicated in at least one column, and wherein the set of output values is generated as an ordered set of output values based processing an ordered set of input values generated based on ordering by the temporal values in the at least one column.

11. The method of claim 10, wherein the ordered set of output values meet a stationary data condition based on performing a fractional degree of differentiation, further comprising:
executing at least one time series forecasting algorithm upon the ordered set of output values based on the ordered set of output values meeting the stationary data condition.

12. The method of claim 1, further comprising:
receiving a second query expression indicating a second query for execution against the at least one relational database table; and
executing the second query based on:
identifying, based on the second query expression, a second plurality of required binomial coefficient values required for generating a second set of output values for the second query based on a second configured non-integer numeric value indicated in the second query expression, wherein the second plurality of required binomial coefficient values are different from the plurality of required binomial coefficient values based on the second configured non-integer numeric value of the second query expression being different from the configured non-integer numeric value of the query expression;
generating the second plurality of required binomial coefficient values as a function of the second configured non-integer numeric value;
storing the second plurality of required binomial coefficient values in the cache memory resources; and
generating the second set of output values, wherein generating each output value of the second set of output values is based on:
identifying a subset of the second plurality of required binomial coefficient values for generating the each output value of the second set of output values; and
accessing the subset of the second plurality of required binomial coefficient values in the cache memory resources, wherein the each output value of the second set of output values is generated as a function of the subset of the second plurality of required binomial coefficient values;
generating a second query resultant for the second query based on the second set of output values; and
removing the second plurality of required binomial coefficient values from the cache memory resources based on completing execution of the second query.

13. The method of claim 1, wherein execution of the query is completed at a first time, wherein the plurality of required binomial coefficient values are removed from the cache memory resources at a second time after the first time, and wherein, during a temporal period between the first time and the second time, the method further comprises:
determining a second query for execution;
executing the second query based on:
identifying a second plurality of required binomial coefficient values required for generating a second set of output values for the second query, wherein the second plurality of required binomial coefficient values has a non-null set intersection with the plurality of required binomial coefficient values;
generating an additional set of binomial coefficient values set corresponding to only ones of the second plurality of required binomial coefficient values not included in the plurality of required binomial coefficient values;
storing the additional set of binomial coefficient values in the cache memory resources;
generating the second set of output values, wherein generating each output value of the second set of output values is based on:
identifying a second subset of the second plurality of required binomial coefficient values for generating the each output value; and
accessing the second subset of the second plurality of required binomial coefficient values in the cache memory resources, wherein the each output value is generated as a function of the subset of the plurality of required binomial coefficient values, and wherein at least one output value of the second set of output values is generated based on accessing at least one binomial coefficient value generated for the query based on being included in the non-null set intersection with the plurality of required binomial coefficient values.

14. A database system includes:
at least one processor; and
a memory that stores operational instructions that, when executed by the at least one processor, cause the database system to:
receive a query expression indicating a query for execution against at least one relational database table; and
execute the query based on:
identifying a plurality of required binomial coefficient values required for generating a set of output values for the query based on a configured non-integer numeric value included in the query expression;
utilizing a thread pool of the database system to generate the plurality of required binomial coefficient values as a function of the configured non-integer numeric value via a plurality of parallelized threads of the thread pool, wherein each of the plurality of parallelized threads generates a corresponding subset of the plurality of required binomial coefficient values in parallel with other ones of the plurality of parallelized threads generating other corresponding subsets of the plurality of required binomial coefficient values;
storing the plurality of required binomial coefficient values in cache memory resources; and
generating the set of output values, wherein generating each output value of the set of output values is based on:
identifying a subset of the plurality of required binomial coefficient values for generating the each output value; and
accessing the subset of the plurality of required binomial coefficient values in the cache memory resources, wherein the each output value is generated as a function of the subset of the plurality of required binomial coefficient values;
generating a query resultant for the query based on the set of output values; and
removing the plurality of required binomial coefficient values from the cache memory resources based on completing execution of the query.

15. The database system of claim 14, wherein generating a first one of the set of output values is based on accessing a first proper subset of the plurality of required binomial coefficient values in the cache memory resources, wherein generating a second one of the set of output values is based on accessing a second proper subset of the plurality of required binomial coefficient values in the cache memory resources, wherein the first proper subset and the second proper subset have a non-null intersection that includes at least one of the plurality of required binomial coefficient values.

16. The database system of claim 14, wherein executing the query is further based on:
  determining an ordered set of input rows based on accessing a corresponding plurality of relational database rows in the at least one relational database table; and
  generating the set of output values as an ordered set of output values based on performing a window function upon each row in the ordered set of input rows to return an output value for the each row as a function of the each row and further as a function of at least one binomial coefficient value of the plurality of required binomial coefficient values, wherein the output value for the each row is generated based on accessing the least one binomial coefficient value in the cache memory resources.

17. The database system of claim 14, wherein the query expression indicates performance of a fractional degree of differentiation, and wherein the plurality of required binomial coefficient values are identified based on a fractional value of the fractional degree of differentiation.

18. The database system of claim 14, wherein the least one relational database table includes a corresponding plurality of relational database rows corresponding to time series data having temporal values indicated in at least one column, and wherein the set of output values is generated as an ordered set of output values based processing an ordered set of input values generated based on ordering by the temporal values in the at least one column.

19. The database system of claim 14, wherein the operational instructions, when executed by the at least one processor, further cause the database system to:
  receive a second query expression indicating a second query for execution against the at least one relational database table; and
  execute the second query based on:
    identifying, based on the second query expression, a second plurality of required binomial coefficient values required for generating a second set of output values for the second query based on a second configured non-integer numeric value indicated in the second query expression, wherein the second plurality of required binomial coefficient values are different from the plurality of required binomial coefficient values based on the second configured non-integer numeric value of the second query expression being different from the configured non-integer numeric value of the query expression;
    generating the second plurality of required binomial coefficient values as a function of the second configured non-integer numeric value;
    storing the second plurality of required binomial coefficient values in the cache memory resources; and
    generating the second set of output values, wherein generating each output value of the second set of output values is based on:
      identifying a subset of the second plurality of required binomial coefficient values for generating the each output value of the second set of output values; and
      accessing the subset of the second plurality of required binomial coefficient values in the cache memory resources, wherein the each output value of the second set of output values is generated as a function of the subset of the second plurality of required binomial coefficient values;
    generating a second query resultant for the second query based on the second set of output values; and
    removing the second plurality of required binomial coefficient values from the cache memory resources based on completing execution of the second query.

20. A non-transitory computer readable storage medium comprises:
  at least one memory section that stores operational instructions that, when executed by a processing module that includes a processor and a memory, causes the processing module to:
    receive a query expression indicating a query for execution against at least one relational database table; and
    execute the query based on:
      identifying a plurality of required binomial coefficient values required for generating a set of output values for the query based on a configured non-integer numeric value included in the query expression;
      utilizing a thread pool to generate the plurality of required binomial coefficient values as a function of the configured non-integer numeric value via a plurality of parallelized threads of the thread pool, wherein each of the plurality of parallelized threads generates a corresponding subset of the plurality of required binomial coefficient values in parallel with other ones of the plurality of parallelized threads generating other corresponding subsets of the plurality of required binomial coefficient values;
      storing the plurality of required binomial coefficient values in cache memory resources; and
      generating the set of output values, wherein generating each output value of the set of output values is based on:
        identifying a subset of the plurality of required binomial coefficient values for generating the each output value;
        accessing the subset of the plurality of required binomial coefficient values in the cache memory resources, wherein the each output value is generated as a function of the subset of the plurality of required binomial coefficient values;
      generating a query resultant for the query based on the set of output values; and
      removing the plurality of required binomial coefficient values from the cache memory resources based on completing execution of the query.

* * * * *